US008351767B2

(12) United States Patent  
Iwase et al.

(10) Patent No.: US 8,351,767 B2  
(45) Date of Patent: Jan. 8, 2013

(54) REPRODUCING DEVICE AND ASSOCIATED METHODOLOGY FOR PLAYING BACK STREAMS

(75) Inventors: Ayako Iwase, Kanagawa (JP); Motoki Kato, Kanagawa (JP); Shinobu Hattori, Tokyo (JP)

(73) Assignee: Sony Corporation, Tokyo (JP)

( * ) Notice: Subject to any disclaimer, the term of this patent is extended or adjusted under 35 U.S.C. 154(b) by 1319 days.

(21) Appl. No.: 11/579,724

(22) PCT Filed: Mar. 2, 2006

(86) PCT No.: PCT/JP2006/303962

§ 371 (c)(1),  
(2), (4) Date: Nov. 6, 2006

(87) PCT Pub. No.: WO2006/093218

PCT Pub. Date: Sep. 8, 2006

(65) Prior Publication Data

US 2008/0285948 A1    Nov. 20, 2008

(30) Foreign Application Priority Data

| Mar. 4, 2005 | (JP) | ................................. 2005-060810 |
| Mar. 4, 2005 | (JP) | ................................. 2005-060811 |
| Apr. 19, 2005 | (JP) | ................................. 2005-121046 |
| May 20, 2005 | (JP) | ................................. 2005-148044 |
| Aug. 30, 2005 | (JP) | ................................. 2005-250162 |
| Sep. 21, 2005 | (JP) | ................................. 2005-274488 |
| Feb. 1, 2006 | (JP) | ................................. 2006-024073 |

(51) Int. Cl.  
*H04N 5/76* (2006.01)

(52) U.S. Cl. ...................................................... 386/341
(58) Field of Classification Search .................. 386/337, 386/341  
See application file for complete search history.

(56) References Cited

U.S. PATENT DOCUMENTS 5,917,781 A * 6/1999 Kim ................................. 369/4  
(Continued)

FOREIGN PATENT DOCUMENTS

EP            1 603 335 A1    12/2005  
(Continued)

OTHER PUBLICATIONS

Japanese Office Action in Patent Application No. 2011-288870, issued on Jan. 19, 2012, with English Translation.

*Primary Examiner* — David Harvey  
(74) *Attorney, Agent, or Firm* — Oblon, Spivak, McClelland, Maier & Neustadt, L.L.P.

(57) ABSTRACT

The present invention relates to a playback apparatus, a playback method, a program, a recording medium, a data structure, and a manufacturing method for a recording medium in which content to be played back can be switched between streams different from a main stream. A PlayList includes Main path for referring to Video and Audio within a main TS, Sub Path-A for referring to Secondary Video and Secondary Audio in a sub TS, and Sub Path-B for referring to Audio in a sub TS. STN_table( ), which is information for selecting Video and Audio in a clip AV stream file-0 as PlayItem-1 and selecting Secondary Video and Secondary Audio in clip AV stream file-1, or Audio in clip AV stream file-2 as SubPlayItem (SPI) which is simultaneously played back with PlayItem-1, is used. The present invention is applicable to a playback apparatus.

12 Claims, 86 Drawing Sheets

U.S. PATENT DOCUMENTS

| | | | |
|---|---|---|---|
| 6,775,467 B1 * | 8/2004 | Su | 386/241 |
| 7,676,142 B1 * | 3/2010 | Hung | 386/233 |
| 7,792,418 B2 * | 9/2010 | Seo et al. | 386/334 |
| 8,019,196 B2 * | 9/2011 | Takakuwa et al. | 386/248 |
| 2003/0012558 A1 | 1/2003 | Kim et al. | |
| 2004/0184768 A1 * | 9/2004 | Seo et al. | 386/46 |
| 2005/0259968 A1 * | 11/2005 | Tsumagari et al. | 386/95 |
| 2006/0039258 A1 | 2/2006 | Seo et al. | |
| 2007/0041279 A1 * | 2/2007 | Kim et al. | 369/4 |
| 2010/0046912 A1 * | 2/2010 | Ikeda et al. | 386/71 |
| 2010/0054706 A1 * | 3/2010 | McCrossan et al. | 386/95 |

FOREIGN PATENT DOCUMENTS

| | | |
|---|---|---|
| EP | 1 638 327 A1 | 3/2006 |
| EP | 1 717 808 A1 | 11/2006 |
| EP | 1 921 622 A2 | 5/2008 |
| EP | 1 921 622 A3 | 5/2008 |
| JP | 08-287654 | 11/1996 |
| JP | 11-298845 | 10/1999 |
| JP | 2002-158972 A | 5/2002 |
| JP | 2002-237170 | 8/2002 |
| JP | 2003-101957 | 4/2003 |
| JP | 2003-134440 | 5/2003 |
| JP | 2003-230104 | 8/2003 |
| JP | 2003-242753 | 8/2003 |
| JP | 2003-249057 | 9/2003 |
| JP | 2005-332521 | 12/2005 |
| WO | 2004/034398 | 4/2004 |
| WO | WO 2004/032141 * | 4/2004 |
| WO | WO-2004/074976 | 9/2004 |
| WO | WO 2004/074976 A2 | 9/2004 |
| WO | WO-2004/075547 | 9/2004 |
| WO | WO 2004/075547 A1 | 9/2004 |
| WO | WO-2004/114658 | 12/2004 |
| WO | WO 2004/114658 A1 | 12/2004 |
| WO | WO 2005/088634 A1 | 9/2005 |
| WO | WO 2006/080460 | 8/2006 |

\* cited by examiner

FIG. 1
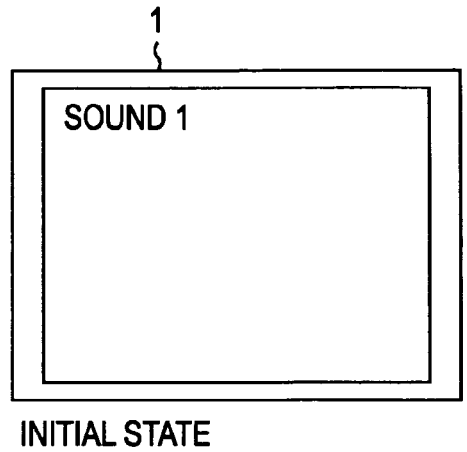
INITIAL STATE
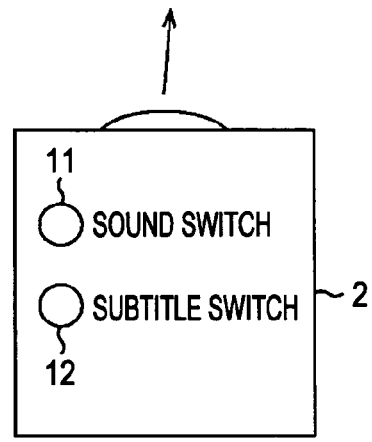
FIG. 2
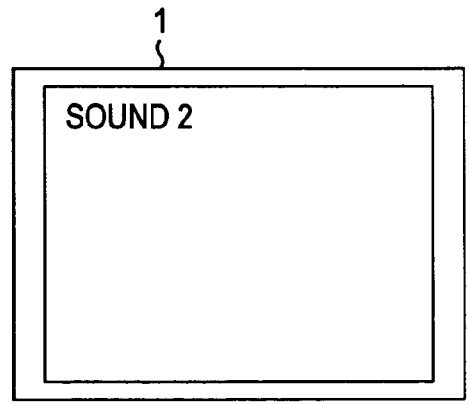

FIG. 4

STREAM NUMBER TABLE

A_SN=1: AUDIO 2
A_SN=2: AUDIO 1
A_SN=3: AUDIO 3

S_SN=1: SUB-PICTURE 3
S_SN=2: SUB-PICTURE 1
S_SN=3: SUB-PICTURE 2

FIG. 9

PlayList-Syntax

| Syntax | No. of bits | Mnemonic |
|---|---|---|
| PlayList() { | | |
|   length | 32 | uimsbf |
|   reserved_for_future_use | 16 | bslbf |
|   number_of_PlayItems | 16 | uimsbf |
|   number_of_SubPaths | 16 | uimsbf |
|   for (PlayItem_id=0; | | |
|     PlayItem_id<number_of_PlayItems; | | |
|     PlayItem_id++) { | | |
|       PlayItem() | | |
|   } | | |
|   for (SubPath_id= 0; | | |
|     SubPath_id<number_of_SubPaths; | | |
|     SubPath_id++) { | | |
|       SubPath() | | |
|   } | | |
| } | | |

FIG. 10

SubPath-Syntax

| Syntax | No. of bits | Mnemonic |
|---|---|---|
| SubPath() { | | |
|     length | 32 | uimsbf |
|     reserved_for_future_use | 8 | bslbf |
|     SubPath_type | 8 | uimsbf |
|     reserved_for_future_use | 15 | uimsbf |
|     is_repeat_SubPath | 1 | bslbf |
|     reserved_for_future_use | 8 | bslbf |
|     number_of_SubPlayItems | 8 | uimsbf |
|     for (i=0; i< number_of_SubPlayItems; i++) { | | |
|         SubPlayItem(i) | | |
|     } | | |
| } | | |

FIG. 11

SubPath_type

| SubPath_type | Meaning |
|---|---|
| 0 | reserved |
| 1 | reserved |
| 2 | Audio presentation path of the Browsable slideshow<br>(The audio presentation path using the SubPath is not synchronized with the main path using PlayItems in the PlayList.) |
| 3 | Interactive graphics presentation menu<br>(The interactive graphics menu using the SubPath is not synchronized with the main path using PlayItems in the PlayList.) |
| 4 | Text subtitle presentation path<br>(The text subtitle presentation path using the SubPath is synchronized with the main path using PlayItems in the PlayList.) |
| 5 | 2nd Audio Presentation path<br>(The 2nd Audio Presentation path using the SubPath is synchronized with the main path using PlayItems in the PlayList.) |
| 6 | 2nd Video Presentation path<br>(The 2nd Video Presentation path using the SubPath is synchronized with the main path using PlayItems in the PlayList.) |
| 7-255 | reserved |

FIG. 12

SubPlayItem(i)-Syntax

| Syntax | No. of bits | Mnemonic |
|---|---|---|
| SubPlayItem(i) { | | |
|   length | 16 | uimsbf |
|   Clip_Information_file_name[0]    //subclip_entry_id=0 | 8*5 | bslbf |
|   Clip_codec_identifier[0] | 8*4 | bslbf |
|   reserved_for_future_use | 31 | bslbf |
|   is_multi_Clip_entries | 1 | bslbf |
|   ref_to_STC_id[0] | 8 | uimsbf |
|   SubPlayItem_IN_time | 32 | uimsbf |
|   SubPlayItem_OUT_time | 32 | uimsbf |
|   sync_PlayItem_id | 16 | uimsbf |
|   sync_start_PTS_of_PlayItem | 32 | uimsbf |
|   if(is_multi_Clip_entries==1b) { | | |
|     reserved_for_future_use | 8 | bslbf |
|     num_of_Clip_entries | 8 | uimsbf |
|     for(subclip_entry_id=1;//Note:Entries after subclip_entry_id=0 | | |
|     subclip_entry_id<num_of_Clip_entries;subclip_entry_id ++) { | | |
|       Clip_Information_file_name[subclip_entry_id] | 8*5 | bslbf |
|       Clip_codec_identifier[subclip_entry_id] | 8*4 | bslbf |
|       ref_to_STC_id[subclip_entry_id] | 8 | uimsbf |
|       reserved_for_future_use | 8 | bslbf |
|     } | | |
|   } | | |
| } | | |

FIG. 13

PlayItem-Syntax

| Syntax | No. of bits | Mnemonic |
|---|---|---|
| PlayItem() { | | |
|     length | 16 | uimsbf |
|     Clip_Information_file_name[0] | 8*5 | bslbf |
|     Clip_codec_identifier[0] | 8*4 | bslbf |
|     reserved_for_future_use | 11 | bslbf |
|     is_multi_angle | 1 | bslbf |
|     connection_condition | 4 | uimsbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_mode | 8 | uimsbf |
|     still_mode | 8 | uimsbf |
|     if(still_mode==0x1) { | | |
|         still_time | 16 | uimsbf |
|     } else { | | |
|         reserved | 16 | bslbf |
|     } | | |
|     if(is_multi_angle==1b) { | | |
|         number_of_angles | 8 | uimsbf |
|         reserved_for_future_use | 7 | bslbf |
|         is_seamless_angle_change | 1 | uimsbf |
|         for(angle_id = 1; //Note: angles after angle_id=1 | | |
|         angle_id<number_of_angles; angle_id++) { | | |
|             Clip_Information_file_name[angle_id] | 8*5 | bslbf |
|             Clip_codec_identifier[angle_id] | 8*4 | bslbf |
|             ref_to_STC_id[angle_id] | 8 | uimsbf |
|             reserved_for_future_use | 16 | bslbf |
|         } | | |
|     } | | |
|     STN_table() | | |
| } | | |

FIG. 14

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0;<br>        video_stream_id < number_of_video_stream_entries;<br>        video_stream_id++) { | | |
|         stream_entry() | | |
|         stream_attribute() | | |
|     } | | |
|     for (audio_stream_id=0;<br>        audio_stream_id < number_of_audio_stream_entries;<br>        audio_stream_id++) { | | |
|         stream_entry() | | |
|         stream_attributes() | | |
|         if(type==3) { | | |
|             stream_attributes() | | |
|         } | | |
|     } | | |
|     for (PG_textST_stream_id=0;<br>        PG_textST_stream_id < number_of_PG_textST_stream_entries;<br>        PG_txtST_stream_id++) { | | |
|         stream_entry() | | |
|         stream_attribute() | | |
|     } | | |
|     for (IG_stream_id=0;<br>        IG_stream_id < number_of_IG_stream_entries;<br>        IG_stream_id++) { | | |
|         stream_entry() | | |
|         stream_attribute() | | |
|     } | | |
| } | | |

FIG. 15

Stream_entry()

| Syntax | No. of bits | Mnemonic |
|---|---|---|
| stream_entry(id) { | | |
|    length | 8 | uimsbf |
|    type | 8 | uimsbf |
|    if(type==1 \|\| type==3) { | | |
|       ref_to_stream_PID_of_mainClip | 16 | uimsbf |
|       reserved_for_future_use | 48 | Bslbf |
|    } else if(type==2 \|\| type==3) { | | |
|       ref_to_SubPath_id | 8 | Uimsbf |
|       ref_to_subClip_entry_id | 8 | Uimsbf |
|       ref_to_stream_PID_of_subClip | 16 | |
|       reserved_for_future_use | 32 | bslbf |
|    } | | |
| } | | |

FIG. 16

STN_table()

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0; | | |
|         video_stream_id < number_of_video_stream_entries; | | |
|         video_stream_id++) { | | |
|         stream_entry() | | |
|         stream_attribute() | | |
|     } | | |
|     for (audio_stream_id=0; | | |
|         audio_stream_id < number_of_audio_stream_entries; | | |
|         audio_stream_id++) { | | |
|         stream_entry() | | |
|         stream_attributes() | | |
|         secondary_audio_present_flag | 8 | bslbf |
|         if (secondary_audio_present_flag) { | | |
|             stream_entry() | | |
|             stream_attributes() | | |
|         } | | |
|     } | | |
|     for (PG_textST_stream_id=0; | | |
|         PG_textST_stream_id < number_of_PG_textST_stream_entries; | | |
|         PG_txtST_stream_id++) { | | |
|         stream_entry() | | |
|         stream_attribute() | | |
|     } | | |
|     for (IG_stream_id=0; | | |
|         IG_stream_id < number_of_IG_stream_entries; | | |
|         IG_stream_id++) { | | |
|         stream_entry() | | |
|         stream_attribute() | | |
|     } | | |
| } | | |

FIG. 17

Stream_entry()

| Syntax | No. of bits | Mnemonic |
|---|---|---|
| stream_entry(id) { | | |
|   length | 8 | uimsbf |
|   type | 8 | uimsbf |
|   if(type==1) { | | |
|     ref_to_stream_PID_of_mainClip | 16 | uimsbf |
|     reserved_for_future_use | 48 | Bslbf |
|   } else if(type==2) { | | |
|     ref_to_SubPath_id | 8 | Uimsbf |
|     ref_to_subClip_entry_id | 8 | Uimsbf |
|     ref_to_stream_PID_of_subClip | 16 | |
|     reserved_for_future_use | 32 | bslbf |
|   } | | |
| } | | |

FIG. 18 stream_attribute()

| Syntax | No. of bits | Mnemonic |
|---|---|---|
| stream_attribute() { | | |
|     length | 8 | uimsbf |
|     stream_coding_type | 8 | bslbf |
|     if (stream_coding_type==0x02) { | | |
|         video_format | 4 | bslbf |
|         frame_rate | 4 | bslbf |
|         aspect_ratio | 4 | bslbf |
|         reserved_for_future_use | 4 | bslbf |
|     } else if (stream_coding_type==0x80 \|\| <br>         stream_coding_type==0x81 \|\| <br>         stream_coding_type==0x82) { | | |
|         audio_presentation_type | 4 | bslbf |
|         sampling_frequency | 4 | bslbf |
|         audio_language_code | 8*2 | bslbf |
|         reserved_for_future_use | 8 | bslbf |
|     } else if (stream_coding_type==0x90) { <br>         // Presentation graphics stream | | |
|         PG_language_code | 8*2 | bslbf |
|     } else if (stream_coding_type==0x91) { <br>         // Interactive graphics stream | | |
|         IG_language_code | 8*2 | bslbf |
|     } else if (stream_coding_type==0x92) { <br>         // Text subtitle stream | | |
|         character_code | 8 | bslbf |
|         textST_language_code | 8*2 | bslbf |
|     } | | |
| } | | |

FIG. 19 stream_coding_type

| stream_coding_type | Meaning |
|---|---|
| 0x02 | MPEG-2 video stream |
| 0x80 | HDMV LPCM audio |
| 0x81 | Dolby AC-3 audio |
| 0x82 | dts audio |
| 0x90 | Presentation graphics stream |
| 0x91 | Interactive graphics stream |
| 0x92 | Text subtitle stream |
| other values | reserved |

FIG. 20 video_format

| video_format | Meaning | Video standard |
|---|---|---|
| 0 | reserved | |
| 1 | 480i | ITU-R BT.601-4 |
| 2 | 576i | ITU-R BT.601-4 |
| 3 | 480p | SMPTE 293M |
| 4 | 1080i | SMPTE 274M |
| 5 | 720p | SMPTE 296M |
| 6 | 1080p | SMPTE 274M |
| 7 - 14 | reserved | |

FIG. 21 frame_rate

| frame_rate | Meaning [Hz] |
|---|---|
| 0 | reserved |
| 1 | 24 000/1001 (23.976...) |
| 2 | 24 |
| 3 | 25 |
| 4 | 30 000/1001 (29.97...) |
| 5 | reserved |
| 6 | 50 |
| 7 | 60 000/1001 (59.94...) |
| 8-15 | reserved |

FIG. 22 aspect_ratio

| aspect_ratio | Meaning |
|---|---|
| 0 | reserved |
| 1 | reserved |
| 2 | 4:3 display aspect ratio |
| 3 | 16:9 display aspect ratio |
| 4-15 | reserved |

FIG. 23 audio_presentation_type

| audio_presentation_type | Meaning |
|---|---|
| 0 | reserved |
| 1 | single mono channel |
| 2 | dual mono channel |
| 3 | stereo (2-channel) |
| 4 | reserved |
| 5 | reserved |
| 6 | multi-channel |
| 7-15 | reserved |

FIG. 24 sampling_frequency

| sampling_frequency | Meaning |
|---|---|
| 0 | reserved |
| 1 | 48 kHz |
| 2 | reserved |
| 3 | reserved |
| 4 | 96 kHz |
| 5 -15 | reserved |

FIG. 25

| Character code | | |
|---|---|---|
| Character code value | Character set | Character Encoding scheme |
| 0x00 | reserved | |
| 0x01 | Unicode V1.1 (ISO 10646-1) | UTF8 |
| 0x02 | Unicode V1.1 (ISO 10646-1) | UTF16 big endian |
| 0x03 | Shift JIS (Japanese) | |
| 0x04 | KSC 5601-1987 including KSC 5653 for Roman character (Korean) | |
| 0x05 | GB18030-2000 (Chinese) | |
| 0x06 | GB2312 (Chinese) | |
| 0x07 | BIG5 (Chinese) | |
| Others | Reserved | |

FIG. 26

```
―――――――― STREAM NUMBER TABLE ――――――――

A_SN=1: AUDIO 2
A_SN=2: AUDIO 1
A_SN=3: AUDIO 3
A_SN=4: AUDIO 2 + AUDIO 4
A_SN=5: AUDIO 1 + AUDIO 4

S_SN=1: SUB-PICTURE 3
S_SN=2: SUB-PICTURE 1
S_SN=3: SUB-PICTURE 2
```

FIG. 35

| STN_table() Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 56 | bslbf |
|     for (video_stream_id=0;<br>        video_stream_id < number_of_video_stream_entries;<br>        video_stream_id++) { | | |
|         stream_entry() | | |
|         stream_attribute() | | |
|     } | | |
|     for (audio_stream_id=0;<br>        audio_stream_id < number_of_audio_stream_entries;<br>        audio_stream_id++) { | | |
|         stream_entry() | | |
|         stream_attributes() | | |
|     } | | |
|     for (audio_stream_id2=0;<br>        audio_stream_id2 < number_of_audio_stream2_entries;<br>        audio_stream_id2++) { | | |
|         stream_entry() | | |
|         stream_attributes() | | |
|     } | | |
|     for (PG_textST_stream_id=0;<br>        PG_textST_stream_id < number_of_PG_textST_stream_entries;<br>        PG_txtST_stream_id++) { | | |
|         stream_entry() | | |
|         stream_attribute() | | |
|     } | | |
|     for (IG_stream_id=0;<br>        IG_stream_id < number_of_IG_stream_entries;<br>        IG_stream_id++) { | | |
|         stream_entry() | | |
|         stream_attribute() | | |
|     } | | |
| } | | |

FIG. 37

STN_table()

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 56 | bslbf |
|     for (video_stream_id=0;<br>        video_stream_id < number_of_video_stream_entries;<br>        video_stream_id++) { | | |
|         stream_entry() | | |
|         stream_attribute() | | |
|     } | | |
|     for (audio_stream_id=0;<br>        audio_stream_id < number_of_audio_stream_entries;<br>        audio_stream_id++) { | | |
|         stream_entry() | | |
|         stream_attributes() | | |
|     } | | |
|     for (audio_stream_id2=0;<br>        audio_stream_id2 < number_of_audio_stream2_entries;<br>        audio_stream_id2++) { | | |
|         Combination_of_Primary_and_Secondary | | |
|         stream_entry() | | |
|         stream_attributes() | | |
|     } | | |
|     for (PG_textST_stream_id=0;<br>        PG_textST_stream_id < number_of_PG_textST_stream_entries;<br>        PG_txtST_stream_id++) { | | |
|         stream_entry() | | |
|         stream_attribute() | | |
|     } | | |
|     for (IG_stream_id=0;<br>        IG_stream_id < number_of_IG_stream_entries;<br>        IG_stream_id++) { | | |
|         stream_entry() | | |
|         stream_attribute() | | |
|     } | | |
| } | | |

FIG. 38

Combination_of_Primary_and_Secondary

| audio_stream_id | 0 | 1 | 2 | 3 | 4 | 5 | ... | 26 | 27 | 28 | 29 | 30 | 31 |
|---|---|---|---|---|---|---|---|---|---|---|---|---|---|
| indicator | 1 | 1 | 0 | 0 | 0 | 0 | ... | 0 | 0 | 0 | 0 | 0 | 0 |

FIG. 39

```
 ─── STREAM NUMBER TABLE ───────────────

A_SN=1: AUDIO 2 ... × AUDIO 4
A_SN=2: AUDIO 1 ... × AUDIO 4, × AUDIO 5
A_SN=3: AUDIO 3

S_SN=1: SUB-PICTURE 3
S_SN=2: SUB-PICTURE 1
S_SN=3: SUB-PICTURE 2
```

FIG. 41

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 56 | bslbf |
|     for (video_stream_id=0;<br>        video_stream_id < number_of_video_stream_entries;<br>        video_stream_id++) { | | |
|         stream_entry() | | |
|         stream_attribute() | | |
|     } | | |
|     for (audio_stream_id=0;<br>        audio_stream_id < number_of_audio_stream_entries;<br>        audio_stream_id++) { | | |
|         stream_entry() | | |
|         stream_attributes() | | |
|     } | | |
|     for (audio_stream_id2=0;<br>        audio_stream_id2 < number_of_audio_stream2_entries;<br>        audio_stream_id2++) { | | |
|         number_of_combinations | | |
|         for (i=0; i < number_of_combinations; i++) { | | |
|             audio_stream_id | | |
|         } | | |
|         stream_entry() | | |
|         stream_attributes() | | |
|     } | | |
|     for (PG_textST_stream_id=0;<br>        PG_textST_stream_id < number_of_PG_textST_stream_entries;<br>        PG_txtST_stream_id++) { | | |
|         stream_entry() | | |
|         stream_attribute() | | |
|     } | | |
|     for (IG_stream_id=0;<br>        IG_stream_id < number_of_IG_stream_entries;<br>        IG_stream_id++) { | | |
|         stream_entry() | | |
|         stream_attribute() | | |
|     } | | |
| } | | |

FIG. 42

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_PG_textST_stream_entries | 8 | uimsbf |
|     number_of_IG_stream_entries | 8 | uimsbf |
|     number_of_audio_stream2_entries | 8 | uimsbf |
|     reserved_for_future_use | 56 | Bslbf |
|     for(video_stream_id=0; | | |
|         video_stream_id<number_of_video_stream_entries; | | |
|         video_stream_id++) { | | |
|         stream_entry() | | |
|         stream_attributes() | | |
|     } | | |
|     for (audio_stream_id=0; | | |
|         audio_stream_id < | | |
|         number_of_audio_stream_entries; | | |
|         audio_stream_id++) { | | |
|         stream_entry() | | |
|         stream_attributes() | | |
|         if(number_of_audio_stream2_entries!=0) { | | |
|             number_of_audio_stream2_ref_entries | 8 | uimsbf |
|             for(i=0; i< number_of_audio_stream2_ref_entries; i++) { | | |
|                 audio_stream_id2_ref | 8 | uimsbf |
|             } | | |
|         } | | |
|     } | | |
|     for(PG_textST_stream_id=0; | | |
|         PG_textST_stream_id<number_of_PG_textST_stream_entries; | | |
|         PG_textST_stream_id++) { | | |
|         stream_entry() | | |
|         stream_attributes() | | |
|     } | | |
|     for(IG_stream_id=0; | | |
|         IG_stream_id<number_of_IG_stream_entries; | | |
|         IG_stream_id++) { | | |
|         stream_entry() | | |
|         stream_attributes() | | |
|     } | | |
|     for(audio_stream_id2=0; | | |
|         audio_stream_id2 < | | |
|         number_of_audio_stream2_entries; | | |
|         audio_stream2_id++) { | | |
|         stream_entry() | | |
|         stream_attributes() | | |
|     } | | |
| } | | |

FIG. 44

| STN_table() | | |
|---|---|---|
| Syntax | No. of bits | Mnemonic |
| STN_definition_table() { | | |
|     length | 16 | uimsbf |
|     reserved_for_future_use | 16 | bslbf |
|     num_of_video_stream_entries | 8 | uimsbf |
|     num_of_audio_stream_entries | 8 | uimsbf |
|     num_of_audio_stream2_entries | 8 | uimsbf |
|     num_of_PG_txtST_stream_entries | 8 | uimsbf |
|     num_of_IG_stream_entries | 8 | uimsbf |
|     num_of_video_stream2_entries | 8 | uimsbf |
|     reserved_for_future_use | 48 | bslbf |
|     for (video_stream_id=0;<br>        video_stream_id < number_of_video_stream_entries;<br>        video_stream_id++) { | | |
|         stream_entry() | | |
|         stream_attribute() | | |
|     } | | |
|     for (audio_stream_id=0;<br>        audio_stream_id < number_of_audio_stream_entries;<br>        audio_stream_id++) { | | |
|         stream_entry() | | |
|         stream_attributes() | | |
|     } | | |
|     for (audio_stream_id2=0;<br>        audio_stream_id2 < number_of_audio_stream2_entries;<br>        audio_stream_id2++) { | | |
|         number_of_combinations | | |
|         for (i=0; i < number_of_combinations; i++) { | | |
|             audio_stream_id | | |
|         } | | |
|         stream_entry() | | |
|         stream_attributes() | | |
|     } | | |
|     for (PG_textST_stream_id=0;<br>        PG_textST_stream_id < number_of_PG_textST_stream_entries;<br>        PG_txtST_stream_id++) { | | |
|         stream_entry() | | |
|         stream_attribute() | | |
|     } | | |
|     for (IG_stream_id=0;<br>        IG_stream_id < number_of_IG_stream_entries;<br>        IG_stream_id++) { | | |
|         stream_entry() | | |
|         stream_attribute() | | |
|     } | | |

FIG. 45

| Syntax | No. of bits | Mnemonic |
|---|---|---|
| for (video_stream_id2=0; video_stream_id2 < num_of_video_stream2_entries; video_stream_id2++) { | | |
|     number_of_Audio_combinations_for_video2 | 8 | |
|     for(i=0; i<number_of_Audio_combinations_for_video2; i++) { | | |
|         audio_stream_id | 8 | |
|         audio_stream_id2 | 8 | |
|     } | | |
|     number_of_Subtitle_combinations_for_video2 | 8 | |
|     for(i=0; i<number_of_Subtitle_combinations_for_video2; i++) { | | |
|         PG_textST_stream_id | 8 | |
|     } | | |
|     stream_entry() | | |
|     stream_attributes() | | |
| } | | |
| } | | |

FIG. 46

STREAM NUMBER TABLE

A_SN=1: AUDIO 2 ... × VIDEO 2, × AUDIO 4
A_SN=2: AUDIO 1 ... × VIDEO 1, × AUDIO 4, × AUDIO 5
A_SN=3: AUDIO 3

V2_SN=1: VIDEO 2 ... × AUDIO 2, × AUDIO 4,              × SUB-PICTURE 3
V2_SN=2: VIDEO 1 ... × AUDIO 1, × AUDIO 4, × AUDIO 5, × SUB-PICTURE 1

S_SN=1: SUB-PICTURE 3
S_SN=2: SUB-PICTURE 1
S_SN=3: SUB-PICTURE 2

FIG. 49

SubPath_type

| SubPath_type | Meaning |
|---|---|
| 0 | reserved |
| 1 | reserved |
| 2 | Out-of-mux and primary audio presentation path of the Browsable slideshow (The audio presentation path using the SubPath is not synchronized with the main path using PlayItems in the PlayList.) |
| 3 | Out-of-mux and interactive graphics menu (The interactive graphics menu using the SubPath is not synchronized with the main path using PlayItems in the PlayList.) |
| 4 | Out-of-mux and text subtitle presentation path (The text subtitle presentation path using the SubPath is synchronized with the main path using PlayItems in the PlayList.) |
| 5 | Out-of-mux and AV synchronized type of one or more elementary streams path (Primary audio/PG/IG/Secondary audio path.)<br><br>Out-of-mux and AV synchronized type of Picture-in-Picture presentation path which contains one or more elementary stream paths.<br><br>(The elementary streams used by the path are multiplexed in a separate Clip from other Clip used by PlayItem. The path using the SubPath is synchronized with the main path using PlayItems in the PlayList.) |
| 6 | Out-of-mux and AV non-synchronized type of Picture-in-Picture presentation path which contains one or more elementary stream paths.<br><br>(The elementary streams used by the path are multiplexed in a separate Clip from other Clip used by PlayItem. The path using the SubPath is not synchronized with the main path using PlayItems in the PlayList.) |
| 7 | In-mux type and AV synchronized type of Picture-in-Picture presentation path which contains one or more elementary stream paths.<br><br>(The elementary streams used by the path is multiplexed in the same Clip used by PlayItem. The path using the SubPath is synchronized with the main path using PlayItems in the PlayList.) |
| 8-255 | reserved |

FIG. 50

| Syntax | No. of bits | Mnemonic |
|---|---|---|
| Stream_entry() | | |
| stream_entry(id) { | | |
|   length | 8 | uimsbf |
|   type | 8 | uimsbf |
|   if(type==1) { | | |
|     ref_to_stream_PID_of_mainClip | 16 | uimsbf |
|     reserved_for_future_use | 48 | Bslbf |
|   } else if(type==2) { | | |
|     ref_to_SubPath_id | 8 | Uimsbf |
|     ref_to_subClip_entry_id | 8 | Uimsbf |
|     ref_to_stream_PID_of_subClip | 16 | |
|     reserved_for_future_use | 32 | bslbf |
|   } else if(type==3) { | | |
|     ref_to_SubPath_id | 8 | |
|     ref_to_stream_PID_of_mainClip | 16 | |
|     reserved_for_future_use | 40 | |
|   } | | |
| } | | |

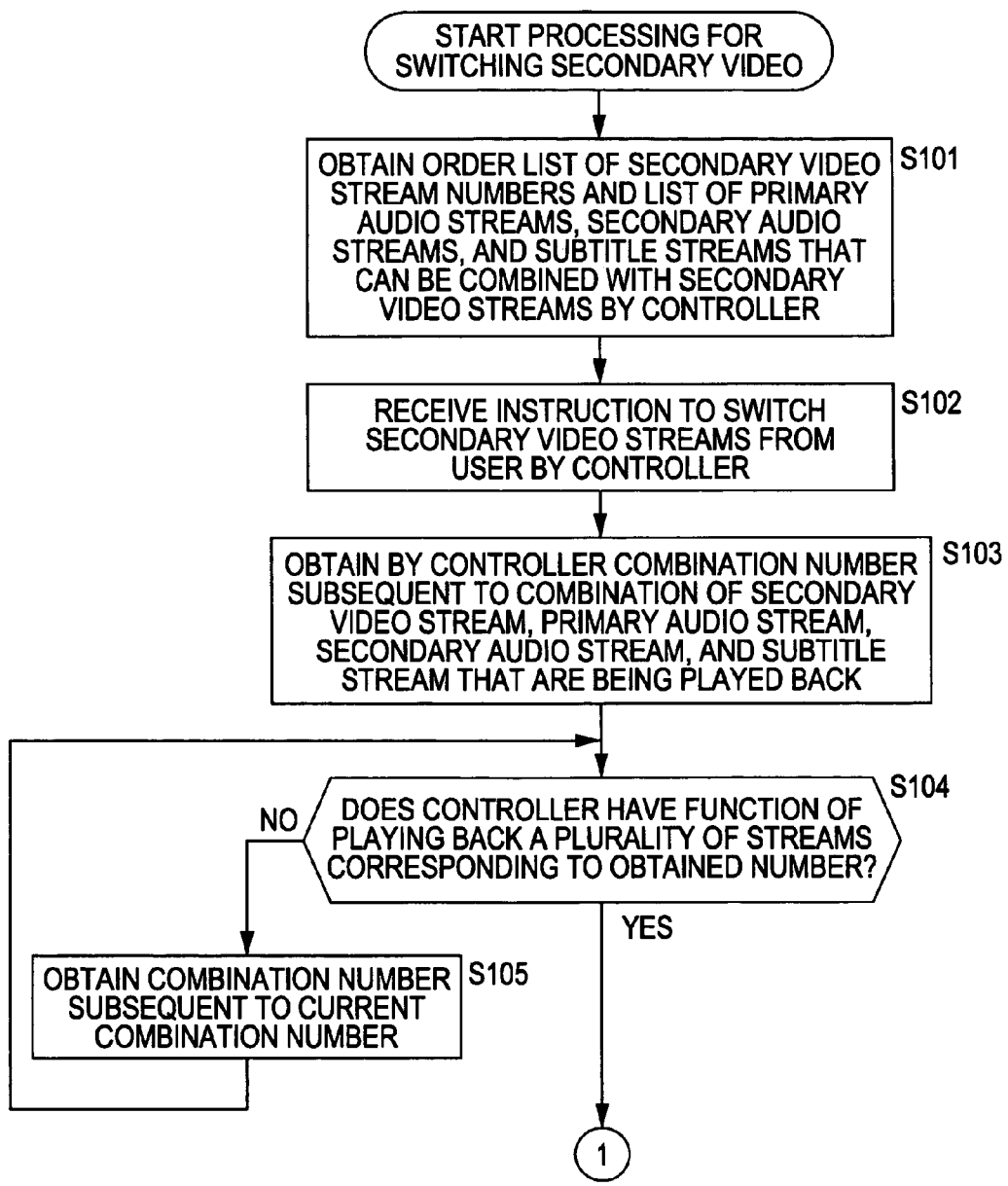

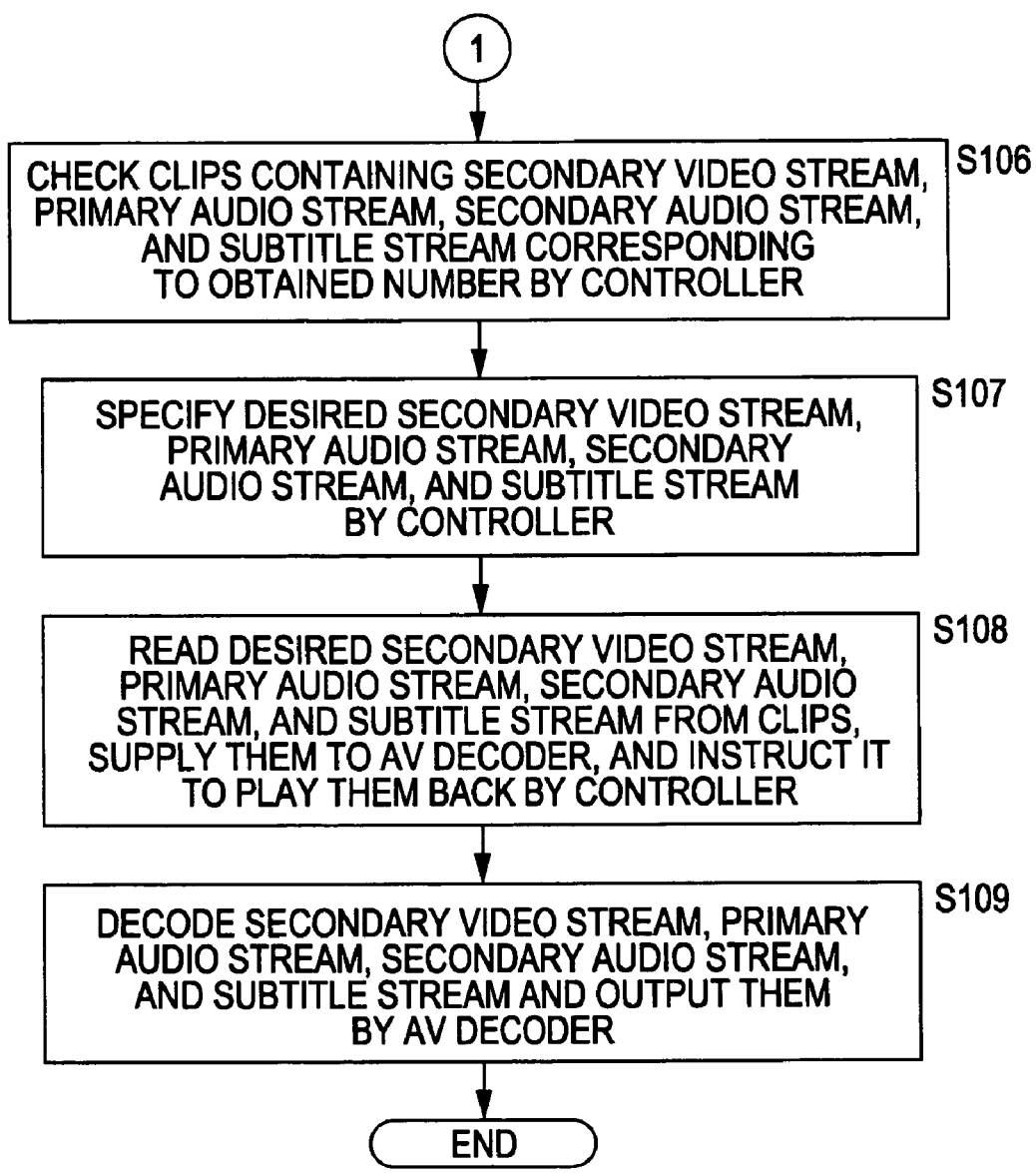

FIG. 56

| application_type | meaning | Stream Input |
|---|---|---|
| 0 | reserved | |
| 1 | TS for Movie applications | These types of Clip AV stream files may be provided from either Disc or Local storage |
| 2 | TS for Time based slide show | |
| 3 | TS for a main-path of Browsable slide show | |
| 4 | TS for a sub-path of Browsable slide show | |
| 5 | TS for a sub-path of Interactive graphics menu | |
| 6 | TS for a sub-path of Text subtitle | |
| 7 | TS for a sub-path of one or more elementary streams path | This type of Clip AV stream file may be provided only from Local storage, shall not provided from Disc |
| 8-255 | reserved | |

FIG. 57

| application_type(of Main TS) | | SubPath_type | number of SubPaths |
|---|---|---|---|
| Movie Type/ Time-based Slideshow | 1 or 2 | 3 (*1) | ≥0 |
| | | 4 | ≥0 |
| | | 5 | ≥0 |
| | | 6 | ≥0 |
| | | 7 | 0,1 |
| Browsable slideshow | 3 | 2 | ≥0 |
| | | 3 (*2) | ≥0 |

(*1) If the PlayItems of PlayList use IG or If the SubPaths with SubPath_type=5 use IG, then the PlayList shall not have SubPaths with SubPath_type=3

(*2) If the PlayItems of PlayList use IG, then the PlayList shall not have SubPaths with SubPath_type=3

FIG. 58

| Num of PlayItem | Num of SubPath |
|---|---|
| 1 | 0 |
| 1 | 1 |
| 1 | 2 (*) |
| (*) one SubPath and one SubPath with SubPath_type=7 ||

FIG. 69

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_PG_txtST_stream_entries | 8 | uimsbf |
|     number_of_IG_stream_entries | 8 | uimsbf |
|     number_of_audio_stream2_entries | 8 | uimsbf |
|     number_of_video_stream2_entries | 8 | uimsbf |
|     number_of_PiP_PG_textST_stream_entries | 8 | uimsbf |
|     reserved_for_future_use | 40 | bslbf |
|     for (video_stream_id=0; <br>        video_stream_id < number_of_video_stream_entries; <br>        video_stream_id++) { | | |
|         stream_entry() | | |
|         stream_attribute() | | |
|     } | | |
|     for (audio_stream_id=0; <br>        audio_stream_id < number_of_audio_stream_entries; <br>        audio_stream_id++) { | | |
|         stream_entry() | | |
|         stream_attributes() | | |
|     } | | |
|     for (PG_textST_stream_id=0; <br>        PG_textST_stream_id < number_of_PG_textST_stream_entries; <br>        PG_txtST_stream_id++) { | | |
|         stream_entry() | | |
|         stream_attribute() | | |
|     } | | |
|     for (IG_stream_id=0; <br>        IG_stream_id < number_of_IG_stream_entries; <br>        IG_stream_id++) { | | |
|         stream_entry() | | |
|         stream_attribute() | | |
|     } | | |
|     for (audio_stream_id2=0; <br>        audio_stream_id2 < number_of_audio_stream2_entries; <br>        audio_stream_id2++) { | | |
|         stream_entry() | | |
|         stream_attributes() | | |
|         comb_info_Secondary_audio_Primary_audio() { | | |
|             number_of_audio_stream_ref_entries | 8 | uimsbf |
|             reserved_for_word_align | 8 | bslbf |
|             for (i=0; i<number_of_ audio_stream_ref_entries; i++) { | | |
|                 audio_stream_id_ref | 8 | uimsbf |
|             } | | |
|             if (number_of_ audio_stream_ref_entries%2==1) { | | |
|                 reserved_for_word_align | 8 | bslbf |
|             } | | |
|         } | | |
|     } | | |

FIG. 70

| STN_table() | | |
|---|---|---|
| Syntax | No.of bits | Mnemonic |
| for(video_stream_id2=0; <br>  video_stream_id2 < <br>    number_of_video_stream2_entries; <br>  video_stream_id2++) { | | |
|   stream_entry() | | |
|   stream_attributes() | | |
|   comb_info_Secondary_video_Secondary_audio() { | | |
|     number_of_audio_stream2_ref_entries | 8 | uimsbf |
|     reserved_for_word_align | 8 | bslbf |
|     for(i=0;i<number_of_audio_stream2_ref_entries;i++) { | | |
|       audio_stream_id2_ref | 8 | uimsbf |
|     } | | |
|     if(number_of_audio_stream2_ref_entries%2==1) { | | |
|       reserved_for_word_align | 8 | bslbf |
|     } | | |
|   } | | |
|   comb_info_Secondary_video_PiP_PG_textST() { | | |
|     number_of_PiP_PG_textST_ref_entries | 8 | uimsbf |
|     reserved_for_word_align | 8 | bslbf |
|     for(i=0;i<number_of_PiP_PG_textST_ref_entries; i++) { | | |
|       PiP_PG_textST_id_ref | 8 | uimsbf |
|     } | | |
|     if(number_of_PiP_PG_textST_ref_entries%2==1) { | | |
|       reserved_for_word_align | 8 | bslbf |
|     } | | |
|   } | | |
| } | | |
| for(PiP_PG_textST_stream_id=0; <br>  PiP_PG_textST_stream_id< <br>    number_of_PiP_PG_textST_stream_entries; <br>  PiP_PG_textST_stream_id++) { | | |
|   stream_entry() | | |
|   stream_attributes() | | |
| } | | |
| } | | |

FIG. 76

| Syntax | No. of bits | Mnemonic |
|---|---|---|
| STN_table() { | | |
|     length | 16 | uimsbf |
|         reserved_for_future_use | 16 | bslbf |
|         number_of_video_stream_entries | 8 | uimsbf |
|         number_of_audio_stream_entries | 8 | uimsbf |
|         number_of_PG_txtST_stream_entries | 8 | uimsbf |
|         number_of_IG_stream_entries | 8 | uimsbf |
|         number_of_audio_stream2_entries | 8 | uimsbf |
|         number_of_video_stream2_entries | 8 | uimsbf |
|         number_of_PiP_primary_audio_stream_entries | 8 | uimsbf |
|         number_of_PiP_PG_textST_stream_entries | 8 | uimsbf |
|         reserved_for_future_use | 32 | bslbf |
|     for (video_stream_id=0;<br>        video_stream_id < number_of_video_stream_entries;<br>        video_stream_id++) { | | |
|         stream_entry() | | |
|         stream_attribute() | | |
|     } | | |
|     for (audio_stream_id=0;<br>        audio_stream_id < number_of_audio_stream_entries;<br>        audio_stream_id++) { | | |
|         stream_entry() | | |
|         stream_attributes() | | |
|     } | | |
|     for (PG_textST_stream_id=0;<br>        PG_textST_stream_id < number_of_PG_textST_stream_entries;<br>        PG_txtST_stream_id++) { | | |
|         stream_entry() | | |
|         stream_attribute() | | |
|     } | | |
|     for (IG_stream_id=0;<br>        IG_stream_id < number_of_IG_stream_entries;<br>        IG_stream_id++) { | | |
|         stream_entry() | | |
|         stream_attribute() | | |
|     } | | |
|     for (audio_stream_id2=0;<br>        audio_stream_id2 < number_of_audio_stream2_entries;<br>        audio_stream_id2++) { | | |
|         stream_entry() | | |
|         stream_attributes() | | |

FIG. 77

STN_table()

| Syntax | No. of bits | Mnemonic |
|---|---|---|
| comb_info_Secondary_audio_Primary_audio() { | | |
|     number_of_audio_stream_ref_entries | 8 | uimsbf |
|     reserved_for_word_align | 8 | bslbf |
|     for (i=0; i<number_of_ audio_stream_ref_entries; i++) { | | |
|         audio_stream_id_ref | 8 | uimsbf |
|     } | | |
|     if (number_of_ audio_stream_ref_entries%2==1) { | | |
|         reserved_for_word_align | 8 | bslbf |
|     } | | |
| } | | |
| } | | |
| for(video_stream_id2=0; | | |
|     video_stream_id2 < | | |
|       number_of_video_stream2_entries; | | |
|     video_stream_id2++) { | | |
|     stream_entry() | | |
|     stream_attributes() | | |
|     comb_info_Secondary_video_Secondary_audio() { | | |
|         number_of_audio_stream2_ref_entries | 8 | uimsbf |
|         reserved_for_word_align | 8 | bslbf |
|         for(i=0;i<number_of_audio_stream2_ref_entries;i++) { | | |
|             audio_stream_id2_ref | 8 | uimsbf |
|         } | | |
|         if(number_of_audio_stream2_ref_entries%2==1) { | | |
|             reserved_for_word_align | 8 | bslbf |
|         } | | |
|     } | | |
|     comb_info_Secondary_video_PiP_Primary_audio() { | | |
|         number_of_PiP_Primary_audio_ref_entries_SV | 8 | uimsbf |
|         reserved_for_word_align | 8 | bslbf |
|         for(i=0;i<number_of_PiP_Primary_audio_ref_entries; i++) { | | |
|             PiP_Primary_audio_id_ref_SV | 8 | uimsbf |
|         } | | |
|         if(number_of_PiP_Primary_audio_ref_entries%2==1) { | | |
|             reserved_for_word_align | 8 | bslbf |
|         } | | |
|     } | | |

FIG. 78

STN_table()

| Syntax | No. of bits | Mnemonic |
|---|---|---|
| comb_info_Secondary_video_PiP_PG_textST () { | | |
|     number_of_PiP_PG_textST_ref_entries | 8 | uimsbf |
|     reserved_for_word_align | 8 | bslbf |
|     for(i=0;i<number_of_PiP_PG_textST_ref_entries; i++) { | | |
|         PiP_PG_textST_id_ref | 8 | uimsbf |
|     } | | |
|     if(number_of_PiP_PG_textST_ref_entries%2==1) { | | |
|         reserved_for_word_align | 8 | bslbf |
|     } | | |
|   } | | |
| } | | |
|   for(PiP_Primary_audio_stream_id=0; | | |
|         PiP_Primary_audio_stream_id< | | |
|         number_of_PiP_Primary_audio_stream_entries; | | |
|         PiP_Primary_audio_stream_id++) { | | |
|     stream_entry() | | |
|     stream_attributes() | | |
|   } | | |
| } | | |
|   for(PiP_PG_textST_stream_id=0; | | |
|         PiP_PG_textST_stream_id< | | |
|         number_of_PiP_PG_textST_stream_entries; | | |
|         PiP_PG_textST_stream_id++) { | | |
|     stream_entry() | | |
|     stream_attributes() | | |
|   } | | |
| } | | |

FIG. 79

3 REGISTER

| Primary audio stream number |

4 REGISTER

| Secondary audio stream number |

5 REGISTER

| invalid_flag | PiP primary audio stream number |

FIG. 83

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_PG_txtST_stream_entries | 8 | uimsbf |
|     number_of_IG_stream_entries | 8 | uimsbf |
|     number_of_audio_stream2_entries | 8 | uimsbf |
|     number_of_video_stream2_entries | 8 | uimsbf |
|     number_of_PiP_primary_audio_stream_entries | 8 | uimsbf |
|     number_of_PiP_PG_textST_stream_entries | 8 | uimsbf |
|     reserved_for_future_use | 32 | bslbf |
|     for (video_stream_id=0;<br>        video_stream_id < number_of_video_stream_entries;<br>        video_stream_id++) { | | |
|         stream_entry() | | |
|         stream_attribute() | | |
|     } | | |
|     for (audio_stream_id=0;<br>        audio_stream_id < number_of_audio_stream_entries;<br>        audio_stream_id++) { | | |
|         stream_entry() | | |
|         stream_attributes() | | |
|     } | | |
|     for (PG_textST_stream_id=0;<br>        PG_textST_stream_id < number_of_PG_textST_stream_entries;<br>        PG_txtST_stream_id++) { | | |
|         stream_entry() | | |
|         stream_attribute() | | |
|     } | | |
|     for (IG_stream_id=0;<br>        IG_stream_id < number_of_IG_stream_entries;<br>        IG_stream_id++) { | | |
|         stream_entry() | | |
|         stream_attribute() | | |
|     } | | |
|     for (audio_stream_id2=0;<br>        audio_stream_id2 < number_of_audio_stream2_entries;<br>        audio_stream_id2++) { | | |
|         stream_entry() | | |
|         stream_attributes() | | |

FIG. 84

| STN_table() | | |
|---|---|---|
| Syntax | No. of bits | Mnemonic |
| comb_info_Secondary_audio_Primary_audio() { | | |
|     number_of_audio_stream_ref_entries | 8 | uimsbf |
|     reserved_for_word_align | 8 | bslbf |
|     for(i=0;i<number_of_audio_stream_ref_entries;i++) { | | |
|         audio_stream_id_ref | 8 | uimsbf |
|     } | | |
|     if(number_of_audio_stream_ref_entries%2==1) { | | |
|         reserved_for_word_align | 8 | bslbf |
|     } | | |
| } | | |
| comb_info_Secondary_audio_PiP_Primary_audio() { | | |
|     number_of_PiP_Primary_audio_ref_entries_SA | 8 | uimsbf |
|     reserved_for_word_align | 8 | bslbf |
|     for(i=0;i<number_of_PiP_Primary_audio_ref_entries; i++) { | | |
|         PiP_Primary_audio_id_ref_SA | 8 | uimsbf |
|     } | | |
|     if(number_of_PiP_Primary_audio_ref_entries%2==1) { | | |
|         reserved_for_word_align | 8 | bslbf |
|     } | | |
|   } | | |
| } | | |
| for (video_stream_id2=0;<br>    video_stream_id2 <<br>    number_of_video_stream2_entries;<br>    video_stream_id2++) { | | |
|     stream_entry() | | |
|     stream_attributes() | | |
|     comb_info_Secondary_video_Secondary_audio() { | | |
|         number_of_audio_stream2_ref_entries | 8 | uimsbf |
|         reserved_for_word_align | 8 | bslbf |
|         for(i=0;i<number_of_audio_stream2_ref_entries;i++) { | | |
|             audio_stream_id2_ref | 8 | uimsbf |
|         } | | |
|         if(number_of_audio_stream2_ref_entries%2==1) { | | |
|             reserved_for_word_align | 8 | bslbf |
|         } | | |
|     } | | |

FIG. 85

| Syntax | No. of bits | Mnemonic |
|---|---|---|
| STN_table() | | |
| comb_info_Secondary_video_PiP_Primary_audio() { | | |
| number_of_PiP_Primary_audio_ref_entries_SV | 8 | uimsbf |
| reserved_for_word_align | 8 | bslbf |
| for(i=0;i<number_of_PiP_Primary_audio_ref_entries; i++) { | | |
| PiP_Primary_audio_id_ref_SV | 8 | uimsbf |
| } | | |
| if(number_of_PiP_Primary_audio_ref_entries%2==1) { | | |
| reserved_for_word_align | 8 | bslbf |
| } | | |
| } | | |
| comb_info_Secondary_video_PiP_PG_textST() { | | |
| number_of_PiP_PG_textST_ref_entries | 8 | uimsbf |
| reserved_for_word_align | 8 | bslbf |
| for(i=0;i<number_of_PiP_PG_textST_ref_entries; i++) { | | |
| PiP_PG_textST_id_ref | 8 | uimsbf |
| } | | |
| if(number_of_PiP_PG_textST_ref_entries%2==1) { | | |
| reserved_for_word_align | 8 | bslbf |
| } | | |
| } | | |
| } | | |
| for (PiP_Primary_audio_stream_id=0; PiP_Primary_audio_stream_id< number_of_PiP_Primary_audio_stream_entries; PiP_Primary_audio_stream_id++) { | | |
| stream_entry() | | |
| stream_attributes() | | |
| } | | |
| } | | |
| for (PiP_PG_textST_stream_id=0; PiP_PG_textST_stream_id< number_of_PiP_PG_textST_stream_entries; PiP_PG_textST_stream_id++) { | | |
| stream_entry() | | |
| stream_attributes() | | |
| } | | |
| } | | |

REPRODUCING DEVICE AND ASSOCIATED METHODOLOGY FOR PLAYING BACK STREAMS

TECHNICAL FIELD

The present invention relates to playback apparatuses, playback methods, programs, recording media, data structures, and manufacturing methods for recording media. More particularly, the invention relates to a playback apparatus, a playback method, a program, a recording medium, a data structure, and a manufacturing method for the recording medium, which are suitably used when, not only content of a main AV stream, but also various types of content items, such as audio and video content items, of streams or data files different from the main AV stream can be played back.

BACKGROUND ART

In DVD (Digital Versatile Disc) video standards, interactive operations can be performed, that is, users can switch sound or subtitles when playing back AV (Audio Visual) content, such as a movie, recorded in a recording medium (for example, see Non-Patent Document 1). More specifically, the user operates a sound switch button 11 or a subtitle switch button 12 of a remote controller 2 to switch sound or subtitles of AV content displayed on a display device 1 shown in FIG. 1. For example, if the user operates the sound switch button 11 when sound 1 is set in the initial state in the display device 1, sound 1 is switched to sound 2, as shown in FIG. 2.

AV content based on the DVD video is recorded in the form of a MPEG (Moving Picture Experts Group) 2 program stream. In the MPEG2 program stream, as shown in FIG. 3, a video stream (indicated by "video" in FIG. 3), a plurality of audio streams (indicated by "audio 1", "audio 2", and "audio 3" in FIG. 3), and a plurality of sub-picture streams (indicated by "sub-picture 1, "sub-picture 2", and "sub-picture 3") are multiplexed such that the audio streams and the sub-picture streams are AV-synchronized with the video stream. The sub-picture streams (sub-pictures 1, 2, and 3) are streams in which bitmap images are run-length coded, and are mainly used for subtitles.

Generally, a plurality of audio streams are used for recording sound of different languages, and a plurality of sub-picture streams are used for recording subtitles of different languages. The user can interactively select sound or subtitles of a desired language by using the remote controller 2 while video is being played back.

The DVD video defines a table structure, provided to users, indicating the relationship between sound numbers and subtitle numbers for a plurality of audio streams (audio 1, 2, and 3) and a plurality of sub-picture streams (sub-pictures 1, 2, and 3) in a program stream.

FIG. 4 illustrates an example of such a stream number table indicating the relationship between audio signals and subtitle signals provided to the user. In this table, the sound numbers are referred to as "A_SN (Audio Stream Numbers)", and the subtitle numbers are referred to as "S_SN (Sub-picture Stream Numbers)". In the stream number table shown in FIG. 4, each of the audio streams is provided with A_SN, and each of the sub-picture streams is provided with S_SN. A_SN=1: audio 2, A_SN=2: audio 1, and A_SN=3: audio 3. Also, S_SN=1: sub-picture 3, S_SN=2: sub-picture 1, and S_SN=3: sub-picture 2. In this case, a smaller number of A_SN or S_SN indicates an audio signal or a subtitle signal to be provided to users with higher priority. That is, A_SN=1 is an audio stream played back as a default, and S_SN=L is a sub-picture stream played back as a default.

More specifically, sound 1 played back in the initial state in FIG. 1 is audio 2, which is A_SN=1 (FIG. 4), and sound 2 played back after being switched from sound 1 in FIG. 2 is audio 1, which is A_SN=2.

[Non-Patent Document 1]

DVD Specifications for Read-Only Disc Part 3; Version

A technique for using Sub Paths to play back sound which is additionally recorded (so-called "dubbed sound") is known (for example, see Patent Document 1).

[Patent Document 1]

Japanese Unexamined Patent Application Publication No. 2002-158972.

DISCLOSURE OF INVENTION

Problems to be Solved by the Invention

According to the DVD video, however, when the user switches sound or subtitles while playing back a video program stream, the user can select only from audio streams or sub-picture streams multiplexed into the program stream which is currently played back. That is, when playing back the MPEG2 program stream shown in FIG. 3, the user can select only from audio 1 through audio 3 when switching sound.

Accordingly, even if another stream having audio streams and subtitles different from a program stream which is currently played back is available, the user cannot switch sound or subtitles to the audio streams or subtitles in the different stream. Accordingly, the extensibility in selecting streams is low.

It can also be considered that in the near future, content to be switched will not be restricted to sound, but will be extended to various types of content items, such as video. Since it is difficult to select content items from a stream different from a stream which is being played back when switching such various types of content, the extensibility in selecting streams will become low.

Although Patent Document 1 discloses a technique for using Sub Paths for playing back sound which is additionally recorded (for example, so-called "dubbed sound"), it does not disclose a configuration in which two streams of the same type, i.e., two audio streams or two video streams, are combined and played back is not disclosed.

The present invention has been made in view of such a background. It is an object of the present invention to select various types of content, such as sound and video, from streams or data files different from a main AV stream so that the selected content can be played back together with the main AV stream.

Means for Solving the Problems

A playback apparatus according to one aspect of the present invention is a playback apparatus for playing back streams. The playback apparatus includes: obtaining means for obtaining playback management information including a main playback path indicating a position of at least one stream on a time axis, at least one sub playback path indicating a position of at least one stream on the time axis, and selection information for selecting at least one category of stream, which is to be played back, from among at least one stream referred to by the main playback path and for selecting at least one category of stream, which is to be played back, referred to by one of at least one sub playback path; receiving means for receiving a selection of streams to be played back based on the selection information included in the playback management information obtained by the obtaining means; reading means for reading, if the selection of streams to be played back is received by the receiving means, by referring to the main playback path, at least one category of stream selected from among at least one stream referred to by the main playback path and received by the receiving means, and for reading, by referring to the corresponding sub playback path, at least one category of stream selected from among at least one stream referred to by at least one sub playback path and received by the receiving means; and combining means for combining at least two streams of a predetermined category, if at least two streams are included in at least one category of stream referred to by the main playback path and read by the reading means and in at least one category of stream referred to by the corresponding sub playback path and read by the reading means. The selection information includes information indicating a combination of a first stream of the predetermined category referred to by the main playback path and a second stream of the predetermined category referred to by the corresponding sub playback path, the receiving means receives the selection of streams to be played back based on the selection information, the reading means reads, if the selection of the first stream and the second stream to be played back is received by the receiving means, the first stream of the predetermined category referred to by the main playback path and the second stream of the predetermined category referred to by the corresponding sub playback path, and the combining means combines the first stream and the second stream of the predetermined category read by the reading means.

The playback apparatus may further include decoding means for decoding at least one category of stream referred to by the main playback path and read by the reading means and at least one category of stream referred to by the corresponding sub playback path and read by the reading means.

The streams of the predetermined category to be combined by the combining means may be audio streams or video streams.

The stream of the predetermined category referred to by the main playback path may be a first video stream, and the selection information may further include information defining a combination of a first audio stream associated with the first video stream and a second audio stream different from the first audio stream.

The receiving means may receive the selection of a stream to be played back from among: the first stream referred to by the main playback path; the second stream referred to by the corresponding sub playback path; a combination of the first stream referred to by the main playback path and the second stream referred to by the corresponding sub playback path, the second stream being included in a file different from a file including the first stream; a combination of the second streams referred to by the corresponding sub playback paths; and a combination of the first stream referred to by the main playback path and the second stream referred to by the corresponding sub playback path, the second stream being included in an identical file including the first stream.

The playback management information obtained by the obtaining means may further include information concerning a combination of two streams of a predetermined category referred to by the corresponding sub playback paths, the reading means may read, if the selection of the combination of the two streams of the predetermined category to be played back is received by the receiving means, the two streams of the predetermined category referred to by the corresponding sub playback paths, and the combining means may combine the two streams of the predetermined category read by the reading means.

The selection information may further include information indicating whether streams to be combined are entered, the receiving means may receive, based on the information indicating whether streams to be combined are entered, a selection of a combination of streams of an identical category referred to by at least one of the main playback path and the corresponding sub playback path or receives a selection of a single stream of an identical category, and the reading means may read the entered streams received by the receiving means based on the selection information.

The stream of the predetermined category referred to by the main playback path may be a first video stream, and the selection information may further include information defining a combination of a second video stream different from the first video stream and a second audio stream associated with the second video stream.

The stream of the predetermined category referred to by the main playback path may be a first video stream, and the selection information may further include information defining a combination of a second video stream different from the first video stream and first image information associated with the second video stream.

The playback apparatus may further include: first storing means for storing information indicating whether second image information associated with the first video stream is to be displayed or whether the first image information associated with the second video stream is to be displayed; second storing means for storing information indicating which stream from among streams forming the second image information that are selectable by the selection information is to be played back if the second image information is displayed; third storing means for storing information indicating which stream from among streams forming the first image information that are selectable by the selection information is to be played back if the first image information is displayed; and fourth storing means for storing information indicating whether the first image information or the second image information is to be displayed. The reading means may read a stream associated with the first image information or the second image information to be displayed by further referring to the information stored in the first storing means, the second storing means, the third storing means, and the fourth storing means.

The stream of the predetermined category referred to by the main playback path may be a first video stream, and the selection information may further include information defining a combination of a second video stream, which is independent of the first video stream, and text information associated with the second video stream.

At least one type of at least one sub playback path may be defined according to a category of a stream referred to by the corresponding sub playback path, and at least one sub playback path included in the playback management information may be classified into a predetermined type of at least one type defined, and information concerning the classified type of at least one sub playback path may be included in the playback management information.

At least one type defined may include a type in which at least one category of stream is referred to by the corresponding sub playback path.

At least one type defined may include a type in which at least one category of stream is referred to by the corresponding sub playback path and at least one category of stream may be included in a file different from a file including a stream referred to by the main playback path.

At least one type defined may include a type in which at least one category of stream is referred to by the corresponding sub playback path and at least one category of stream may be included in an identical file including a stream referred to by the main playback path.

The playback apparatus may further include display control means for controlling display of a display screen which displays information used for assisting a user in performing an input operation. The stream of the predetermined category referred to by the main playback path may be a first video stream, and if a selection of a second video stream, which is independent of the first video stream, that is played back in synchronization with the first video stream is received by the receiving means, the display control means may control a list of streams that can be played back in association with the second video stream to be displayed on the display screen, and the receiving means may receive a selection of a stream that can be played back in association with the second video stream from the user by referring to the display screen which is controlled to be displayed by the display control means.

A playback method/program according to one aspect of the present invention includes: an obtaining step of obtaining playback management information including a main playback path indicating a position of at least one stream on a time axis, at least one sub playback path indicating a position of at least one stream on the time axis, and selection information for selecting at least one category of stream, which is to be played back, from among at least one stream referred to by the main playback path and for selecting at least one category of stream, which is to be played back, referred to by one of at least one sub playback path; a receiving step of receiving a selection of streams to be played back based on the selection information included in the playback management information obtained by processing in the obtaining step; a reading step of reading, if the selection of streams to be played back is received by processing in the receiving step, by referring to the main playback path, at least one category of stream selected from among at least one stream referred to by the main playback path, and reading, by referring to the corresponding sub playback path, at least one category of stream selected from among at least one stream referred to by at least one sub playback path; and a combining step of combining at least two streams of a predetermined category, if at least two streams are included in at least one category of stream referred to by the main playback path and read by processing in the reading step and in at least one category of stream referred to by the corresponding sub playback path and read by processing in the reading step. The selection information includes information indicating a combination of a first stream of the predetermined category referred to by the main playback path and a second stream of the predetermined category referred to by the corresponding sub playback path, in the processing in the receiving step, the selection of streams to be played back is received based on the selection information, in the processing in the reading step, if the selection of the first stream and the second stream to be played back is received by the processing in the receiving step, the first stream of the predetermined category referred to by the main playback path and the second stream of the predetermined category referred to by the corresponding sub playback path are read, and in the processing in the combining step, the first stream and the second stream of the predetermined category read by the processing in the reading step are combined.

According to the playback apparatus, playback method, and program according to one aspect of the present invention, playback management information including a main playback path indicating a position of at least one stream on a time axis, at least one sub playback path indicating a position of at least one stream on the time axis, and selection information for selecting at least one category of stream, which is to be played back, from among at least one stream referred to by the main playback path and for selecting at least one category of stream, which is to be played back, referred to by one of at least one sub playback path is obtained. A selection of streams to be played back is received based on the selection information included in the obtained playback management information. If the selection of streams to be played back is received, by referring to the main playback path, at least one category of stream selected from among at least one stream referred to by the main playback path is read, and by referring to the corresponding sub playback path, at least one category of stream selected from among at least one stream referred to by at least one sub playback path is read. At least two streams of a predetermined category are combined if at least two streams are included in at least one category of read stream referred to by the main playback path and in at least one category of read stream referred to by the corresponding sub playback path. The selection information includes information indicating a combination of a first stream of the predetermined category referred to by the main playback path and a second stream of the predetermined category referred to by the corresponding sub playback path, in the processing in the receiving step, the selection of streams to be played back is received based on the selection information. If the selection of the first stream and the second stream to be played back is received, the first stream of the predetermined category referred to by the main playback path and the second stream of the predetermined category referred to by the corresponding sub playback path are read. The read first stream and the read second stream of the predetermined category are combined.

A recording medium according to one aspect of the present invention records thereon data including playback management information for managing a playback operation for at least one stream is recorded. The playback management information includes: a main playback path indicating a position of at least one stream on a time axis; at least one sub playback path indicating a position of at least one stream on the time axis; and selection information including information for selecting at least one category of stream, which is to be played back, from among at least one stream referred to by the main playback path and for selecting at least one category of stream, which is to be played back, referred to by one of at least one sub playback path, the information indicating a combination of a first stream of the predetermined category referred to by the main playback path and a second stream of the predetermined category referred to by at least one sub playback path.

A data structure according to one aspect of the present invention includes playback management information for managing a playback operation for at least one stream. The playback management information includes: a main playback path indicating a position of at least one stream on a time axis; at least one sub playback path indicating a position of at least one stream on the time axis; and selection information including information for selecting at least one category of stream, which is to be played back, from among at least one stream referred to by the main playback path and for selecting at least one category of stream, which is to be played back, referred to by one of at least one sub playback path, the information indicating a combination of a first stream of the predetermined category referred to by the main playback path and a second stream of the predetermined category referred to by at least one sub playback path.

The recording medium/data structure according to one aspect of the present invention includes playback management information for managing a playback operation of a first file including at least one stream. More specifically, the playback management information includes: a main playback path indicating a position of at least one stream on a time axis; at least one sub playback path indicating a position of at least one stream on the time axis; and selection information including information for selecting at least one category of stream, which is to be played back, from among at least one stream referred to by the main playback path and for selecting at least one category of stream, which is to be played back, referred to by one of at least one sub playback path, the information indicating a combination of a first stream of the predetermined category referred to by the main playback path and a second stream of the predetermined category referred to by at least one sub playback path.

A manufacturing method for a recording medium according to one aspect of the present invention is a manufacturing method for a recording medium on which data that can be played back by a playback apparatus is recorded. The manufacturing method includes the step of generating data having a data structure including playback management information for managing a playback operation for at least one stream and recording the generated data on the recording medium. The playback management information including a main playback path indicating a position of at least one stream on a time axis, at least one sub playback path indicating a position of at least one stream on the time axis, and selection information for selecting at least one category of stream, which is to be played back, from among at least one stream referred to by the main playback path and for selecting at least one category of stream, which is to be played back, referred to by one of at least one sub playback path, the information indicating a combination of a first stream of the predetermined category referred to by the main playback path and a second stream of the predetermined category referred to by at least one sub playback path.

The manufacturing method for a recording medium according to one aspect of the present invention is a manufacturing method for a recording medium on which data that can be played back by a playback apparatus is recorded. In the manufacturing method, data having a data structure including playback management information for managing a playback operation for at least one stream is generated, and the generated data is recorded on the recording medium. The playback management information includes a main playback path indicating a position of at least one stream on a time axis, at least one sub playback path indicating a position of at least one stream on the time axis, and selection information for selecting at least one category of stream, which is to be played back, from among at least one stream referred to by the main playback path and for selecting at least one category of stream, which is to be played back, referred to by one of at least one sub playback path, the information indicating a combination of a first stream of the predetermined category referred to by the main playback path and a second stream of the predetermined category referred to by at least one sub playback path.

Advantages

According to the present invention, AV streams can be played back, and in particular, various types of content, such as sound and video, from a stream or a data file different from a main AV stream can be selected.

BRIEF DESCRIPTION OF THE DRAWINGS

FIG. 1 illustrates known sound switching.
FIG. 2 illustrates known sound switching.
FIG. 4 illustrates a stream number table indicating audio signals and subtitle signals provided to a user.
FIG. 9 illustrates the syntax of PlayList( ).
FIG. 10 illustrates the syntax of SubPath( ).
FIG. 11 illustrates an example of SubPath_type.
FIG. 12 illustrates the syntax of SubPlayItem(i).
FIG. 13 illustrates the syntax of PlayItem( ).
FIG. 14 illustrates the syntax of first STN_table( ).
FIG. 15 illustrates a first example of the syntax of stream_entry( ).
FIG. 16 illustrates the syntax of second STN_table( ).
FIG. 17 illustrates a second example of the syntax of stream_entry( ).
FIG. 18 illustrates the syntax of stream_attribute( ).
FIG. 19 illustrates stream_coding_type.
FIG. 20 illustrates video_format.
FIG. 21 illustrates frame_rate.
FIG. 22 illustrates aspect_ratio.
FIG. 23 illustrates audio_presentation_type.
FIG. 24 illustrates sampling_frequency.
FIG. 25 illustrates Character code.
FIG. 26 illustrates an example of a stream number table indicating the relationship between audio signals and subtitle signals provided to a user.
FIG. 35 illustrates the syntax of third STN_table( ).
FIG. 37 illustrates the syntax of fourth STN_table( ) defining combinations of audio streams #1 and audio streams #2.
FIG. 38 illustrates an example of the bitmap syntax of Combination_of_Primary_and_Secondary.
FIG. 39 illustrates a stream number table indicating audio signals and subtitle signals provided to a user.
FIG. 41 illustrates the syntax of fifth STN_table( ) defining combinations of audio streams #1 and audio streams #2.
FIG. 42 illustrates the syntax of sixth STN_table( ) defining combinations of audio streams #1 and audio streams #2.

FIG. 44 illustrates the syntax of sixth STN_table( ) defining combinations of secondary video streams, primary audio streams, secondary audio streams, and subtitle streams that can be played back together with primary video streams.

FIG. 45 illustrates the syntax of seventh STN_table( ) defining combinations of secondary video streams, primary audio streams, secondary audio streams, and subtitle streams that can be played back together with primary video streams.

FIG. 46 illustrates a stream number table indicating combinations of audio signals, video signals, and subtitle signals provided to a user.

FIG. 49 illustrates another example of SubPath_type different from SubPath_type shown in FIG. 11.

FIG. 50 illustrates a third example of stream_entry( ).

FIG. 54 is a flowchart illustrating secondary video switching processing performed by the playback apparatus shown in FIG. 53.

FIG. 55 is a flowchart illustrating the secondary video switching processing performed by the playback apparatus shown in FIG. 53.

FIG. 56 illustrates the types of application_type.

FIG. 57 illustrates a Sub Path restriction technique, and more specifically, FIG. 57 illustrates Sub Paths that can be provided for PlayList according to the types of PlayList.

FIG. 58 illustrates a Sub Path restriction technique, and more specifically, FIG. 58 illustrates the relationships between the number of PlayItems disposed in PlayList and the number of Sub Paths.

FIG. 69 illustrates the syntax of eighth STN_table( ) defining combinations of audio streams #1 and audio streams #2, video streams #2 and audio streams #1, and video streams #2 and video stream #2 text subtitle streams.

FIG. 70 illustrates the syntax of eighth STN_table( ) defining combinations of audio streams #1 and audio streams #2, video streams #2 and audio streams #1, and video streams #2 and video stream #2 text subtitle streams.

FIG. 76 illustrates the syntax of ninth STN_table( ) defining a larger number of combinations.

FIG. 77 illustrates the syntax of ninth STN_table( ) defining a larger number of combinations.

FIG. 78 illustrates the syntax of ninth STN_table( ) defining a larger number of combinations.

FIG. 79 illustrates registers.

FIG. 83 illustrates the syntax of tenth STN_table( ) defining a larger number of combinations.

FIG. 84 illustrates the syntax of tenth STN_table( ) defining a larger number of combinations.

FIG. 85 illustrates the syntax of tenth STN_table( ) defining a larger number of combinations.

Figure 3:
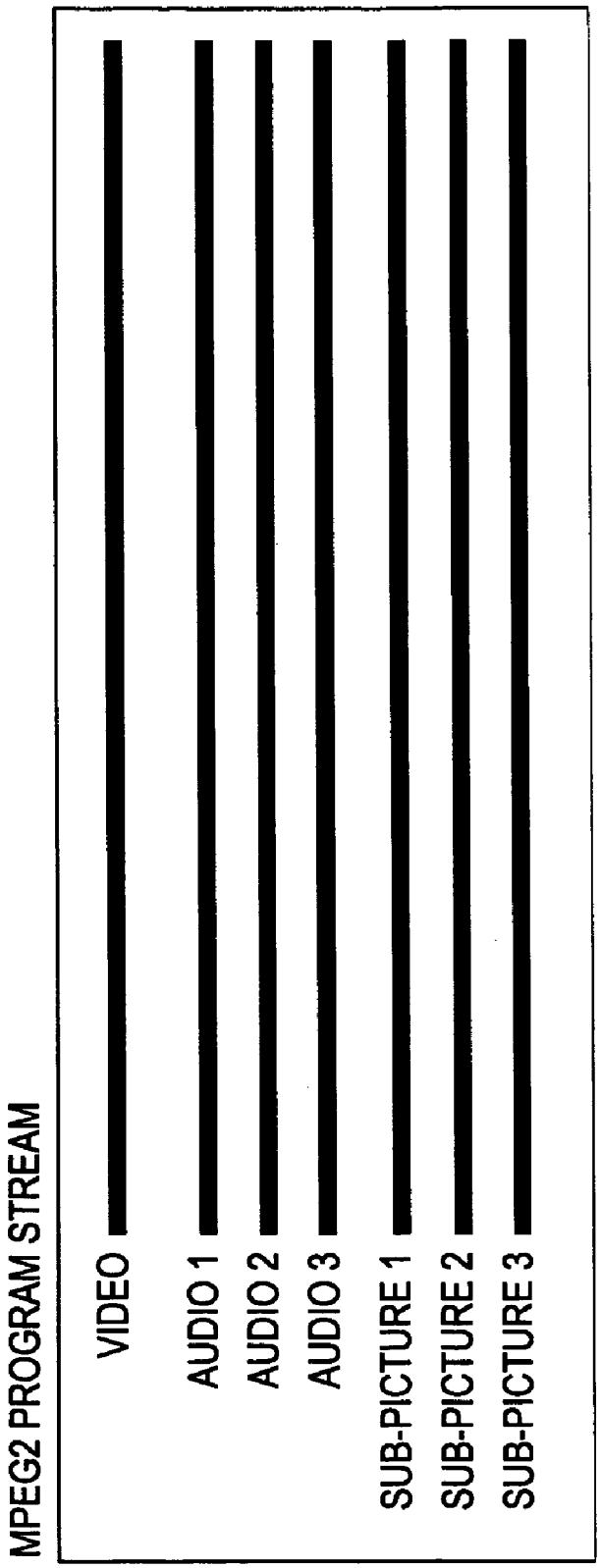
FIG. 3 illustrates the structure of an MPEG2 program stream.

REFERENCE NUMERALS 1 playback apparatus, 11 recording medium, 21 controller, 22 optical disc drive, 23 memory, 24 local storage, 26 AV decoder, 32 switch, 51 through 54 buffers, 55, 56 PID filters, 57 through 59 switches, 71 background decoder, 72 video decoder/first video decoder, 73 presentation graphics decoder, 74 interactive graphics decoder, 75 audio decoder, 76 Text-ST composition, 77 switch, 91 background plane generator, 92 video plane generator/first video plane generator, 93 presentation graphics plane generator, 94 interactive graphics plane generator, 95 buffer, 96 video data processor, 97 mixing processor, 101 mixing processor, 141 playback apparatus, 151 AV decoder, 161 PID filter, 162 switch, 401 playback apparatus, 403 AV decoder, 411 PID filter, 412 second video decoder, 413 second video plane generator, 414 preload buffer

BEST MODE FOR CARRYING OUT THE INVENTION

An embodiment of the present invention is described below with reference to the accompanying drawings.

Figure 5:
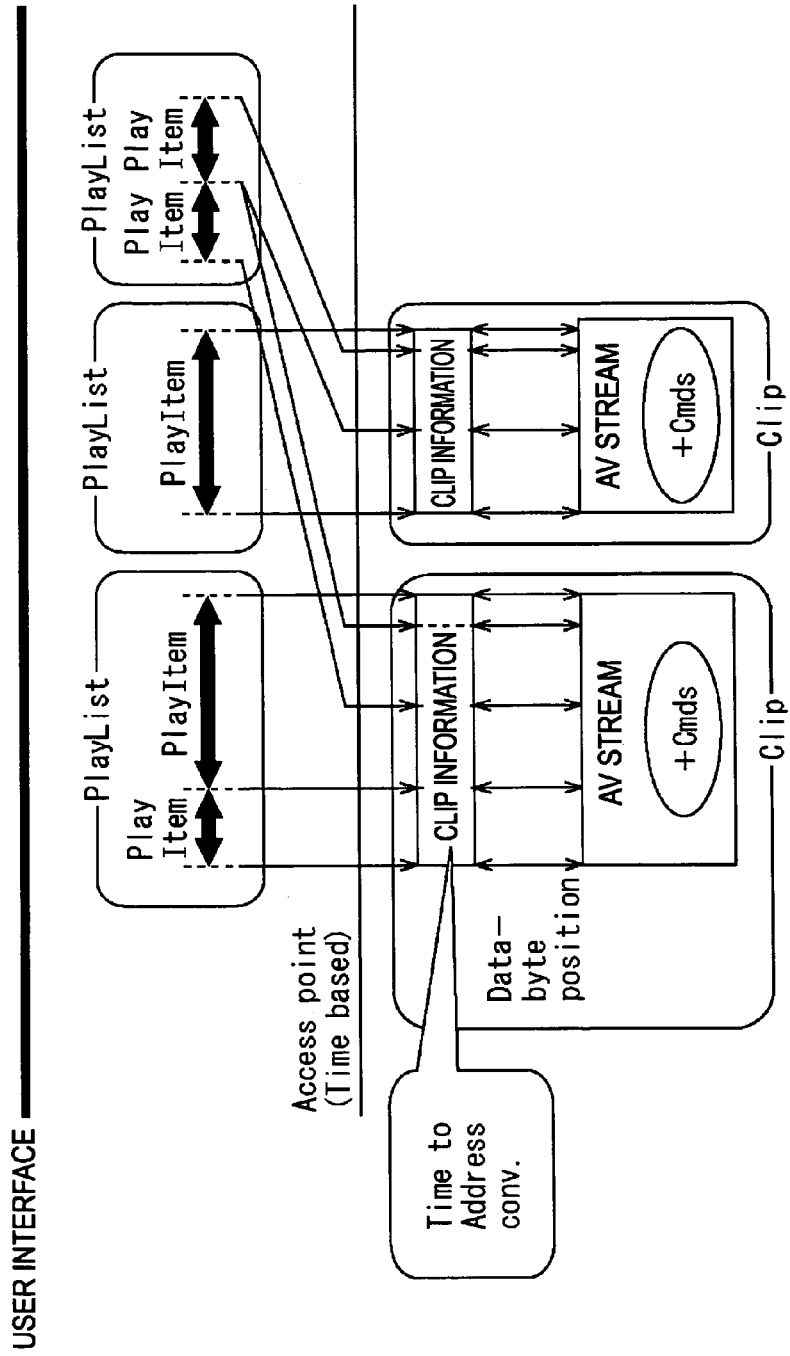
FIG. 5 illustrates an example of an application format on a recording medium installed on a playback apparatus to which the present invention is applied.

FIG. 5 illustrates an example of an application format on a local storage (for example, a hard disk or a memory) built in a playback apparatus 1 (which is discussed below with reference to FIGS. 27 and 28) to which the present invention is applied or on a recording medium to be installed in the playback apparatus 1. The recording medium is an optical disc, a magnetic disk, or a semiconductor memory, which is discussed below.

The application format has two layers, i.e., a PlayList layer and a Clip layer, for managing AV (Audio Visual) streams. In this case, a pair of one AV stream and one item of clip information associated with the AV stream are considered to be as one object, which is referred to as a "clip". An AV stream is also referred to as an "AV stream file". The AV stream file may include, not only sound data and video data, but also various stream files played back together with the sound data and the video data. Clip information is also referred to as a "clip information file".

Generally, files used in computers are handled as byte strings. On the other hand, content of AV stream files is expanded onto a time axis, and access points in clips are mainly specified by PlayLists by using time stamps. That is, it can be said that the PlayLists and clips form two layers for managing AV streams.

If access points in clips are indicated by PlayLists by using time stamps, a Clip Information file is used for finding, from the time stamps, information concerning an address at which decoding in an AV stream file is started.

A PlayList is a set of playback zones of an AV stream. One playback zone in an AV stream is referred to as a "PlayItem", which is indicated by a pair of an IN point (playback start point) and an OUT point (playback end point) on the time axis. Accordingly, a PlayList has one or a plurality of PlayItems, as shown in FIG. 5.

In FIG. 5, the first PlayList from the left has two PlayItems, which refer to the first half and the second half of the AV stream contained in the clip at the left side in FIG. 5. The second PlayList from the left has one PlayItem, which refers to the entirety of the AV stream contained in the clip at the right side. The third PlayList from the left has two PlayItems, which refer to a certain portion of the AV stream contained in the clip at the left side and a certain portion of the AV stream contained in the clip at the right side.

If a disc navigation program shown in FIG. 5 designates the left PlayItem contained in the first PlayList from the left as information concerning the current playback position, the first half of the AV stream contained in the left clip, which is referred to by the designated PlayItem, is played back. In this manner, the PlayLists are used as playback management information for managing the playback operation of AV stream files.

The disc navigation program has a function of controlling the playback order specified in PlayLists and interactive playback operations by using PlayLists. The disc navigation program also has a function of displaying a menu screen for allowing a user to give instructions to perform various types of playback operations. The disc navigation program is described in a programming language, for example, Java™, and is recorded on a recording medium.

In this embodiment, a playback path including at least one PlayItem (sequential PlayItems) in a PlayList is referred to as a "Main Path", and a playback path including at least one SubPlayItem (may be sequential or non-sequential PlayItems) disposed in parallel with the Main Path in a PlayList is referred to as a "Sub Path". That is, the application format on the local storage built in the playback apparatus 1 (discussed below with reference to FIGS. 27 and 28) or on a recording medium installed in the playback apparatus 1 has at least one Sub Path, which is played back in association with the Main Path, in a PlayList.

Figure 6:
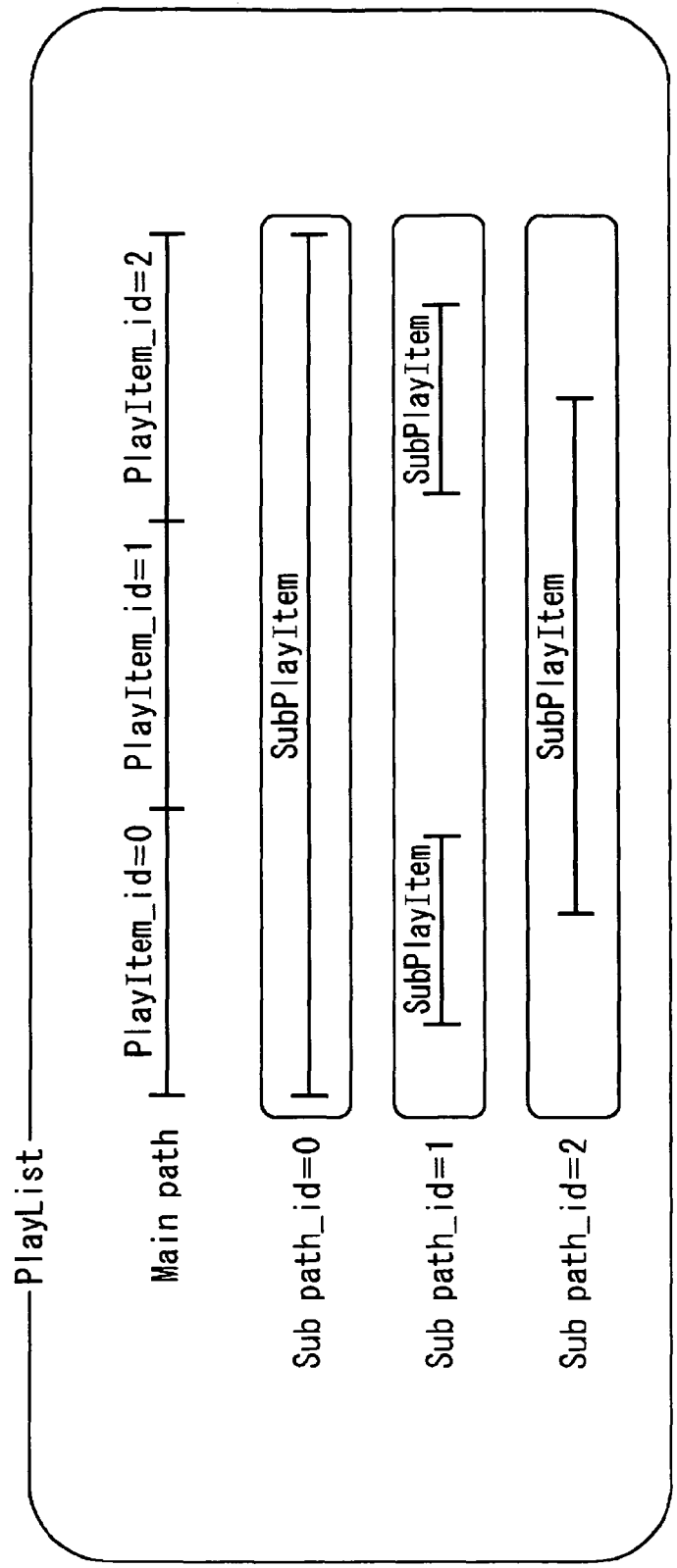
FIG. 6 illustrates the structure of Main Path and Sub Paths.

FIG. 6 illustrates the structure of the Main Path and Sub Paths. A PlayList is allowed to have the single Main Path and at least one Sub Path. The Main Path includes at least one PlayItem, and one Sub Path includes at least one SubPlayItem.

The PlayList shown in FIG. 6 has one Main Path including three PlayItems and three Sub Paths. The PlayItems forming the Main Path are provided with IDs (Identifications) from the head. More specifically, the Main Path includes PlayItems, such as PlayItem_id=0, PlayItem_id=1, and PlayItem_id=2. The Sub Paths are also provided with IDs from the head, such as, Subpath_id=0, Subpath_id=1, and Subpath_id-2. Subpath_id=0 has one SubPlayItem, Subpath_id=1 has two SubPlayItems, and SubPath_id=2 has one SubPlayItem.

The stream referred to by the SubPlayItem contained in Sub Path_id=0 is, for example, dubbed Japanese movie sound, and can be played back instead of the audio stream contained in the AV stream file referred to by the Mainpath. The stream referred to by the SubPlayItems contained in Sub Path_id=1 is, for example, Director's Cut, and can be inserted into a predetermined portion of the AV stream file referred to by the Main Path as the director's commentaries.

A clip AV stream file referred to by one PlayItem includes at least video stream data (main image data). The clip AV stream file may also include at least one audio stream, which is played back simultaneously with (in synchronization with) the video stream (main image data) which is also contained in the clip AV stream file. The clip AV stream file may also include at least one bitmap subtitle stream file (Presentation Graphics stream) which is played back in synchronization with the video stream which is also contained in the clip AV stream file. The clip AV stream file may also include at least one interactive graphics stream file which is played back in synchronization with the video stream which is also contained in the clip AV stream file. The video stream contained in the clip AV stream file and the audio stream, bitmap subtitle stream, or interactive graphics stream, which is played back in synchronization with the video stream, are multiplexed. In other words, a clip AV stream file referred to by one PlayItem includes video stream data and at least 0 audio stream data, at least 0 bitmap subtitle stream data, or at least 0 interactive graphics stream data, which is played back in synchronization with the video stream data, such that they are multiplexed into the clip AV stream file.

That is, a clip AV stream file referred to by one PlayItem includes a plurality of types of streams, such as a video stream, an audio stream, a bitmap subtitle stream, or an interactive graphics stream.

A SubPlayItem refers to, for example, audio stream data or subtitle data contained in a stream file different from the clip AV stream file referred to by the PlayItem.

When playing back a PlayList including only a Main Path, the user can select sound and subtitles only from audio streams and sub-picture streams multiplexed into a clip referred to by that Main Path. In contrast, when playing back a PlayList including a Main Path and a Sub Path, the user can refer to audio streams and sub-picture streams multiplexed into a clip referred to by the SubPlayItem in addition to audio streams and sub-picture streams multiplexed into a clip AV stream file referred to by the Main Path.

As discussed above, a plurality of Sub Paths are included in one PlayList, and a SubPlayItem of each Sub Path refers to the corresponding streams. Accordingly, AV streams having high extensibility and high flexibility can be provided. That is, SubPlayItems can be added afterwards.

Figure 7:
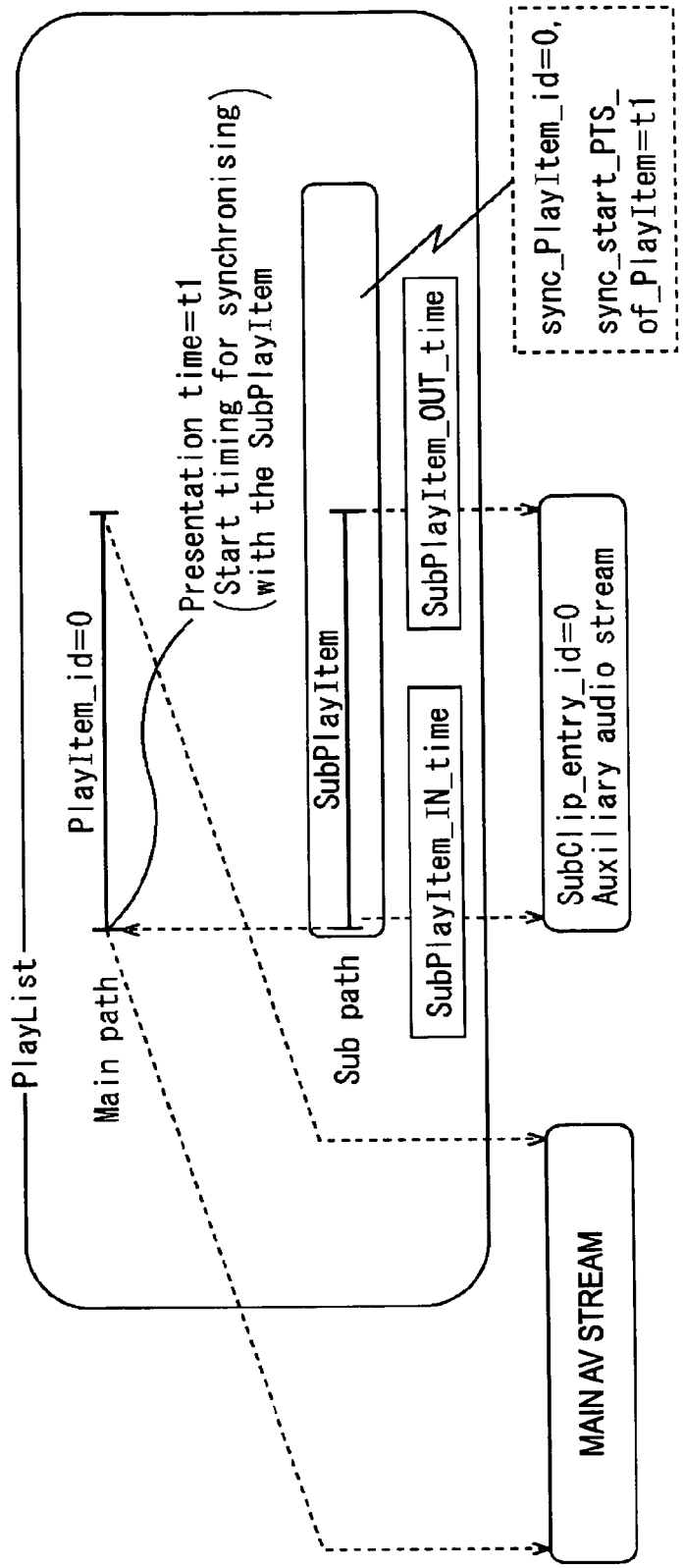
FIG. 7 illustrates an example of Main Path and Sub Paths.

FIG. 7 illustrates an example of a Main Path and an example of a Sub Path. In FIG. 7, an audio playback path played back simultaneously with (in synchronization with) the Main Path is indicated by using the Sub Path.

The PlayList shown in FIG. 7 includes one PlayItem, i.e., PlayItem_id=0, as the Main Path, and one SubPlayItem as the Sub Path. PlayItem( ), which is PlayItem_id=0, refers to the main clip AV stream. SubPlayItem( ) includes the following data. SubPlayItem( ) includes Clip_Information_file_name for specifying the clip referred to by the Sub Path in the PlayList. In the example in FIG. 7, the SubPlayItem refers to an auxiliary audio stream of SubClip_entry_id=0. SubPlayItem( ) also includes SubPlayItem_IN_time and SubPlayItem_OUT_time for specifying the playback zone of the Sub Path contained in the clip (in this case, the auxiliary audio stream). SubPlayItem( ) also includes sync_PlayItem_id and sync_start_PTS_of_PlayItem for specifying the time at which the playback operation of the Sub Path is started on the time axis of the Main Path. In FIG. 7, sync_PlayItem_id=0 and sync_start_PTS_of_PlayItem=t1. With this information, the time t1 at which the playback operation of the Sub Path is started on the time axis of PlayItem=0 of the Main Path can be specified. That is, in the example in FIG. 7, the playback start time of the Main Path and the playback start time of the Sub Path is the same, i.e., t1.

The clip AV audio stream referred to by the Sub Path should not include STC non-sequential time points (system time base non-sequential points). The clip audio sample clock used for the Sub Path is locked to the audio sample clock used for the Main Path.

In other words, SubPlayItem( ) includes information for specifying the clip referred to by the Sub Path, information for specifying the playback zone of the Sub Path, and information for specifying the time at which the playback operation of the Sub Path is started on the time axis of the Main Path. Since the clip AV stream used for the Sub Path does not include STC, the user can refer to a clip AV audio stream different from the clip AV stream (main AV stream to be played back) referred to by the Main Path on the basis of the information included in SubPlayItem( ) (information for specifying the clip referred to by the Sub Path, information for specifying the playback zone of the Sub Path, and information for specifying the time at which the playback operation of the Sub Path is started on the time axis of the Main Path), and plays back the clip AV audio stream.

As stated above, the PlayItem and the SubPlayItem individually manage clip AV stream files. The clip AV stream file (main AV stream file) managed by the PlayItem is different from the clip AV stream file managed by the SubPlayItem.

In a manner similar to the example shown in FIG. 7, a subtitle stream playback path played back simultaneously with the Main Path may be indicated by using a Sub Path.

Figure 8:
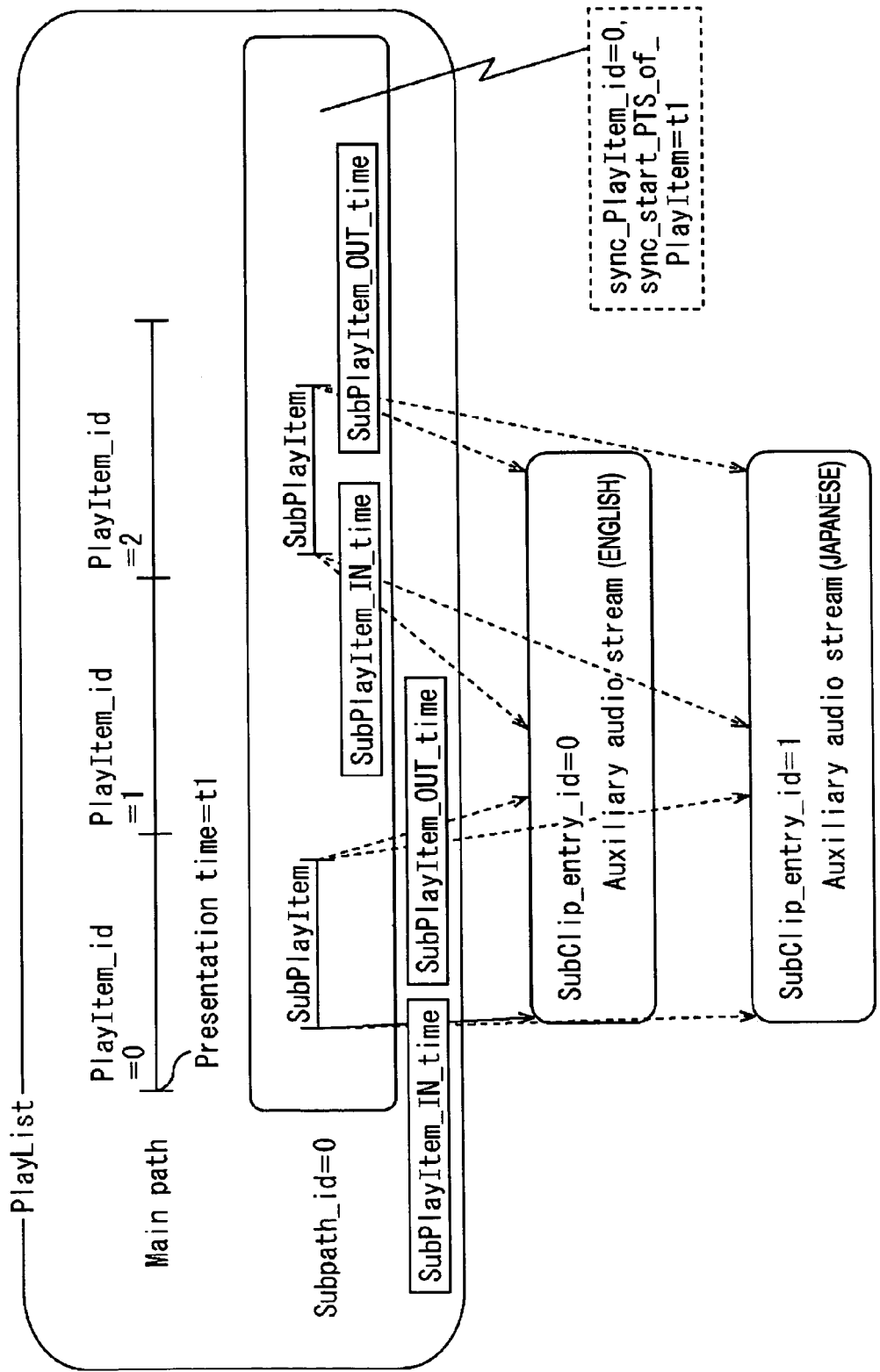
FIG. 8 illustrates another example of Main Path and Sub Paths.

FIG. 8 illustrates another example of a Main Path and another example of Sub Paths. In FIG. 8, an audio playback path played back AV-simultaneously with the Main Path is indicated by using a Sub Path. The main clip AV stream file referred to by the PlayItem of the Main Path is similar to that in FIG. 7, and an explanation thereof is thus omitted.

It is now assumed that the clip AV stream referred to by the Main Path is movie content (AV content), and the auxiliary audio stream (clip) referred to by the audio playback path of the Sub Path is director's commentaries on that movie, and then, the auxiliary audio stream referred to by the Sub Path is mixed into (overlaps with) the clip AV audio stream referred to by the Main Path. In this case, the configuration shown in FIG. 8 can be used. More specifically, the configuration shown in FIG. 8 can be used when the user inputs an instruction to listen to the director's commentaries on the movie into a player while watching the movie, in other words, when the auxiliary audio stream referred to by the Sub Path is mixed into the sound of the clip AV stream referred to by the Main Path.

In FIG. 8, three PlayItems, i.e., PlayItem_id=0, 1, and 2 are disposed in the Main Path, and two SubPlayItems are disposed in the Sub Path (Subpath_id=0). The SubPlayItem (discussed below with reference to FIG. 12) called by the Sub Path (Subpath_id=0) (discussed below with reference to FIG. 10) includes SubPlayItem_IN_time and SubPlayItem_OUT_time for specifying the playback zones of the auxiliary audio streams (English auxiliary audio stream clip having SubClip_entry_id=0 and Japanese auxiliary audio stream clip having SubClip_entry_id=1) of the Sub Path.

Comparing the example in FIG. 8 with that in FIG. 7, it can be seen that, in the example in FIG. 8, a SubPlayItem can refer to the auxiliary audio stream (English or Japanese audio stream) having SubClip_entry_id=0 or SubClip_entry_id=1. That is, the use of the SubPlayItem makes it possible to refer to a plurality of audio streams, and when playing back the SubPlayItem, an audio stream file can be selected from a plurality of audio stream files, i.e., in the example in FIG. 8, the English audio stream file or the Japanese audio stream file is selected. More specifically, one of SubClip_entry_id=0 and SubClip_entry_id=1 is selected based on, for example, an instruction from the user, and the auxiliary audio stream referred to by the selected ID is played back. If an instruction to play back the auxiliary audio stream together with the audio stream referred to by the Main Path is provided, a first audio stream referred to by the Main Path and a second audio stream referred to by the Sub Path are mixed and played back. It is possible that two audio streams referred to by the two Sub Paths be mixed and played back. This is discussed later.

The data structure (syntax) that implements the structure of the Main Path and Sub Paths discussed with reference to FIGS. 6 through 8 is as follows.

FIG. 9 illustrates the syntax of PlayList( ).

The length is a 32-bit unsigned integer indicating the number of bytes from immediately after the length field to the end of PlayList( ), i.e., a field indicating the number of bytes from reserved_for_future_use to the end of PlayList( ). After the length, the 16-bit reserved_for_future_use field follows. The number_of_PlayItems is a 16-bit field indicating the number of PlayItems contained in the PlayList. In the case of the example in FIG. 6, the number of PlayItems is three, and the numeric value is assigned to the PlayItems as PlayItem_id from 0 in the order in which PlayItem( ) appears in the PlayList. For example, PlayItem_id=0, 1, 2 are assigned, as shown in FIGS. 6 and 8.

The number_of_SubPath is a 16-bit field indicating the number of Sub Paths (number of entries) contained in the PlayList. In the case of the example in FIG. 6, the number of Sub Paths is three, and the numeric value is assigned to the SubPlayItems as SubPath_id from 0 in the order in which SubPath( ) appears in the PlayList. For example, Sub Path_id=0, 1, 2 are assigned, as shown in FIG. 6. Then, in the subsequent FOR statement, the PlayItems are referred to for the same number of times as the number of PlayItems, and the Sub Paths are referred to for the same number of times as the number of Sub Paths.

FIG. 10 illustrates the syntax of SubPath( ).

The length is a 32-bit unsigned integer indicating the number of bytes from immediately after the length field to the end of PlayList( ), i.e., a field indicating the number of bytes from reserved_for_future_use to the end of PlayList( ). After the length, the 16-bit reserved_for_future_use field follows. The SubPath_type is an 8-bit field indicating the type of application of the Sub Path, i.e., the type of Sub Path, such as audio, bitmap subtitle, or text subtitle. A first example of the SubPath_type is discussed below with reference to FIG. 11. After the SubPath_type, the 15-bit reserved_for_future_use field follows. The is_repeat_SubPath field is a one-bit field indicating the playback method for the Sub Path, and more specifically, indicating whether the Sub Path is played back repeatedly or only once while playing back the Main Path. This field is used when, for example, the playback timing of the stream contained in the clip specified by the Sub Path is different from that of the main AV stream (when, for example, the Main Path is a still-image slideshow and the audio Sub Path is background music (BGM) of the Main Path). After the is_repeat_SubPath field, the 8-bit reserved_for_future_use follows. The number_of_SubPlayItems is an 8-bit field indicating the number of SubPlayItems (number of entries) contained in one Sub Path. For example, the number of SubPlayItems of SubPath_id=0 in FIG. 6 is one, and the number of SubPlayItems of SubPath_id=1 is 2. In the subsequent FOR statement, the SubPlayItems are referred to for the same number of times as the number of SubPlayItems.

FIG. 11 illustrates a first example of the SubPath_type (the type of Sub Path). The types of Sub Paths can be defined, for example, as shown in FIG. 11.

In FIG. 11, SubPath_type=0, 1 are reserved. The SubPath_type=2 is the Audio presentation path of the Browsable slideshow. In SubPath_type=2, the audio presentation path referred to by the Sub Path is not synchronized with the Main Path referred to by the PlayItems in the PlayList.

The Sub Path_type=3 is the Interactive graphics presentation menu. In SubPath_type=3, the interactive graphics presentation menu referred to by the Sub Path is not synchronized with the Main Path referred to by the PlayItems in the PlayList.

The SubPath_type=4 is the Text subtitle presentation path. In SubPath_type=4, the text subtitle presentation path referred to by the Sub Path is synchronized with the Main Path referred to by the PlayItems in the PlayList.

The SubPath_type=5 is the second Audio presentation path (which is the path for referring to the second audio stream). In SubPath_type=5, the second audio presentation path referred to by the Sub Path is synchronized with the Main Path referred to by the PlayItems in the PlayList. The second audio stream referred to by that Sub Path is, for example, director's commentaries (sound) on a movie. For the Sub Path represented by Subpath_id=0 in FIG. 8, the SubPath_type is SubPath_type=5 in FIG. 10.

The SubPath_type=6 is the second video presentation path (which is the path for referring to the second video stream). In SubPath_type=6, the second video presentation path referred to by the Sub Path is synchronized with the Main Path referred to by the PlayItems in the PlayList. The second video stream referred to by that Sub Path is, for example, director's commentaries (moving pictures) on a movie. When describing processing performed by the playback apparatus 1 with reference to in FIGS. 27 and 28, only audio synthesizing is discussed. However, moving pictures can also be synthesized in a configuration similar to that shown in FIGS. 27 and 28, which is discussed in detail later.

The SubPath_type=7 through 255 are reserved.

FIG. 12 illustrates the syntax of SubPlayItem(i).

The length is a 16-bit unsigned integer indicating the number of bytes from immediately after the length field to the end of SubPlayItem( ).

In FIG. 12, the syntax is divided into two portions, and more specifically, a portion where the SubPlayItem refers to one clip and a portion where the SubPlayItem refers to a plurality of clips are shown.

The portion where the SubPlayItem refers to one clip is discussed first.

The SubPlayItem( ) includes Clip_Information_file_name[0] for specifying the clip, Clip_codec_identifier[0] for specifying the codec method for the clip, reserved_for_future_use, is_multi_Clip_entries, which is a flag indicating whether multi-clips are registered, and ref_to_STC_id[0], which is information concerning the STC non-sequential points (non-sequential points of the system time base). If the flag of is_multi_Clip_entries is ON, the syntax of the portion where SubPlayItem( ) refers to a plurality of clips is checked. The SubPlayItem( ) also includes SubPlayItem_IN_time and SubPlayItem_OUT_time for specifying the playback zone of the Sub Path contained in the clip, and sync_PlayItem_id and sync_start_PTS_of_PlayItem for specifying the playback start time at which the playback operation of the Sub Path is started on the time axis of the Main Path. The sync_PlayItem_id and sync_start_PTS_of_PlayItem are used when the playback timing of the main AV stream is the same as that of the stream contained in the file referred to by the Sub Path, as shown in FIGS. 7 and 8, but are not used when the playback timing of the main AV stream is different from the stream contained in the file referred to by the Sub Path (for example, still-image slideshow (Main Path) is not synchronized with BGM (Sub Path) for the slideshow). The SubPlayItem_IN_time, SubPlayItem_OUT_time, sync_PlayItem_id, and sync_start_PTS_of_PlayItem are used in common for the clip referred to by SubPlayItem( ).

Next, the portion where the SubPlayItem refers to a plurality of clips (if (is_multi_Clip_entries==1b) is discussed. More specifically, the case where the SubPlayItem refers to a plurality of clips, as shown in FIG. 8, is discussed.

The num_of_Clip_entries indicates the number of clips, and designates clips other than those having Clip_Information_file_name[0][SubClip_entry_id]. That is, num_of_Clip_entries designates clips, such as those having Clip_Information_file_name[1], Clip_Information_file_name[2], and so on, other than those having Clip_Information_file_name[0]. The SubPlayItem( ) also includes Clip_codec_identifier[SubClip_entry_id] for specifying the codec method for the clip, ref_to_STC_id[SubClip_entry_id], which is information concerning the STC non-sequential points (non-sequential points of the system time base), and reserved_for_future_use.

The SubPlayItem_IN_time, SubPlayItem_OUT_time, sync_PlayItem_id, and sync_start_PTS_of_PlayItem are used in common for the clips referred to by SubPlayItem( ). In the example in FIG. 8, SubPlayItem_IN_time, SubPlayItem_OUT_time, sync_PlayItem_id, and sync_start_PTS_of_PlayItem are used in common for SubClip_entry_id=0 and SubClip_entry_id=1. The text-based subtitle for the selected SubClip_entry_id is played back based on the SubPlayItem_IN_time, SubPlayItem_OUT_time, sync_PlayItem_id, and sync_start_PTS_of_PlayItem.

The numeric value is sequentially assigned to SubClip_entry_id from 1 in the order in which Clip_Information_file_name[SubClip_entry_id] in the SubPlayItem( ) appears. The SubClip_entry_id of Clip_Information_file_name[0] is 0.

FIG. 13 illustrates the syntax of PlayItem( ).

The length is a 16-bit unsigned integer indicating the number of bytes from immediately after the length field to the end of PlayItem( ). Clip_Information_file_name[0] is a field for specifying the clip referred to by PlayItem( ). In the example in FIG. 7, the main clip AV stream file is referred to by Clip_Information_file_name[0]. The PlayItem( ) also includes Clip_codec_identifier[0] specifying the codec method for the clip, reserved_for_future_use, is_multi_angle, connection_condition, and ref_to_STC_id[0], which is information concerning the STC non-sequential points (non-sequential time points of the system time base). The PlayItem( ) also includes IN_time and OUT_time for specifying the playback zone of the PlayItem in the clip. In the example in FIG. 7, IN_time and OUT_time specify the playback zone of the main clip AV stream file. The PlayItem( ) also includes UO_mask_table( ), PlayItem_random_access_mode, and still_mode. A description of a case where is_multi_angle indicates a plurality of angles is not given here, since such a case is not directly related to the present invention.

The STN_table( ) provides a mechanism for allowing a user, if the target PlayItem and at least one Sub Path to be played back in association with the target PlayItem are provided, to select from the streams contained in the clip referred to by the PlayItem and the clips referred to by at least Sub Path when the user switches sound or subtitles.

FIG. 14 illustrates an example of the syntax of STN_table( ) (first STN_table( )). The first STN_table( ) is set as an attribute of PlayItem( ). The first STN_table( ) shown in FIG. 14 provides a mechanism for allowing the user to select a combination of the clip referred to by the PlayItem and the clip referred to by the SubPath.

The length is a 16-bit unsigned integer indicating the number of bytes from immediately after the length field to the end of STN_table( ). After the length, a 16-bit reserved_for_future_use follows. The number_of_video_stream_entries indicates the number of streams provided with video_stream_id entered (registered) in STN_table( ). The video_stream_id is information for identifying the video streams. The video_stream_number is the video stream number that can be seen by the user when switching video. The number_of_audio_stream_entries indicates the number of streams provided with audio_stream_id entered (registered) in STN_table( ). The audio_stream_id is information for identifying the audio streams. The audio_stream_number is the audio stream number that can be seen by the user when switching sound.

The number_of_PG_txtST_stream_entries indicates the number of streams provided with PG_txtST_stream_id entered in STN_table( ). In STN_table( ) shown in FIG. 14, streams (PG, Presentation Graphics streams) in which bitmap subtitles, such as DVD sub-pictures, are run-length coded, and text subtitle files (txtST) are entered. The PG_txtST_stream_id is information for identifying the subtitle streams, and PG_txtST_stream_number is the subtitle stream number (text subtitle stream number) that can be seen by the user when switching subtitles.

The number_of_IG_stream_entries indicates the number of streams provided with IG_stream_id entered in STN_table( ). In STN_table( ) shown in FIG. 14, interactive graphics streams are entered. IG_stream_id is information for identifying the interactive graphics streams. The IG_stream_number is the graphics stream number that can be seen when switching graphics.

The syntax of stream_entry( ) is discussed below with reference to FIG. 15.

The length is an 8-bit unsigned integer indicating the number of bytes from immediately after the length field to the end of stream_entry( ). The type is an 8-bit field indicating the type of information required for uniquely specifying the stream provided with the above-described stream number.

If type=1 or type=3, a 16-bit packet ID (PID) is designated for specifying one elementary stream from a plurality of elementary streams multiplexed into the main clip referred to by the PlayItem. The ref_to_stream_PID_of_mainClip indicates this PID. That is, if type=1 or type=3, the stream can be determined only by specifying the PID in the main clip AV stream file.

If type=2 or type=3, to specify one elementary stream from a plurality of elementary streams multiplexed into one clip referred to by the Sub Path including a plurality of clips, SubPath_id of the Sub Path, Clip_id, and packet ID (PID) are designated. The ref_to_SubPath_id indicates the SubPath_id, the ref_to_SubClip_entry_id indicates the Clip_id, and the ref_to_stream_PID_of_SubClip indicates the PID. This field is used when a plurality of clips are referred to by a SubPlayItem and when a plurality of elementary streams are referred to by each clip.

More specifically, if type=3, when the packet ID (PID) for specifying one elementary stream from a plurality of elementary streams multiplexed into the main clip referred to by the PlayItem is designated and when the Sub Path refers to a plurality of clips at the same time and a plurality of elementary streams are multiplexed into each clip, two streams can be entered by SubPath_id, Clip_id, and packet ID (PID) for specifying one elementary stream from a plurality of elementary streams multiplexed into one sub-clip. For example, two audio streams, i.e., an audio stream referred to by the Main Path and an audio stream referred to by the Sub Path, can be entered. Hereinafter, an audio stream referred to by the Main Path is also referred to as a "first audio stream", and an audio stream referred to by the Sub Path is also referred to as a "second audio stream".

If a PlayItem and at least one Sub Path played back in association with the PlayItem are provided, type (three types) can be used for specifying one elementary stream from the clip referred to by the PlayItem and the clips referred to by at least one Sub Path. The type=1 indicates the clip (main clip) referred to by the Main Path, and type=2 or type=3 indicates the clip (sub clip) referred to by the Sub Path.

If type=3, an audio stream (first audio stream) of a clip AV stream file referred to by the Main Path and an audio stream (second audio stream) referred to by the Sub Path can be specified and entered. For example, the first audio stream and the second audio stream can be combined (mixed) and played back.

Referring back to a description of the first STN_table( ) in FIG. 14, in the FOR loop of the video stream ID (video_stream_id), video_stream_id is assigned from 0 to a video elementary stream specified for each stream_entry( ). Instead of the video stream ID (video_stream_id), the video stream number (video_stream_number) is used, in which case, the number is assigned from 1. That is, the number obtained by adding one to video_stream_id is the video_stream_number. The number is assigned from 1 since video_stream_number is the video stream number that can be seen by the user when switching video.

Similarly, in the FOR loop of the audio stream ID (audio_stream_id), audio_stream_id is assigned from 0 to an audio elementary stream specified for each stream_entry( ). As in the video stream, instead of the audio stream ID (audio_stream_id), the audio stream number (audio_stream_number) is used, in which case, the number is assigned from 1. That is, the number obtained by adding one to audio_stream_id is the audio_stream_number. The number is assigned from 1 since audio_stream_number is the audio stream number that can be seen by the user when switching sound.

Similarly, in the FOR loop of the subtitle stream ID (PG_txtST_stream_id), PG_txtST_stream_id is assigned from 0 to a bitmap subtitle or text subtitle elementary stream specified for each stream_entry( ). As in the video stream, instead of the subtitle stream ID (PG_txtST stream_id), the subtitle stream number (PG_txtST_stream_number) is used, in which case, the number is assigned from 1. That is, the number obtained by adding one to PG_txtST_stream_id is the PG_txtST_stream_number. The number is assigned from 1 since PG_txtST_stream_number is the bitmap subtitle or text subtitle stream number that can be seen by the user when switching subtitles.

Similarly, in the FOR loop of the graphics stream ID (IG_stream_id), IG_stream_id is assigned from 0 to an interactive graphics elementary stream specified for each stream_entry( ). As in the video stream, instead of the graphics stream ID (IG_stream_id), the graphics stream number (IG_stream_number) is used, in which case, the number is assigned from 1. That is, the number obtained by adding one to IG_stream_id is the IG_stream_number. The number is assigned from 1 since IG_stream_number is the graphics stream number that can be seen by the user when switching graphics.

The stream_attribute( ) in the first STN_table( ) shown in FIG. 14 is as follows. In stream_attribute( ), attribute information concerning the stream specified by stream_entry( ) is recorded.

The stream_attribute( ) in the FOR loop of the video stream ID (video_stream_id) provides stream attribute information concerning one video elementary stream specified by each stream_entry( ). That is, in stream_attribute( ), stream attribute information concerning one video elementary stream specified by each stream_entry( ) is indicated.

The stream_attributes( ) in the FOR loop of the audio stream ID (audio_stream_id) provides stream attribute information concerning at least one audio elementary stream specified by each stream_entry( ). That is, in stream_attributes( ), stream attribute information concerning at least one audio elementary stream specified by each stream_entry( ) is indicated. More specifically, in stream_entry( ) shown in FIG. 15, if type=1 or type=2, there is only one audio elementary stream specified by this stream_entry( ). Accordingly, stream_attributes( ) provides stream attribute information concerning that audio elementary stream. If type=3, there are two audio elementary streams (i.e., a first audio stream referred to by the Main Path and a second audio stream referred to by a Sub Path) specified by this stream_entry( ).

Accordingly, stream_attributes( ) provides stream attribute information concerning the two audio elementary streams.

In this manner, if type=3, i.e., if audio streams are referred to by both the Main Path and a Sub Path, two stream_attributes elements can be inserted. That is, in the FOR statement for the audio streams, if type=3 in stream_entry( ), two stream_attributes( ) elements are entered.

More specifically, in the first STN_table( ) in FIG. 14, stream_attributes( ) is defined for each stream_entry( ) of the audio stream ID (audio_stream_id). If type=3, two stream_attributes( ) elements are assigned to stream_entry( ). Accordingly, since two stream_attributes( ) elements of the audio streams referred to by the Main Path and a Sub Path are entered for one audio_stream_id, two audio streams which are simultaneously played back can be entered.

The stream_attribute( ) in the FOR loop of the subtitle stream ID (PG_txtST_stream_id) provides stream attribute information concerning one bitmap subtitle elementary stream or one text subtitle elementary stream specified by each stream_entry( ). That is, in stream_attribute( ), stream attribute information concerning one bitmap subtitle elementary stream or one text subtitle elementary stream specified by each stream_entry( ) is indicated.

Similarly, the stream_attribute( ) in the FOR loop of the graphics stream ID (IG_stream_id) provides stream attribute information concerning one interactive graphics elementary stream specified by each stream_entry( ). That is, in stream_attribute( ), stream attribute information concerning one interactive graphics elementary stream specified by each stream_entry( ) is indicated.

An example in which two audio streams, i.e., an audio stream referred to by the Main Path and an audio stream referred to by a Sub Path, are entered has been discussed with reference to FIGS. 14 and 15. The syntax of second STN_table( ) and the syntax of second Stream_entry( ) that allow two audio streams referred to by two Sub Paths to be entered are shown in FIGS. 16 and 17, respectively. In FIGS. 16 and 17, elements corresponding to those in FIGS. 14 and 15 are not explained for avoiding repetitions.

FIG. 16 illustrates the syntax of second STN_table( ). The second STN_table( ) is set as an attribute of the PlayItem. FIG. 17 illustrates the syntax of second Stream_entry( ).

In FIG. 17, if type=1, to specify one elementary stream from a plurality of elementary streams multiplexed into the main clip referred to by the PlayItem, a 16-bit packet ID (PID) is designated. The ref_to_stream_PID_of_mainClip indicates this PID. That is, if type=1, the stream is determined only by specifying the PID in the main clip AV stream file.

If type=2, to specify one elementary stream from a plurality of elementary streams multiplexed into one clip referred to by a Sub Path including a plurality of clips, the SubPath_id, Clip id, and packet ID (PID) are designated. The ref_to_SubPath_id indicates the SubPath_id, the ref_to_SubClip_entry_id indicates the Clip id, and the ref_to_stream_PID_of_SubClip indicates the PID. This type is used when a plurality of clips are referred to by a SubPlayItem and when a plurality of elementary streams are referred to by each clip.

In this manner, when a PlayItem and at least one Sub Path played back in association with the PlayItem are provided, type (two types, i.e., type 1 and type 2) can be used for specifying one elementary stream from the clip referred to by the PlayItem and clips referred to by at least one SubPath. Type=1 indicates the clip (main clip) referred to by the Main Path and type=2 indicates a clip (sub clip) referred to by a Sub Path.

Referring back to a description of the second STN_table( ) in FIG. 16, in the FOR loop of the audio stream ID (audio_s- tream_id), audio_stream_id is assigned from 0 to an audio elementary stream specified for each stream_entry( ). Unlike the first STN_table( ) shown in FIG. 14, after Stream_entry( ) and Stream_attributes( ) for the first audio stream (decoded by a first audio decoder 75-1 of the playback apparatus 1 shown in FIG. 28), secondary_audio_present_flag indicating whether a secondary audio stream is defined is provided. If a secondary audio stream is defined, the secondary_audio_present_flag is set to be 1, and a secondary audio stream is defined in stream_entry( ) and stream_attributes( ) in the subsequent IF statement. If secondary_audio_present_flag is 1, two stream_entry( ) elements are defined in the FOR loop of the audio stream ID (audio_stream_id), and audio_stream_id is assigned from 0 to two audio elementary streams specified by the two stream_entry( ) elements. As in the case of the video streams, instead of the audio stream ID (audio_stream_id), the audio stream number (audio_stream_number) may be used, in which case, audio_stream_number is assigned from 1. That is, the number obtained by adding one to audio_stream_id is the audio_stream_number. The number is assigned from 1 since audio_stream_number is the audio stream number that can be seen by the user when switching sound.

It is possible that a Secondary Audio Stream, i.e., the secondary stream_entry( ), is not entered. In this case, secondary_audio_present_flag is set to be 0, and only the primary audio stream (main audio stream) is entered. That is, if there is no secondary audio stream, the secondary stream_entry( ) is not entered. In this case, mixing of two audio streams is not performed.

In the FOR loop of the audio stream ID (audio_stream_id), two combinations of stream_entry( ) and stream_attributes( ) are indicated. The first combination of stream_entry( ) and stream_attributes( ) is defined for an audio stream decoded by the first audio decoder 75-1 of the playback apparatus 1 shown in FIG. 28, and the second combination of stream_entry( ) and stream attributes( ) entered when secondary_audio_present_flag is 1 is defined for an audio stream decoded by a second audio decoder 75-2 of the playback apparatus 1 shown in FIG. 28. That is, two audio streams can be defined.

In the FOR loop of the audio stream ID (audio_stream_id), stream_attributes( ) provides stream attribute information concerning at least one audio elementary stream specified for each stream_entry( ). That is, in the stream_attributes( ), stream attribute information concerning at least one audio elementary stream specified for each stream_entry( ) is indicated. More specifically, if secondary_audio_present_flag shown in FIG. 16 is 1, there are two audio elementary streams specified by the two stream_entry( ) elements, and thus, each stream_attributes( ) provides stream attribute information concerning the corresponding audio elementary stream. More specifically, in the FOR loop of the audio stream ID (audio_stream_id), the first stream_entry( ) defines the audio stream (main audio stream) decoded by the first audio decoder 75-1 of the playback apparatus 1 shown in FIG. 28, and then, stream attribute information concerning the specified audio elementary stream is given by the first stream_attributes( ). Similarly, if secondary_audio_present_flag is 1, the second stream_entry( ) in the FOR loop of the audio stream ID (audio_stream_id) defines the audio stream decoded by the second audio decoder 75-2 of the playback apparatus 1 shown in FIG. 28, and then, stream attribute information concerning the specified audio elementary stream is given by the second stream_attributes( ) in the FOR loop of the audio stream ID (audio_stream_id).

The audio stream defined by the first stream_entry( ) in the FOR loop of the audio stream ID (audio_stream_id) is, for example, dubbed Japanese movie sound or the English movie sound. If secondary_audio_present_flag in the For loop of the audio stream ID (audio_stream_id) is 1, the audio stream defined by the second stream_entry( ) is, for example, movie sound of Director's Cut, which is used when director's commentaries are inserted into a predetermined portion of the AV stream file referred to by the Main Path.

That is, when combining two audio streams, secondary_audio_present_flag shown in FIG. 16, which indicates the presence of an audio stream to be combined with the primary (first) audio stream, is set to be 1 so that the stream_entry( ) and stream_attributes( ) of the secondary audio stream can be referred to.

More particularly, it is now assumed that one of the audio streams to be combined is set to be the audio stream referred to by the Main Path (main audio stream decoded by the first audio decoder 75-1 of the playback apparatus 1 shown in FIG. 28, which is discussed below), and the other audio stream is set to be the audio stream referred to by a Sub Path (secondary audio stream decoded by the second audio decoder 75-2 of the playback apparatus 1 shown in FIG. 28, which is discussed below). In this case, the type of first stream_entry( ) in FIG. 16 is set to be 1 (type=1), and stream attribute information concerning the specified audio elementary stream is given by stream_attributes( ). Then, secondary_audio_present_flag in FIG. 16 is set to be 1, and the type of second stream_entry( ) is set to be 2 (type=2), and stream attribute information concerning the specified audio elementary stream is given by stream_attributes( ).

If two audio streams referred to by Sub Paths are combined, the type of first stream_entry( ) in the FOR loop of the audio stream ID (audio_stream_id) in FIG. 16 is set to be 2 (type=2), and stream attribute information concerning the specified audio elementary stream is given by stream_attributes. Then, secondary_audio_present_flag in the FOR loop of the audio stream ID (audio_stream_id) in FIG. 16 is set to be 1, and the type of second stream_entry( ) is set to be 2 (type=2). Then, stream attribute information concerning the specified audio elementary stream is given by stream_attributes( ). That is, if audio streams to be combined are audio streams referred to by Sub Paths, the type of stream_entry( ) in FIG. 17 is 2 (type=2).

As described above, since audio streams (or video streams) can be specified by Sub Paths and added, an audio stream (or video stream) stored in a disc and an audio stream (or video stream) obtained by being downloaded or stored in a local storage can be played back in synchronization with each other. Alternatively, audio streams (or video streams) obtained by being downloaded can be played back in synchronization with a video stream (or audio stream) stored in a disc or obtained from an external source.

If a PlayList is obtained, a video stream (or audio stream) specified by the Main Path can be played back in synchronization with two audio streams (or video streams) specified by Sub Paths.

If only an audio stream referred to by the Main Path or only an audio stream referred to by a Sub Path is played back, secondary_audio_present_flag in FIG. 16 is set to be 0. Then, if the audio stream is referred to by the Main Path, the type of first stream_entry( ) is set to be 1 (type=1), and if the audio stream is referred to by the Sub Path, the type of first stream_entry( ) is 2 (type=2). Stream attribute information concerning the specified audio elementary stream is then given by stream_attributes( ). That is, only one audio stream can be played back without being mixed.

In this manner, in FIG. 16, stream_entry( ) and stream_attributes can be inserted for two audio elementary streams.

That is, in the FOR statement of the audio stream, by using two stream_entry( ) elements, the corresponding stream_attributes( ) can be entered.

That is, in the second STN_table( ) shown in FIG. 16, the two stream_entry( ) elements of the audio stream ID (audio_stream_id) define the corresponding stream_attributes( ). Accordingly, one combination of stream_entry( ) and stream_attributes( ) referred to by the Main Path and the other combination of stream_entry( ) and stream_attributes( ) referred to by a Sub Path or by two Sub Paths can be entered for one audio_stream_id. Thus, two audio streams, which are played back simultaneously, can be entered.

The video stream ID (video_stream_id), subtitle stream ID (PG_txtST_stream_id), and graphics stream ID (IG_stream_id) in FIG. 16 are similar to those in FIG. 14.

The syntax of stream_attribute( ) is discussed below with reference to FIG. 18.

The length is a 16-bit unsigned integer indicating the number of bytes from the length field to the end of stream_attribute( ).

The stream_coding_type indicates the coding type of elementary stream, as shown in FIG. 19. The coding types of elementary streams include MPEG-2 video stream, HDMV LPCM audio, Dolby AC-3 audio, dts audio, Presentation graphics stream, Interactive graphics stream, and Text subtitle stream. The stream_coding_type may be further extended so that video streams compressed by other types of coding methods, such as MPEG4 AVC and VC-1, can be handled.

The video_format indicates the video format of a video elementary stream, as shown in FIG. 20. The video formats of the video elementary streams include 480i, 576i, 480p, 1080i, 720p, and 1080p.

The frame_rate indicates the frame rate of a video elementary stream, as shown in FIG. 21. The frame rates of the video elementary streams include 24000/1001, 24, 25, 30000/1001, 50, and 60000/1001.

The aspect_ratio indicates the aspect ratio of a video elementary stream, as shown in FIG. 22. The aspect ratios of the video elementary streams include 4:3 display aspect ratio and 16:9 display aspect ratio.

The audio_presentation_type indicates the presentation type of an audio elementary stream, as shown in FIG. 23. The presentation types of audio elementary streams include single mono channel, dual mono channel, stereo (2-channel), and multi-channel.

The sampling_frequency indicates the sampling frequency of an audio elementary stream, as shown in FIG. 24. The sampling frequencies of the audio elementary streams include 48 kHz and 96 kHz.

The audio_language_code indicates the language code (for example, Japanese, Korean, or Chinese) of an audio elementary stream.

The PG_language_code indicates the language code (for example, Japanese, Korean, or Chinese) of a bitmap subtitle elementary stream.

The IG_language_code indicates the language code (for example, Japanese, Korean, or Chinese) of an interactive graphics elementary stream.

The textST_language_code indicates the language code (for example, Japanese, Korean, or Chinese) of a text subtitle elementary stream.

The character_code indicates the character code of a text subtitle elementary stream, as shown in FIG. 25. The character codes of text subtitle elementary streams include Unicode V1.1 (ISO 10646-1), Shift JIS (Japanese), KSC 5601-including KSC 5653 for Roman character (Korean), GB18030-2000 (Chinese), GB2312 (Chinese), and BIG5 (Chinese).

A specific example of the syntax of stream_attribute( ) shown in FIG. 18 is described below with reference to FIGS. 18, and 19 through 25.

If the coding type (stream_coding_type in FIG. 18) of the elementary stream is the MPEG2 video stream (FIG. 19), stream_attribute( ) includes the video format (FIG. 20), the frame rate (FIG. 21), and the aspect ratio (FIG. 22) of the elementary stream.

If the coding type (stream_coding_type in FIG. 18) of the elementary stream is the HDMV LPCM audio, Dolby AC-3 audio, or dts audio (FIG. 19), stream_attribute( ) includes the audio presentation type information (FIG. 23), the sampling frequency (FIG. 24), and the language code of the audio elementary stream.

If the coding type (stream_coding_type in FIG. 18) of the elementary stream is the Presentation graphics stream (FIG. 19), stream_attribute( ) includes the language code of the bitmap subtitle elementary stream.

If the coding type (stream_coding_type in FIG. 18) of the elementary stream is the Interactive graphics stream (FIG. 19), stream_attribute( ) includes the language code of the interactive graphics elementary stream.

If the coding type (stream_coding_type in FIG. 18) of the elementary stream is the Text subtitle stream (FIG. 19), stream_attribute( ) includes the character code (FIG. 25) and the language code of the text subtitle elementary stream.

The attribute information is not restricted to the above-described types.

In this manner, if a PlayItem and at least one Sub Path played back in association with the PlayItem are provided, by referring to the clip referred to by the PlayItem and clips referred to by at least one Sub Path, attribute information concerning an elementary stream (one elementary stream if type=1 or type=2, and two elementary streams if type=3) specified by stream_entry( ) can be defined by stream_attribute( ).

By checking the attribute information (stream_attribute( )), the playback apparatus can determine whether it has a function of playing back the corresponding elementary stream. Also, by checking the attribute information, the playback apparatus can select the elementary streams in accordance with the initial information concerning the language set in the playback apparatus.

It is now assumed, for example, that the playback apparatus has a function of playing back bitmap subtitle elementary streams without a function of playing back text subtitle elementary streams. In this case, in response to an instruction to switch the languages from the user, the playback apparatus sequentially selects only bitmap subtitle elementary streams from the FOR loop of the subtitle stream ID (PG_txtST_stream_id) and plays back the selected elementary streams.

If the initial information concerning the language set in the playback apparatus is Japanese, in response to an instruction to switch from main audio to sub audio (i.e., secondary audio) or to mix main audio with secondary audio from the user, the playback apparatus sequentially selects only audio elementary stream whose language code is Japanese from the FOR loop of the audio stream ID (audio_stream_id) prepared as secondary audio and plays back the selected elementary streams.

If AV video streams and AV audio streams (movie) referred to by the Main Path are played back, in response to an instruction to switch sound and to mix an audio stream (director's or performs' commentaries) referred to by a Sub Path with an AV stream referred to by the Main Path from the user, the playback apparatus mixes (superimposes) the second audio stream referred to by the Sub Path with (on) the first audio stream referred to by the Main Path, and plays back the mixed audio streams together with the video streams.

In response to an instruction to switch sound and to mix two audio streams referred to by two Sub Paths (i.e., an instruction to play back audio streams corresponding to the audio IDs whose secondary_audio_present_flag shown in FIG. 16 is 1 and whose types shown in FIG. 17 are 2 in the syntaxes shown in FIGS. 16 and 17), the playback apparatus mixes (superimposes) the two audio streams referred to by the two Sub Paths, and plays back the mixed streams together with the video stream.

As described above, by the provision of STN_table( ) in PlayItem( ), if a PlayItem and at least one Sub Path played back in association with the PlayItem are provided, the user can select a stream to be played back from the clip referred to by the PlayItem and clips referred to by at least one Sub Path when switching sound or subtitles. Thus, interactive operations can be performed for streams or data files different from an AV stream to be played back.

Since one PlayList includes a plurality of SubPaths and each SubPath refers to a SubPlayItem, AV streams having high extensibility and high flexibility are implemented. That is, SubPlayItems can be added afterwards. For example, if a PlayList including a clip AV stream file referred to by the Main Path is replaced by a PlayList including the clip AV stream file and a new Sub Path, the user can select based on the new PlayList, not only from the clip AV stream file referred to by the Main Path, but also from the clip AV stream file referred to by the Sub Path. Thus, the AV streams have high extensibility.

If a PlayItem and at least two Sub Paths played back associated with the PlayItem are provided, the STN_table( ) in PlayItem( ) provides a mechanism for mixing clip audio streams referred to by two Sub Paths and playing back the mixed stream (FIGS. 16 and 17). Accordingly, interactive operations can be performed when superimposing an audio stream (for example, dubbed Japanese movie sound) decoded by the first audio decoder 75-1 on an audio stream (for example, Director's Cut) decoded by the second audio decoder 75-2.

By the provision of STN_table( ) in PlayItem( ), if a PlayItem and at least one SubPath played back in association with the PlayItem are provided, a mechanism for mixing a first audio stream referred to by the PlayItem with a second audio stream referred to by the SubPath can be provided. Thus, the user can perform interactive operations when superimposing an audio stream different from the main clip AV stream (such as a second audio stream, for example, the director's commentaries) on the audio stream referred to by the PlayItem.

A specific example is given with reference to FIG. 26. FIG. 26 illustrates an example of the stream number table indicating the relationship between sound numbers and subtitle numbers provided to users. The stream number table shown in FIG. 26 corresponds to the second STN_table and second Stream_entry( ) shown in FIGS. 16 and 17, respectively.

In FIG. 26, the sound numbers are referred to as "A_SN" (Audio Stream Number) and the subtitle numbers are referred to as "S_SN" (SubPicture Stream Number). In FIG. 26, each of a plurality of clip AV audio streams referred to by the Main Path and each of a plurality of clip AV audio streams referred to by a Sub Path are provided with A_SN. That is, audio 2 referred to by the Main Path is assigned to A_SN=1, audio 1 referred to by the Sub Path is assigned to A_SN=2, and audio 3 referred to by the Main Path is assigned to A_SN=3.

A_SN is assigned such that audio streams referred to by the Sub Path can be mixed with each of the audio streams provided with A_SN=1 through A_SN=3. More specifically, a combination of audio 4 referred to by another Sub Path and audio 2 referred to by the Main Path is assigned to A_SN=4. A combination of audio 4 and audio 1 referred to by the Sub Paths is assigned to A_SN=5. In other words, A_SN=4 is assigned for mixing an audio stream referred to by the Main Path and an audio stream referred to by the Sub Path, and A_SN=5 is assigned for mixing two audio streams referred to by the two Sub Paths.

Each of a plurality of sub-picture streams of the main clip AV stream referred to by the Main Path is provided with S_SN. More specifically, sub-picture 3 is assigned to S_SN=1, sub-picture 1 is assigned to S_SN=2, and sub-picture 2 is assigned to S_SN=3. In this case, as A_SN or S_SN indicates a smaller number, the corresponding audio signals or sub-picture stream is provided to the user with higher priority. That is, A_SN=1 is an audio stream played back as a default, and S_SN=1 is a sub-picture stream played back as a default.

More specifically, sound played back based on the initial information concerning the language set in the playback apparatus is audio 2 (FIG. 26), which is A_SN=1, and sound played back after being switched from audio 2 is audio 1, which is A_SN=2 (FIG. 26).

To provide such a stream number table, STN_table( ) in PlayItem( ) referred to by PlayList( ) should be configured such that "audio 1 or audio 3" and "sub-picture 1, sub-picture 2, or sub-picture 3" can be referred to by the Main Path of the PlayItem, and "audio 2 or audio 4" can be referred to by SubPath( ) played back in association with PlayItem( ). Then, in STN_table( ) (FIG. 16), audio_stream_id=0 (A_SN=1) is assigned to audio 2 (type=1), audio_stream_id=1 (A_SN=2) is assigned to audio 1 (type=2), audio_stream_id=2 (A_SN=3) is assigned to audio 3 (type=1), audio_stream_id=3 (A_SN=4) is assigned to audio 2 and audio 4 (type=1 and type=2), and audio_stream_id=4 (A_SN=5) is assigned to audio 1 and audio 4 (type=2 and type=2).

In the case of audio_stream_id=3 (A_SN=4), by the first stream_entry( ) and first stream_attributes( ) corresponding to the audio stream ID in FIG. 16, the audio stream (type=1) referred to by the Main Path can be registered, and the subsequent secondary_audio_present_flag is set to be 1. Then, by the second stream_entry( ) and second stream_attributes( ), the audio stream (type=2) referred to by the Sub Path can be registered. In this case, by using audio_stream_id, a combination of an audio stream referred to by the Main Path and an audio stream referred to by the Sub Path can be defined. That is, inconsistent combinations are not defined. This enables the user to always select a combination of audio streams that can be played back. That is, in the example shown in FIG. 26, an inconsistent combination, such as audio 2 and audio 3, is not defined, and thus, the user can select combinations that can be played back.

As discussed above, in stream_entry( ) (FIG. 17) in STN_table( ) (FIG. 16) in PlayItem( ), the first audio stream referred to by the Main Path and the second audio stream referred to by the Sub Path can be entered (registered) by the provision of secondary_audio_present_flag. Then, a combination of the first audio stream and the second audio stream can be provided by audio_stream_id so that two audio streams can be mixed and played back. That is, from a plurality of types of streams, streams of the same type (in this case, audio streams) can be mixed (superimposed or combined) and played back at the same time.

In the case of audio_stream_id=4 (A_SN=5), by the first stream_entry( ) and first stream_attributes( ) and the second stream_entry( ) and second stream_attributes( ) corresponding to the audio stream ID in FIG. 16, the audio streams (type=2) referred to by the two Sub Paths can be registered. In this case, by using audio_stream_id, a combination of the two audio streams referred to by the two Sub Paths can be defined. That is, inconsistent combinations are not defined. This enables the user to always select a combination of audio streams that can be played back.

As discussed above, in stream_entry( ) (FIG. 17) in STN_table( ) (FIG. 16) in PlayItem( ), two audio streams referred to by two Sub Paths can be entered (registered). Then, a combination of two audio streams can be provided by audio_stream_id so that two audio streams can be mixed and played back. That is, from a plurality of types of streams, streams of the same type (in this case, audio streams) can be mixed (superimposed or combined) and played back at the same time.

Additionally, the user can select audio streams to be played back from a plurality of predetermined combinations of audio streams without the need to individually select two audio streams.

Also in the syntaxes shown in FIGS. 14 and 15, a combination of a first audio stream referred to by the Main Path and a second audio stream referred to by a Sub Path in FIG. 26 (audio_stream_id=3 (A_SN=4)) can be defined. In this case, in stream_entry( ) shown in FIG. 14, the audio stream referred to by the Main Path and the audio stream referred to by the Sub Path are registered by type=3, and then, two stream_attributes( ) elements are inserted. In this manner, in stream_entry( ) (FIG. 15) of STN_table( ) (FIG. 14) in PlayItem( ), the first audio stream referred to by the Main Path and the second audio stream referred to by the Sub Path can be entered (registered) (type=3), and by using audio_stream_id, the first audio stream and the second audio stream are combined so that the two audio streams can be mixed and played back. That is, from a plurality of types of streams, streams of the same type (in this case, audio streams) can be mixed (superimposed or combined) and played back at the same time.

Figure 27:
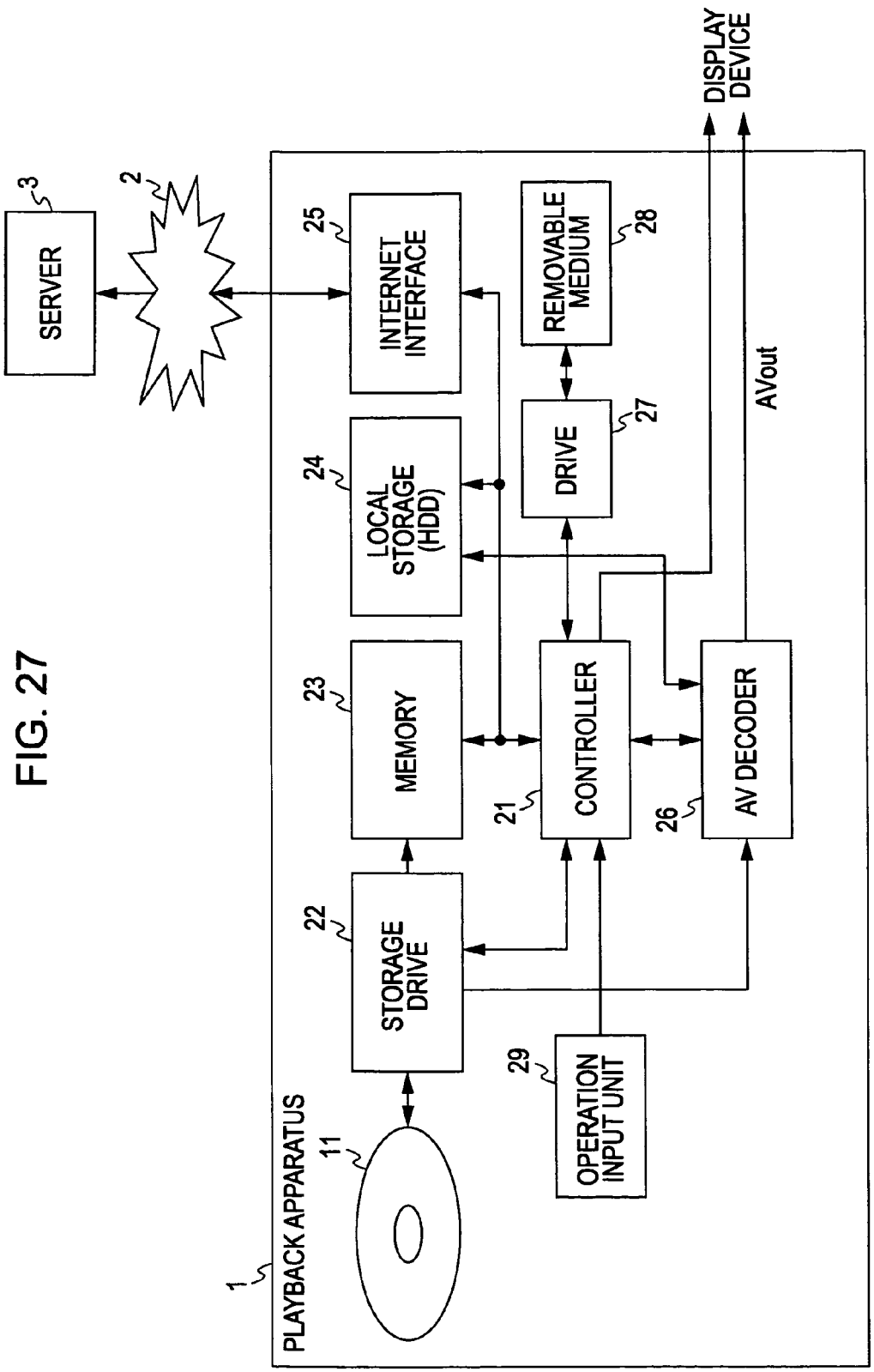
FIG. 27 is a block diagram illustrating an example of the configuration of a playback apparatus to which the present invention is applied.

A first example of the configuration of the playback apparatus 1 to which the present invention is applied is discussed. FIG. 27 is a block diagram illustrating an example of the configuration of the playback apparatus 1 to which the present invention is applied. The playback apparatus 1 is the playback apparatus 1 playing back a PlayList including the above-described Main Path and Sub Path.

A controller 21 executes a predetermined control program. Alternatively, the controller 21 controls a storage drive 22 to read a navigation program recorded on a recording medium 11 or on a local storage 24 and expands it into a memory 23 to execute the navigation program. Then, the controller 21 controls the overall operation of the playback apparatus 1. For example, the controller 21 can display a predetermined menu screen on an external display device when the recording medium 11 is installed in the playback apparatus 1.

The storage drive 22 reads data from the recording medium 11 under the control of the controller 21 and outputs the read data to the controller 21, the memory 23, or an AV decoder 26. If information read from the recording medium 11 is a navigation program or a PlayList, it is output to the controller 21 or the memory 23. If information read from the recording medium 11 is an AV stream or text data, information read from the storage drive 22 is output to the AV decoder 26.

The memory 23 stores data necessary for executing various processing jobs by the controller 21. The memory 23 includes various registers in which information necessary for playback processing by the playback apparatus 1 is set. The local storage 24 may be a HDD (Hard Disk Drive).

An Internet interface 25 is connected to a network 2 by wired or wireless means, and communicates with a server 3 via the network 2 under the control of the controller 21 to supply data downloaded from the server 3 to the local storage 24. In this case, data downloaded from the server 3 as content is, for example, data to update information, such as that shown in FIG. 5, recorded on the recording medium 11 installed in the playback apparatus 1. The local storage 24 can record therein the content downloaded from the server 3 via the network 2.

The AV decoder 26 decodes AV streams or text data supplied from the storage drive 22 or the local storage 24 and outputs the resulting video signal and audio signal to an external display device. In the display device, content (video or sound) recorded on the recording medium 11, for example, is output based on the signal decoded by the AV decoder 26.

An operation input unit 29, which includes an input device, such as buttons, keys, a touch panel, a jog dial, or a mouse, and a receiver that receives signals, such as infrared signals, sent from a predetermined remote commander, receives the input from the user and supplies it to the controller 21.

A drive 27 is connected to the controller 21 if necessary, and a removable medium 28 including a magnetic disk (including a flexible disk), an optical disc (including a CD-ROM (Compact Disk-Read Only Memory) and a DVD), a magneto-optical disk (including an MD (registered)), or a semiconductor memory, is installed in the drive 27.

Figure 28:
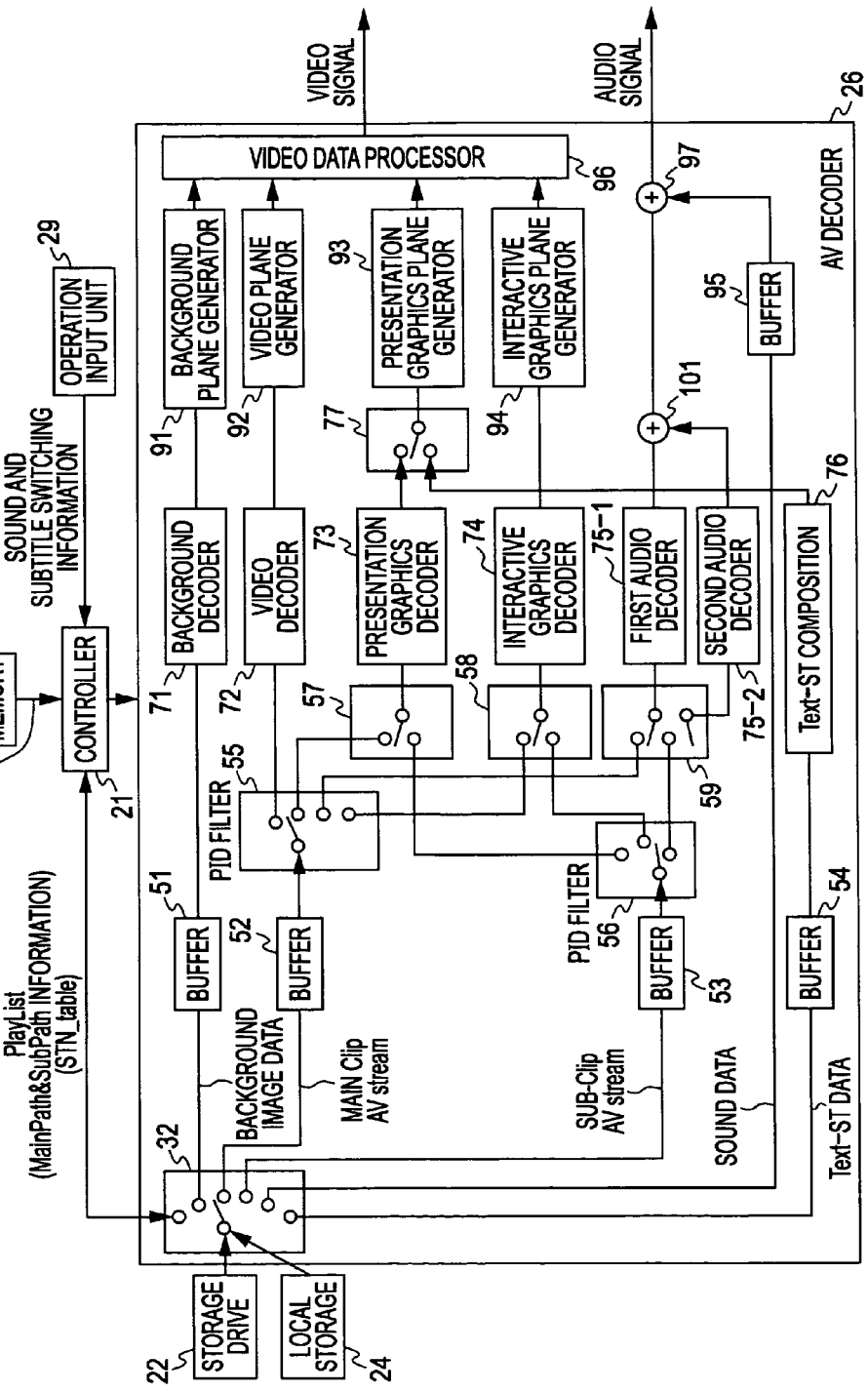
FIG. 28 is a block diagram illustrating an example of the configuration of a playback apparatus to which the present invention is applied.

FIG. 28 is a block diagram illustrating the AV decoder of the playback apparatus 1 shown in FIG. 27.

In the example shown in FIG. 28, the controller 21 first reads out a PlayList file from the storage drive 22 or the local storage 24, and reads an AV stream or AV data from the local storage 24 or the recording medium 11, such as an HDD, Blu-ray disc™, or a DVD, via the storage drive 22 on the basis of the information concerning the PlayList file. The user can give an instruction to switch sound or subtitles to the controller 21 by using the operation input unit 29. The controller 21 reads various setting information including initial information concerning the language set in the playback apparatus 1 from the register of the memory 23.

The PlayList file includes, not only information concerning a Main Path and information concerning Sub Paths, but also STN_table( ). The controller 21 reads a main clip AV stream file referred to by a PlayItem contained in the PlayList file, a sub-clip AV stream file referred to by a SubPlayItem, and text subtitle data referred to by a SubPlayItem from the recording medium 11 or the local storage 24 via the storage drive 22. In this case, the main clip AV stream referred to by the PlayItem and the sub-clip AV stream file referred to by the SubPlayItem may be recorded on different recording media. For example, the main clip AV stream file may be recorded on the recording medium 11, and the corresponding sub-clip AV stream file may be supplied via the network 2 (not shown) and stored in the local storage 24, such as an HDD. By referring to various setting information set in the register of the memory 23, the controller 21 controls the playback apparatus 1 to select and play back elementary streams in accordance with the playback function of the playback apparatus 1 or to select and play back elementary streams in accordance with the initial information concerning the language set in the playback apparatus 1.

The AV decoder 26 includes buffers 51 through 54, PID filters 55 and 56, switches 57 through 59, a background decoder 71, an MPEG (Moving Picture Experts Group)2 video decoder 72, a presentation graphics decoder 73, an interactive graphics decoder 74, the first audio decoder 75-1, the second audio decoder 75-2, a Text-ST composition 76, a switch 77, a background plane generator 91, a video plane generator 92, a presentation graphics plane generator 93, an interactive graphics plane generator 94, a buffer 95, a video data processor 96, and mixing processors 97 and 98. The first and second audio decoders 75-1 and 75-2 decode audio streams. The first audio decoder 75-1 is used preferentially over the second audio decoder 75-2. More specifically, if there is only one audio stream to be decoded, it is decoded by the first audio decoder 75-1 regardless of whether the audio stream belongs to the main clip AV stream file or the sub-clip AV stream file. That is, the playback apparatus 1 includes two audio decoders (the first audio decoder 75-1 and the second audio decoder 75-2) for decoding two audio streams. Hereinafter, the first and second audio decoders 75-1 and 75-2 are simply referred to as the "audio decoder 75" unless they have to be distinguished from each other.

File data read by the controller 21 is demodulated by a demodulator, and the demodulated multiplexed streams are then subjected to error correction by an ECC decoder. A switch 32 then selects the multiplexed streams according to the stream types and supplies the streams to the corresponding buffers 51 through 54 under the control of the controller 21. More specifically, under the control of the controller 21, the switch 32 supplies background image data to the buffer 51, main clip AV stream file data to the buffer 52, sub-clip AV stream file data to the buffer 53, and text-ST data to the buffer 54. Then, the buffers 51 through 54 buffer the background image data, main clip AV stream file data, sub-clip AV stream file data, and text-ST data, respectively, therein.

The main clip AV stream file is a stream (for example, a transport stream) in which at least one stream of video, audio, bitmap subtitle (presentation graphics), and interactive graphics streams is multiplexed together with a video stream. The sub-clip AV stream file is a stream in which at least one stream of audio, bitmap subtitle (Presentation Graphics stream), and interactive graphics streams is multiplexed. The text subtitle data file (Text-ST) may be a multiplexed stream, such as a transport stream, but this is not essential.

When reading the main clip AV stream file, the sub-clip AV stream file, and the text subtitle data from the storage drive 22 (recording medium 11), they can be alternately read in a time-division manner. Alternatively, the sub-clip AV stream file or the text subtitle data may be entirely preloaded to the buffer 53 or 54, respectively, before reading the main clip.

The playback apparatus 1 reads those data from the recording medium 11 via the storage drive 22 to play back video, bitmap subtitle, interactive graphics, and audio.

More specifically, stream data read out from the buffer 52, which serves as the clip AV stream file read buffer, is output to the PID (packet ID) filter 55, which is disposed subsequent to the buffer 52 at a predetermined time. The PID filter 55 allocates streams contained in the main clip AV stream file to the corresponding elementary stream decoders according to the PIDs (packet IDs). More specifically, the PID filter 55 supplies video streams to the video decoder 72, presentation graphics streams to the switch 57, which supplies the graphics streams to the presentation graphics decoder 73, interactive graphics streams to the switch 58, which supplies the graphics streams to the interactive graphics decoder 74, and audio streams to the switch 59, which supplies the audio streams to the first audio decoder 75-1.

The presentation graphics streams are, for example, bitmap subtitle data, and the text subtitle data is, for example, text subtitle data.

Stream data read out from the buffer 53, which serves as the sub-clip AV stream file read buffer, is output to the PID (packet ID) filter 56, which is disposed subsequent to the buffer 53, at a predetermined time. The PID filter 56 allocates streams contained in the sub-clip AV stream file to the corresponding elementary stream decoders according to the PIDs (packet IDs). More specifically, the PID filter 56 supplies presentation graphics streams to the switch 57, which supplies the graphics streams to the presentation graphics decoder 73, interactive graphics streams to the switch 58, which supplies the graphics streams to the interactive graphics decoder 74, and sub-clip audio streams to the switch 59, which supplies the audio streams to the first audio decoder 75-1 and the second audio decoder 75-2.

Data read out from the buffer 51, which serves as the background image data buffer, is supplied to the background decoder 71 at a predetermined time. The background decoder 71 decodes the background image data, and then supplies the decoded data to the background plane generator 91.

The video streams allocated by the PID filter 55 are supplied to the video decoder 72, which is disposed subsequent to the PID filter 55. The video decoder 72 decodes the video streams and supplies the decoded video streams to the video plane generator 92.

The switch 57 selects one of the presentation graphics streams contained in the main clip AV stream file supplied from the PID filter 55 and the presentation graphics streams contained in the sub-clip AV stream file supplied from the PID filter 56, and supplies the selected presentation graphics streams to the presentation graphics decoder 73, which is disposed subsequent to the switch 57. The presentation graphics decoder 73 decodes the presentation graphics streams and supplies them to the switch 77, which further supplies them to the presentation graphics plane generator 93.

The switch 58 selects one of the interactive graphics streams contained in the main clip AV stream file supplied from the PID filter 55 and the interactive graphics streams contained in the sub-clip AV stream file supplied from the PID filter 56, and supplies the selected interactive graphics streams to the interactive graphics stream decoder 74, which is disposed subsequent to the switch 58. That is, the interactive graphics streams simultaneously input into the interactive graphics decoder 74 are streams separated from the main clip AV stream file or the sub-clip AV stream file. The interactive graphics decoder 74 decodes the interactive graphics streams, and supplies the decoded streams to the interactive graphics plane generator 94.

The switch 59 selects one of the audio streams contained in the main clip AV stream file supplied from the PID filter 55 and the audio streams contained in the sub-clip AV stream file supplied from the PID filter 56 and supplies the selected audio streams to the first audio decoder 75-1 or the second audio decoder 75-2. The audio streams simultaneously input into the first audio decoder are streams separated from the main clip AV stream file or the sub-clip AV stream file. The audio streams simultaneously input into the second audio decoder 75-2 are streams separated from the sub-clip AV stream file.

More specifically, the switch 59 selects the audio streams according to the type in stream_entry( ) shown in FIG. 15 or 17. If type=1, the switch 59 selects the audio streams contained in the main clip AV stream file supplied from the PID filter 55 and supplies them to the first audio decoder 75-1. If type=2, the switch 59 selects the audio streams contained in the sub-clip AV stream file supplied from the PID filter 56 and supplies them to the first audio decoder 75-1 or the second audio decoder 75-2.

If an instruction to mix an audio stream contained in a sub-clip AV stream file with an audio stream contained in the main clip AV stream file is given (i.e., if the type in stream_entry( ) of the first STN_table shown in FIG. 14 is 3 (type=3), or if secondary_audio_present_flag in stream_entry of the second STN_table shown in FIG. 16 is 1 and the type in the second stream_entry( ) is 2 (type=2)), the switch 59 supplies the audio stream contained in the main clip AV stream file supplied from the PID filter 55 to the first audio decoder 75-1 and supplies the audio stream contained in the sub-clip AV stream file supplied from the PID filter 56 to the second audio decoder 75-2.

If an instruction to mix two audio streams contained in sub-clip AV stream files is given (i.e., if, in FIG. 16, secondary_audio_present_flag is 1, and the type of first stream_entry( ) is 2 (type=2) and the type of second stream_entry( ) is 2 (type=2)), the switch 59 supplies the corresponding audio stream contained in one sub-clip AV stream file supplied from the PID filter 56 to the first audio decoder 75-1 if that audio stream corresponds to the audio stream defined by the first stream_entry( ) in the FOR loop of the audio stream ID (audio_stream_id) shown in FIG. 16, and also supplies the corresponding audio stream contained in the other sub-clip AV stream file supplied from the PID filter 56 to the second audio decoder 75-2 if that audio stream corresponds to the audio stream defined by the second stream_entry( ) in the FOR loop of the audio stream ID (audio_stream_id) shown in FIG. 16.

That is, audio streams read from the buffer 52, which serves as the main clip AV stream file read buffer (when type=1 or type=3 in FIG. 15 or when type=1 in FIG. 17), and audio streams read from the buffer 53, which serves as the sub-clip AV stream file read buffer (when type=2 or type=3 in FIG. 15 or when type=2 in FIG. 17) are supplied to the first audio decoder 75-1. Only audio streams read from the buffer 53 are supplied to the second audio decoder 75-2.

The first audio decoder 75-1 decodes the audio streams and supplies the decoded audio streams to the mixing processor 101. The second audio decoder 75-2 decodes the audio streams and supplies the decoded audio streams to the mixing processor 101.

If two audio streams are superimposed and played back, the audio stream decoded by the first audio decoder 75-1 and the audio stream decoded by the second audio decoder 75-2 are supplied to the mixing processor 101.

For example, if the first audio stream referred to by the Main Path and the second audio stream referred to by a Sub Path are superimposed and played back (if type=3 in FIG. 15, or if, in FIG. 16, secondary_audio_present_flag is 1 and the type of first stream_entry( ) is 1 (type=1) and the type of second stream_entry( ) is 2 (type=2)), the audio stream contained in the main clip AV stream file decoded by the first audio decoder 75-1 and the audio stream contained in the sub-clip AV stream file decoded by the second audio decoder 75-2 are supplied to the mixing processor 101.

If two audio streams referred to by Sub Paths are superimposed and played back (if, in FIG. 16, secondary_audio_present_flag is 1, and if the types of the first stream_entry( ) and the second stream_entry( ) are 2 (type=2)), the audio stream contained in one sub-clip AV stream file decoded by the first audio decoder 75-1 (type=2 and defined by the first stream_entry( ) in FIG. 16) and the audio stream contained in the other sub-clip AV stream file decoded by the second audio decoder 75-2 (type=2 and defined by the second stream_entry( ) when secondary_audio_present_flag is 1 in FIG. 16) are supplied to the mixing processor 101.

The mixing processor 101 mixes (superimposes) the audio data from the first audio decoder 75-1 and the audio data from the second audio decoder 75-2, and supplies the resulting data to the mixing processor 97. In this embodiment, mixing (superimposing) of the audio data output from the first audio decoder 75-1 and the audio data output from the second audio decoder 75-2 is also referred to as "combining". That is, to combine two audio data is to mix two audio data.

Sound data selected by the switch 32 is supplied to the buffer 95 and is buffered therein. The buffer 95 supplies the sound data to the mixing processor 97 at a predetermined time. The sound data is, for example, effect sound that can be selected from a menu. The mixing processor 97 mixes (superimposes or combines) the audio data mixed by the mixing processor 101 (audio data obtained by mixing the audio data output from the first audio decoder 75-2 with the audio data output from the second audio decoder 75-2) with the sound data supplied from the buffer 95, and outputs the resulting data as an audio signal.

Data read from the buffer 54, which serves as the text subtitle read buffer, is output to the text subtitle composition (decoder) 76, which is disposed subsequent to the buffer 54, at a predetermined time. The text subtitle composition 76 decodes the text-ST data and supplies the decoded data to the switch 77.

The switch 77 selects one of the presentation graphics streams decoded by the presentation graphics decoder 73 and the Text-ST (text subtitle data) decoded by the text subtitle composition 76, and supplies the selected data to the presentation graphics plane generator 93. That is, subtitle images simultaneously supplied to the presentation graphics plane generator 93 are those output from the presentation graphics decoder 73 or from the text subtitle (Text-ST) composition 76. Presentation graphics streams simultaneously input into the presentation graphics decoder 73 are streams separated from the main clip AV stream file or from the sub-clip AV stream file (selected by the switch 57). Accordingly, the subtitle images simultaneously input into the presentation graphics plane generator 93 are presentation graphics streams from the main clip AV stream file, presentation graphics streams from a sub-clip AV stream file, or text subtitle data.

The background plane generator 91 generates a background plane, which serves as, for example, a wallpaper image when a video image is displayed by reducing the size thereof, on the basis of the background image data supplied from the background decoder 71, and supplies the generated background plane to the video data processor 96. The video plane generator 92 generates a video plane based on the video data supplied from the video decoder 72, and supplies the generated video plane to the video data processor 96. The presentation graphics plane generator 93 generates a presentation graphics plane, which serves as, for example, a rendering image, on the basis of the data (presentation graphics streams or text subtitle data) selected by the switch 77, and supplies the generated presentation graphics plane to the video data processor 96. The interactive graphics plane generator 94 generates an interactive graphics plane based on the interactive graphics stream data supplied from the interactive graphics decoder 74, and supplies the generated interactive graphics plane to the video data processor 96.

The video data processor 96 combines the background plane from the background plane generator 91, the video plane from the video plane generator 92, the presentation graphics plane from the presentation graphics plane generator 93, and the interactive graphics plane from the interactive graphics plane generator 94, and outputs the combined plane as a video signal.

The switches 57 through 59 and the switch 77 select data according to the selection by the user via the operation input unit 29 or depending on the type of file containing target data. For example, if audio streams are contained only in sub-clip AV stream files, the switch 59 changes the selection to the side supplying sub-clip AV stream files (the output of the PID filter 56).

The playback processing performed by the playback apparatus 1 shown in FIG. 28 is described below with reference to the flowcharts in FIGS. 29 through 31. This processing is started when an instruction to play back a predetermined AV stream is given from a user via the operation input unit 29.

In step S11, the controller 21 reads a PlayList file, such as that shown in FIG. 9, recorded on the recording medium 11 or the local storage 24, such as a HDD (Hard Disk Drive), via the storage drive 22.

In step S12, the controller 21 reads a main clip AV stream file, a sub-clip AV stream file, and text subtitle data (text-ST data). More specifically, the controller 21 reads the corresponding main clip AV stream file from the main clip based on the PlayItem contained in the PlayList shown in FIG. 9, and also reads a sub-clip AV stream file and text subtitle data based on the SubPlayItem shown in FIGS. 10 through 12, which is referred to by a SubPath contained in the PlayList.

In step S13, the controller 21 controls the switch 32 to supply the read data (main clip AV stream file, sub-clip AV stream file, and text subtitle data) to the corresponding buffers 51 through 54. More specifically, the controller 21 controls the switch 32 to supply the background image data to the buffer 51, the main clip AV stream file data to the buffer 52, the sub-clip AV stream file data to the buffer 53, and the Text-ST data to the buffer 54.

In step S14, the switch 32 supplies the corresponding data as described above under the control of the controller 21. Then, the background image data is supplied to the buffer 51, the main clip AV stream file data is supplied to the buffer 52, the sub-clip AV stream file data is supplied to the buffer 53, and the text subtitle data is supplied to the buffer 54.

In step S15, the buffers 51 through 54 buffer the supplied data therein. More specifically, the buffer 51 buffers the background image data, the buffer 52 buffers the main clip AV stream file data, the buffer 53 buffers the sub-clip AV stream file data, and the buffer 54 buffers the Text-ST data.

In step S16, the buffer 51 outputs the background image data to the background decoder 71.

In step S17, the buffer 52 outputs the stream data of the main clip AV stream file to the PID filter 55.

In step S18, the PID filter 55 allocates the elementary streams to the corresponding elementary stream decoders based on the PIDs attached to the TS (transport stream) packets forming the main clip AV stream file. More specifically, the PID filter 55 supplies video streams to the video decoder 72, presentation graphics streams to the switch 57, which supplies the streams to the presentation graphics decoder 73, interactive graphics streams to the switch 58, which supplies the streams to the interactive graphics decoder 74, and audio streams to the switch 59, which supplies the streams to the first audio decoder 75-1. As discussed above, the video streams, presentation graphics streams, interactive graphics streams, and audio streams are provided with different PIDs.

In step S19, the buffer 53 outputs the stream data of the sub-clip AV stream file to the PID filter 56.

In step S20, the PID filter 56 allocates the elementary streams to the corresponding decoders based on the PIDs. More specifically, the PID filter 56 supplies presentation graphics streams to the switch 57, which supplies the streams to the presentation graphics decoder 73, interactive graphics streams to the switch 58, which supplies the streams to the interactive graphics decoder 74, and audio streams to the switch 59, which supplies the streams to the first audio decoder 75-1 or the second audio decoder 75-2.

In step S21, the switches 57 through 59, which are disposed subsequent to the PID filters 55 and 56, select one of the main clip AV stream file and the sub-clip AV stream file under the control of the controller 21. More specifically, the switch 57 selects presentation graphics streams of the main clip AV stream file or those of the sub-clip AV stream file supplied from the PID filter 55, and supplies the selected streams to the presentation graphics decoder 73, which is disposed subsequent to the switch 57. The switch 58 selects interactive graphics streams of the main clip AV stream file or those of the sub-clip AV stream file supplied from the PID filter 55, and supplies the selected streams to the interactive graphics decoder 74, which is disposed subsequent to the switch 58. The switch 59 selects audio streams of the main clip AV stream file or those of the sub-clip AV stream file supplied from the PID filter 55, and supplies the selected streams to the first audio decoder 75-1, which is disposed subsequent to the switch 59. If an instruction to switch sound is given from the user, the switch 59 supplies audio streams of a sub-clip AV stream file to the second audio decoder 75-2. However, an explanation thereof is not given here since switching sound is not considered in this processing.

In step S22, the buffer 54 outputs text subtitle data to the text subtitle composition 76.

In step S23, the background decoder 71 decodes background image data and supplies the decoded data to the background plane generator 91.

In step S24, the video decoder 72 decodes the video streams and supplies the decoded streams to the video plane generator 92.

In step S25, the presentation graphics decoder 73 decodes the presentation graphics streams selected by the switch 57, and outputs the decoded streams to the switch 77, which is disposed subsequent to the presentation graphics decoder 73.

In step S26, the interactive graphics decoder 74 decodes the interactive graphics streams selected by the switch 58, and outputs the decoded streams to the interactive graphics plane generator 94, which is disposed subsequent to the interactive graphics decoder 74.

In step S27, the first audio decoder 75-1 decodes the audio data selected by the switch 59 and outputs the decoded data to the mixing processor 101, which is disposed subsequent to the first audio decoder 75-1. In the playback processing (playback processing shown in FIGS. 29 through 32) when an instruction to switch sound is not given from the user, audio data is not output from the second audio decoder 75-2. Accordingly, the mixing processor 101 directly supplies the audio data output from the first audio decoder 75-1 to the mixing processor 97.

In step S28, the Text-ST composition 76 decodes text subtitle data and outputs the decoded data to the switch 77, which is disposed subsequent to the Text-ST composition 76.

In step S29, the switch 77 selects data from the presentation graphics decoder 73 or the Text-ST composition 76. More specifically, the switch 77 selects the presentation graphics streams decoded by the presentation graphics decoder 73 or the Text-ST (text subtitle data) from the text subtitle composition 76, and supplies the selected data to the presentation graphics plane generator 93.

In step S30, the background plane generator 91 generates a background plane based on the background image data supplied from the background decoder 71.

In step S31, the video plane generator 92 generates a video plane based on the video data supplied from the video decoder 72.

In step S32, the presentation graphics plane generator 93 generates a presentation graphics plane based on the data selected by the switch 77 in step S29 and supplied from the presentation graphics decoder 73 or the Text-ST composition 76.

In step S33, the interactive graphics plane generator 94 generates an interactive graphics plane based on the interactive graphics stream data supplied from the interactive graphics decoder 74.

In step S34, the buffer 95 buffers the sound data selected in step S14 and supplies it to the mixing processor 97 at a predetermined time.

In step S35, the video data processor 96 combines the planes and outputs the combined data. More specifically, the video data processor 96 combines the data from the background plane generator 91, the video plane generator 92, the presentation graphics plane generator 93, and the interactive graphics plane generator 94, and outputs the combined data as video data.

In step S36, the mixing processor 97 mixes (combines) the audio data output from the mixing processor 101 with the sound data, and outputs the resulting data. The processing is then completed.

Figure 29:
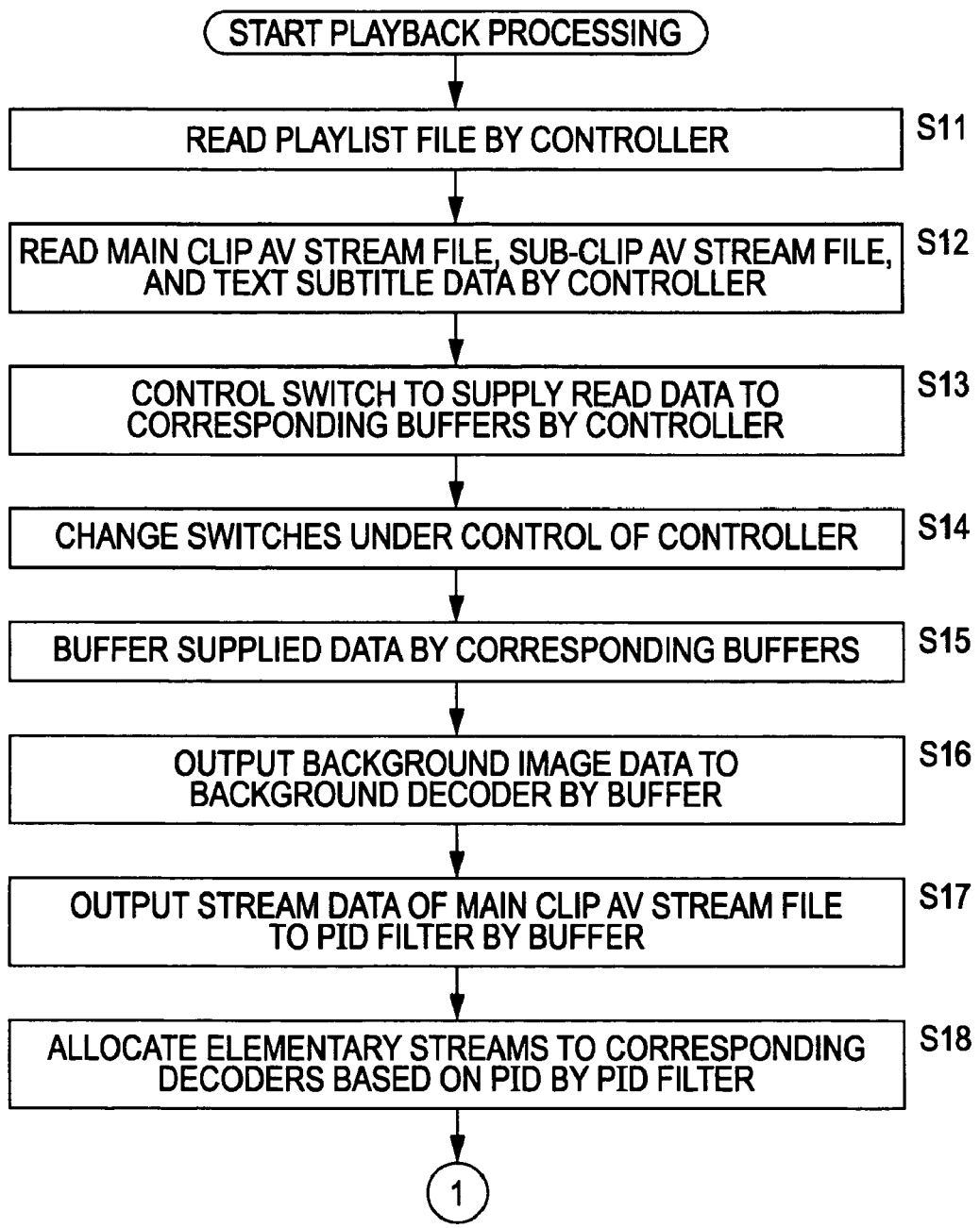
FIG. 29 is a flowchart illustrating playback processing performed by the playback apparatus shown in FIG. 28.
Figure 30:
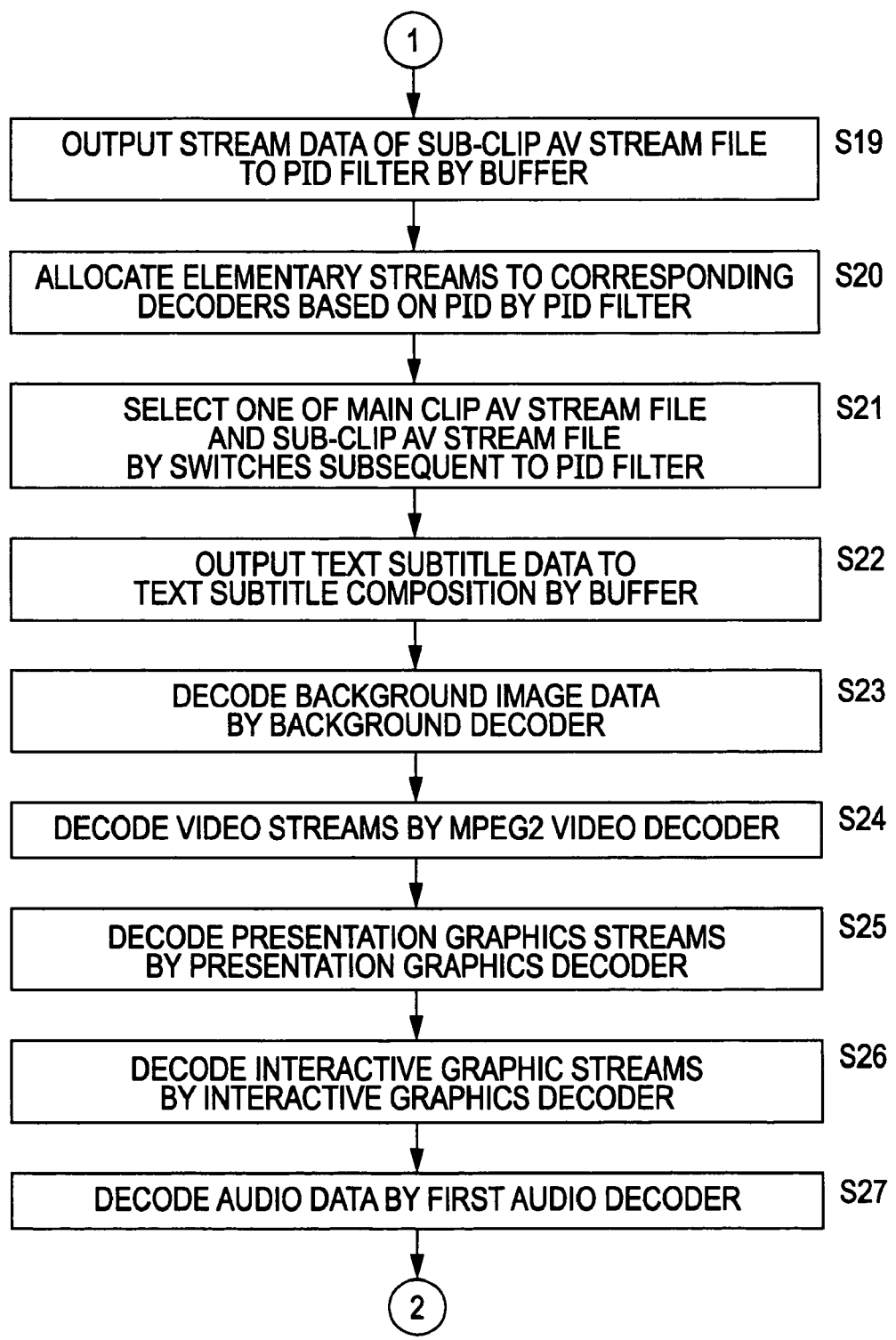
FIG. 30 is a flowchart illustrating playback processing performed by the playback apparatus shown in FIG. 28.
Figure 31:
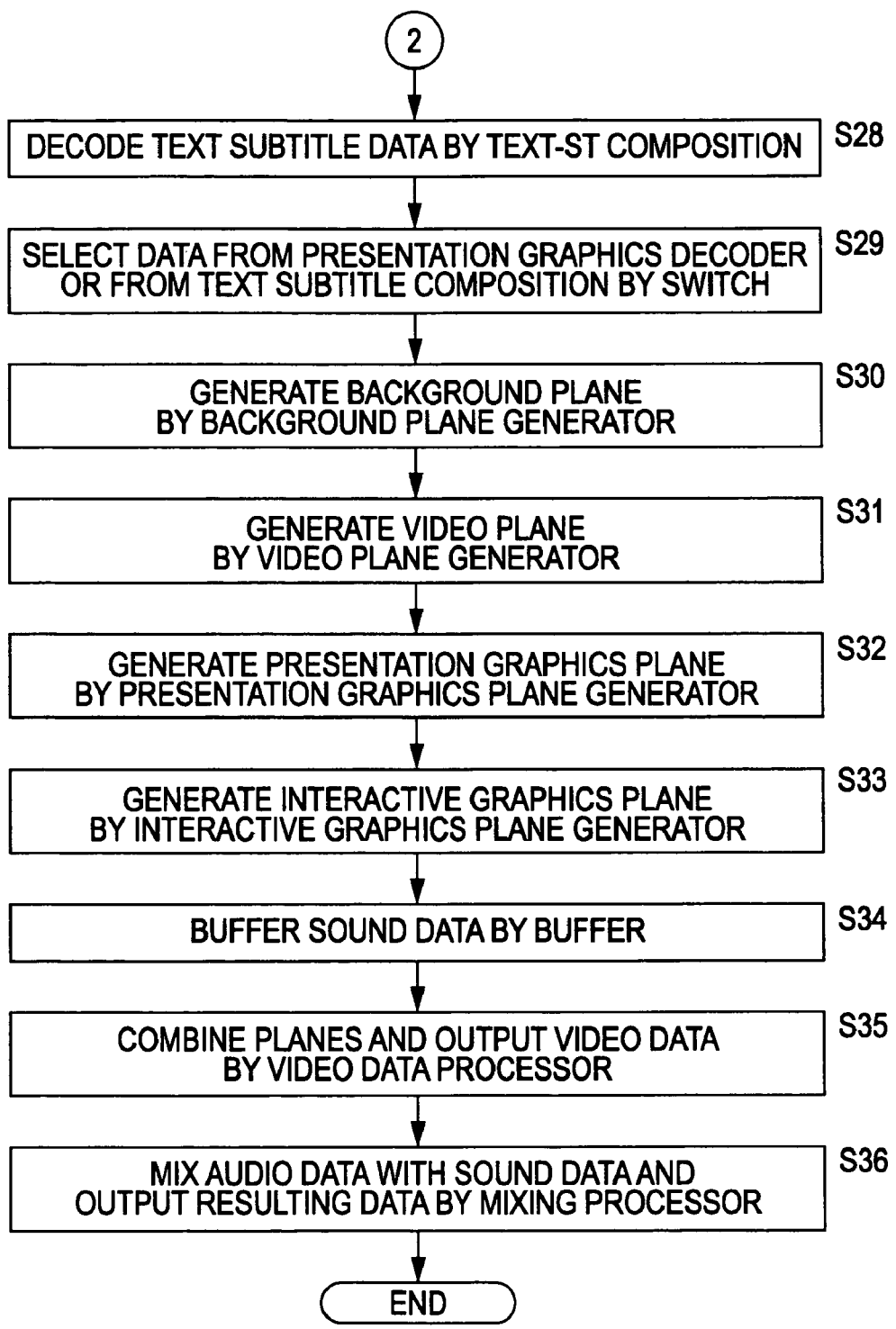
FIG. 31 is a flowchart illustrating playback processing performed by the playback apparatus shown in FIG. 28.

According to the processing shown in FIGS. 29 through 31, by referring to the main clip AV stream file referred to by the Main Path included in the PlayList, a sub-clip AV stream file referred to by the corresponding Sub Path included in the PlayList, and the text subtitle data, the corresponding data is played back. By providing the Main Path and the Sub Path in the PlayList, a clip AV stream file, which is different from the main clip AV stream file specified by the Main Path, can be specified by the Sub Path. Thus, data of a sub-clip AV stream file, which is different from the main clip specified by the PlayItem of the Main Path, can be played back together with (in synchronization with) the data of the main clip AV stream file contained in the main clip.

In FIGS. 29 through 31, the order of steps S16 and S17 may be reversed or steps S16 and S17 may be executed in parallel. Similarly, the order of steps S18 and S20 may be reversed or steps S18 and S20 may be executed in parallel. The order of steps S23 through S28 may be reversed or steps S23 through S28 may be executed in parallel. The order of steps S30 through S33 may be reversed or steps S30 through S33 may be executed in parallel. The order of steps S35 and S36 may be reversed or steps S35 and S36 may be executed in parallel. That is, in FIG. 28, the elements disposed vertically on the same layer, i.e., the processing jobs of the buffers 51 through 54, those of the switches 57 through 59, those of the decoders 71 through 76, those of the plane generators 91 through 94, and those of the video data processor 96 and the mixing processor 97 may be executed in parallel, and the order thereof is not particularly restricted.

Processing performed by the playback apparatus 1 when an instruction to switch sound is given is now described with reference to the flowchart in FIG. 32. This processing is executed while performing, for example, the playback processing shown in FIGS. 29 through 31.

In step S51, the controller 21 obtains an order list of audio stream numbers (may be IDs). More specifically, the controller 21 refers to STN_table( ) of PlayItem( ) discussed with reference to FIG. 13 to obtain the order list of audio stream numbers (IDs) entered in STN_table( ) discussed with reference to FIG. 14 or 16. This step is executed when the playback processing shown in FIGS. 29 through 31 is started.

In response to an instruction to switch sound given from the user via the operation input unit 29, in step S52, the controller 21 receives the instruction to switch sound from the user. In this case, the controller 21 may control an external display device (not shown) to display a stream number table, such as that shown in FIG. 26, on the external display device. In this manner, the controller 21 displays audio signals and subtitle signals that can be provided to the user and receives an instruction to switch sound (select sound) from the user. In fact, in FIG. 32, step S51 has been executed, and in response to an instruction to switch sound from the user, step S52 is executed.

In step S53, the controller 21 obtains the audio stream number subsequent to the audio stream number which is currently played back. For example, if the audio stream (auxiliary audio stream) having SubClip_entry_id=0 shown in FIG. 8 is played back, the audio stream number having SubClip_entry_id=1 is obtained. If the audio stream file corresponding to audio 3 (A_SN=3) shown in FIG. 26 is currently played back, the subsequent audio streams are a combination of audio 2 and audio 4 (A_SN=4). Accordingly, the controller 21 obtains the audio stream number corresponding to audio 2 referred to by the Main Path and the audio stream number corresponding to audio 4 referred to by the Sub Path.

In step S54, the controller 21 determines whether the playback apparatus 1 has a function of playing back the audio stream associated with the obtained number. More specifically, the controller 21 makes this determination based on the information indicated in stream_attribute( ) (FIG. 18), and if necessary, by referring to various setting information registered in the memory 23. For example, if type=1 in Stream_entry( ) in FIG. 15 or 17, the controller 21 determines whether the function of playing back the audio stream of the main clip AV stream associated with the obtained number is provided. If type=2 in Stream_entry( ) in FIG. 15 or 17, the controller 21 determines whether the function of playing back the audio stream of the sub-clip AV stream associated with the obtained number is provided.

If an instruction to mix and play back an audio stream of the main clip AV stream and an audio stream of a sub-clip AV stream is given (i.e., if, in the first STN_table in FIG. 14, type=3 in stream_entry( ) in FIG. 15, or if, in the second STN_table in FIG. 16, secondary_audio_present_flag is 1, and if the type of first stream_entry( ) is 1 (type=1) and the type of second stream_entry( ) is 2 (type=2)), the controller 21 determines whether to have a function of playing back audio streams only contained in the main clip AV stream file. In other words, when mixing and playing back an audio stream of the main clip AV stream file and an audio stream of a sub-clip AV stream file, a determination as to whether to have a function of playing back audio streams of the sub-clip AV stream file may be omitted. This is because the possibility of the main clip AV stream file including extended streams or multi-channel streams is high, but the possibility of the sub-clip AV stream file including such files is low since the extensibility of the sub-clip AV stream file is restricted. Thus, it is not necessary to determine whether to have a function of playing back audio streams contained in the sub-clip AV stream file. Alternatively, the controller 21 may determine whether it has a function of playing back audio streams contained in the sub-clip AV stream file.

If an instruction to mix and play back two audio streams of two sub-clip AV stream files (i.e., if, in the second STN_table in FIG. 16, secondary_audio_present_flag is 1, and if the type of first stream_entry( ) is 2 (type=2) and the type of second stream_entry( ) is 2 (type=2)), the controller 21 determines whether the playback apparatus 1 has a function of playing back an audio stream to be decoded by the first audio decoder 75-1 (the first audio stream in the FOR loop in the audio stream ID (audio_stream_id) in FIG. 16) associated with the obtained number. A determination as to whether the playback apparatus 1 has a function of playing back the second audio stream of the sub-clip AV stream file entered after secondary_audio_present_flag is 1 in stream_entry( ) in FIG. 16 may be omitted. This is because the first audio stream in the FOR loop of the audio stream ID (audio_stream_id) in FIG. 16 may be dubbed Japanese movie sound, which is higher quality than that of the second audio stream (for example, Director's Cut) of the sub-clip AV stream file entered in the second stream_entry( ) in FIG. 16, and it is not necessary to determine whether to have a function of playing back the second audio stream of the sub-clip AV stream file having lower quality. Alternatively, the controller 21 may determine whether it has a function of playing back the second audio stream.

If it is determined in step S54 that the function of playing back the audio stream associated with the obtained number is not provided, the process proceeds to step S55 in which the controller 21 obtains the stream number subsequent to the current stream number. That is, the current stream number is skipped (which is not played back), and the subsequent stream number is obtained. Then, after step S55, the process returns to step S54. That is, the processing is repeated until the controller 21 obtains an audio stream number that can be played back by the playback apparatus 1.

If it is determined in step S54 that the function of playing back the audio stream associated with the obtained number is provided, the process proceeds to step S56. In step S56, the controller 21 checks the audio streams of the main clip AV stream contained in the main clip associated with the obtained number and the audio streams of the sub-clip AV stream file contained in the sub clip associated with the obtained number. In the example shown in FIG. 8, since the obtained SubClip_entry_id=1 is referred to by a Sub Path, the controller 21 can determine that the audio stream associated with the obtained number is contained in the sub-clip AV stream file. If type=1 in stream_entry( ) in FIG. 15 or 17, the controller 21 can determine that the audio stream associated with the obtained number is contained in the main clip AV stream file. If type=2 in stream_entry( ) in FIG. 15 or 17, the controller 21 can determine that the audio stream associated with the obtained number is contained in the sub-clip AV stream file. If an audio stream contained in the main clip AV stream and an audio stream contained in the sub-clip AV stream are mixed and played back (if, in the first STN_table in FIG. 14, the type of stream_entry( ) in FIG. 15 is 3 (type=3), or if, in the second STN_table in FIG. 16, secondary_audio_present_flag is 1 and if the type of first stream_entry( ) is 1 (type=1) and the type of second stream_entry( ) is 2 (type=2)), the controller 21 can determine that the audio streams associated with the obtained numbers are contained in both the main clip AV stream file and the sub-clip AV stream file. If audio streams of two sub-clip AV stream files are mixed and played back (i.e., if, in the second STN_table in FIG. 16, secondary_audio_present_flag is 1, and if the type of first stream_entry( ) is 2 (type=2) and the type of second stream_entry( ) is 2 (type=2)), the controller 21 can determine that the audio streams associated with the obtained numbers are contained in the sub-clip AV stream files.

In step S57, the controller 21 specifies a desired audio stream. More specifically, the controller 21 specifies a desired audio stream contained in the main clip AV stream associated with the obtained number or the sub-clip AV stream file associated with the obtained number. If type=1 in FIG. 15 or 17, the controller 21 specifies a predetermined audio stream in the main clip AV stream file, or if type=2, the controller 21 specifies a predetermined audio stream in the sub-clip AV stream file. If type=3 in FIG. 15, or if, in FIG. 17, secondary_audio_present_flag is 1 and the type of first stream_entry( ) is 1 (type=1) and the type of second stream_entry( ) is 2 (type=2), the controller 21 specifies a predetermined audio stream in the main clip AV stream file and a predetermined audio stream in the sub-clip AV stream file. If, in FIG. 17, secondary_audio_present_flag is 1 and if the type of first stream_entry( ) is 2 (type=2) and the type of second stream_entry( ) is 2 (type=2), the controller 21 specifies predetermined two audio streams in two sub-clip AV stream files.

In step S58, the controller 21 instructs the storage drive 22 to read the specified audio stream from the clip including the audio stream (clip including only the main clip AV stream file, only sub-clip AV stream files, both the main clip AV stream file and sub-clip AV stream files, or including two sub-clip AV stream files). Alternatively, the controller 21 reads the specified audio stream from the clip including that audio stream from the local storage 24. In response to an instruction from the controller 21, the storage drive 22 reads the target audio stream. Then, the controller 21 supplies the read audio stream to the AV decoder 26 and instructs it to play back the audio stream. If, in the first STN_table in FIG. 14, the type of stream_entry( ) in FIG. 15 is 3 (type=3), or if, in the second STN_table in FIG. 16, secondary_audio_present_flag is 1 and if the type of first stream_entry( ) is 1 (type=1) and the type of second stream_entry( ) is 2 (type=2), the controller 21 instructs the AV decoder 26 to play back both the audio stream of the main clip and the audio stream of the sub-clip file.

In step S59, the AV decoder 26 decodes the audio stream and outputs it. More specifically, the audio data decoded by the audio decoder 75 and the sound data output from the buffer 95 are mixed and output as an audio signal. More particularly, if type=1 in FIG. 15 or 17, the first audio decoder 75-1 decodes the predetermined audio stream in the main clip AV stream file and supplies the decoded audio stream to the mixing processor 97 via the mixing processor 101. If type=2 in FIG. 15 or 17, the first audio decoder 75-1 or the second audio decoder 75-2 (determined by the description in STN_table) decodes the predetermined audio stream in the sub-clip AV stream file, and supplies the decoded audio stream to the mixing processor 97 via the mixing processor 101.

In this case, if an audio stream in the main clip AV stream file and an audio stream in the sub-clip AV stream file are mixed and played back (if the type of stream_entry( ) in FIG. 15 is 3 (type=3), or if, in the second STN_table in FIG. 16, secondary_audio_present_flag is 1 and if the type of first stream_entry( ) is 1 (type=1) and the type of second stream_entry( ) is 2 (type=2)), the first audio decoder 75-1 decodes the predetermined audio stream in the main clip AV stream and supplies the decoded audio stream to the mixing processor 101, and the second audio decoder 75-2 decodes the predetermined audio stream in the sub-clip AV stream and supplies the decoded audio stream to the mixing processor 101. If audio streams in two sub-clip AV stream files are mixed and played back (if, in FIG. 16, secondary_audio_present_flag is 1 and if the type of first stream_entry( ) is 2 (type=2) and the type of second stream_entry( ) is 2 (type=2)), the first audio decoder 75-1 decodes the predetermined audio stream in a sub-clip AV stream file and supplies the decoded audio stream to the mixing processor 101, and the second audio decoder 75-2 decodes the predetermined audio stream in the other sub-clip AV stream file and supplies the decoded audio stream to the mixing processor 101. The mixing processor 101 mixes (superimposes or combines) the audio data supplied from the first audio decoder 75-1 and the audio data supplied from the second audio decoder 75-2, and supplies the resulting data to the mixing processor 97. The mixing processor 97 mixes (superimposes or combines) the audio data supplied from the mixing processor 101 and the sound data supplied from the buffer 95, and outputs the resulting data as an audio signal.

Figure 32:
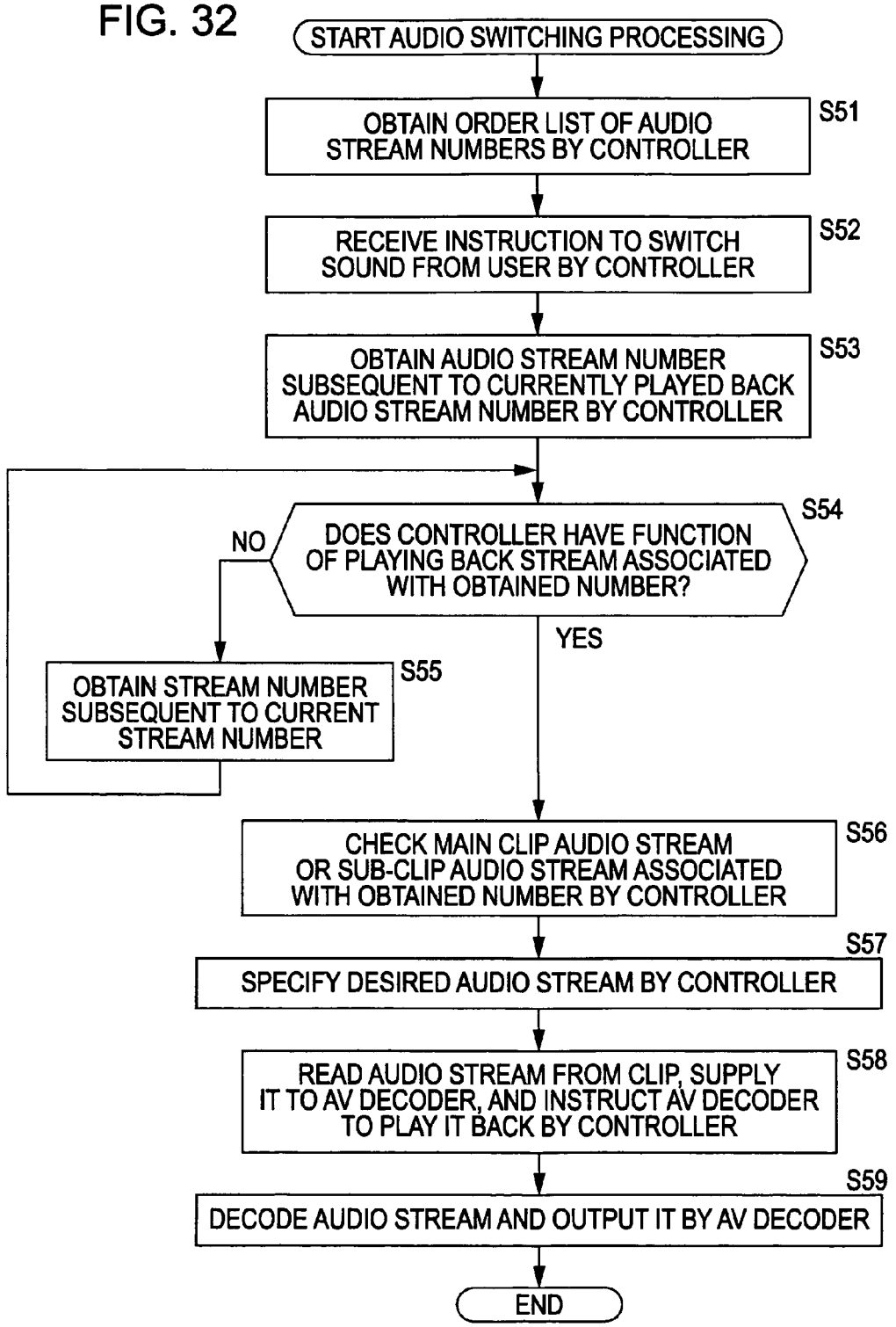
FIG. 32 is a flowchart illustrating processing in response to an instruction to switch sound from a user.
Figure 33:
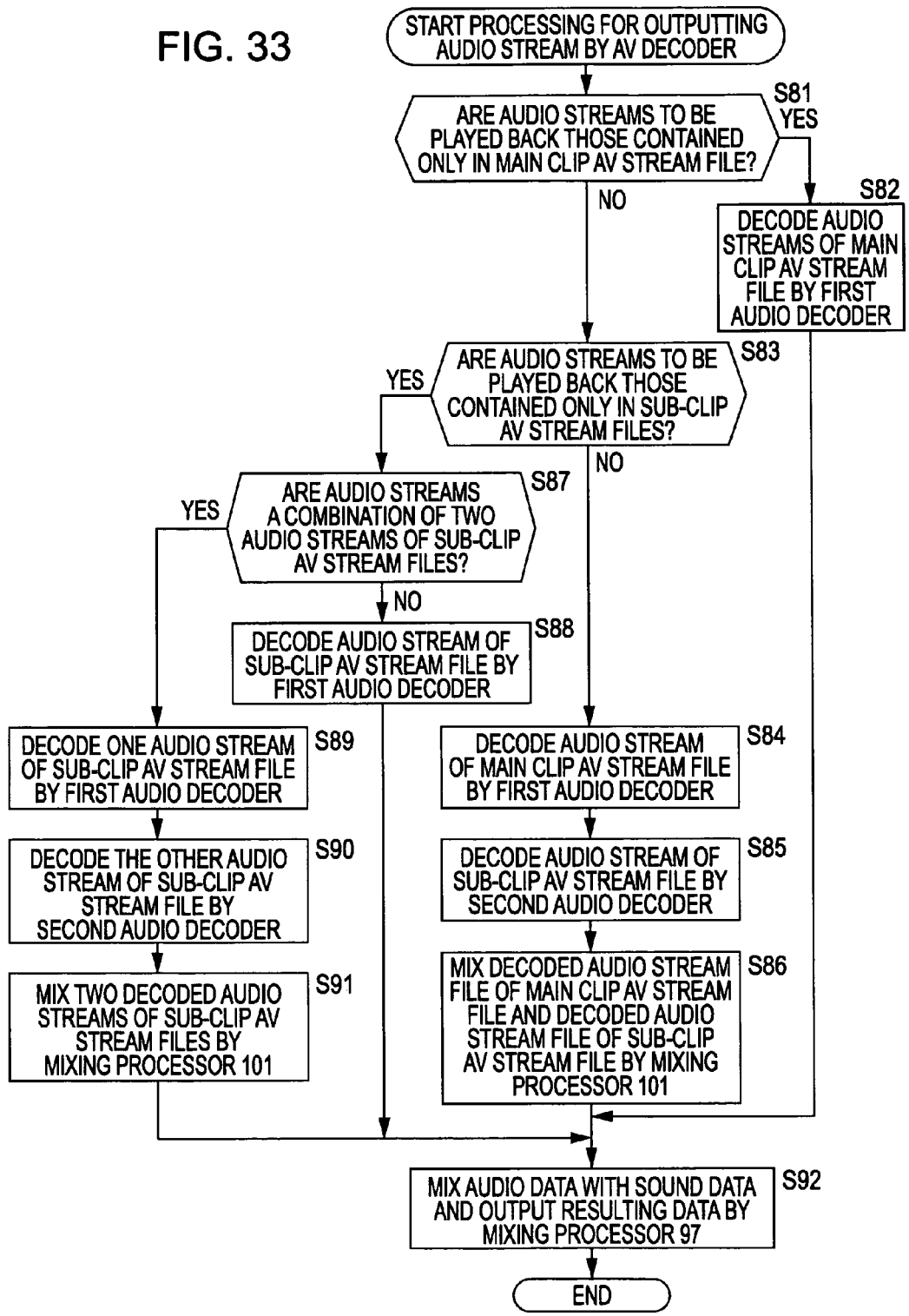
FIG. 33 is a flowchart illustrating details of step S59 in FIG. 32.

Details of step S59 in FIG. 32 are described below with reference to the flowchart in FIG. 33. FIG. 33 is a flowchart illustrating an example of processing for outputting audio streams in the AV decoder 26.

In step S81, the AV decoder 26 determines under the control of the controller 21 whether the audio streams to be played back are contained only in the main clip AV stream file. For example, the AV decoder 26 determines whether the type of audio stream entered in FIG. 14 or 16 is 1, i.e. whether type=1 in FIG. 15 or 17.

If it is determined in step S81 that the audio streams to be played back are contained only in the main clip AV stream file, the audio streams of the main clip AV stream file selected by the PID filter 55 are selected by the switch 59 and are supplied to the first audio decoder 75-1. Then, in step S82, the first audio decoder 75-1 decodes the audio streams of the main clip AV stream and supplies them to the mixing processor 101, which is disposed subsequent to the first audio decoder 75-1. The mixing processor 101 then directly outputs the audio data to the mixing processor 97, which is disposed subsequent to the mixing processor 101.

If it is determined in step S81 that not all the audio streams are contained in the main clip AV stream file (i.e., if type=2 or type=3 in FIG. 15 or if at least one of the types in FIG. 17 is 2 (type=2)), the AV decoder 26 determines in step S83 under the control of the controller 21 whether the audio streams to be played back are contained only in sub-clip AV stream files. That is, the AV decoder 26 determines whether the types of audio streams entered in FIG. 14 or 16 are only 2 (type=2) in FIG. 15 or 17.

If it is determined in step S83 that not all the audio streams are contained in the sub-clip AV stream files, it means that the audio streams to be played back are a combination of an audio stream of the main clip AV stream and an audio stream of the sub-clip AV stream, that is, the types of audio streams in FIG. 15 are 3 (type=3), or in FIG. 16, secondary_audio_present_flag=1 and the type of first stream_entry( ) is 1 (type=1) and the type of second stream_entry( ) is 2 (type=2). The audio stream of the main clip AV stream file selected by the PID filter 55 is selected by the switch 59 and is supplied to the first audio decoder 75-1, and the audio stream of the sub-clip AV stream selected by the PID filter 56 is selected by the switch 59 and is supplied to the second audio decoder 75-2.

Then, in step S84, the first audio decoder 75-1 decodes the audio stream of the main clip AV stream file, and supplies the decoded audio stream to the mixing processor 101, which is disposed subsequent to the first audio decoder 75-1.

In step S85, the second audio decoder 75-2 decodes the audio stream of the sub-clip AV stream file, and supplies the decoded audio stream to the mixing processor 101, which is disposed subsequent to the second audio decoder 75-2. The order of steps S84 and S85 may be reversed or steps S84 and S85 may be executed in parallel.

In step S86, the mixing processor 101 mixes (combines or superimposes) the audio stream of the main clip AV stream file decoded by the first audio decoder 75-1 and the audio stream of the sub-clip AV stream file decoded by the second audio decoder 75-2. Then, the mixing processor 101 supplies the mixed audio data to the mixing processor 97.

If it is determined in step S83 that the audio streams to be played back are audio streams contained only in the sub-clip AV streams (the types in FIG. 15 or 17 are only 2 (type=2)), the process proceeds to step S87 to determine under the control of the controller 21 whether the audio streams to be played back are a combination of audio streams in sub-clip AV stream files. That is, the AV decoder 26 determines in step S87 whether two audio streams are entered after secondary_audio_present_flag is 1 in stream_entry in FIG. 16 and if the types in FIG. 17 are 2. In the case of the syntaxes in FIGS. 14 and 15, a combination of two audio streams of sub-clip AV stream files is not defined, and thus, it is determined in step S87 that the audio streams to be played back are not a combination of audio streams of sub-clip AV stream files.

If it is determined in step S87 that the audio streams to be played back are not a combination of audio streams of sub-clip AV streams (if type=2 in FIG. 14 or 15, or if, in FIG. 16 or 17, secondary_audio present_flag is 0 and the type of first stream_entry( ) is 2 (type=2), i.e., if only one audio stream is entered, this is an audio stream of a sub-clip AV stream file. The audio stream selected by the PID filter 56 is selected by the switch 59 and is supplied to the first audio decoder 75-1. Then, in step S88, the first audio decoder 75-1 decodes the audio stream of the sub-clip AV stream file, and supplies the decoded stream to the mixing processor 101, which is disposed subsequent to the first audio decoder 75-1. The mixing processor 101 then outputs the supplied audio data to the mixing processor 97.

If it is determined in step S87 that the audio streams to be played back are a combination of audio streams of sub-clip AV stream files (if secondary_audio_present_flag is 1 in stream_entry in FIG. 16 and if the types of first stream_entry( ) and second stream_entry( ) in FIG. 17 are 2 (type=2)), it means that there are two audio streams of the sub-clip AV stream files selected by the PID filter 56. Then, the switch 59 supplies the audio stream first entered in the FOR loop of the audio stream ID (audio_stream_id) in FIG. 16 to the first audio decoder 75-1, and supplies the audio stream entered after secondary_audio_present_flag is 1 in the FOR loop of the audio stream ID (audio_stream_id) in FIG. 16 to the second audio decoder 75-2.

Then, in step S89, the first audio decoder 75-1 decodes the supplied audio stream and supplies the decoded stream to the mixing processor 101, which is disposed subsequent to the first audio decoder 75-1.

In step S90, the second audio decoder 75-2 decodes the supplied audio stream and supplies the decoded stream to the mixing processor 101, which is disposed subsequent to the second audio decoder 75-2. The order of steps S89 and S90 may be reversed and steps S89 and S90 may be executed in parallel.

In step S91, the mixing processor 101 mixes the audio stream decoded by the first audio decoder 75-1 and the audio stream decoded by the second audio decoder 75-2 (i.e., audio streams of the two sub-clip AV stream files). In other words, the mixing processor 101 mixes (combines or superimposes) the audio data supplied from the first audio decoder 75-1 and the audio data supplied from the second audio decoder 75-2. The mixing processor 101 supplies the resulting audio data to the mixing processor 97.

After step S82, S86, S88, or S91, the process proceeds to step S92. In step S92, the mixing processor 97 mixes the supplied audio data with the sound data supplied from the buffer 95, and outputs the resulting data. In step S92 after step S82, the mixing processor 97 mixes the audio data of the audio stream of the main clip AV stream with the sound data. In step S92 after step S88, the mixing processor 97 mixes the audio data of the audio stream of the sub-clip AV stream file with the sound data. In step S92 after step S86, the mixing processor 97 mixes the audio data, which is generated by mixing the audio stream of the main clip AV stream file with the audio stream of the sub-clip AV stream file, with the sound data. In step S92 after step S91, the mixing processor 97 mixes the audio data, which is generated by mixing the audio streams of the two sub-clip AV stream files, with the sound data.

According to the processing shown in FIG. 33, an audio stream referred to by the Main Path and an audio stream referred to by a Sub Path can be mixed and played back. Alternatively, two audio streams referred to by two Sub Paths can be mixed and played back.

According to the processing discussed with reference to FIG. 33, the selection of the switch 59 in FIG. 28 in step S21 in FIG. 30 can be determined. More specifically, if the audio streams to be played back in the processing in FIG. 33 are audio streams contained only in the main clip AV stream file, the switch 59 supplies the audio streams from the main side, i.e., the PID filter 55, to the first audio decoder 75-1 (outcome of step S81 is YES). If there is only one audio stream of one sub-clip AV stream file to be played back, the switch 59 supplies the audio stream from the sub-side, i.e., the PID filter 56, to the first audio decoder 75-1 (outcome of step S87 is NO). If the audio streams to be played back are a combination of an audio stream of the main clip AV stream file and an audio stream of a sub-clip AV stream file, the switch 59 supplies the audio stream from the PID filter 55 to the first audio decoder 75-1 and the audio stream from the PID filter 56 to the second audio decoder 75-2 (outcome of step S83 is NO). If the audio streams to be played back are a combination of audio streams of two sub-clip AV stream files, the switch 59 supplies the audio streams from the PID filter 56 to the first audio decoder 75-1 or the second audio decoder 75-2 (outcome of step S87 is YES).

As described above, the controller 21 can control the switching of sound (audio) based on STN_table( ) of PlayItem( ). The controller 21 can also select streams only that can be played back by the playback apparatus 1 by referring to stream_attribute of STN_table( ). Based on STN_table( ), the controller 21 can also superimpose an audio stream contained in a sub-clip AV stream file on an audio stream contained in the main clip AV stream file and plays it back, and can also superimpose audio streams contained in two sub-clip AV stream files and plays it back.

If the syntaxes (first STN_table( )) in FIGS. 14 and 15 are used, a combination of two audio streams of two sub-clip AV stream files is not defined. Accordingly, the outcome of step S87 in FIG. 33 is always NO, and step S88 and the subsequent steps are executed. Thus, steps S89, S90, and S91 are not executed.

Although in the processing shown in FIG. 32 audio streams are switched based on the audio stream numbers, they may be switched based on the audio stream IDs (audio_stream_id). In this case, the numbers obtained by subtracting one from the audio stream numbers are audio stream IDs.

In the above-described example, an audio stream referred to by the Main Path and an audio stream referred to by a Sub Path are mixed (combined) and played back (FIGS. 14 and 15 or FIGS. 16 and 17), or audio streams referred to by two Sub Paths are mixed (combined) and played back (FIGS. 16 and 17). However, the type of stream is not restricted to audio, and various streams can be mixed and played back as long as they are the same stream type. For example, video streams (type of stream is a video stream) may be combined and played back (picture-in-picture display). Thus, a predetermined type of stream file in a main clip and a stream file in a sub-clip of the same type of the main clip can be defined, or stream files of the same type in a sub-clip can be defined. Accordingly, a stream referred to by a Main Path and a stream referred to by a Sub Path (two streams of the same type) can be combined and played back, and streams referred to by two Sub Paths (two streams of the same type) can be combined and played back.

The configuration as described above can be used for so-called "PinP (picture-in-picture)" display, and more specifically, as discussed below with reference to FIG. 43, a video stream referred to by a Main Path is displayed as a full screen and a video stream referred to by a Sub Path is displayed inside the full screen as a sub-screen. Details of PinP display by the application of the above-described configuration are given later.

A stream or a data file, which contains audio or subtitle data, different from a main AV stream, is provided, and the PlayList includes a Main Path and a Sub Path. With this configuration, the user can select from streams contained in the main clip and the streams contained in the sub clips different from the main clip when switching sound or subtitles.

In the first or second STN_table( ), a combination of an audio stream contained in a main clip and an audio stream contained in a sub clip can be selected. This enables the user to superimpose and plays back two audio streams. More specifically, in STN_table( ), stream_attributes ( ) of two audio streams can be entered, and in stream_entry( ), audio streams can be entered by a combination of an audio stream of a main clip and an audio stream of a sub clip. Accordingly, the user can give an instruction to superimpose and play back two audio streams.

In the second STN_table( ), as shown in FIGS. 16 and 17, a combination of two audio streams contained in two sub clips can be selected (since secondary_audio_present_flag is provided). Accordingly, the user can superimpose and plays back two audio streams. More specifically, in the second STN_table( ), two stream_entry( ) elements and two stream_attributes( ) elements can be entered with one audio stream ID, thereby enabling the user to give an instruction to superimpose and play back two audio streams.

In a PlayItem in the Main Path, STN_table( ) defining the type of data multiplexed into an AV stream file and the type of data referred to by a Sub Path is provided. Accordingly, streams having high extensibility can be implemented.

By referring to stream_attribute of STN_table( ), the playback apparatus 1 can sequentially select and play back streams only that can be played back by the playback apparatus 1.

The processing performed by the playback apparatus 1 can be summarized as follows.

The playback apparatus 1 obtains a PlayList recorded on a recording medium as playback management information. The PlayList includes a Main Path, which is a playback path indicating the position of a main clip AV stream file containing at least one stream, and a plurality of Sub Paths, each indicating the position of a sub-clip AV stream file played back in synchronization with the main stream file. The main clip AV stream file may include a plurality of types of streams. Based on STN_table( ) (STN_table( ) indicated by the PlayItem), which is information indicating a combination of a predetermined type of main stream of the main clip AV stream file (for example, a first audio stream) and a sub-clip AV stream of the same type of the main stream file, which is played back in synchronization with the main stream file (for example, a second audio stream), the selection of a stream to be played back is received.

Upon receiving the selection of a combination of a predetermined type of main stream of the main clip AV stream file (for example, a first audio stream) and a sub-clip AV stream of the same type of the main stream file, which is played back in synchronization with the main stream file (for example, a second audio stream), the playback apparatus 1 reads the sub-clip AV stream file referred to by the Sub Path together with the main clip AV stream file. The mixing processor 101 of the playback apparatus 1 then combines the two audio streams (decoded audio streams) and the mixing processor 97 (AV decoder 26) plays back (outputs) the combined streams.

Figure 34:
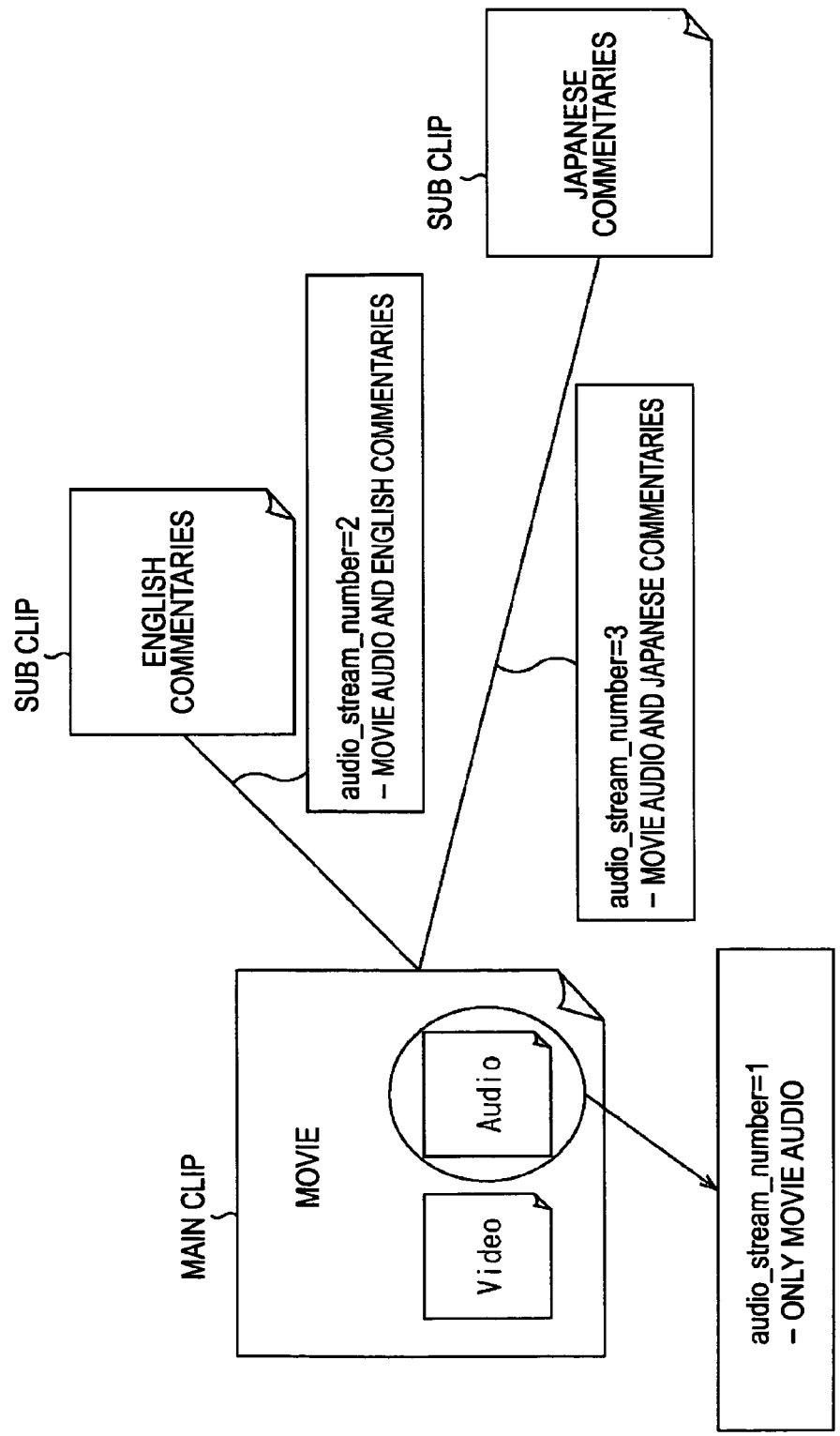
FIG. 34 illustrates an example in which two audio streams are mixed and played back.

It is now assumed, as shown in FIG. 34, that movie, which is a main clip AV stream file, includes video data and audio data, and sub-clip AV stream files include director's English commentaries and director's Japanese commentaries. In this case, the user can select an audio stream to be played back from audio_stream_number=1 (only main audio (movie)), audio_stream_number=2 (main audio and English commentaries), and audio_stream_number=3 (main audio and Japanese commentaries). If the user selects a combination of the main clip AV stream file and a sub-clip AV stream file (audio_stream_number=1 or 2), the two files can be combined and played back.

In this manner, a PlayList includes a Main Path and Sub Paths, and the Main Path and Sub Paths refer to different clip AV stream files. Accordingly, streams having high extensibility can be implemented. Additionally, since one Sub Path can refer to a plurality of files (for example, FIG. 8), the user can select from a plurality of different streams.

A PlayItem of the Main Path includes the first STN_table( ) discussed with reference to FIG. 14 or the second STN_table( ) discussed with reference to FIG. 16 as a table for defining accompanying data (for example, audio streams) multiplexed (contained) into an AV stream file referred to by the Main Path and accompanying data referred to by Sub Paths. Thus, streams having high extensibility can be implemented. Additionally, Sub Paths can be easily extended by entering additional data into STN_table( ).

Stream_attribute( ) shown in FIG. 18, which is stream attribute information, is provided in STN_table( ). This enables the playback apparatus 1 to determine whether it has a function of playing back a selected stream. By referring to stream_attribute( ), the playback apparatus 1 can select streams only that can be played back.

In the first or second STN_table( ) (FIG. 14 or 16), a combination of a stream file referred to by the Main Path and a stream file of the same type (in this case, audio stream file) referred to by a Sub Path is defined by stream_entry (FIG. 15 or 17). Also, a combination of two audio stream files referred to by Sub Paths is defined as shown in FIGS. 16 and 17. As shown in FIG. 28, two audio decoders (first audio decoder 75-1 and second audio decoder 75-2), and the mixing processor 101 for combining (mixing) audio streams decoded by the first and second audio decoders 75-1 and 75-2 are provided for the playback apparatus 1. Thus, two streams of the same type can be combined and played back simultaneously.

If two sub-clip AV streams of a predetermined type contained in sub-clip AV stream files are selected (i.e., in the second STN_table( ), secondary_audio_present_flag is 1 and if the types of first stream_entry( ) and second stream_entry( ) are 2 (type=2)), the playback apparatus 1 reads the two sub-clip AV streams. The mixing processor 101 of the playback apparatus 1 then mixes the two audio streams (decoded audio streams) and the mixing processor 97 (AV decoder 26) plays back (outputs) the mixed streams.

A Sub Path includes SubPath_type indicating the type of Sub Path (such as audio or subtitles), as shown in FIG. 11, Clip_Information_file_name indicating the name of the sub clip referred to by the Sub Path, as shown in FIG. 12, and SubPlayItem_IN_time and SubPlayItem_OUT_time indicating the IN point and the OUT point of the clip referred to by the Sub Path, as shown in FIG. 12. Accordingly, data referred to by the Sub Path can be precisely specified.

The Sub Path also includes sync_PlayItem_id (for example, sync_PlayItem_id shown in FIGS. 7 and 8), which is information for specifying the AV stream file on the Main Path so that the Sub Path can be played back simultaneously with the Main Path, and sync_start_PTS_of_PlayItem (for example, sync_start_PTS_of_PlayItem in FIGS. 7 and 8), which is the time on the Main Path at which the IN point of the data referred to by the Sub Path is started simultaneously on the time axis of the Main Path. Accordingly, data (file) referred to by the Sub Path can be played back, as shown in FIGS. 7 and 8, in synchronization with the main clip AV stream file referred to by the Main Path.

Data read by the storage drive 22 and supplied to the AV decoder 26 in FIG. 28 is data recorded on the recording medium 11, such as a DVD (Digital Versatile Disc). Data recorded on the local storage 24, such as a hard disk, is also supplied to the AV decoder 26. The data recorded on the local storage 24 may be data downloaded via the network 2. In other words, data supplied to the AV decoder 26 may be data recorded on the recording medium 11, data stored in the playback apparatus 1 in advance, data supplied from another device via the network 2, or a combination of data thereof. For example, AV streams may be played back based on a PlayList and a sub clip downloaded and recorded on the local storage 24 and based on a main clip AV stream file recorded on the recording medium 11. Alternatively, based on a PlayList recorded on the local storage 24, a sub-clip may be read from the recording medium 11 and a main clip AV stream file may be read from the local storage 24 and played back.

If a stream referred to by a Main Path and a stream referred to by a Sub Path or streams referred to by two Sub Paths to be played back are downloaded as different transport streams (TSs), audio streams included in the two different TSs are combined. If two streams referred to by two Sub Paths are obtained as at least one TS containing the two streams, the two audio streams included in the single TS are combined.

If two audio streams are defined by a Main Path and a Sub Path (i.e., in the first STN_table( ) shown in FIG. 14, if type=3 in stream_attribute in FIG. 15), or if two audio streams are defined by a Main Path and a Sub Path or by two Sub Paths (i.e., in the second STN_table( ) shown in FIG. 16, if secondary_audio_present_flag is 1 and if the two audio streams are defined in stream_attribute( ) in FIG. 17), the first audio decoder 75-1 decodes the main clip AV stream file or one sub-clip AV stream file and the second audio decoder 75-2 decodes the other sub-clip AV stream file. In this case, a combination of audio streams of two clips having the same coding type (for example, Dolby AC-3 audio in FIG. 19) may be defined in STN_table( ). In other words, a restriction may be imposed so that audio streams defined in STN_table( ) to be simultaneously decoded have the same coding type. The reason for this is as follows. If the coding type is the same, audio streams which are in process of being decoded by the first audio decoder 75-1 and the second audio decoder 75-2 (for example, audio streams are dequantized but not yet subjected to IDCT during MPEG decoding) can be mixed by the mixing processor 101 since the data type of audio streams which are being decoded is the same.

In the playback apparatus 1 described above, by referring to the first STN_table( ) in FIG. 14 or the second STN_table( ) in FIG. 16, a combination of a clip referred to by a PlayItem and a clip referred to by a Sub Path or two clips referred to by Sub Paths to be played back together can be selected. A description is now given of another example of a mechanism for selecting two audio streams to be mixed and played back.

FIG. 35 illustrates a third example of the syntax of STN_table( ) (third STN_table( )) when two audio streams are mixed and played back. As in the first or second STN_table( ), the third STN_table( ) is also set as an attribute of PlayItem( ). In the third STN_table( ), instead of selecting a combination of a clip referred to by a PlayItem and a clip referred to by a Sub Path or clips referred to by Sub Paths, clips to be played back can be selected as desired. In FIG. 35, an explanation of portions similar to those of FIG. 14 is omitted.

The third STN_table( ) shown in FIG. 35 differs from the first STN_table( ) shown in FIG. 14 in that two types of audio streams are defined. The Length, number_of_video_stream_entries, video_stream_id, and video_stream_number are similar to those of FIG. 14.

The number_of_audio_stream_entries indicate the number of first audio streams provided with audio_stream_id entered in the third STN_table( ). The audio_stream_id is information for identifying the first audio streams. The audio_stream_number is the audio stream number that can be seen from the user when switching sound. The number_of_audio_stream2-entries indicates the number of second audio streams provided with audio_stream_id2 entered in the third STN_table( ). The audio_stream_id2 is information for identifying the second audio streams. The audio_stream_number is the audio stream number that can be seen from the user when switching sound.

More specifically, the audio streams represented by number_of_audio_stream_entries entered in the third STN_table( ) are audio streams decoded by the first audio decoder 75-1 of a playback apparatus 141 shown in FIG. 36 or a playback apparatus 401 shown in FIG. 53, which are discussed below. The audio streams represented by number_of_audio_stream2_entries entered in the third STN_table( ) are audio streams decoded by the second audio decoder 75-2 of the playback apparatus 141 shown in FIG. 36 or the playback apparatus 401 shown in FIG. 53. In this manner, in the third STN_table( ) shown in FIG. 35, two types of audio streams decoded by the two decoders can be entered.

Figure 53:
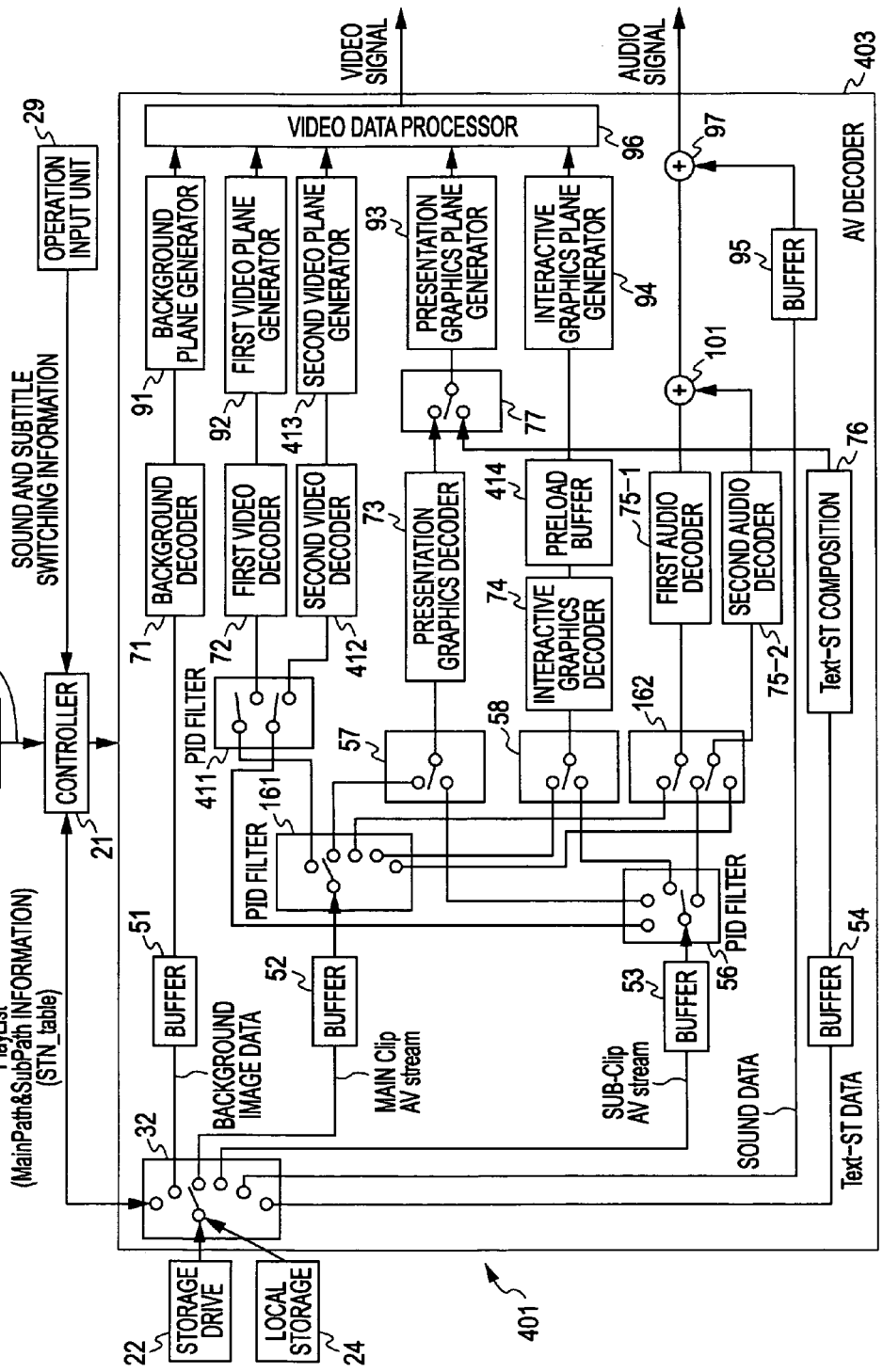
FIG. 53 is a block diagram illustrating an example of the configuration of a playback apparatus to which the present invention is applied, which is different from the example shown in FIG. 36.

The audio streams represented by number_of_audio_stream_entries decoded by the first audio decoder 75-1 of the playback apparatus 141 shown in FIG. 36 or the playback apparatus 401 shown in FIG. 53 are hereinafter referred to as "audio streams #1 (or may be referred to as "primary audio streams" as described below). The audio streams represented by number_of_audio_stream2_entries decoded by the second audio decoder 75-2 are hereinafter referred to as "audio streams #2" (or may be referred to as "secondary audio streams" as described below). The audio streams #1 are audio streams which are played back preferentially over the audio streams #2.

The number_of_PG_txtST_stream_entries, PG_txtST stream_id, and PG_txtST_stream_number are similar to those discussed with reference to FIG. 14.

The number_of_IG_stream_entries, IG_stream_id, and IG_stream_number are similar to those discussed with reference to FIG. 14.

The syntax of stream_entry( ) is similar to that discussed with reference to FIG. 17.

As in the FOR loop of the video stream ID (video_stream_id) and the FOR loop of the audio stream ID (audio_stream_id) discussed with reference to FIGS. 14 and 16, in the FOR loop of the audio stream ID2 (audio_stream_id2), audio_stream_id2 is assigned from 0 to an audio elementary stream specified for each stream_entry( ). As in the video streams, instead of the audio stream ID2 (audio_stream_id2), the audio stream number 2 (audio_stream_number2) may be used, in which case, audio_stream_number2 is assigned from 1. That is, the number obtained by adding one to audio_stream_id2 is the audio_stream_number2. The number is assigned from 1 since audio_stream_number2 is the audio stream number 2 that can be seen by the user when switching sound.

That is, in the third STN_table( ) in FIG. 35, the audio streams #1 represented by number_of_audio_stream_entries and the audio streams #2 represented by number_of_audio_stream2_entries are defined. In other words, by using the third STN_table( ), the audio streams #1 and the audio streams #2 can be entered so that the user can select two audio streams to be played back simultaneously.

The IDs in the FOR loop of the subtitle stream ID (PG_txtST_stream_id) and in the FOR loop of the graphics stream ID (IG_stream_id) are similar to those discussed with reference to FIG. 14 or 16.

The stream_attribute( ) in third STN_table( ) in FIG. 35 is as follows. The syntax of stream_attribute( ) is similar to that in FIGS. 18 through 25.

After reserved_for_future_use, in the FOR statement, the video streams are referred to for the same number of times as the number of video streams, and the audio streams are referred to for the same number of times as the number of Main Paths and Sub Paths set by the disc manufacturer. The PG textST streams are referred to for the same number of times as the number of PG textST streams, and the IG streams are referred to for the same number of times as the number of IG streams.

In the FOR loop of the video stream ID (video_stream_id), stream_attribute( ) gives stream attribute information concerning one video elementary stream specified for each stream_entry( ). That is, the stream attribute information concerning one video elementary stream specified for each stream_entry( ) is indicated in the stream_attribute( ).

Similarly, in the FOR loop of the audio stream ID (audio_stream_id), stream_attributes( ) gives stream attribute information concerning one audio elementary stream specified for each stream_entry( ). That is, the stream attribute information concerning one audio elementary stream specified for each stream_entry( ) is indicated in the stream_attributes( ). For example, since the audio elementary stream specified by type=1 or type=2 in stream_entry( ) in FIG. 15 is only one, stream_attributes( ) gives stream attribute information concerning that audio elementary stream.

Similarly, in the FOR loop of the audio stream ID2 (audio_stream_id2), stream_attributes( ) gives stream attribute information concerning one audio elementary stream specified for each stream_entry( ). That is, the stream attribute information concerning one audio elementary stream specified for each stream_entry( ) is indicated in the stream_attributes( ). For example, since the audio elementary stream specified by type=1 or type=2 in stream_entry( ) in FIG. 15 is only one, stream_attributes( ) gives stream attribute information concerning that audio elementary stream.

Similarly, in the FOR loop of the subtitle stream ID (PG_txtST_stream_id), stream_attribute( ) gives stream attribute information concerning one bitmap subtitle elementary stream or one text subtitle elementary stream specified for each stream_entry( ). That is, the stream attribute information concerning one bitmap elementary stream or one text subtitle elementary stream specified for each stream_entry( ) is indicated in the stream_attributes( ).

Similarly, in the FOR loop of the graphics stream ID (IG_stream_id), stream_attribute( ) gives stream attribute information concerning one interactive graphics elementary stream specified for each stream_entry( ). That is, the stream attribute information concerning one interactive graphics elementary stream specified for each stream_entry( ) is indicated in the stream_attribute( ).

As discussed above, by using the third STN_table, when a PlayItem and at least one Sub Path played back in association with the PlayItem are provided, attribute information concerning one elementary stream specified for each stream_entry( ) among from the clip referred to by the PlayItem and the clip referred to by at least one Sub Path can be identified by stream_attributes( ).

As in the first or second STN_table( ), by checking the attribute information (stream_attribute( )), the playback apparatus can check whether it has a function of playing back the elementary stream. By checking the attribute information, the playback apparatus can also select the elementary streams in accordance with the initial information concerning the language set in the playback apparatus.

By the use of the third STN_table( ) in FIG. 35, the audio stream #1 and the audio stream #2 may be audio streams contained in the Main Path. Alternatively, the audio stream #1 and the audio stream #2 may be an audio stream contained in a clip referred to by the Main Path and an audio stream contained in a clip referred to by a Sub Path. In this manner, by the use of the third STN_table( ), two audio streams superimposed on main clip AV streams referred to by the Main Path may be selected and mixed and played back.

By using the third STN_table( ) provided in PlayItem( ), if a PlayItem and at least one Sub Path played back in association with the PlayItem are provided, a mechanism for allowing a user to select a combination of streams as desired from clips referred to by the Main Path and clips referred to by at least one Sub Path when switch sound or subtitles can be provided. Thus, the user can perform interactive operations for streams or data files different from a stream containing an AV stream to be played back.

As in the first STN_table( ) and the second STN_table( ), in the third STN_table( ), one PlayList includes a plurality of Sub Paths, and each Sub Path refers to at least one SubPlayItem. Thus, AV streams having high extensibility and high flexibility can be implemented. That is, SubPlayItems can be added afterwards to the content played back by the PlayList.

Figure 36:
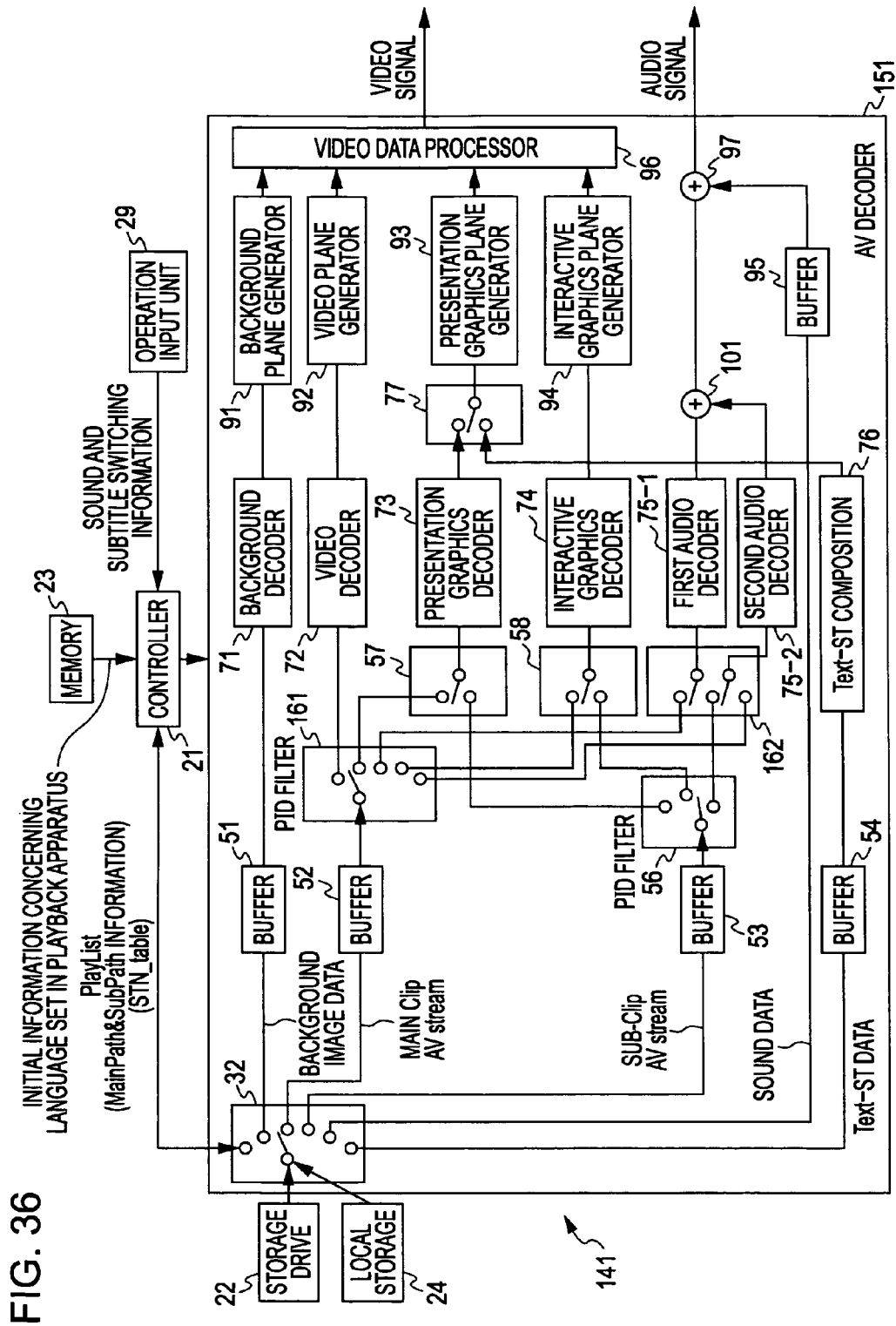
FIG. 36 is a block diagram illustrating another example of the configuration of a playback apparatus to which the present invention is applied.

The third STN_table( ) in FIG. 35 provides a mechanism for mixing the audio stream #1 decoded by the first audio decoder 75 of the playback apparatus 141 in FIG. 36 or the playback apparatus 401 in FIG. 53 with the audio stream #2 decoded by the second audio decoder 75-2 of the playback apparatus 141 or 401. For example, if PlayItem( ) and at least one Sub Path played back in association with PlayItem( ) are provided, an audio stream contained in the clip referred to by the PlayItem is set to be the audio stream #1, and an audio stream contained in the clip referred to by the Sub Path is set to be the audio stream #2, and then, the audio stream #1 and the audio stream #2 are mixed and played back. Alternatively, two audio streams contained in the clip (main clip) referred to by the PlayItem may be set as the audio stream #1 and the audio stream #2 and are mixed and played back. With this configuration, an audio stream (for example, director's commentaries) different from the main audio stream can be superimposed on the main audio stream. Additionally, two audio streams #1 and #2 superimposed on the main clip AV stream can be superimposed (mixed) and played back.

More specifically, as in the stream number table shown in FIG. 26, in a stream number table, provided to the user, indicating the relationship between sound numbers and subtitle numbers, the sound numbers are referred to as A_SN (Audio Stream Number) or A_SN2, and the subtitle numbers are referred to as S_SN (SubPicture Stream Number). Each of the audio streams #1 (audio streams represented by audio_stream_id) entered in the third STN_table( ) of a PlayItem forming the Main Path of the PlayList is provided with A_SN, and the user can select the audio streams #1 to be played back from the audio streams provided with A_SN. Similarly, each of the audio streams #2 (audio streams represented by audio_stream_id2) entered in the third STN_table( ) is provided with A_SN2, and the user can select the audio streams #2 to be mixed with the selected audio streams #1 from the audio streams provided with A_SN2.

A_SN provided for selecting the audio stream #2 and A_SN2 provided for selecting the audio stream #2 are independently selected by the user. Accordingly, the audio stream #1 and the audio stream #2 can also be switched independently.

That is, by separately defining two types of audio streams (audio stream #1 and audio stream #2) to be played back, the user can select two audio streams as desired from the defined streams. In other words, the user can select two audio streams as desired from the defined streams, and thus, the flexibility in selecting audio streams becomes high. For example, the user can select a combination of audio 2 and audio 4 (A_SN=1 and A_SN2=1) or a combination of audio 2 and audio 5 (A_SN=1 and A_SN2=2).

As described above, in stream_entry( ) of the third STN_table( ) (FIG. 35) in PlayItem( ), two audio streams can be entered so that two audio streams can be mixed and played back. That is, two streams of the same type (in this case, audio streams) can be selected from streams of different types so that they can be mixed (superimposed or combined) and played back simultaneously. The user can give an instruction to mix and play back the streams.

A description is now given of, as another example of the playback apparatus to which the present invention is applied, the playback apparatus 141 that can enter two audio streams separately by using STN_table( ), such as the third STN_table( ) in FIG. 35, to mix and play back the selected audio streams.

The configuration of the playback apparatus 141 is similar to that of the playback apparatus 1 shown in FIG. 27, except that an AV decoder 151 is disposed instead of the AV decoder 26 of the playback apparatus 1. FIG. 36 is a block diagram illustrating an example of the configuration of the AV decoder 151. The playback apparatus 141 including the AV decoder 151 can play back AV streams based on a PlayList including the above-described Main Path and Sub Paths in which the third STN_table shown in FIG. 35 is indicated.

The configuration of the AV decoder 151 of the playback apparatus 141 is similar to that of the AV decoder 26 of the playback apparatus 1, except that a PID filter 161 is disposed instead of the PID filter 55 and a switch 162 is disposed instead of the switch 59. The first audio decoder 75-1 decodes the audio streams represented by audio_stream_id in the third STN_table( ) in FIG. 35, and the second audio decoder 75-2 decodes the audio streams represented by audio_stream_id2 in the third STN_table( ).

File data read by the controller 21 is demodulated by a demodulator, and the demodulated multiplexed streams are then subjected to error correction by an ECC decoder. The switch 32 then divides the multiplexed streams according to the stream types and supplies the divided streams to the corresponding buffers 51 through 54 under the control of the controller 21. More specifically, under the control of the controller 21, the switch 32 supplies background image data to the buffer 51, data read from the main clip (i.e., main clip AV stream file data) to the buffer 52, data read from the sub clip (i.e., sub-clip AV stream file data) to the buffer 53, and text-ST data to the buffer 54. Then, the buffers 51 through 54 buffer the background image data, main clip AV stream file data, sub-clip AV stream file data, and text-ST data, respectively, therein.

Stream data read out from the buffer 52, which serves as the clip AV stream file read buffer, is output to the PID (packet ID) filter 161, which is disposed subsequent to the buffer 52, at a predetermined time. The PID filter 161 allocates streams contained in the main clip AV stream file to the corresponding elementary stream decoders, which is disposed subsequent to the PID filter 161, according to the PIDs (packet IDs). More specifically, the PID filter 161 supplies video streams to the video decoder 72, presentation graphics streams to the switch 57, which supplies the graphics streams to the presentation graphics decoder 73, interactive graphics streams to the switch 58, which supplies the graphics streams to the interactive graphics decoder 74, and audio streams to the switch 162, which supplies the audio streams to the first audio decoder 75-1 or the second audio decoder 75-2.

Stream data read out from the buffer 53, which serves as the sub-clip AV stream file read buffer, is output to the PID (packet ID) filter 56, which is disposed subsequent to the buffer 53, at a predetermined time. The PID filter 56 allocates streams contained in the sub-clip AV stream file to the corresponding elementary stream decoders according to the PIDs (packet IDs). More specifically, the PID filter 56 supplies presentation graphics streams to the switch 57, which supplies the graphics streams to the presentation graphics decoder 73, interactive graphics streams to the switch 58, which supplies the graphics streams to the interactive graphics decoder 74, and sub-clip audio streams to the switch 162, which supplies the audio streams to the first audio decoder 75-1 or the second audio decoder 75-2.

The video streams allocated by the PID filter 161 are supplied to the video decoder 72, which is disposed subsequent to the PID filter 161. The video decoder 72 decodes the video streams and supplies the decoded video streams to the video plane generator 92.

The switch 57 selects one of the presentation graphics streams contained in the main clip AV stream file supplied from the PID filter 161 and the presentation graphics streams contained in the sub-clip AV stream file supplied from the PID filter 56, and supplies the selected presentation graphics streams to the presentation graphics decoder 73, which is disposed subsequent to the switch 57. The presentation graphics decoder 73 decodes the presentation graphics streams and supplies them to the switch 77, which further supplies them to the presentation graphics plane generator 93.

The switch 58 selects one of the interactive graphics streams contained in the main clip AV stream file supplied from the PID filter 161 and the interactive graphics streams contained in the sub-clip AV stream file supplied from the PID filter 56, and supplies the selected interactive graphics streams to the interactive graphics stream decoder 74. That is, the interactive graphics streams simultaneously input into the interactive graphics decoder 74 are streams separated from the main clip AV stream file or the sub-clip AV stream file. The interactive graphics decoder 74 decodes the interactive graphics streams, and supplies the decoded streams to the interactive graphics plane generator 94.

The switch 162 selects one of the audio streams contained in the main clip AV stream file supplied from the PID filter 161 and the audio streams contained in the sub-clip AV stream file supplied from the PID filter 56 and supplies the selected audio streams to the first audio decoder 75-1 or the second audio decoder 75-2, which is disposed subsequent to the switch 162. The audio streams simultaneously input into the first audio decoder 75-1 are streams separated from the main clip AV stream file or the sub-clip AV stream file. The audio streams simultaneously input into the second audio decoder 75-2 are also streams separated from the main clip AV stream file or the sub-clip AV stream file. If the main clip AV stream file includes the audio streams #1 and the audio streams #2, the PID filter 161 filters the audio streams #1 and the audio streams #2 according to the PIDs of the audio streams, and supplies them to the switch 162.

More specifically, the switch 162 selects the audio streams #1 supplied from the PID filter 161 to the first audio decoder 75-1 and the audio streams #2 supplied from the PID filter 161 to the second audio decoder 75-2.

The first audio decoder 75-1 decodes the audio streams #1 and supplies the decoded audio streams to the mixing processor 101. The second audio decoder 75-2 decodes the audio streams #2 and supplies the decoded audio streams to the mixing processor 101.

If an instruction to superimpose the audio stream #1 on the audio stream #2 and play back the superimposed stream is given (if two audio streams are selected by the user as audio streams to be played back), the specified audio stream #1 decoded by the first audio decoder 75-1 and the specified audio stream #2 decoded by the second audio decoder 75-2 are supplied to the mixing processor 101.

The mixing processor 101 mixes (superimposes) the audio data from the first audio decoder 75-1 with the audio data from the second audio decoder 75-2, and supplies the resulting data to the mixing processor 97, which is disposed subsequent to the mixing processor 101. In this embodiment, mixing (superimposing) of the audio data output from the first audio decoder 75-1 and the audio data output from the second audio decoder 75-2 is also referred to as "combining". That is, to combine two audio data is to mix two audio data.

Sound data selected by the switch 32 is supplied to the buffer 95 and is buffered therein. The buffer 95 supplies the sound data to the mixing processor 97 at a predetermined time. The sound data is, for example, effect sound that can be selected from a menu. The mixing processor 97 mixes (superimposes or combines) the audio data mixed by the mixing processor 101 (audio data obtained by mixing the audio data output from the first audio decoder 75-1 with the audio data output from the second audio decoder 75-2) with the sound data supplied from the buffer 95, and outputs the resulting data as an audio signal.

The text subtitle (Text-ST) data, presentation graphics streams, background image data, and video data are processed basically similarly to those of the AV decoder 26 of the playback apparatus 1.

The switches 57, 58, 162, and 77 select data according to the selection by the user via the operation input unit 29 or depending on the type of file containing target data. For example, if audio streams are contained only in sub-clip AV stream files, the switch 162 changes the selection to the side supplying the sub-clip AV stream files (to the output of the PID filter 56).

The playback processing performed by the playback apparatus 141 shown in FIG. 36 is as follows. In response to an instruction to play back a predetermined AV stream from a user by using the operation input unit 29, the controller 21 reads a main clip AV stream, a sub-clip AV stream, and text subtitle data (text-ST data) from the recording medium 11 via the storage drive 22 or from the local storage 24, such as a HDD (Hard Disk Drive), based on a PlayList file, such as that discussed with reference to FIG. 9, and a PlayItem and Sub-PlayItems contained in the PlayList.

The controller 21 changes the switch 32 to supply the background image data to the buffer 51, the main clip AV stream data to the buffer 52, the sub-clip AV stream data to the buffer 53, and the Text-ST data to the buffer 54. Then, the buffers 51 through 54 buffer the corresponding data therein.

Then, the switch 32 is changed to supply the background image data to the buffer 51, the main clip AV stream data to the buffer 52, the sub-clip AV stream data to the buffer 53, and the text subtitle data to the buffer 54. The buffers 51 through 54 buffer the corresponding data.

Then, the buffer 51 outputs the background image data to the background decoder 71. The buffer 52 outputs the main clip AV stream data to the PID filter 161. The buffer 54 outputs the text subtitle data to the text subtitle composition 76. The buffer 53 outputs the sub-clip AV stream data to the PID filter 56.

The PID filter 161 supplies the video streams to the video decoder 72, the presentation graphics streams to the switch 57, which supplies the presentation graphics streams to the presentation graphics decoder 73, the interactive graphics streams to the switch 58, which supplies the interactive graphics streams to the interactive graphics decoder 74, and the audio streams to the switch 162, which supplies the audio streams to the first audio decoder 75-1 or the second audio decoder 75-2. The video streams, presentation graphics streams, interactive graphics streams, and audio streams are provided with PIDs.

The PID filter 56 supplies the presentation graphics streams to the switch 57, which supplies the graphics streams to the presentation graphics decoder 73, the interactive graphics streams to the switch 58, which supplies the graphics streams to the interactive graphics decoder 74, and the audio streams to the switch 59, which supplies the audio streams to the first audio decoder 75-1 or the second audio decoder 75-2.

The switches 57, 58, and 162, which is disposed subsequent to the PID filters 161 and 56, select one of the main clip and the sub clip under the control of the controller 21. More specifically, the switch 57 selects the presentation graphics streams of the main clip AV stream or the sub-clip AV stream supplied from the PID filter 161, and supplies the selected presentation graphics streams to the presentation graphics decoder 73, which is disposed subsequent to the switch 57. The switch 58 selects the interactive graphics streams of the main clip AV stream or the sub-clip AV stream supplied from the PID filter 161, and supplies the selected interactive graphics streams to the interactive graphics decoder 74, which is disposed subsequent to the switch 58. The switch 162 selects the main clip AV audio stream or the sub-clip AV audio stream (in this case, audio stream #1 since an instruction to switch sound is not yet given) supplied from the PID filter 161, and supplies the selected audio streams to the first audio decoder 75-1, which is disposed subsequent to the switch 162. If an instruction to switch sound is given from the user, the switch 162 supplies the main clip AV audio streams to the second audio decoder 75-2 and the sub-clip AV audio streams to the first audio decoder 75-1 or the second audio decoder 75-2.

However, the playback processing discussed here is before switching sound, and an explanation of processing after switching sound is omitted.

The background decoder 71 decodes the background image data and outputs them to the background plane generator 91. The video decoder 72 decodes the video streams and outputs them to the video plane generator 92. The presentation graphics decoder 73 decodes the presentation graphics streams selected by the switch 57 and outputs them to the switch 77, which is disposed subsequent to the presentation graphics decoder 73. The interactive graphics decoder 74 decodes the interactive graphics streams selected by the switch 58 and outputs them to the interactive graphics plane generator 94, which is disposed subsequent to the interactive graphics decoder 74. The Text-ST composition 76 decodes the text subtitle data and outputs it to the switch 77, which is disposed subsequent to the Text-ST composition 76.

The first audio decoder 75-1 decodes the audio streams (audio streams #1) selected by the switch 162 and outputs them to the mixing processor 101. If an instruction to switch sound is not given from the user, audio data is not output from the second audio decoder 75-2. Accordingly, the mixing processor 101 directly supplies the audio data from the first audio decoder 75-1 to the mixing processor 97.

The switch 77 selects one of the data from the presentation graphics decoder 73 or the Text-ST composition 76, and supplies the selected data to the presentation graphics plane generator 93. The background plane generator generates a background plane based on the background image data supplied from the background decoder 71. The video plane generator 92 generates a video plane based on the video data supplied from the video decoder 72. The presentation graphics plane generator 93 generates a presentation graphics plane based on the data from the presentation graphics decoder 73 or the Text-ST composition 76 selected by the switch 77. The interactive graphics plane generator 94 generates an interactive graphics plane based on the data from the interactive graphics decoder 74. The buffer 95 buffers the supplied sound data and supplies it to the mixing processor 97 at a predetermined time.

The video data processor 96 combines the planes and outputs the combined data as video data. The mixing processor 97 mixes (combines) the audio data (output from the mixing processor 101) with the sound data, and outputs the resulting data.

According to the above-described processing, by the Main Path and Sub Paths included in the PlayList, the main clip AV streams, sub-clip AV streams, and text subtitle data are referred to and played back. As described above, by providing a Main Path and Sub Paths in the PlayList, sub-clip AV streams different from main clip AV stream files specified by the Main Path can be specified by the Sub Paths. Accordingly, data contained in sub clips different from main clips referred to by PlayItems of the Main Path can be played back together with (simultaneously with) the data in the main clips.

The processing performed by the playback apparatus 141 when an instruction to switch sound is given is discussed below. A description is first given of the processing in response to an instruction to perform sound switching for audio streams #1. The processing in response to an instruction to perform sound switching for audio streams #2 is discussed later. The playback apparatus 141 executes this processing while performing the playback processing.

The controller 21 first obtains an order list of the audio stream numbers (may be IDs). More specifically, the controller 21 refers to STN_table( ) of PlayItem( ) to obtain the order list of the audio stream numbers (IDs) entered in the third STN_table( ) in FIG. 35. This processing is executed when playback processing is started.

In response to an instruction to perform sound switching for audio streams #1 given from the user by using the operation input unit 29, the controller 21 receives this instruction. In this case, the controller 21 may control an external display device (not shown) to display a stream number table on the display device. Since this processing is to perform sound switching for the audio streams #1, the user gives an instruction to switch sound of A_SN=1, A_SN=2, or A_SN=3, and more specifically, to switch from audio 2 (A_SN=1) to audio 1 (A_SN=2). The controller 21 receives an instruction to perform sound switching for audio streams #1 from the user.

The controller 21 obtains the audio stream number subsequent to the currently played back audio stream number. For example, if the audio stream file corresponding to A_SN=1 is currently played back, the controller 21 obtains the audio stream number corresponding to A_SN=2.

The controller 21 determines based on stream_attribute( ) (FIG. 18) whether the playback apparatus 141 has a function of playing back the audio streams (audio streams #1) corresponding to the obtained number. If, for example, the type of stream_entry( ) is 1 (type=1), the controller 21 determines whether it has a function of playing back the audio streams contained in the main clip associated with the obtained number. Since the audio streams associated with the obtained number are the audio streams #1 decoded by the first audio decoder 75-1, it is determined whether the audio decoder 75-1 can decode the audio streams #1.

If the function of playing back the audio streams associated with the obtained number is not provided, the controller 21 obtains the stream number subsequent to the current stream number. That is, if the function of playing back the audio streams associated with the current stream number is not provided, that stream number is skipped (which is not played back). The processing for obtaining the subsequent stream number is repeated until the audio stream number (audio stream #1) that can be played back is obtained.

If the function of playing back the audio streams associated with the obtained number is provided, the controller 21 checks the clip containing those audio streams. For example, the controller 21 checks based on the type of Stream_entry( ) whether the audio streams associated with the obtained number are contained in the main clip (type=1) or a sub clip (type=2). If type=1 in Stream_entry( ), the controller 21 can identify that the audio streams are contained in the main clip. If type=2, the controller 21 can identify that the audio streams are contained in a sub clip.

The controller 21 then specifies a desired audio stream, and more specifically, a desired audio stream in the main clip or a sub clip containing the streams associated with the obtained number. For example, if the audio streams associated with the obtained number are contained in the main clip, the controller 21 specifies the predetermined audio stream contained in the main clip based on information (ref_to_stream_PID_of_mainClip) entered in stream_entry( ) as type=1. If the audio streams associated with the obtained number are contained in a sub clip, the controller 21 specifies the predetermined audio stream contained in the sub clip based on information (ref_to_SubPath_id, ref_to_SubPath_entry_id, and ref_to_stream_PID_of_SubClip) entered in stream_entry( ) as type=2. The specified audio stream serves as the audio stream #1 decoded by the first audio decoder 75-1.

The controller 21 then instructs the storage drive 22 to read the specified audio stream from the clip AV stream contained in the clip in which the desired audio stream is multiplexed (from the main clip AV stream file or the sub-clip AV stream file), and the storage drive 22 reads the specified audio stream and supplies it to the AV decoder 151. Alternatively, the controller 21 reads the specified audio stream from the clip AV stream in which the desired audio stream is multiplexed (from the main clip AV stream file or the sub-clip AV stream file) recorded on the local storage 24, and supplies it to the AV decoder 151. Then, the controller 21 supplies the desired audio stream (i.e., audio stream #1) to the first audio decoder 75-1 of the AV decoder 151, and instructs the audio decoder 75-1 to decode the audio stream.

The first audio decoder 75-1 of the AV decoder 151 decodes the audio stream #1 (audio stream instructed to be read processing in step S58) and outputs it to the mixing processor 101. If the audio stream #2 is decoded by the second audio decoder 75-2, the mixing processor 101 mixes the audio stream #1 with the audio stream #2, and supplies the mixed stream to the mixing processor 97. If the audio stream #2 is not decoded by the second audio decoder 75-2, the mixing processor 101 directly supplies the audio stream #1 to the mixing processor 97. The mixing processor 97 then mixes the supplied audio data (audio data obtained by decoding the audio stream #1 or audio data obtained by decoding the audio stream # and audio stream #2 and mixing them) from the mixing processor 101 with the sound data output from the buffer 95, and outputs the resulting data as an audio signal.

The processing performed in response to an instruction to perform sound switching for the audio stream #2 is described below. This processing is also executed while performing the playback processing. Generally, when the audio stream #2 is played back, the audio stream #1 is also played back. Accordingly, this processing is executed in parallel with the playback processing for the audio stream #1, and when the audio stream #2 is not selected by the user, only the playback processing for the audio stream #1 is performed.

The controller 21 first refers to STN_table( ) in Play Item( ) and also obtains an order list of audio stream numbers (IDs) entered in the third STN_table( ) in FIG. 35. This processing is executed when the playback processing is started.

In response to an instruction to perform sound switching for audio streams #2 given from the user by using the operation input unit 29, the controller 21 receives the instruction to perform sound switching for audio streams #2. In this case, the controller 21 may control an external display device (not shown) to display the stream number table shown in FIG. 26 on the display device. Since this processing is to perform sound switching for the audio streams #2, the user gives an instruction to switch sound of, for example, A_SN2=1 or A_SN2=2. The controller 21 receives the instruction to perform sound switching for audio streams #2. The controller 21 obtains the audio stream number subsequent to the currently played back audio stream number.

The controller 21 then determines based on stream_attribute( ) (FIG. 18) whether the controller 21 (playback apparatus 141) has a function of playing back the audio streams (audio streams #2) corresponding to the obtained number. Since the audio streams associated with the obtained number are the audio streams #2 decoded by the second audio decoder 75-2, it is determined whether the audio decoder 75-2 can decode the audio streams #2.

This processing may be omitted if the audio streams #1 decoded by the first audio decoder 75-1 have higher extensibility (as in multi-streams) than the audio streams #2 decoded by the second audio decoder 75-2. For example, if the first audio decoder 75-1 has higher performance than the second audio decoder 75-2 (if, for example, the audio streams #1 are normal movie sound and the audio streams #2 are director's commentaries on that movie), it is highly likely that a certain restriction is imposed on the audio streams #2 decoded by the second audio decoder 75-2. Accordingly, the possibility of streams that cannot be decoded by the second audio decoder 75-2 being set as the audio streams #2 is low.

If the function of playing back the audio streams associated with the obtained number is not provided, the controller 21 obtains the stream number subsequent to the current stream number. That is, if the playback apparatus does not have the function of playing back the audio streams associated with the current stream number, that stream number is skipped (which is not played back). The processing for obtaining the subsequent stream number is repeated until the audio stream number (audio stream #2) that can be played back is obtained.

If the function of playing back the audio streams associated with the obtained number is provided, the controller 21 checks based on the type of Stream_entry( ) whether the audio streams associated with the obtained number are contained in the main clip (type=1) or a sub clip (type=2). If type=1 in Stream_entry( ), the controller 21 can check that the audio streams are contained in the main clip. If type=2, the controller 21 can check that the audio streams are contained in a sub clip.

The controller 21 then specifies a desired audio stream in the main clip or a sub clip containing the streams associated with the obtained number. For example, if the audio streams associated with the obtained number are contained in the main clip, the controller 21 specifies the predetermined audio stream contained in the main clip based on information (ref_to_stream_PID_of_mainClip) entered in Stream_entry( ) as type=1. If the audio streams associated with the obtained number are contained in a sub clip, the controller 21 specifies the predetermined audio stream contained in the sub clip based on information (ref_to_SubPath_id, ref_to_SubClip_entry_id, and ref_to_stream_PID_of_SubClip) entered in Stream_entry( ) as type=2. The specified audio stream serves as the audio stream #2 decoded by the second audio decoder 75-2.

The controller 21 then instructs the storage drive 22 to read the clip AV stream in which the desired audio stream is multiplexed (the main clip AV stream file or the sub-clip AV stream file), and the storage drive 22 reads the specified stream file based on this instruction and supplies it to the AV decoder 151. Alternatively, the controller 21 controls the local storage 24 to read out the clip AV stream in which the desired audio stream is multiplexed (the main clip AV stream file or the sub-clip AV stream file) and to supply it to the AV decoder 151. Then, the controller 21 instructs the second audio decoder 75-2 of the AV decoder 151 to decode the desired audio stream (i.e., audio stream #2) contained in the read clip file.

The audio decoder 151 decodes the audio stream (audio stream #2) and outputs it. More specifically, the second audio decoder 75-2 decodes the audio stream #2 (audio stream instructed to be read in processing in step S78) and outputs it to the mixing processor 101. Since the audio stream #2 is decoded by the second audio decoder 75-2, the audio stream #1 has been decoded by the first audio decoder 75-1 and output to the mixing processor 101. Then, the mixing processor 101 mixes the audio stream #1 with the audio stream #2, and supplies the mixed stream to the mixing processor 97. The mixing processor 97 then mixes the supplied audio data (audio data obtained by decoding the audio stream #1 and audio stream #2 and by mixing them) from the mixing processor 101 with the sound data output from the buffer 95, and outputs the resulting data as an audio signal.

As described above, two audio streams can be mixed and played back. More specifically, if there is only one audio stream to be played back, the switch 162 supplies the audio stream supplied from the PID filter 161 or 56 to the first audio decoder 75-1. If there are two audio streams to be played back, the switch 162 supplies the audio streams supplied from the PID filter 161 or the PID filter 56 to the second audio decoder 75-2.

In short, the controller 21 can control sound (audio) switching based on STN_table( ) of PlayItem( ), and by referring to stream_attribute of STN_table( ), the controller can control playback switching by selecting streams only that can be played back by the playback apparatus 141. The controller 21 also control two audio streams to be superimposed and played back based on STN_table( ). The controller 21 can also perform control so that the audio stream #1, which serves as a main stream, is mixed with the audio stream #2, which is a stream of the same type (in this case, an audio stream) of the audio stream #1 and play them back simultaneously.

Although audio streams are switched based on the audio stream numbers, they may be switched based on the audio stream IDs (audio_stream_id). In this case, the number obtained by subtracting one from the audio stream number is the audio stream ID.

As in the processing using the first or second STN_table( ), the processing using the third STN_table( ) is applicable to various types of streams files other than audio streams as long as they are the same stream type. For example, this configuration can be used for picture-in-picture display in which two video streams (the type of stream is video stream) are combined and played back. Accordingly, stream files of the same type can be combined and played back.

That is, as discussed below with reference to FIG. 43, a video stream (video stream #1) referred to by a Main Path is displayed as a full screen and a video stream (video stream #2) referred to by the Main Path or a Sub Path is displayed inside the full screen as a sub-screen.

As in the playback apparatus 1, in the playback apparatus 141, audio or subtitles is provided in streams or data files different from a main AV stream, and a PlayList includes a Main Path and Sub Paths. This enables the user to select audio or subtitle data from the main clip AV stream and also from the streams or data files different from the main clip AV stream.

Additionally, STN_table( ) that defines the type of data multiplexed into the AV stream file and the type of data referred to by Sub Paths is disposed in the PlayItem of the Main Path. Accordingly, streams having high extensibility can be implemented.

As in the playback apparatus 1, the playback apparatus 141 can also sequentially select streams only that can be played back by the playback apparatus 141 by referring to stream_attribute of STN_table( ).

The processing performed by the playback apparatus 141 by referring to the third STN_table in FIG. 35 can be summarized as follows.

The playback apparatus 141 obtains a PlayList as playback management information. The PlayList includes a Main Path, which is a playback path indicating the position of a main clip AV stream file containing at least one stream, and a plurality of Sub Paths, each indicating the position of a sub-clip AV stream file played back in synchronization with the main stream file. The playback apparatus 141 receives an instruction to select streams to be played back included in the PlayList on the basis of STN_table( ), which serves as information for selecting a predetermined stream (for example, audio stream #1) of the main clip AV stream file and a stream of the same type (for example, audio stream #2) of the main stream file, which is played back in synchronization with the main stream file.

In response to an instruction to select two streams (audio streams) of the same type, the playback apparatus 141 reads the files containing the selected two streams. The mixing processor 101 of the playback apparatus 141 then combines the two audio streams and the mixing processor 97 (AV decoder 151) plays back (outputs) the combined streams.

As a result, two audio streams selected (by being switched) by the user can be mixed (combined) and played back.

As in the playback apparatus 1, in the playback apparatus 141, a PlayList includes a Main Path and Sub Paths, and the Main Path and Sub Paths refer to different clip AV stream files. Accordingly, streams having high extensibility can be implemented. Additionally, since one Sub Path can refer to a plurality of files, as discussed with reference to FIG. 8, the user can select from a plurality of different streams.

A PlayItem of the Main Path includes the STN_table( ) discussed with reference to FIG. 35 as a table for defining data (for example, audio streams) multiplexed (contained) into an AV stream file referred to by the Main Path and data referred to by Sub Paths. Thus, streams having high extensibility can be implemented. Additionally, Sub Paths can be easily extended by entering additional data into STN_table( ).

Stream_attribute( ) shown in FIG. 18, which is stream attribute information, is provided in STN_table( ). This enables the playback apparatus 141 to determine whether it has a function of playing back a selected stream. By referring to stream_attribute( ), the playback apparatus 141 can select streams only that can be played back.

In STN_table( ) (FIG. 35), two stream files of the same type (in this case, audio stream files) are defined, and the playback apparatus 141 includes two audio decoders (the first audio decoder 75-1 and the second audio decoder 75-2), and the mixing processor 101 for combining (mixing) the decoded audio data. Thus, two streams of the same type can be combined and played back simultaneously.

As in the playback apparatus 1, in the playback apparatus 141, a Sub Path includes SubPath_type indicating the type of Sub Path (such as audio or subtitles), as shown in FIG. 11, Clip_Information_file_name indicating the name of the sub clip referred to by the Sub Path, as shown in FIG. 12, and SubPlayItem_IN_time and SubPlayItem_OUT_time indicating the IN point and the OUT point of the clip referred to by the Sub Path, as shown in FIG. 12. Accordingly, data referred to by the Sub Path can be precisely specified.

Also, as in the playback apparatus 1, the Sub Path also includes sync_PlayItem_id (for example, sync_PlayItem_id shown in FIGS. 7 and 8), which is information for specifying the AV stream file on the Main Path so that the Sub Path can be played back simultaneously with the Main Path, and sync_start_PTS_of_PlayItem (for example, sync_start_PTS_of_PlayItem in FIGS. 7 and 8), which is the time on the Main Path at which the IN point of the data referred to by the Sub Path is started simultaneously on the time axis of the Main Path. Accordingly, data (file) referred to by the Sub Path can be played back, as shown in FIGS. 7 and 8, in synchronization with the main clip AV stream file referred to by the Main Path.

To mix and play back two audio streams, the first audio decoder 75-1 decodes the audio stream #1, while the second audio decoder 75-2 decodes the audio stream #2. A determination may be made as to whether the coding type of the audio stream #1 and audio stream #2 is the same (from example, Dolby AC-3 audio in FIG. 19). The reason for this is as follows. If the coding type is the same, two streams which are in process of being decoded by the first audio decoder 75-1 and the second audio decoder 75-2 can be mixed by the mixing processor 101 since the data type of audio streams which are being decoded is the same.

Data supplied to the AV decoder 151 of the playback apparatus 141 shown in FIG. 36 may be data recorded on the recording medium 11, such as a DVD (Digital Versatile Disc), data recorded on the local storage 24, such as a hard disk, data downloaded via the network 2, or a combination thereof.

In the playback processing performed by referring to the third STN_table( ) in FIG. 35, the audio stream #1 of the playback apparatus 141 shown in FIG. 36 decoded by the first audio decoder 75-1 and the audio stream #2 decoded by the second audio decoder 75-2 can be selected separately by the user. Alternatively, combinations of audio streams #1 and audio streams #2 that can be mixed may be determined, and the user is instructed to select a combination of audio streams to be mixed. That is, combinations of audio streams #2 that can be played back together with audio streams #1 may be defined.

Definitions of combinations of streams to be played back are discussed below.

FIG. 37 illustrates a fourth example of the syntax of STN_table( ) (fourth STN_table( )) when combinations of audio streams #1 and audio streams #2 are defined. The playback processing performed by referring to the fourth STN_table( ) can be performed by the playback apparatus 141 shown in FIG. 36. In FIG. 37, portions similar to those in FIG. 35 are not explained for avoiding repetitions.

In FIG. 37, in the FOR loop of the audio stream ID2 (audio_stream_id2), audio_stream_id2 is assigned from 0 to one audio elementary stream specified for each stream_entry( ). In this case, for audio_stream_id2, in addition to stream_entry( ) and stream_attributes( ), a new field, i.e., Combination_of_Primary_and_Secondary, is defined. Combination_of_Primary_and_Secondary is information for defining combinations of audio streams #1 (primary streams) and audio streams #2 (secondary streams). That is, information indicating which audio streams #1 can be combined with audio streams #2 represented by the audio stream ID2 (audio_stream_id2) is defined in the FOR loop of the audio stream ID2. In other words, audio streams #2 that can be combined with audio streams #1 can be defined in Combination_of_Primary_and_Secondary. Instead of defining audio streams ID2 to be combined with audio streams ID1 in the FOR loop of the audio streams ID1, audio streams ID1 and audio streams ID2 are defined separately, and combination of audio streams #1 and audio streams #2 are defined in the FOR loop of the audio streams ID2. With this configuration, even if the number of audio streams ID1 to be registered is fixed, combinations of audio streams ID1 with audio streams ID2 do not count toward the number of registrations. Thus, the number of audio streams that can be registered can be used effectively.

As described with reference to FIG. 35, instead of the audio stream ID2 (audio_stream_id2), the audio stream number 2 (audio_stream_number2) may be used, in which case, audio_stream_number 2 is assigned from 1. That is, the number obtained by adding one to audio_stream_id2 is audio_stream_number2. The number is assigned from 1 since the audio stream number 2 is the number that can be seen from the user when switching sound.

An example of the bitmap syntax of Combination_of_Primary_and_Secondary shown in FIG. 37 is described below with reference to FIG. 38.

The bitmap syntax of Combination_of_Primary_and_Secondary shown in FIG. 38 is 32 bits. In FIG. 38, audio_stream_id indicates the audio_stream_id (audio stream ID) defined in the fourth STN_table( ) in FIG. 37, and the indicator designates a flag indicating audio_stream_id specifying the audio stream #1 that can be combined with the audio stream #2 specified by the corresponding audio_stream_id2 (audio stream ID2). That is, by a combination of audio_stream_id and indicator, audio_stream_id of the audio stream #1 that can be combined with the audio stream #2 represented by audio_stream_id2 can be specified.

As Combination_of_Primary_and_Secondary specified in the FOR loop of audio_stream_id2 in FIG. 37, Combination_of_Primary_and_Secondary is defined for each audio_stream_id2, and the audio stream #1 that can be combined with a certain audio stream #2 represented by audio_stream_id2 can be specified by audio_stream_id designated by the indicator.

More specifically, if the indicator is 0, the corresponding audio_stream_id2 is not associated with the audio stream #1 specified by audio_stream_id. If the indicator is 1, the corresponding audio_stream_id2 is associated with the audio stream #1 specified by audio_stream id.

FIG. 38 shows that two audio streams (audio streams #1) specified by audio_stream_id=0 and audio_stream_id=1 can be combined with the audio stream #2 specified by audio_stream_id2 (audio stream ID2).

Although in FIG. 38 the audio stream #1 is specified by audio_stream_id, the audio stream number may be used, in which case, the audio stream number is assigned from 1.

Since Combination_of_Primary_and_Secondary is defined by the 32-bit bitmap syntax, as shown in FIG. 38, an audio stream #2 can be defined for each of the 32 audio streams #1.

According to FIGS. 37 and 38, combinations of audio streams #1 and audio streams #2 can be defined by using audio_stream_id, audio_stream_id2, and Combination_of_Primary_and_Secondary. That is, inconsistent combinations of audio streams are not defined, and this enables the user to select a combination of audio streams that can always be played back.

A specific example is discussed below with reference to FIG. 39. FIG. 39 illustrates an example of a stream number table indicating the relationship between audio signals and subtitle stream subtitle signals provided to users. A description of subtitle signals (sub-pictures) is similar to that in FIG. 26, and an explanation thereof is thus omitted.

In FIG. 39, each of the audio streams #1 (audio streams specified by audio_stream_id) entered in the fourth STN_table( ) of PlayItem( ) forming the Main Path of a PlayList is provided with A_SN.

More specifically, audio 2 is assigned to A_SN=1, audio 1 is assigned to A_SN=2, and audio 3 is assigned to A_SN=3.

In this case, audio 4 (audio_stream_id2=0, i.e., audio stream number 2 is 1) can be combined with audio 2 associated with A_SN=1. Audio 4 (audio_stream_id2=1, i.e., audio stream number 2 is 1) and audio 5 (audio_stream_id2=1, i.e., audio stream number 2 is 2) can be combined with audio 1 associated with A_SN=2.

More specifically, for audio 4 (audio_stream_id2=0), in the bitmap syntax of Combination_of_Primary_and_Secondary in FIG. 38, the indicator values for audio_stream_id=0 and audio_stream_id=1 are 1, and the indicator values for audio_stream_id=2 through audio_stream_id=31 are all 0. For audio 5 (audio_stream_id2=1), in the bitmap syntax of Combination_of_Primary_and_Secondary in FIG. 38, the indicator value for audio_stream_id=1 is 1, and the indicator values for audio_stream_id=0, and audio_stream_id=2 through audio_stream_id=31 are all 0.

The user selects audio stream #1 to be played back from audio streams provided with A_SN, and selects audio stream #2 from audio streams indicated at the right side in FIG. 39. In the example in FIG. 39, if the user selects audio 2 (A_SN=1) as the audio stream #1, the audio stream #2 that can be mixed with the audio stream #1 is only audio 4, and thus, the user determines whether to select audio 4 to be combined with audio 2. In FIG. 39, audio 4 associated with audio 2 is indicated by X, which means that it is not combined with audio 2. The user changes X to O so that the mixing and playback of audio 2 and audio 4 is selected.

In FIG. 39, if the user selects audio 1 (A_SN=2) as audio stream #1, the audio stream #2 that can be mixed with audio #1 can be selected from audio 4 and audio 5 indicated at the right side in FIG. 39. Accordingly, the user determines whether to select audio 4 or audio 5. In FIG. 39, audio 4 and audio 5 associated with audio 1 are indicated by X, which means that neither of them is combined with audio 1. The user changes X to O so that the mixing and playback of audio 2 and audio 4 or audio 2 and audio 5 is selected.

A specific example of an instruction to select audio streams is given below. If the user gives an instruction to switch audio streams while selecting audio 2 associated with A_SN=1, the playback operation is switched to a combination of audio 2 and audio 4 (audio 4 corresponding to audio 2 is changed to O in FIG. 39). If the user further gives an instruction to switch audio streams, the playback operation is switched to audio 1 associated with A_SN=2 (audio 4 corresponding to audio 2 is changed to X in FIG. 39). If the user further gives an instruction to switch audio streams, the playback operation is switched to a combination of audio 1 and audio 4 (audio 4 corresponding to audio 1 is changed to O in FIG. 39). If the user further gives an instruction to switch audio streams, the playback operation is switched to a combination of audio 1 and audio 5 (audio 4 corresponding to audio 1 is changed to X and audio 5 is changed to O in FIG. 39).

Figure 40:
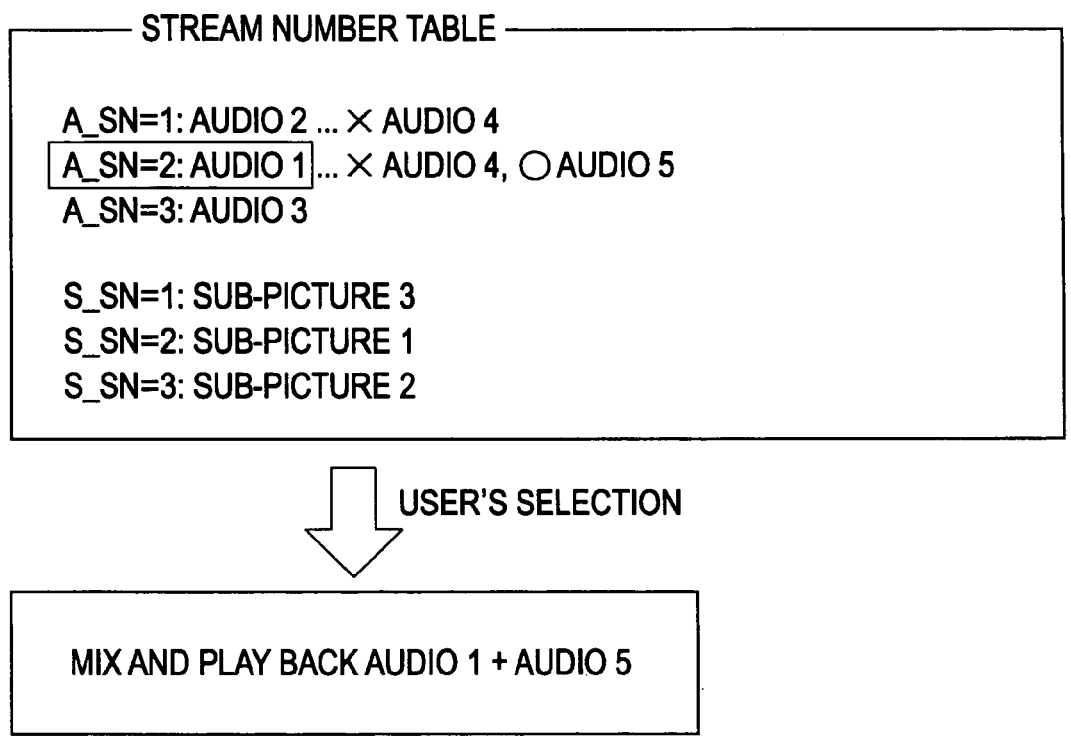
FIG. 40 illustrates another example in which two audio streams are mixed and played back.

By switching the selection of audio streams to be played back, the user can select a combination of audio 1 associated with A_SN=2 and audio 5, as shown in FIG. 40. Accordingly, audio 1 (audio stream #1) and audio 5 (audio stream #2) can be mixed and played back.

By using audio_stream_id, audio_stream_id2, and Combination_of_Primary_and_Secondary, a combination of audio stream #1 and audio stream #2 can be defined. Inconsistent combinations are not defined, and this enables the user to select a combination of audio streams that can always be played back. That is, in the example in FIG. 39, the user can select audio streams without selecting an inconsistent combination, such as audio 2 and audio 5.

In other words, in the fourth STN_table( ) (FIG. 37) in PlayItem( ), a combination of the audio stream #1 decoded by the first audio decoder 75-1 and the audio stream #2 decoded by the second audio decoder 75-2 shown in FIG. 36 can be defined by using Combination_of_Primary_and_Secondary. Accordingly, two audio streams can be mixed and played back. That is, from a plurality of types of streams, streams of the same type (in this case, audio streams) can be mixed (combined or superimposed) and played back simultaneously.

With this configuration, the user can select audio streams from a predetermined combination without the need to individually select two audio streams.

A description is now given, with reference to FIG. 41, a second example in which the user is instructed to select a combination of audio stream #1 and audio stream #2 from defined combinations. In other words, FIG. 41 shows a second example in which audio streams that can be mixed with audio streams #1 are defined as audio streams #2.

FIG. 41 illustrates a fifth example of the syntax of STN_table( ) (fifth STN_table( )) for defining combinations of audio streams #1 and audio streams #2. The playback processing performed by referring to the fifth STN_table( ) can be performed by the playback apparatus 141 shown in FIG. 36. In FIG. 41, portions similar to those in FIG. 35 are not explained for avoiding repetitions.

In FIG. 41, in the FOR loop of the audio stream ID2 (audio_stream_id2), audio_stream_id2 is assigned from 0 to one audio elementary stream whose recording position is specified for each stream_entry( ). In this case, number_of_combinations is defined for audio_stream_id2, and in the FOR statement after number_of_combinations, the same number of audio_stream_id as the number of number_of_combinations is given. The number_of_combinations and the FOR statement after number_of_combinations are information for defining combinations of audio streams #1 and audio streams #2, and the number of audio streams #1 that can be combined with the audio streams #2 specified by audio_stream_id2 is the number_of_combinations. The audio_stream_id specifying the audio streams #1 that can be combined with the audio streams #2 specified by the audio_stream_id2 is defined in the FOR statement after number_of_combinations.

That is, unlike the fourth STN_table( ) in FIG. 37, in the FOR statement of audio stream ID2 (audio_stream_id2) in the fifth STN_table( ) in FIG. 41, the number of audio streams #1 that can be combined with the audio streams #2 specified by the audio stream ID2 is defined by number_of_combinations, and in the FOR statement after number_of_combinations, audio_stream_id specifying the audio streams #1 is directly defined.

In this manner, in the fifth STN_table( ), information indicating which audio streams #1 are combined with the audio streams #2 specified by the audio stream ID2 (audio_stream_id2) is defined in the FOR statement after number_of_combinations of the audio stream ID2. In other words, in the FOR statement after number_of_combinations of the audio stream ID2, the audio streams #2 that can be combined with the audio streams #1 are defined.

As discussed with reference to FIG. 35, instead of the audio stream ID2 (audio_stream_id2), the audio stream number 2 (audio_stream_number2) may be used. Instead of the audio stream number ID (audio_stream_id), the audio stream number (audio_stream_number) may be used. That is, the audio stream number may substitute the audio_stream_id defined in the FOR statement after number_of_combinations.

In FIG. 41, by using number_of_combinations and the subsequent FOR statement, combinations of audio streams #1 and audio streams #2 can be defined. That is, inconsistent combinations of audio streams are not defined, and this enables the user to select a combination of audio streams that can always be played back.

A specific example of the stream number table is similar to that discussed with reference to FIGS. 39 and 40.

If the stream number table shown in FIG. 39 is applied to the fifth STN_table( ) in FIG. 41, as the audio streams #1 that can be combined with audio 4 (audio_stream_id2=0, i.e., audio stream number 2 is 1), audio 2 (audio_stream_id=0) associated with A_SN=1 and audio 1 (audio_stream_id=1) associated with A_SN=2 are defined. In this case, the number_of_combinations corresponding to audio_stream_id2=0 is 2, and the defined audio_stream_id is audio_stream_id=0 and audio_stream_id=1. Also, as the audio streams #1 that can be combined with audio 5 (audio_stream_id2=1, i.e., audio stream number 2 is 2), audio 1 (audio_stream_id=1) associated with A_SN=2 is defined. In this case, the number_of_combinations corresponding to audio_stream_id2=1 is 1, and the defined audio_stream_id is audio_stream_id=1.

By switching audio streams to be played back shown in FIG. 39, the user selects, for example, a combination of audio 1 and audio 5 associated with A_SN=2, as shown in FIG. 40. Then, the audio 1 (audio stream #1) and audio 5 (audio stream #2) can be mixed and played back.

As described above, by using number_of_combinations and the subsequent FOR statement, combinations of audio streams #1 and audio streams #2 can be defined. Inconsistent combinations are not defined, and this enables the user to select a combination of audio streams that can always be played back. For example, in FIG. 39, an inconsistent combination, e.g., audio 2 and audio 5, is not defined, thereby making it possible to provide only streams that can be selected by the user.

In other words, in the fifth STN_table( ) (FIG. 41) in PlayItem( ), combinations of audio streams #1 decoded by the first audio decoder 75-1 and audio streams #2 decoded by the second audio decoder 75-2 are defined in number_of_combinations and the subsequent FOR statement. Thus, two audio streams can be mixed and played back. That is, from a plurality of types of streams, streams of the same type (in this case, audio streams) can be mixed (combined or superimposed) and played back simultaneously.

By using the fifth STN_table( ), the user can select audio streams to be played back from a predetermined combination without the need to individually select two audio streams.

FIG. 42 illustrates a sixth example of the syntax of STN_table( ) (sixth STN_table( )) defining combinations of audio streams #1 and audio streams #2. The playback processing performed by referring to the sixth STN_table( ) can also be performed by the playback apparatus 141 shown in FIG. 36. In FIG. 42, portions similar to those in FIG. 35 or 41 are not explained for avoiding repetitions.

In the FOR loop of the audio stream ID (audio_stream_id) in FIG. 42, audio_stream id is assigned from 0 to one audio stream #1 specified for each stream_entry( ), as in the third STN_table( ) shown in FIG. 35. The stream_attributes( ) after the FOR loop of the audio stream ID is similar to that in the third STN_table( ) in FIG. 35.

In the sixth STN_table( ) in FIG. 42, however, the following information for defining combinations of audio streams #1 and audio streams #2 is included in the FOR loop of the audio stream ID (audio_stream_id). If number_of_audio_stream2_entries is not 0 (if (number_of_audio_stream2_entries!=0), number_of_audio_stream2_ref_entries is given. The number_of_audio_stream2_ref_entries indicates the number of audio streams #2 that can be combined with the audio streams #1 specified by audio_stream_id. The audio_stream2_id_ref specifying the audio streams #2 that can be combined with the stream #1 is defined after the FOR statement of number_of_audio_stream2_ref_entries.

As in the other examples of STN_table( ), the audio stream number 2 ref (audio_stream_number2_ref) may be used instead of the audio stream ID2 ref (audio_stream_id2_ref), and the audio stream number (audio_stream_number) may be used instead of the audio stream ID (audio_stream_id).

In this manner, combinations of the audio streams #1 and the audio streams #2 can be defined by referring to the sixth STN_table( ) in FIG. 42. That is, inconsistent combinations of audio streams are not defined, and this enables the user to select a combination of audio streams that can always be played back.

As stated above, an application format of data recorded on a recording medium installed in the playback apparatus of the present invention or on a local storage of the playback apparatus of the present invention is formed of two layers, i.e., a PlayList layer and a Clip layer. The PlayList includes a Main Path having at least one PlayItem (sequential PlayItems), and at least one Sub Path having at least one SubPlayItem (may be sequential or non-sequential SubPlayItems) disposed in parallel with the Main Path.

Figure 43:
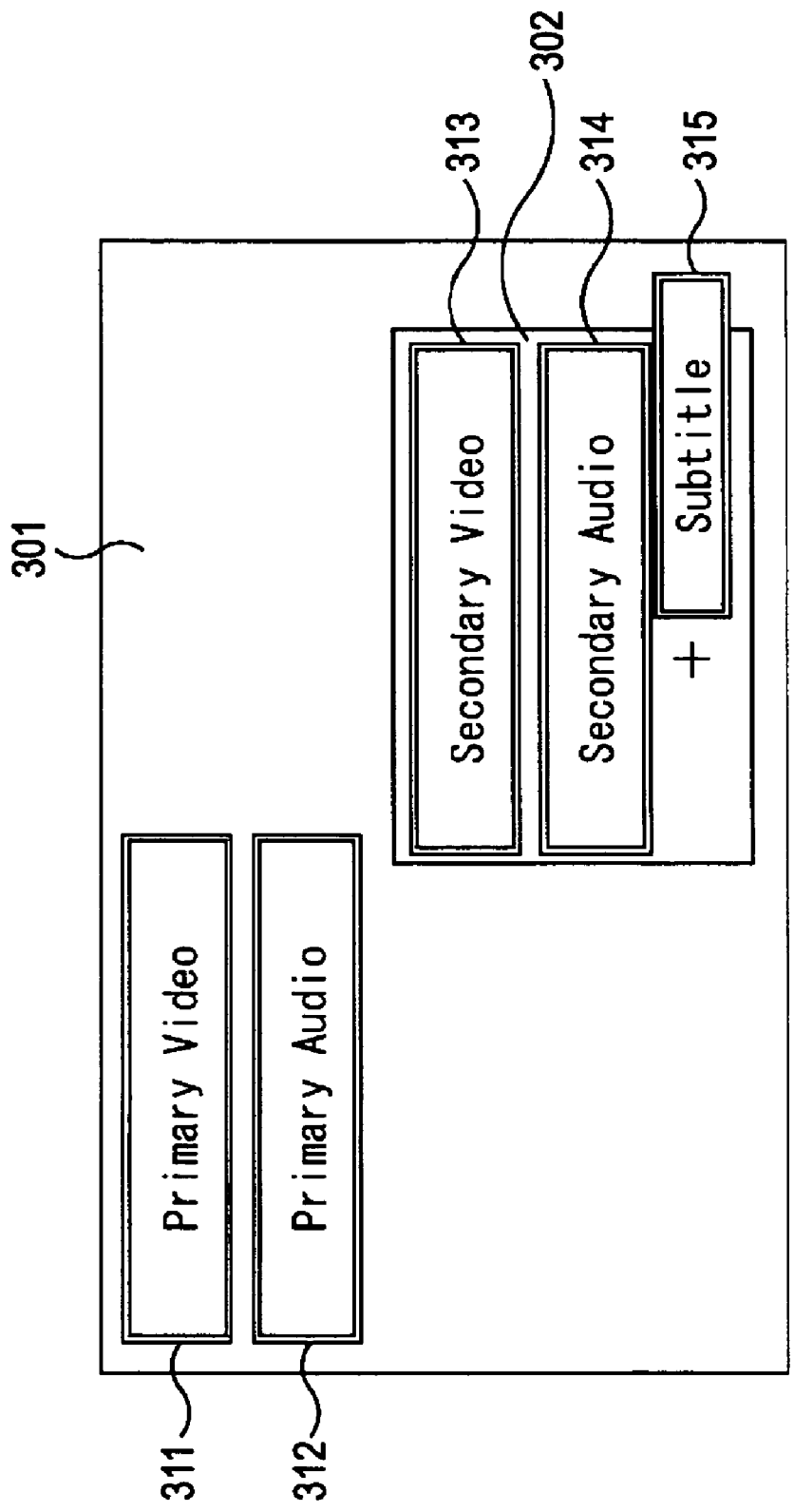
FIG. 43 illustrates a picture-in-picture technique.

With this configuration, as shown in FIG. 43, content, such as a movie, corresponding to AV streams (a video stream 311 indicated by Primary Video in FIG. 43 and an audio stream 312 indicated by Primary Audio in FIG. 43) referred to by the Main Path can be played back in a full screen 301, and content different from the AV streams referred to by the Main Path, for example, director's commentaries on the movie (a video stream 313 indicated by Secondary Video in FIG. 43 and an audio stream 314 indicated by Secondary Audio in FIG. 43) corresponding to AV streams referred to by a Sub Path, can be played back in a sub-screen 302 contained in the full screen 301.

That is, different content items can be simultaneously played back in the full (main) screen 301 and the sub-screen 302.

This technique is referred to as the "picture-in-picture" technique.

The sound corresponding to the audio stream 312 indicated by Primary Audio and the sound corresponding to the audio stream 314 indicated by Secondary Audio can be mixed and played back, as discussed above, which means that the two audio streams are mixed and output.

The real subject to be played back is sound or images corresponding to streams, as stated above. For the sake of simple description, however, it may be said that "a predetermined stream is played back" in the following description.

To implement an application using the picture-in-picture technique, the following syntax, for example, is necessary. In this embodiment, the number of video streams (hereinafter referred to as "primary video streams", for example, the video stream 311 indicated by Video Stream shown in FIG. 43 is referred to as the "primary video stream") defined by video_stream_id in STN_table( ) is one. By considering this fact, if a syntax defining combinations of streams that can be played back simultaneously with the primary video stream is prepared, the picture-in-picture technique, i.e., an application using the picture-in-picture technique, can be implemented.

In this embodiment, as the streams that can be played back simultaneously with the primary video stream by the picture-in-picture technique, the following four streams, i.e., the first through fourth types of streams, are prepared in this embodiment.

The streams of the first type are audio streams defined by audio_stream_id in STN_table( ), that is, the above-described audio streams #1 (hereinafter referred to as "primary audio streams", for example, the audio stream 312 indicated by Primary Audio shown in FIG. 43 is referred to as the "primary audio stream").

The streams of the second type are video streams defined by video_stream_id2 in STN_table( ) (hereinafter referred to as "secondary video streams", for example, the video stream 313 indicated by Secondary Video in FIG. 43 is referred to as the "secondary video stream").

The streams of the third type are audio streams defined by audio_stream_id2 in STN_table( ), that is, the above-described audio streams #2, (hereinafter referred to as "secondary audio streams", for example, the audio stream 314 indicated by Secondary Audio in FIG. 43 is referred to as the "secondary audio stream").

The streams of the fourth type are text subtitle streams (txtST) or streams (PG, Presentation Graphics streams) obtained by run-length-coding bitmap subtitles, such as DVD sub-pictures, referred to by a Sub Path. For example, a subtitle stream 315 indicated by Subtitle in FIG. 43 is an example of the streams of the fourth type. The streams of the fourth type, i.e., txtST and PG, are referred to as "subtitle streams". It is not necessary that subtitle streams be played back (displayed) in the sub-screen, and may be displayed at any position in the full screen. Accordingly, the subtitle stream 315 is outside the sub-screen 302 in the example of FIG. 43.

As discussed above, to implement an application using the picture-in-picture technique, it is necessary to define combinations of streams, i.e., secondary video streams, primary audio streams, secondary audio streams, and subtitle streams, that can be played back simultaneously with a primary video stream.

By defining a plurality of combinations, not only the primary video stream or the primary audio stream displayed on the full screen 301, secondary video streams or subtitle streams displayed in the sub-screen 302 can be easily switched. An example of the switching operation is discussed below with reference to FIGS. 46 and 47.

The definition of combinations of streams that can be played back simultaneously with a primary video stream can be provided in, for example, a seventh STN_table( ) shown in FIGS. 44 and 45. FIGS. 44 and 45 illustrate a seventh example of the syntax of STN_table( ) (seventh STN_table( )) for defining combinations of secondary video streams, primary audio streams, secondary audio streams, and subtitle streams that can be played back together with a primary video stream, recording positions (stream_entry), and attributes (stream_attribute) thereof. In FIGS. 44 and 45, portions similar to those shown in FIG. 41 are not explained for avoiding repetitions.

In the example shown in FIGS. 44 and 45, combinations of secondary video streams, primary audio streams, secondary audio streams, and subtitle streams that can be played back together with a primary video stream are defined as follows. First, at least one secondary video stream that can be played back simultaneously with the primary video stream is defined. Then, audio streams (primary audio streams and secondary audio streams) and subtitle streams that can be played back simultaneously with each of the secondary video streams are defined.

More specifically, in FIG. 44, number_of_video_stream2_entries indicates the number of streams provided with video_stream_id2 and entered (registered) in the seventh STN_table( ). The video_stream_id2 is information for identifying secondary video streams, and video_stream_number2 is the secondary video stream number that can be seen from the user when switching video.

In FIG. 45, in the FOR loop of the video stream ID2 (video_stream_id2), video_stream_id2 is assigned from 0 to one secondary video elementary stream (video elementary stream serving as a secondary video stream) specified for each stream_entry( ).

For video_stream_id2, the number_of_Audio_combinations_for_video2 is provided. In the subsequent FOR statement, the same number of audio_stream_id and audio_stream_id2 as that of number_of_Audio_combinations_for_video2 are provided. The number_of_Audio_combinations_for_video2 and the subsequent FOR statement serve as information for defining combinations of primary audio streams specified by audio_stream_id and the secondary audio streams specified by audio_stream_id2 that can be played back simultaneously with the second video stream. The number of audio streams (primary audio streams and secondary audio streams) that can be combined with the secondary video stream specified by video_stream id2 is number_of_Audio_combinations_for_video2. Then, in the FOR statement after number_of_Audio_combinations_for_video2, audio_stream_id specifying the primary audio streams and audio_stream_id2 specifying the secondary audio streams that can be combined with the secondary video stream are defined.

For the same video_stream_id2, number_of_Subtitle_combinations_for_video2 is provided. In the subsequent FOR statement, the same number of PG_textST_stream_id as the number of number_of_Subtitle_combinations_for_video2 are provided. The number_of_Subtitle_combinations_for_video2 and the subsequent FOR statement serve as information for defining combinations of subtitle streams that can be played back simultaneously with the secondary video stream. The number of subtitle streams that can be combined with the secondary video stream specified by video_stream_id2 is number_of_Subtitle_combinations_for_video2. Then, in the FOR statement after number_of_Subtitle_combinations_for_video2, PG_textST_stream_id specifying subtitle streams that can be combined with the secondary video stream specified by video_stream_id2 is defined.

As in the other examples of STN_table( ), the audio stream number (audio_stream_number) may be used instead of audio_stream_id, and the audio stream number 2 may be used instead of audio_stream_id2. The same applies to video streams and subtitle streams.

According to the seventh STN_table( ) shown in FIGS. 44 and 45, secondary video streams that can be played back together with the primary video stream can be defined by video_stream_id2. Then, by using video_stream_id2, audio_stream_id, audio_stream_id2, and PG_textST_stream_id primary audio streams, secondary audio streams, and subtitle audio streams that can be played back simultaneously with each of the secondary video streams can be defined. That is, combinations of the secondary video streams, primary audio streams, secondary audio streams, and subtitle audio streams that can be played back simultaneously with the primary video stream can be defined.

With this configuration, inconsistent combinations of the primary video stream and secondary video streams, primary audio streams, secondary audio streams, and subtitle audio streams that can be played back simultaneously with the primary video stream are not defined. Accordingly, the user can easily select a stream that can be combined with the primary video stream.

A specific example is described below with reference to FIGS. 46 and 47. FIG. 46 illustrates a stream number table, provided to users, indicating combinations of audio signals associated with primary audio streams or secondary audio streams, video signals associated with secondary video streams, and subtitle signals associated with subtitle streams when the seventh STN_table( ) is used. The sound numbers and subtitle numbers are similar to those discussed with reference to FIG. 26 or 39, and an explanation thereof is thus omitted.

In FIG. 46, each of the secondary video streams specified by video_stream_id2 entered in the seventh STN_table( ) of the PlayItem forming the Main Path of the PlayList is provided with V2_SN (Video2 Stream Number (secondary video stream number)).

More specifically, video 2 is assigned to V2_SN=1, and video 1 is assigned to V2_SN2=2.

In this case, for video 2 associated with V2_SN=1, audio 2 (primary audio stream entered in audio_stream_id in the FOR statement when video_stream_id2 specifies video 2 in FIG. 45) as a primary audio stream, audio 4 (secondary audio stream entered in audio_stream_id2 in the FOR statement when video_stream_id2 specifies video 2 in FIG. 45) as a secondary audio stream, and sub-picture 3 (subtitle stream entered in PG_textST_stream_id in the FOR statement when video_stream_id2 specifies video 2 in FIG. 45) as a subtitle stream can be combined.

For video 1 associated with V2_SN=2, audio 1 (primary audio stream entered in audio_stream_id in the FOR statement when video_stream_id2 specifies video 1 in FIG. 45) as a primary audio stream, audio 4 or audio 5 (each of secondary audio streams entered in audio_stream_id2 in the FOR statement when video_stream_id2 specifies video 1 in FIG. 45) as a secondary audio stream, and sub-picture 1 (subtitle stream entered in PG_textST_stream_id in the FOR statement when video_stream_id2 specifies video 1 in FIG. 45) as a subtitle stream can be combined.

In the FOR statement when video_stream_id2 is video 1 in FIG. 45, a first combination and a second combination are defined as combinations of audio streams that can be played back simultaneously with video 1 associated with V2_SN=2. The first combination is audio 1 as the primary audio stream and audio 4 as the secondary audio stream. The second combination is audio 1 as the primary audio stream and audio as the secondary audio stream.

When the stream number table shown in FIG. 46 is provided (how to provide to the user is not restricted), the user first selects (by operation) one of video 2 (VS_SN=1) or video 1 (VS_SN=2) as the secondary video stream associated with video, for example, director's commentaries that are played back simultaneously with a movie, as the secondary video stream corresponding to video displayed on the sub-screen (sub-screen 302 in the example in FIG. 43).

If, for example, the video 2 (VS_SN=1) is selected as the secondary video stream, the combination of primary and secondary audio streams and subtitle streams that can be played back at the same time with video 2 is, as shown in FIG. 46, the combination of audio 2, audio 4, and sub-picture 3 only. Accordingly, when video 2 (VS_SN=1) is selected as the secondary video stream, the user does not perform selection any further.

Figure 47:
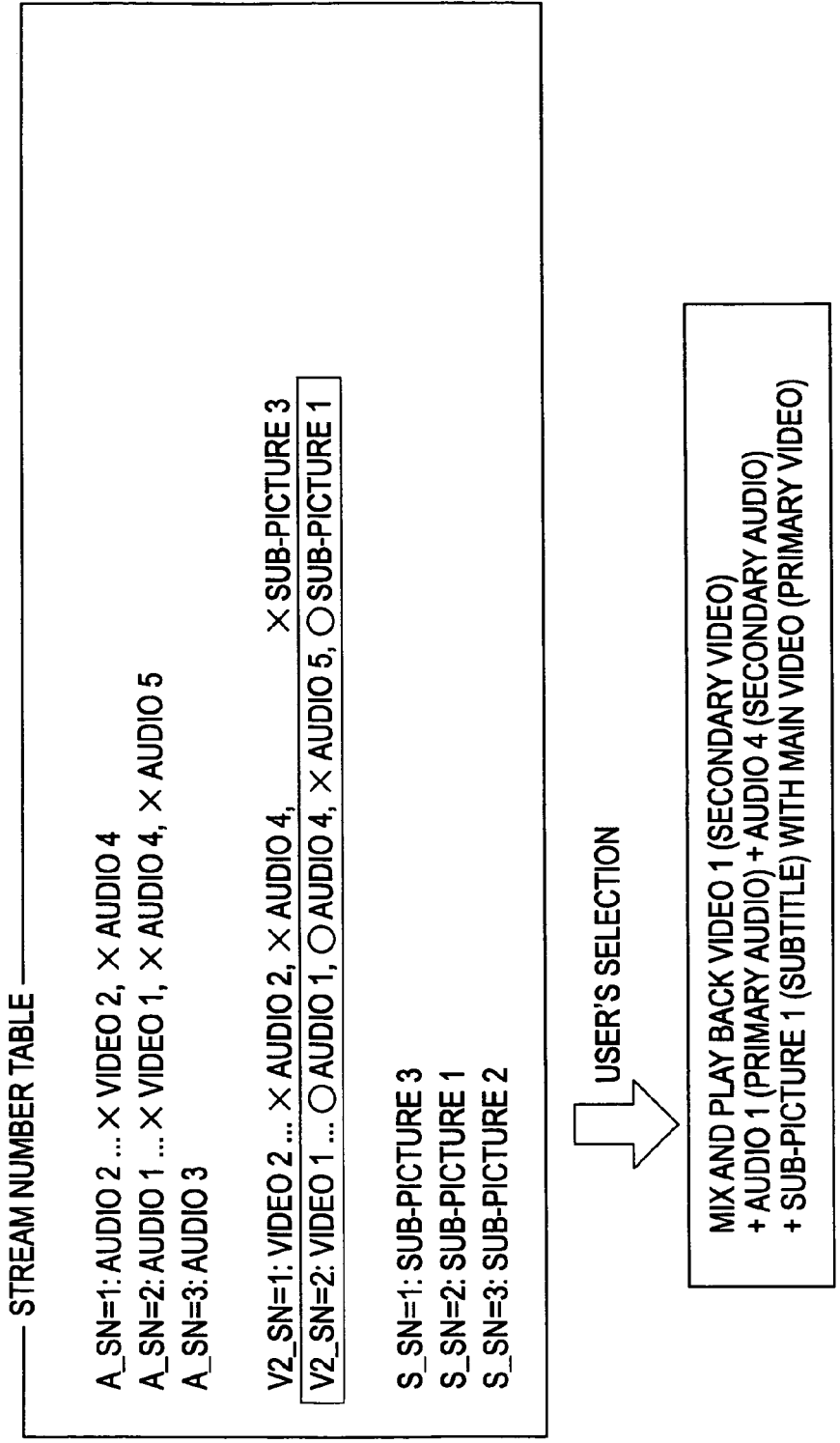
FIG. 47 illustrates a user selection operation for selecting a combination of a secondary video stream, a primary audio stream, a secondary audio stream, and a subtitle stream that can be played back together with a primary video stream.

On the other hand, if, for example, video 1 (VS_SN=2), is selected as the secondary video stream, as the combinations of primary and secondary audio streams and subtitle streams that can be played back at the same time with video 1 is, as shown in FIG. 47, there are two combinations, i.e., a first combination of audio 1, audio 4, sub-picture 1 and a second combination of audio 1, audio 5, and sub-picture 1. Accordingly, when video 1 (VS_SN=2) is selected, the user can select one of the first combination and the second combination.

More specifically, in a manner similar to the selection operation discussed with reference to FIG. 39, when the user selects a stream (to the right side of the display corresponding to the stream number table) to be played back simultaneously with video 1 (VS_SN=2), the user changes the symbol X to O, and when the user does not select that stream, the user maintains the symbol X. As discussed with reference to FIG. 39, O is a symbol indicating that the user has selected the corresponding stream to be played back, and X is a symbol indicating that the user has not selected the corresponding stream to be played back.

FIG. 47 illustrates an example in which the first combination of audio 1, audio 4, and sub-picture 1 has been selected. More specifically, since audio 1 is selected, as shown in FIG. 47, as the primary audio stream that is played back simultaneously with video 1 (V2_SN=2), the selection state of audio 1 is changed from X to O. Since audio 4 is selected (since audio 5 is not selected) as the secondary audio stream that is played back simultaneously with video 1, the selection state of audio 4 is changed from X to O. In contrast, the selection state of audio 5 is maintained at X. Since sub-picture 1 is selected as the subtitle stream that is played back simultaneously with video 1, the selection state of sub-picture 1 is changed from X to O.

According to the above-described series of selection operations, video 1, audio 1, audio 4, and sub-picture 1 are selected and are ready to be played back with the main video (primary video stream).

In the above-described example, as the selection operation for streams that can be played back simultaneously with a primary video stream, a secondary video stream is selected first, and then, a primary audio stream, a secondary audio stream, and a subtitle stream are selected based on the secondary video stream.

However, the selection operation is not restricted to the above type. For example, a primary audio stream may be selected first, and then, a secondary video stream, a secondary audio stream, and a subtitle stream may be selected. More specifically, in the stream number table shown in FIG. 47, audio 2 associated with A_SN=1, audio 1 associated with A_SN=2, or audio 3 associated with A_SN=3 is first selected as the primary audio stream, and then, a secondary video stream, a secondary audio stream, and a subtitle stream may be selected, as in the selection operation discussed with reference to FIG. 39.

Alternatively, a subtitle stream may be selected first, and then, a primary audio stream, a secondary video stream, and a secondary audio stream may be selected. More specifically, in the stream number table shown in FIG. 47, sub-picture 3 associated with S_SN=1, sub-picture 1 associated with S_SN=2, or sub-picture 2 associated with S_SN=3 is first selected as the subtitle stream, and then, a secondary video stream, a primary audio stream, and a secondary audio stream are selected although this selection operation is not shown in FIG. 47.

In this embodiment, the user is prohibited to switch secondary audio streams. Accordingly, in the example in FIG. 47, the secondary audio streams are not provided with A_SN. That is, audio 1, audio 2, and audio 3 are used as primary audio streams, and audio 4 and audio 5 are used as secondary audio streams.

Figure 48:
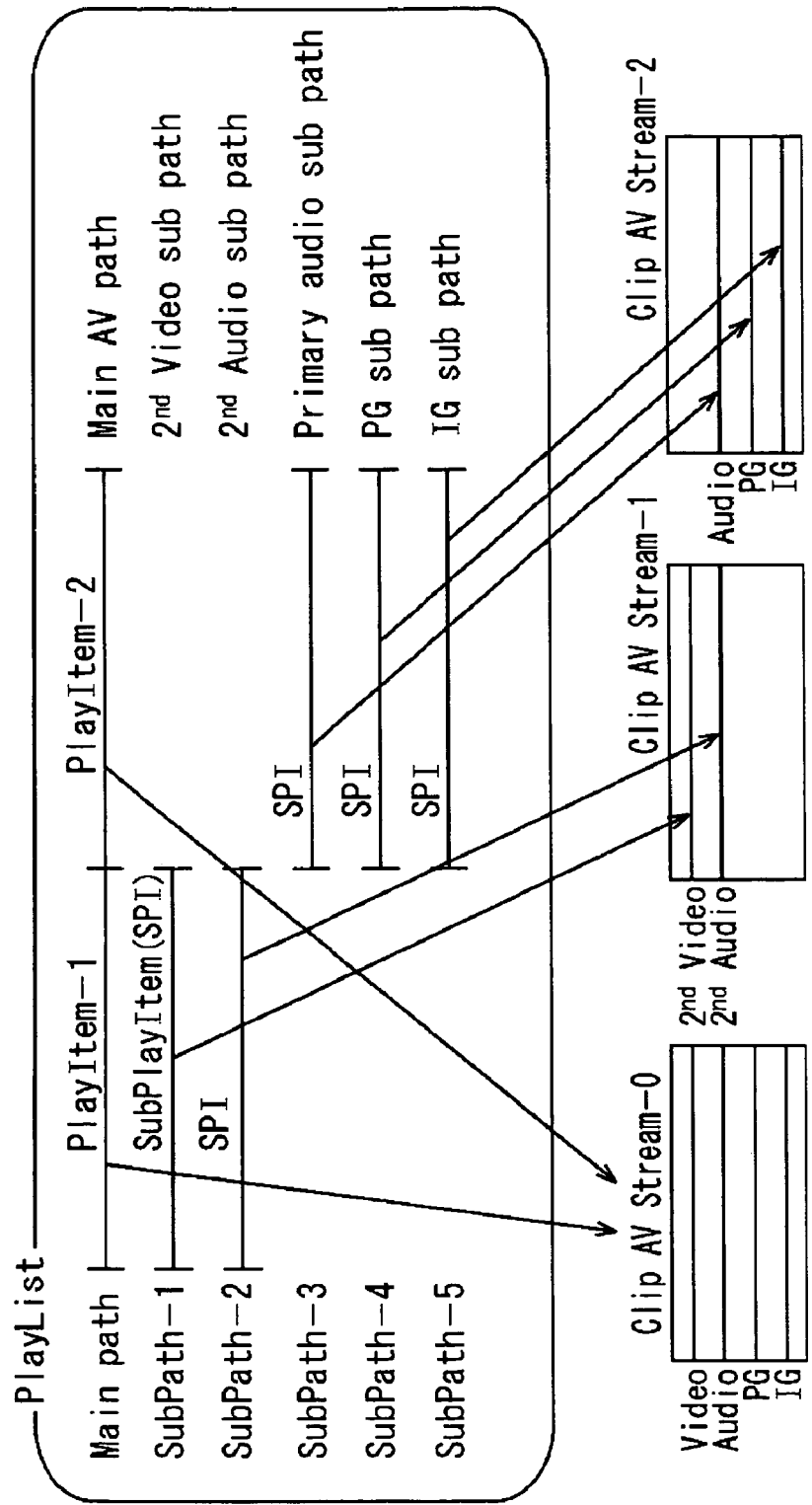
FIG. 48 illustrates a PlayList generated by using SubPath_type shown in FIG. 11 to implement the picture-in-picture technique.

If the picture-in-picture technique is implemented by using the syntax of the seventh STN_table( ) shown in FIGS. 44 and 45, a PlayList shown in FIG. 48 can be generated if SubPath_type shown in FIG. 11 is used.

In FIG. 48, Video (video stream) and Audio (audio stream) included in a clip AV stream file-0 (main clip AV stream file) referred to by PlayItem 1 (PlayItem-1) forming the Main Path are used as the primary video stream and the primary audio stream, respectively. In this case, type=1 is set in stream_entry( ) corresponding to video_stream_id and audio_stream_id in STN_table( ). In the example in FIG. 43, Video and Audio contained in the clip AV stream file-0 are the primary video stream 311 and the primary audio stream 312, respectively. The primary video stream 311 is played back in the full screen 301, and at the same time, the primary audio stream 312 is played back (output).

Secondary Video (video stream) contained in a clip AV stream file-1 (sub-clip AV stream file) referred to by a Sub-PlayItem (SPI) contained in Sub Path 1 is used as the secondary video stream, and Secondary Audio (audio stream) contained in the clip AV stream file-1 (sub-clip AV stream file) referred to by a SubPlayItem (SPI) contained in Sub Path 2 is used as the secondary audio stream. In this case, type=2 is set in stream_entry( ) corresponding to video_stream_id2 and audio_stream_id2. In the example in FIG. 43, Secondary Video and Secondary Audio contained in the main clip AV stream file-1 are the secondary video stream 313 and the secondary audio stream 314, respectively. The secondary video stream 313 is played back in the sub-screen 302, and at the same time, the secondary audio stream 314 is played back (output).

Playing back Audio contained in the main clip AV stream file-0 in the full screen 301 and playing back Secondary Audio contained in the sub-clip AV stream file-1 in the sub-screen 302 means that the two audio streams are mixed and played back, as described above.

As described above, in the example in FIG. 48, the example shown FIG. 11 is used as SubPath_type, and as a result, the picture-in-picture technique is implemented by the Main Path, Sub Path 1, and Sub Path 2.

In the example in FIG. 48, the secondary video stream and the secondary audio stream that are played back simultaneously with the primary video stream contained in the main clip AV stream file-0 are defined by different Sub Paths, i.e., the Sub Path 1 and Sub Path 2, even though they are contained in the same clip AV stream file-1. This is because, in FIG. 11, only Sub Path types indicating that only one ES (elementary stream) can be referred to by each Sub Path are prepared. That is, in SubPath_type in FIG. 11, one Sub Path type is assigned to each ES of a plurality of ESs, such as audio, IG, text, and video ESs, regardless of whether they are contained in the same clip AV stream file.

This is not restricted to the example in FIG. 48. By the use of SubPath_type shown in FIG. 11, if there are two or more ESs to be played back, such ESs are referred to by different Sub Paths, i.e., they are defined as different SubPlayItems.

In this case, the two or more ESs should define certain information, such as SubPlayItem_IN_time and SubPlayItem_OUT_time, separately from each other even though such information is the same since they are contained in the same clip AV stream file. As a result, the information, such as SubPlayItem_IN_time and SubPlayItem_OUT_time, becomes redundant (first problem).

Additionally, a Sub Path should be defined for each elementary path to be played back, which makes the structure of the PlayList complicated (second problem).

The second problem causes the following third problem.

Moreover, in this embodiment, a restriction is imposed on the playback apparatus (playback apparatus 141 shown in FIG. 36 or playback apparatus 401 shown in FIG. 53) such that it can read only two TS (i.e., TSs contained in two clips) simultaneously. Under this restriction, when playing back a PlayList having a complicated structure, the playback apparatus cannot decide immediately which Sub Path should be combined with the Main Path defined in the PlayList. In other words, to decide a combination of the Main Path and a Sub Path, processing becomes complicated (third problem).

Accordingly, to solve the above-described first through third problems, the present inventor has invented the following technique. A Sub Path type that allows a plurality of ESs to be handled, i.e., that allows a plurality of ESs to be referred to at the same time, is added as SubPath_type. A second example of such SubPath_type is shown in FIG. 49.

That is, FIG. 49 illustrates the second example of SubPath_type, which is different from the example shown in FIG. 11. That is, Sub Path types that can solve the above-described first through third problems are added. In other words, to solve the first through third problems, the second SubPath_type shown in FIG. 49 is employed.

In FIG. 49, Sub Path_type=0 through 4 are the same as those of FIG. 11, and an explanation thereof is thus omitted.

However, in the meaning of Sub Path_type=0 through 4 in FIG. 49, "out-of-mux", which is not explained in FIG. 11, is contained. The "out-of-mux" means that a TS containing the ES referred to by a Sub Path is different from a TS containing the ES referred to by the Main Path, that is, the ES referred to by a Sub Path is not multiplexed into the TS contained in a PlayItem referred to by the Main Path. Such a Sub Path type is referred to as a "Main Path-TS non-multiplexed type".

As in SubPath_type=2 or 3, when the ES referred to by the Main Path is not synchronized with the ES referred to by a Sub Path, such a Sub Path type is hereinafter referred to as an "AV non-synchronized type". On the other hand, as in Sub-Path_type=4 or 5, when the ES referred to by the Main Path is synchronized with the ES referred to by a Sub Path, such as a Sub Path type is hereinafter referred to as a "synchronized type".

SubPath_type=5 indicates "out-of-mux and AV synchronized type of one or more elementary streams path (primary audio/PG/IG/secondary audio path)" and "out-of-mux and AV synchronized type of picture-in-picture presentation path which contains one or more elementary stream paths". That is, SubPath_type=5 is the Main Path-TS non-multiplexed type and synchronized type of at least one elementary stream path (Primary audio/PG/IG/Secondary audio path) or a picture-in-picture presentation path.

That is, SubPath_type=5 encompasses the types indicated by SubPath_type=5 and SubPath_type=6 shown in FIG. 11, and thus includes the Secondary Audio Presentation path (path for referring to the secondary audio stream) and the secondary video presentation path (path for referring to the secondary video stream).

The picture-in-picture presentation path includes, in the above-described picture-in-picture technique (FIG. 43), at least one path referring to a primary audio stream, a secondary video stream, a secondary audio stream, and a subtitle stream that is combined with a predetermined video stream (video stream referred to by the Main Path).

SubPath_type=6 indicates "out-of-mux and AV non-synchronized type of picture-in-picture presentation path which contains one or more elementary stream paths". That is, Sub-Path_type=6 is the Main Path-TS non-multiplexed type and non-synchronized type of a picture-in-picture presentation path (including at least one ES).

SubPath_type=7 indicates "in-mux type and AV synchronized type of picture-in-picture presentation path which contains one or more elementary stream paths".

In this case, "in-mux" indicates that a TS containing the ES referred to by a Sub Path is the same Sub Path type as a TS containing at least one ES referred to by the Main Path. In other words, the main clip AV stream and a sub-clip AV stream are contained in the main TS included in the main clip. Such a type is referred to as the "Main Path-TS multiplexed type".

That is, SubPath_type=7 is the Main Path-TS multiplexed type and synchronized type of a picture-in-picture path (including at least one ES).

Sub Path_type=8 through 255 are reserved.

In SubPath_type shown in FIG. 49, new types, i.e., Sub-Path_type=5, 6, and 7 can be used. In SubPath_type=7, the main TS referred to by the PlayItem, i.e., the main clip AV stream, includes a sub TS referred to by a Sub Path. Accordingly, instead of Stream_entry( ) discussed with reference to FIG. 17, the third Stream_entry( ) shown in FIG. 50 in which type=3 (which is different from type=3 defined in Stream_entry( ) in FIG. 15) is defined.

Type=3 defined in the third Stream_entry( ) is used for identifying an elementary stream referred to by a Sub Path and contained in the main clip when SubPath_type=7.

In FIG. 50, portions similar to those in FIG. 17 are not explained.

When type=3, a Sub Path refers to the same clip as that referred by the Main Path, in other words, a plurality of elementary streams are multiplexed into the main clip, and both the Main Path and Sub Path refer to one of the elementary streams. In this case, when SubPath_type=7, for specifying the elementary stream referred to by the Sub Path from the plurality of elementary streams multiplexed into the main clip, the packet ID (PID) of the main clip is designated by ref_to_stream_PID_of_MainClip. Then, SubPath_id is specified by ref_to_SubPath_id, and the Sub Path defined in PlayList( ) shown in FIG. 9 is specified by SubPath_id. The corresponding SubPlayItem (FIG. 10) is called from the Sub Path so that the playback time of the elementary stream (IN_time and OUT_time) can be specified (FIG. 12).

As discussed above, by using the types (three types, i.e., type 1 through type 3), when a PlayItem and at least one Sub Path played back in association with the PlayItem are provided, one elementary stream can be specified from the clip referred to by the PlayItem even when the clip is also referred to by the Sub Path.

Figure 51:
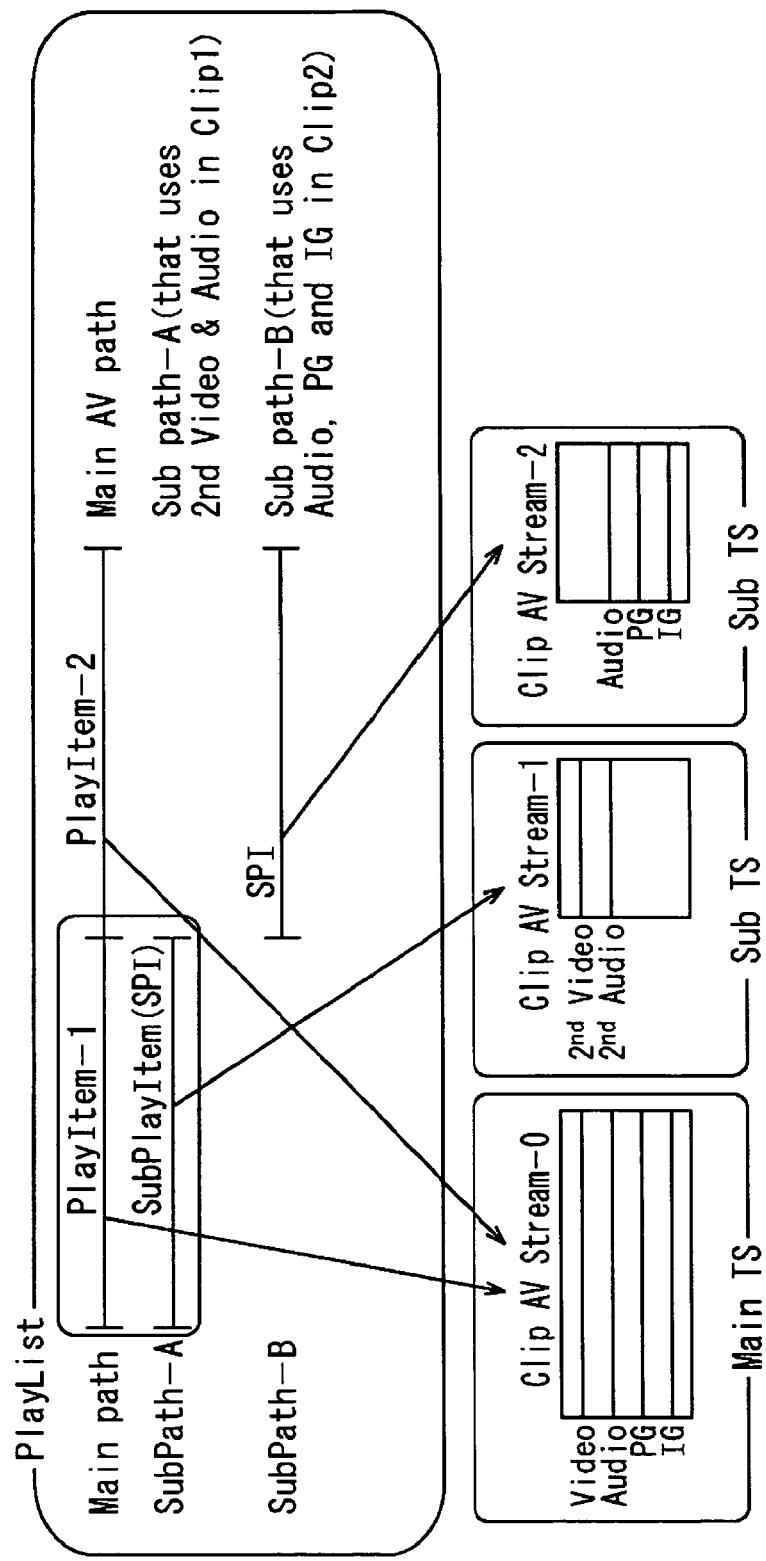
FIG. 51 illustrates an example of PlayList generated by using SubPath_type shown in FIG. 49 to implement the picture-in-picture technique.

By using SubPath_type shown in FIG. 49, i.e., by using SubPath_type 5, 6, and 7 that can handle at least one new elementary stream in addition to SubPath_type=1 through 4, which are contained in the SubPath_type in FIG. 11, a simple PlayList, such as that shown in FIG. 51, can be created and used instead of a complicated PlayList, such as that shown in FIG. 48, to implement the picture-in-picture technique (see FIG. 43).

In the example in FIG. 51, Video and Audio contained in the clip AV stream file-0 referred to by PlayItem 1 contained in the Main Path are used as the primary video stream and the primary audio stream, respectively. In the example in FIG. 43, Video and Audio contained in the clip AV stream file-0 correspond to the primary video stream 311 and the primary audio stream 312, respectively. The primary video stream 311 is played back in the full screen 301, and at the same time, the primary audio stream 312 is played back (output).

In STN_table( ), stream_entry( ) is defined in each of video_stream_id, audio_stream_id, video_stream_id2, and audio_stream_id2. Then, in stream_entry( ) in FIG. 50, type=1 in which an elementary stream is contained in the main clip and is specified by the Main Path, type=2 in which an elementary stream is contained in a Sub Path and is specified by a Sub Path, and type=3 in which an elementary stream is contained in the main clip and is specified by a Sub Path are defined. Accordingly, it is possible that a primary audio stream (audio stream indicated by audio_stream_id) be specified by a Sub Path. Similarly, it is possible that a primary video stream (video stream indicated by video_stream_id) be specified by a Sub Path. However, the primary video stream is considered as the principal AV data, it is specified by the Main Path. If the primary video stream is defined by a Sub Path, it is only necessary to change or add the definition of SubPath_type.

As in the example in FIG. 48, in the example in FIG. 51, the secondary video stream and the secondary audio stream that are played back simultaneously with the primary video stream in the clip AV stream file-0 are contained in the same clip AV stream file-1.

In the example in FIG. 51, as the Sub Path A (subPath-A) type, SubPath_type=5 is used, and more specifically, the Main Path-TS non-multiplexed type and synchronized type of the picture-in-picture presentation path is used. Accordingly, the SubPlayItem (SPI) referred to by the Sub Path A (SubPath-A) can refer to the secondary video stream and the secondary audio stream contained in the clip AV stream file-1 at the same time. In the example in FIG. 43, Secondary Video and Secondary Audio contained in the clip AV stream file-1 referred to by the only Sub Path A (SubPath-A) correspond to the secondary video stream 313 and the secondary audio stream 314, respectively. Then, the secondary video stream 313 is played back in the sub-screen 302, and at the same time, the secondary audio stream 314 is played back (output).

In this case, if SubPath_type=5 is used as the Sub Path A (SubPath-A), the secondary video stream 313 and the secondary audio stream 314 are played back in synchronization with the primary video stream 311.

In other words, if it is desired or necessary that the secondary video stream 313 and the secondary audio stream 314 be played back asynchronously with the primary video stream 311, SubPath_type=6, i.e., the Main Path-TS non-multiplexed and non-synchronized type of a picture-in-picture presentation path (including at least one ES), is selected as the Sub Path A (SubPath-A).

As discussed above, in the example in FIG. 51, by using SubPath_type in FIG. 49, the picture-in-picture technique can be implemented by using only the Main Path and one Sub Path (for example, Sub Path A in FIG. 50).

More specifically, to implement the picture-in-picture technique in which Secondary Video and Secondary Audio contained in the same clip AV stream file-1 are used as the secondary video stream 313 and the secondary audio stream 314, respectively, the secondary video stream 313 and the secondary audio stream 314 are referred to by two different Sub Paths in the PlayList shown in FIG. 48 generated by using the SubPath_type shown in FIG. 11. In contrast, according to the PlayList shown in FIG. 51 generated by using SubPath_type shown in FIG. 49, Secondary Video and Secondary Audio contained in the same clip AV stream file-1 can be referred to by one Sub Path.

As a result, Secondary Video and Secondary Audio can share the same information, such as SubPlayItem_IN_time and SubPlayItem_OUT_time. Thus, the above-described first problem can be solved.

Additionally, upon comparing the PlayList in FIG. 51 with that in FIG. 48, it is seen that the structure of the PlayList can be simplified. Thus, the above-described second and third problems can be solved.

Figure 52:
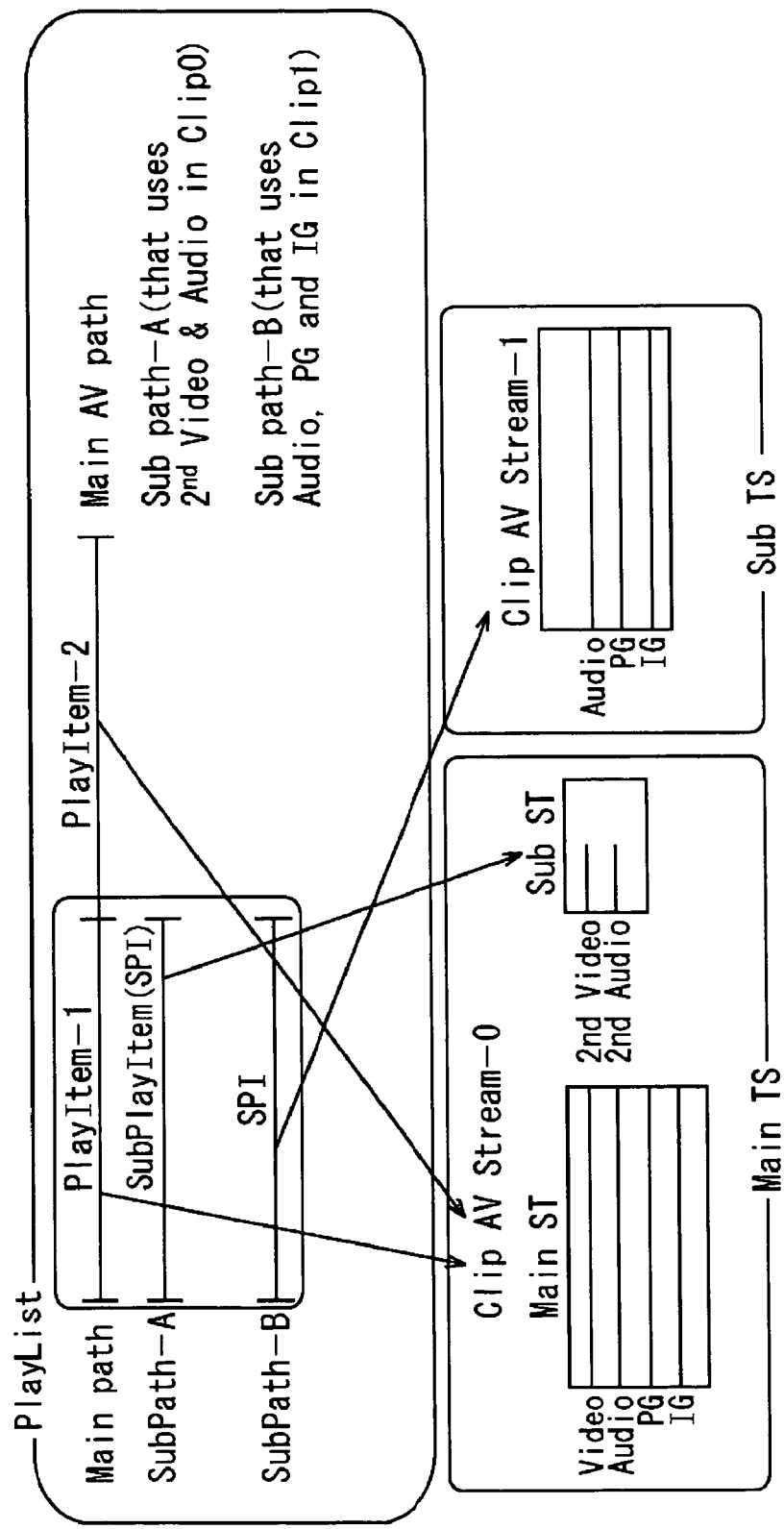
FIG. 52 illustrates another example of PlayList generated by using SubPath_type shown in FIG. 49 to implement the picture-in-picture technique.

By using SubPath_type=7 among SubPath_type categories shown in FIG. 49, i.e., the Main Path-TS multiplexed type and synchronized type of a picture-in-picture presentation path (including at least one ES), a PlayList shown in FIG. 52 can be generated. As a result, the picture-in-picture technique using the PlayList shown in FIG. 52 can be easily implemented.

In the PlayList in FIG. 52, the clip AV stream file-0 (which is different from the clip AV stream file-0 shown in FIG. 51) is contained in the main TS referred to by PlayItem 1 (PlayItem1) contained in the Main Path. The clip AV stream file-0 includes the main ST referred to by PlayItem 1 and a SubST referred to by a SubPlayItem. Video (video stream) and Audio (audio stream) contained in the main stream are used as the primary video stream and the primary audio stream, respectively. In the example in FIG. 43, Video and Audio of MainST contained in the clip AV stream file-0 correspond to the primary video stream 311 and the primary audio stream 312, respectively. The primary video stream 311 is played back in the full screen 301, and at the same time, the primary audio stream 312 is played back (output).

In the PlayList shown in FIG. 52, the secondary video stream and the secondary audio stream that are played back simultaneously with Video of MainST, which is the primary video stream, are Secondary Video and Secondary Audio, respectively, contained in the clip AV stream file-0 in the same main TS.

In this case, to create the PlayList shown in FIG. 52, SubPath_type=7 is used as the type of Sub Path A (SubPath-A). Accordingly, two ESs, such as the secondary video stream and the secondary audio stream, contained in the clip AV stream of the main TS, which are referred to by the Main Path, can also be referred to by the SubPlayItem of the Sub Path A (SubPath-A). In the example in FIG. 43, Secondary Video and Secondary Audio contained in the clip AV stream file-0, which are referred to by the Sub Path A (SubPath-A), correspond to the secondary video stream 313 and the secondary audio stream 314, respectively, and the secondary video stream 313 can be played back in the sub-screen 302, and at the same time, the secondary audio stream 314 can be played back (output). That is, in the example in FIG. 52, in the main TS contained in the main clip, the main stream and the substream are contained.

In FIG. 52, as Sub Paths associated with PlayItem 1, in addition to the Sub Path A (SubPath-A), Sub Path B (SubPath-B) referring to the clip AV stream file-1 contained in a sub-TS different from the main TS including the clip AV stream file-0 is defined. As discussed above, the playback apparatus of this embodiment can read two TSs at the same time. Accordingly, the playback apparatus can read, for example, PG contained in the sub TS together with Video, Audio, Secondary Video, and Secondary Audio contained in the main TS.

Examples of the syntaxes necessary to implement the picture-in-picture technique (see FIG. 43), i.e., the seventh STN_table( ) shown in FIGS. 44 and 45 and the categories of SubPath_type in FIG. 49, have been discussed.

To implement the picture-in-picture technique, a playback apparatus having a function of playing back a primary video stream and a secondary video stream simultaneously, for example, the playback apparatus shown in FIG. 53, is necessary.

Another example of the playback apparatus to which the present invention is applied is described below. The playback apparatus 401 shown in FIG. 53 is basically similar to the playback apparatus 141 shown in FIG. 36, except that an AV decoder 403 shown in FIG. 53 is disposed instead of the AV decoder 141 discussed with reference to FIG. 36. FIG. 53 is a block diagram illustrating an example of the configuration of the AV decoder 403. The playback apparatus 401 including the AV decoder 403 can implement the picture-in-picture technique, as shown in FIG. 47, and more specifically, the playback apparatus 401 can play back content, such as a movie, corresponding to AV streams referred to by the Main Path in the full screen 301 and can play back another content, such as director's commentaries on the movie, corresponding to AV streams referred to by Sub Paths, in the sub-screen 302 contained in the full screen 301.

The playback apparatus 401 shown in FIG. 53 can perform a playback operation in accordance with a PlayList including the above-described Main Path and Sub Paths and implementing the picture-in-picture technique (for example, the PlayList shown in FIG. 51 or 52).

In FIG. 53, elements corresponding to those in FIG. 36 are designated by like reference numerals, and an explanation thereof is thus omitted.

The playback apparatus 401 shown in FIG. 53 is provided with the storage drive 22, the switch 32, and the controller 21 having functions and configurations similar to those of the playback apparatus 141 shown in FIG. 36. However, the controller 21 has additional functions. Details of the additional functions are given below. The playback apparatus 401 shown in FIG. 53 is also provided with the AV decoder 403 having functions and configurations slightly different from those of the AV decoder 151.

The AV decoder 403 shown in FIG. 53 are provided with the buffers 51 through the mixing processor 101 having substantially the same functions and configurations as those of the AV decoder 151 shown in FIG. 36. Additionally, the AV decoder 403 is provided with a PID filter 411, a second video decoder 412, a second video plane generator 413, and a preload buffer 414, which are not provided for the AV decoder 151.

The reason for using the term "substantially" in "having substantially the same functions and configurations as those of the AV decoder 151 shown in FIG. 36" is as follows. The functions and configurations of the AV decoder 403 are slightly different from those of the AV decoder 151 shown in FIG. 36, such as, the first video decoder 72 and the first video plane generator 92 are used instead of the video decoder 72 and the video plane generator 92, respectively, and the number of the output terminals of the PID filter 56 is greater than that of the counterpart of the AV decoder 151 shown in FIG. 36 by one.

A discussion is given of only portions of the AV decoder 403 shown in FIG. 53 different from those of the AV decoder 151 shown in FIG. 36.

More specifically, to implement the picture-in-picture technique, it is necessary to decode primary video streams and secondary video streams. The first video decoder 72 and the second video decoder 412 having functions and configurations similar to each other decode the primary video streams and the secondary video streams, respectively. The first video plane generator 92 and the second video plane generator 413 having functions and configurations similar to each other are provided in association with the first video decoder 72 and the second video decoder 412, respectively.

The PID filter 411 receives video streams of main clip AV streams or video streams of sub-clip AV streams from the PID filter 161 or the PID filter 56, respectively. Then, the PID filter 411 allocates the input video streams to the first video decoder 72 or the second video decoder 412 according to the PIDs (packet IDs). More specifically, if primary video streams are supplied, the PID filter 411 supplies them to the first video decoder 72. If secondary video streams are supplied, the PID filter 411 supplies them to the second video decoder 412.

In this embodiment, only video streams in the main clip AV stream are used as primary video streams, and video streams in sub-clip AV streams are not used as primary video streams. However, by considering the use of video streams in sub-clip AV streams as primary video streams in the future, the PID filter 411 is configured such that video streams in sub-clip AV streams from the PID filter 56 can also be supplied to the first video decoder 72. In this case, only video streams contained in sub clips are played back without playing back video streams in the main clip, while audio streams in sub clips or the main clip are played back. Accordingly, the PID filter 411 may be configured such that video streams and audio streams are played back by using only sub clips (Sub Paths) without using the main clip (Main Path).

The preload buffer 414 temporarily stores interactive graphics streams supplied from the interactive graphics decoder 74. As described above, in this embodiment, a restriction is imposed on the playback apparatus 401 such that it can read only two TSs at the same time. Accordingly, the playback apparatus 401 has the function of obtaining interactive graphics streams in advance (preloading them) to play back preloaded interactive graphics streams simultaneously with other streams. To implement this function, the preload buffer 414 is disposed in the AV decoder 403 shown in FIG. 53 to store preloaded interactive graphics streams until they can be played back with video streams or audio streams.

An example of processing performed by the playback apparatus 401 shown in FIG. 53 according to the picture-in-picture technique, and more specifically, processing for switching secondary video streams to be played back while a primary video stream is being played back (hereinafter simply referred to as the "secondary video switching processing") is described below with reference to the flowchart in FIGS. 54 and 55.

In step S101 in FIG. 54, the controller 21 obtains an order list of secondary video stream numbers (may be IDs) and a list of primary audio streams, secondary audio streams, and subtitle streams that can be combined with secondary video streams from the seventh STN_table( ) shown in FIGS. 44 and 45.

It is now assumed that, after step S101, a stream number table, such as that shown in FIG. 46, is generated based on the obtained list, and the stream number table or a predetermined graphical user interface (GUI) image generated based on the stream number table is presented to the user on a display device under the control of the controller 21. The process then proceeds to step S102.

In step S102, the controller 21 receives an instruction to switch secondary video streams from the user.

More specifically, in step S102, the switching operation performed by the user discussed with reference to FIGS. 46 and 47 is received by the controller 21 as an instruction to switch secondary video streams.

In step S103, the controller 21 obtains a combination number subsequent to the current combination number of a secondary video stream, a primary audio stream, a secondary audio stream, and a subtitle stream.

More specifically, if the stream number table shown in FIG. 46 is presented to the user, there are three combinations, i.e., the first combination through third combination, of a secondary video stream, a primary audio stream, a secondary audio stream, and a subtitle stream. The first combination is a combination of video 2, audio 2, audio 4, and sub-picture 3. The second combination is a combination of video 1, audio 1, audio 4, and sub-picture 1. The third combination is a combination of video 1, audio 1, audio 5, and sub-picture 1. It is now assumed that 1, 2-1, and 2-2 are assigned to the first, second, and third combinations, respectively, as combination numbers. It is also assumed that an instruction to select the second combination shown in FIG. 47 is received by the controller 21. In this case, in step S103, the controller 21 obtains 2-1 as the subsequent combination number.

In step S104, the controller 21 then determines based on stream_attribute( ) (FIG. 18) whether it has a function of playing back a plurality of streams associated with the obtained number (in the first processing in step S104), the number obtained in step S103).

More specifically, in terms of the playback function of the audio streams, if an instruction to select the second combination is received by the controller 21 as the result of selection in FIG. 47, the controller 21 determines in step S104 whether it has a function of playing back audio 1 and audio 4.

In step S104, a determination as to whether the function of playing back other types of streams, such as video streams, may also be made.

If it is determined in step S104 that the function of playing back a plurality of streams associated with the obtained number is not provided, the process proceeds to step S105. In step S105, the controller 21 obtains the subsequent combination number. That is, the current combination number is skipped (which is not played back), and the subsequent number is obtained. The process then returns to step S104, and steps S104 and S105 are repeated. That is, the loop operation of steps S104 and S105 is repeated until a combination number having audio streams that can be played back by the playback apparatus 401 is obtained.

If it is determined in step S104 that the function of playing back a plurality of streams associated with the obtained number (number obtained in step S103 in the first processing or step S105 in the second processing) is provided, the process proceeds to step S106.

In step S106, the controller 21 checks, based on the type of Stream_entry( ), clips containing the secondary video stream, primary audio stream, secondary audio stream, and subtitle stream associated with the obtained number. That is, the controller 21 checks whether each of the secondary video stream, primary audio stream, secondary audio stream, and subtitle stream is contained in the main clip or a sub clip.

In step S107, the controller 21 specifies the desired secondary video stream, primary audio stream, secondary audio stream, and subtitle stream. That is, in step S107, the desired streams associated with the obtained number in the main clip or a sub clip are specified.

In step S108, the controller 21 instructs the storage drive 22 to read the specified secondary video stream, primary audio stream, secondary audio stream, and subtitle stream from the clips containing those streams. Alternatively, the controller 21 instructs the local storage 24 to read those streams and to supply them to the AV decoder 403. If the target clip is recorded on the recording medium 11, the storage drive 22 reads the specified streams from the target clip recorded on the recording medium 11. More specifically, the controller 21 instructs the storage drive 22 to read the streams specified in step S107 from the clip recorded on the recording medium 11.

The controller 21 then supplies the read streams to the AV decoder 403 and also instructs the AV decoder 403 to play back the secondary video stream, the primary audio stream, secondary audio stream, and the subtitle stream. More specifically, the controller 21 instructs the second video decoder 412 to decode the secondary video stream, the first audio decoder 75-1 to decode the primary audio stream, the second audio decoder 75-2 to decode the secondary audio stream, and the presentation graphics decoder 73 to decode the subtitle stream.

In step S109, the AV decoder 403 decodes the secondary video stream, primary audio stream, secondary audio stream, and subtitle stream and outputs the decoded streams. The processing is then completed.

In this case, as stated above, for the primary audio stream and the secondary audio stream, an audio signal generated by mixing and playing back the primary audio stream and the secondary audio stream is output.

As a result of the secondary video switching processing, the picture-in-picture technique discussed with reference to FIG. 43 is implemented. More specifically, in the example in FIG. 43, while video corresponding to the primary video stream 311 is being displayed (played back) in the full screen 311, video corresponding to the secondary video stream 313 output in step S109 is displayed (played back) in the sub-screen 302, subtitles corresponding to the subtitle stream 315 output in step S109 are displayed (played back) at a predetermined position of the full screen 301, and sound generated by mixing the primary audio stream 313 and the secondary audio stream 314 is output (played back) from a speaker (not shown).

As discussed above, by using the seventh STN_table( ) shown in FIGS. 44 and 45, the picture-in-picture technique can be implemented.

To perform the picture-in-picture technique, it is possible that the PlayList (see FIG. 48) generated by using SubPath_type shown in FIG. 11 be used. As stated above, by using such a PlayList, however, a secondary video stream and a secondary audio stream contained in the same clip AV stream are referred to by different Sub Paths, i.e., they are defined as different SubPlayItems. As a result, the above-described problems are caused, such as the structure of the PlayList becomes complicated, as described above.

To solve those problems, as stated above, the categories of SubPath_type, such as the categories of SubPath_type shown in FIG. 49, can be used so that two or more elementary streams in the same clip AV stream can be referred to by one Sub Path, i.e., two or more ESs in the same clip AV stream can be defined as one SPI.

From the viewpoint of the creators of a PlayList, however, even though the structure of the PlayList becomes simple by using SubPath_type shown in FIG. 45, the creator still has to determine which combinations of streams are possible and which combinations of streams are not possible, i.e., to determine which Sub Paths are included, to implement the picture-in-picture technique. Accordingly, there is still a demand for simply creating a PlayList.

To respond to such a demand, the present inventor has invented a technique, such as, Sub Paths that can be created (included in a PlayList) are restricted by SubPath_type shown in FIG. 49 depending on the type of PlayList. Such a technique is referred to as the "Sub Path restriction technique".

According to the Sub Path restriction technique, the Sub Paths that can be included in a PlayList are restricted, which enables the user to determine which Sub Paths are included in the PlayList, thereby facilitating the creation of the PlayList.

Details of the Sub Path restriction technique are given below.

In the Sub Path restriction technique, the type of restriction varies depending on the number of TSs that can be read at the same time by the playback apparatus. In this embodiment, as stated above, the number of TSs that can be read simultaneously is two. Accordingly, the Sub Path restriction technique when the number of TSs that can be read simultaneously is two is described below.

In this embodiment, the PlayList can be largely divided into two types, i.e., Browsable Slideshow (non-synchronized) and Movie-Type/Time-based Slideshow (synchronized). The type of PlayList can be determined by application_type contained in clip_Information_type of the clip referred to by the PlayList.

The application_type is indicated in ClipInfo( ) in a clip information file of a clip. For the sake of simple description, however, the syntax of ClipInfo( ) is not mentioned here, and only application_type indicated in ClipInfo( ) is discussed below with reference to FIG. 56.

That is, FIG. 56 illustrates an example of the categories of application_type.

In FIG. 56, application_type=0 is reserved. The application_type=1 is used for main TSs for movie applications. The main TS is a transport stream as a PlayItem referred to by the Main Path in the PlayList. The application_type=2 is used for main TSs for Time-based Slideshow, i.e., main TSs for image slideshow. The application_type=3 is used for TSs for Browsable Slideshow, i.e., main TSs for video slideshow.

The application_type=4 is used for Sub Path TSs for Browsable Slideshow, which is indicated in ClipInfo( ) for, for example, clip AV streams containing BGM (sound) data that is played back asynchronously with application_type=3. The application_type=5 is used for Sub Path TSs for interactive graphics. The application_type=6 is used for Sub Path TSs for text subtitles (text subtitle data). The application_type=7 is used for Sub Path TSs including at least one ES (elementary stream). The application_type=8 through 255 are reserved.

Clip AV stream files represented by application_type=1 through application_type=6 are obtained from the recording medium 11 via the storage drive 22 or from the local storage 24. In contrast, clip AV stream files represented by application_type=7 are obtained only from the local storage 24, and not obtained from the recording medium 11 via the storage drive 22.

In this embodiment, when application_type=3 in application_type indicated in ClipInfo( ) of a main TS referred to by a PlayList, the PlayList is classified into Browsable Slideshow (non-synchronized type). When PlayList=1 or 2 in application_type indicated in ClipInfo( ), the PlayList is classified into Movie-Type/Time-based Slideshow (synchronized).

In this case, Sub Paths that can be provided for PlayLists are restricted to Sub Paths shown in FIG. 57 depending on the types of PlayLists (non-synchronized or synchronized). Such a restriction is imposed by the Sub Path restriction technique.

The number of Sub Paths indicated in the left side of FIG. 57 designates the number of Sub Paths whose type is indicated in SubPath_type provided for the main TS.

The numbers (the categories of SubPath_type) indicated in SubPath_type correspond to the numbers indicated in SubPath_type shown in FIG. 49.

When the type of PlayList is non-synchronized type, as shown in FIG. 57, i.e., when the type of PlayList is Browsable slideshow having application_type (of main TS)=3, only (1) at least 0 Sub Paths of SubPath_type=2 or (2) at least 0 Sub Paths of SubPath_type=3 are allowed. In other words, Sub Paths other than the above-described (1) and (2) Sub Paths are prohibited.

In the combination of (2), if the main TS of application_type=3 contains an interactive graphics stream (IG), such Sub Paths are prohibited (see *2 in FIG. 57). The reason is as follows.

From the viewpoint of IGs, PlayLists including IGs are largely divided into a first type and a second type. In the first type of PlayList, an IG is multiplexed into the main TS, and the IG is played back simultaneously with an audio or video stream contained in the main TS. In the second type of PlayList, an IG is included in a Sub Path having Sub Path_type=3, and the IG is preloaded (which is used for a popup menu). To play back the second type of PlayList, the preload buffer 414 is disposed in the playback apparatus 401 shown in FIG. 53, as described above.

Since only one IG decoder is provided for the playback apparatus of this embodiment, and more specifically, since the single IG decoder 74 is provided for the playback apparatus 401, the following restriction is imposed. In the first type of PlayList, while the IG in the main TS is being decoded by the IG decoder, another IG cannot be preloaded. In the second type of PlayList, while a first IG, which is preloaded, is input into the IG decoder, a second IG from another main TS cannot be input into the IG decoder.

Because of the above-described reason, a restriction is imposed such that a PlayList including STN_table( ) referring to an IG multiplexed into a main TS is not allowed to have a Sub Path having SubPath_type=3. Under this restriction, if an IG is contained in the main TS of application_type=3, such Sub Paths are prohibited (see *2 in FIG. 57).

When the type of PlayList is synchronized type, i.e., i.e., when the type of PlayList is Movie-Type/Time-based Slideshow of application_type=1 or 2, only (3) at least 0 Sub Paths of SubPath_type=3, (4) at least 0 Sub Paths of SubPath_type=4 (5) at least 0 Sub Paths of SubPath_type=5, (6) at least 0 Sub Paths of SubPath_type=6, or (7) 0 or 1 Sub Path of SubPath_type=7 are allowed. In other words, Sub Paths of SubPath_type=2 are prohibited.

In the combination of (3), if the main TS of application_type=3 contains an IG, or if the TS referred to by a Sub Path of SubPath_type=5 contains an IG, such Sub Paths are prohibited (see *1 in FIG. 57). This is also because of the above-described restriction.

Additionally, in this embodiment, as stated above, the number of clips that can be referred to at the same time by a PlayList, i.e., the number of TSs that can be read at the same time by the playback apparatus, is at most two. Accordingly, to ensure that ESs that can be referred to at the same time by the same PlayList are contained in at most two clips, i.e., that ESs that can be played back at the same time are referred to by at most two clip AV stream files, a restriction is imposed by the Sub Path restriction technique such that the following conditions are satisfied.

The condition, which is imposed by the Sub Path restriction technique, for combining primary_video_stream, primary_audio_stream, PG_textST_stream other than text subtitle streams, IG_stream other than IGs for popup menu, secondary_video_stream, and secondary_audio_stream referred to by STN_table( ) is as follows.

In an ES specified by primary_video_stream_number, an ES specified by primary_audio_stream_number, an ES specified by PG_textST_stream_number, an ES specified by IG_stream_number, an ES specified by secondary_video_stream_number, and an ES specified by secondary_audio_stream_number, combinations of streams that can be played back simultaneously should be stored in at most two clip AV stream files referred to by the PlayList.

ESs referred to by STN_table( ) may be stored by three or more clip AV stream files, but ESs that can be played back simultaneously should be stored in at most two of those clip AV stream files.

The Sub Path restriction technique also imposes the restriction such that it is necessary that the combination of the number of PlayItems and the number of Sub Paths is one of the following combinations (a), (b), and (c). The combination (a) is only one PlayItem (the topmost row in FIG. 58), the combination (b) is one PlayItem and one Sub Path (the middle row in FIG. 58), and the combination (c) is one PlayItem, one Sub Path, and one Sub Path=7, i.e., one PlayItem and two Sub Paths (one of the Sub Paths should be SubPath_type=7) (the bottommost row in FIG. 58).

In one type of Sub Path restriction technique, the types of Sub Paths (SubPath_type) that can be created according to the types of PlayLists are restricted.

In other words, the Sub Path restriction technique includes conditions (restrictions), such as the type of PlayList (in the above-described example, type represented by application_type of the main TS), the number of TSs that can be read at the same time by the playback apparatus (in the above-described example, two), and whether an IG to be preloaded is contained in an ES referred to by a Sub Path of the PlayList) (in this example, whether the Sub Path is SubPath_type=3). To satisfy those conditions, the Sub Paths to be included in the PlayList are determined, and as a result, a PlayList including those Sub Paths is created.

Specific examples of PlayLists created by the Sub Path restriction technique are given below with reference to FIGS. 59 through 62.

Figure 59:
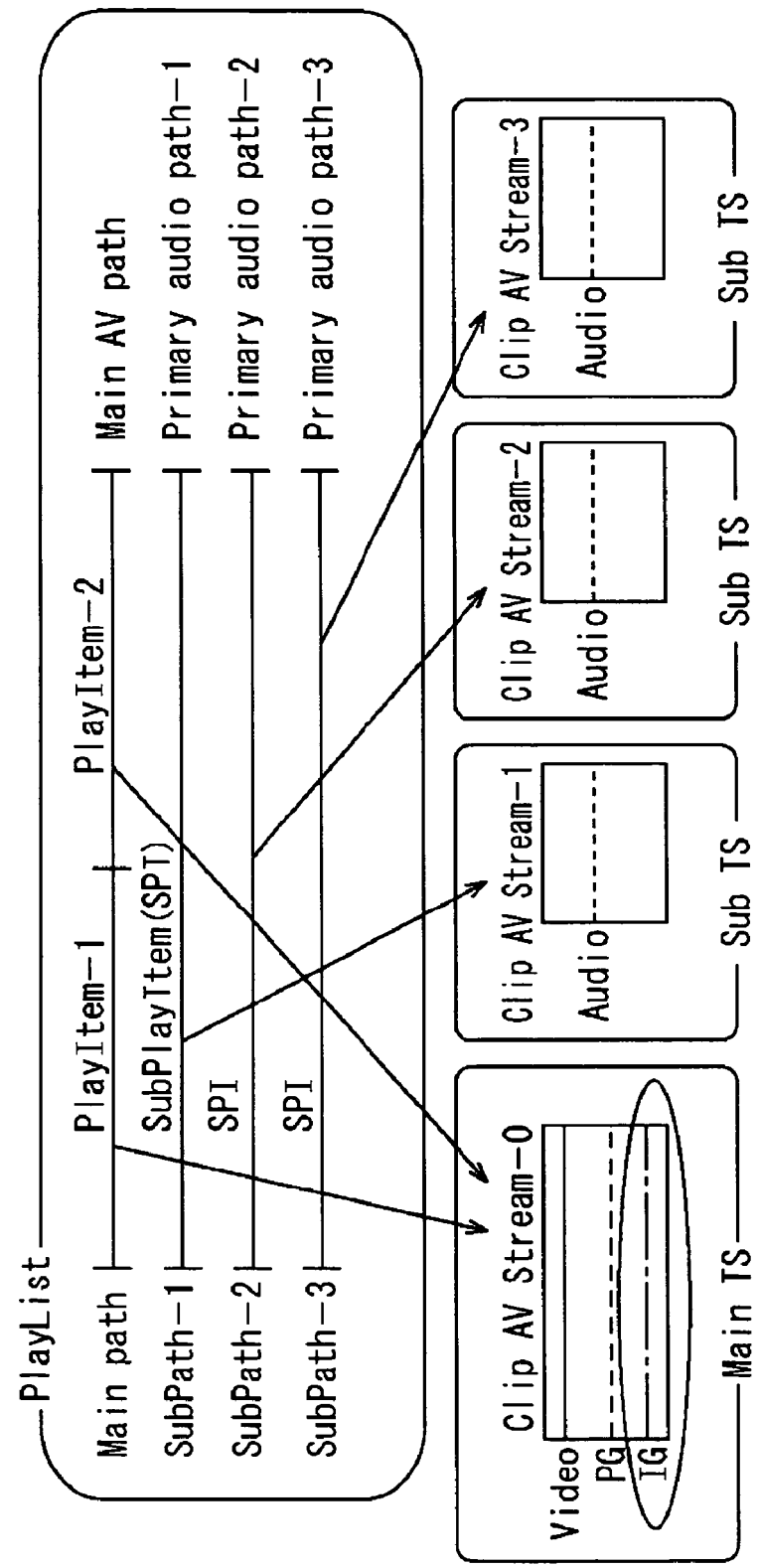
FIG. 59 illustrates a specific example of PlayList generated by the Sub Path restriction technique shown in FIGS. 57 through 59.

FIG. 59 illustrates a PlayList of Browsable Slideshow (non-synchronized type) which does not have SubPath_type=3, i.e., a PlayList including Sub Path 1 through Sub Path 3 of SubPath_type=2. SubPath_type=3 is not contained in the PlayList because an IG is contained in the clip AV stream file-0 (i.e., main TS) referred to by PlayItem 1 and PlayItem 2. Since the PlayList in this example is Browsable Slideshow which sequentially displays a plurality of still images by the user, video streams contained in the clip AV stream file-0 store still image data.

The PlayList shown in FIG. 59 is created by using the conditions (restrictions) that only (1) at least 0 Sub Paths of SubPath_type=2 or (2) at least 0 Sub Paths of SubPath_type=3 are allowed and Sub Paths other than (1) or (2) Sub Paths are prohibited, and that Sub Paths of SubPath_type=3 are prohibited if an IG is contained in the main TS of application_type=3 (see *2 in FIG. 57).

Figure 60:
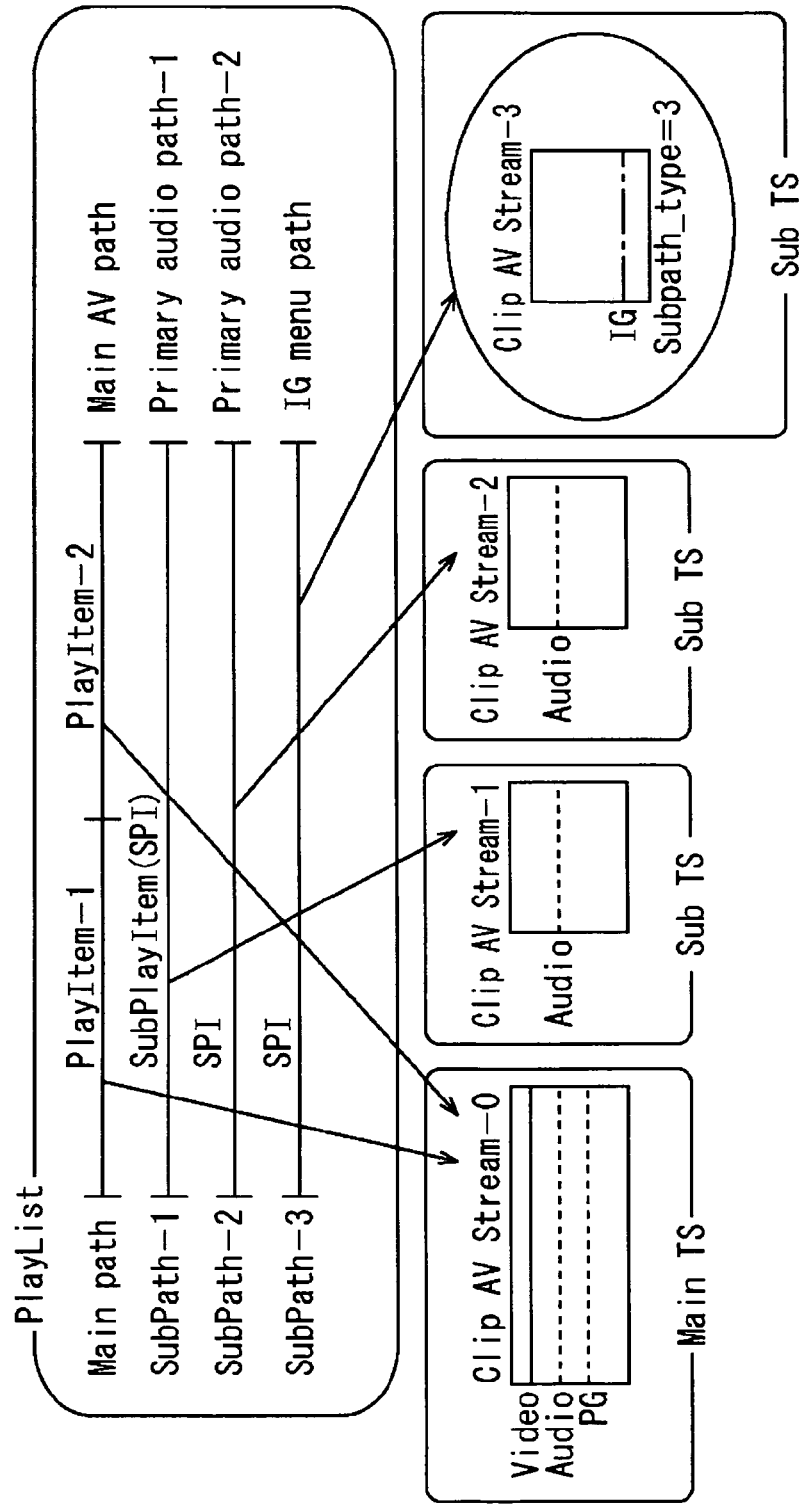
FIG. 60 illustrates a specific example of PlayList generated by the Sub Path restriction technique shown in FIGS. 57 through 59.

In contrast to the example in FIG. 59, FIG. 60 illustrates a PlayList of Browsable Slideshow (non-synchronized type) which have SubPath_type=3, i.e., a PlayList including Sub Path 1 and Sub Path 2 of SubPath=type2 and Sub Path 3 of SubPath_type=3. SubPath_type=3 is contained in the PlayList because an IG is not contained in the clip AV stream file-0 (i.e., main TS) referred to by PlayItem 1 and PlayItem 2, and SubPath_type=3 is used for referring to an IG contained in a clip AV stream file-3, which is different from the clip AV stream file-0.

The conditions (restrictions) used for creating the PlayList shown in FIG. 60 are the same as those for the PlayList shown in FIG. 59.

In other words, an example of the PlayList on which the restriction indicated by *2 in FIG. 57, i.e., in "(2) Sub Path, if the main TS of application_type=3 contains an IG, such Sub Paths of SubPath_type=3 are prohibited", has to be imposed is the example in FIG. 59, and an example of the PlayList on which such a restriction does not have to be imposed is the example in FIG. 60.

As described above, FIGS. 59 and 60 illustrate examples of PlayLists of Browsable Slideshow (non-synchronized type). In contrast, FIGS. 61 and 62 illustrate examples of PlayLists of Movie-Type/Time-based Slideshow (synchronized type).

Figure 61:
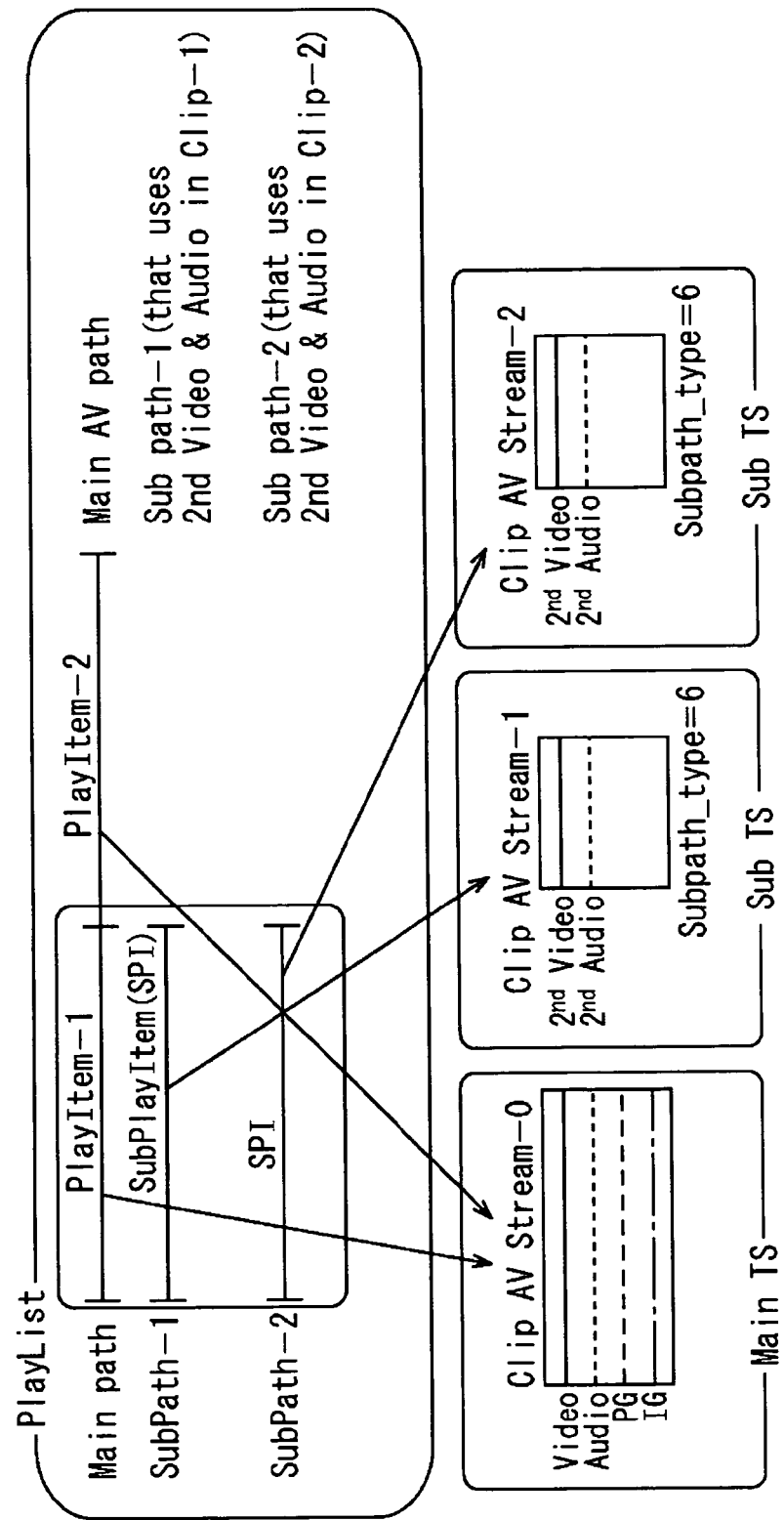
FIG. 61 illustrates a specific example of PlayList generated by the Sub Path restriction technique shown in FIGS. 57 through 59.

More specifically, FIG. 61 illustrates a PlayList of synchronized type in which a secondary video stream and a secondary audio stream are not multiplexed into the main TS (i.e., clip AV stream file-0), i.e., the PlayList including Sub Path 1 and Sub Path 2 of SubPath_type=5.

The restriction (condition) used for creating the PlayList shown in FIG. 61 is as follows. That is, by using the condition (restriction) that (6) "at least 0 Sub Paths of SubPath_type=6 is allowed" described in FIG. 57, the PlayList shown in FIG. 61 is created.

Figure 62:
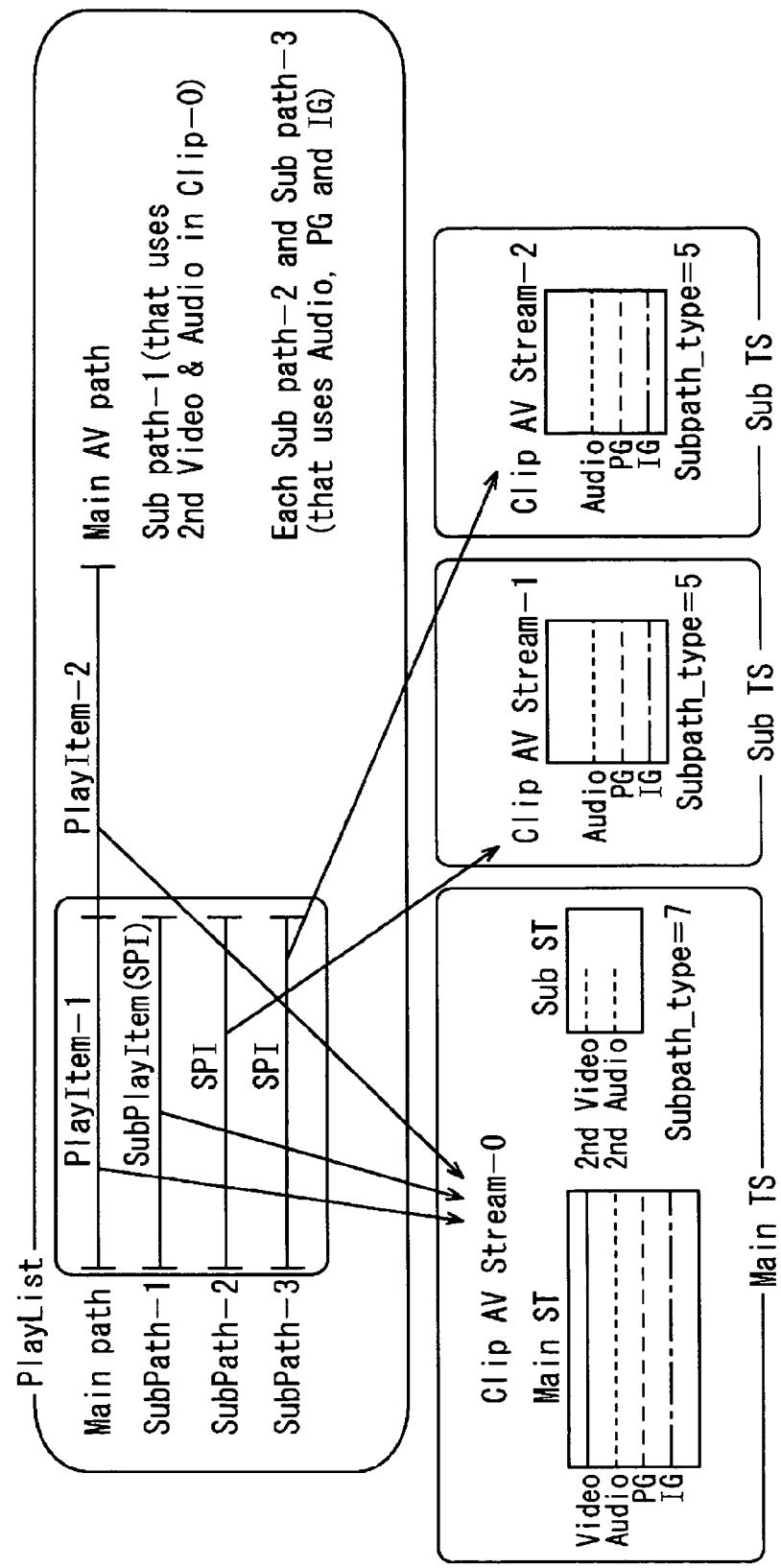
FIG. 62 illustrates a specific example of PlayList generated by the Sub Path restriction technique shown in FIGS. 57 through 59.

In contrast to the example in FIG. 61, FIG. 62 illustrates a PlayList of synchronized type in which the main TS, i.e., the clip AV stream file-0, referred to by the PlayList contains a main ST and a subST and a secondary video stream (Secondary Video) and a secondary audio stream (Secondary Audio) are multiplexed into the clip AV stream file-0 forming the main TS. Accordingly, the PlayList includes Sub Path 1 of SubPath_type=7 and sub-2 and Sub Path 3 of SubPath_type=5.

The restriction (condition) used for creating the PlayList shown in the example in FIG. 62 is as follows. That is, by using conditions that (5) "at least 0 Sub Paths of SubPath_type=5 are allowed", and (7) "0 Sub Path and one Sub Path of SubPath_type=7 are allowed", the PlayList shown in FIG. 62 are created.

The PlayLists created by the above-described Sub Path restriction technique can also be played back by the playback apparatus 401 shown in FIG. 53.

For example, the playback apparatus 401 plays back a PlayList of non-synchronized type, i.e., a PlayList of Browsable Slideshow having application_type=3, in the following manner. If the PlayList refers to at least one Sub Path of SubPath_type=3 (Interactive graphics presentation menu), the playback apparatus 401 preloads a clip AV stream of SubPath_type=3, i.e., an interactive graphics stream, in the preload buffer 414 before playing back the PlayList. If the PlayList refers to at least one Sub Path of SubPath_type=2, the playback apparatus 401 refers to a predetermined Sub Path (SubPath_type=2) and plays it back since Sub Paths can be referred to only one by one (the number of TSs that can be read at the same time is two, and one of them is the main TS referred to by the main TS).

The Interactive graphics presentation menu includes two menus, i.e., a Popup menu that can be displayed or erased by the ON/OFF operation of the user, and an Always-on menu that is always displayed. An example of details of playback processing for a PlayList of application_type=3 is given below with reference to the flowcharts in FIGS. 63 and 64.

The playback apparatus 401 plays back a PlayList of synchronized type, i.e., a PlayList of Movie-Type/Time-based Slideshow of clips having application_type=1 or 2, in the following manner. If the PlayList refers to at least one Sub Path of SubPath_type=3 or 4, i.e., interactive graphics stream or text subtitle stream, the playback apparatus 401 preloads a clip AV stream, i.e., an interactive graphics stream or a text subtitle stream, of SubPath_type=3 or 4 in the preload buffer 414 or the buffer 54 before playing it back. If the PlayList refers to at least one Sub Path of SubPath_type=5 or 6, the playback apparatus 401 refers to a predetermined Sub Path (SubPath_type=5 or 6) and plays it back since Sub Paths can be referred to only one by one (the number of TSs that can be read at the same time is two, and one of them is the main TS referred to by the main TS). However, if the Sub Paths contained in the PlayList includes at least one Sub Path of SubPath_type=7, the playback apparatus 401 can refer to one Sub Path of SubPath_type=7 and plays it back while playing back one Sub Path of SubPath_type=5 or 6 since the Sub Path of SubPath_type=7 refers to an ES contained in the main TS.

An example of details of playback processing for a PlayList of application_type=1 or 2 is given below with reference to FIGS. 65 through 68.

An example of playback processing for a PlayList containing a clip of application_type=3 is described below with reference to FIGS. 63 and 64.

The controller 21 shown in FIG. 53 checks application_type contained in ClipInfo( ) of Clip_information referred to by the Main Path of the PlayList, and if it is found to be application_type=3, the controller 21 starts the playback processing for the PlayList of application_type=3.

Figure 63:
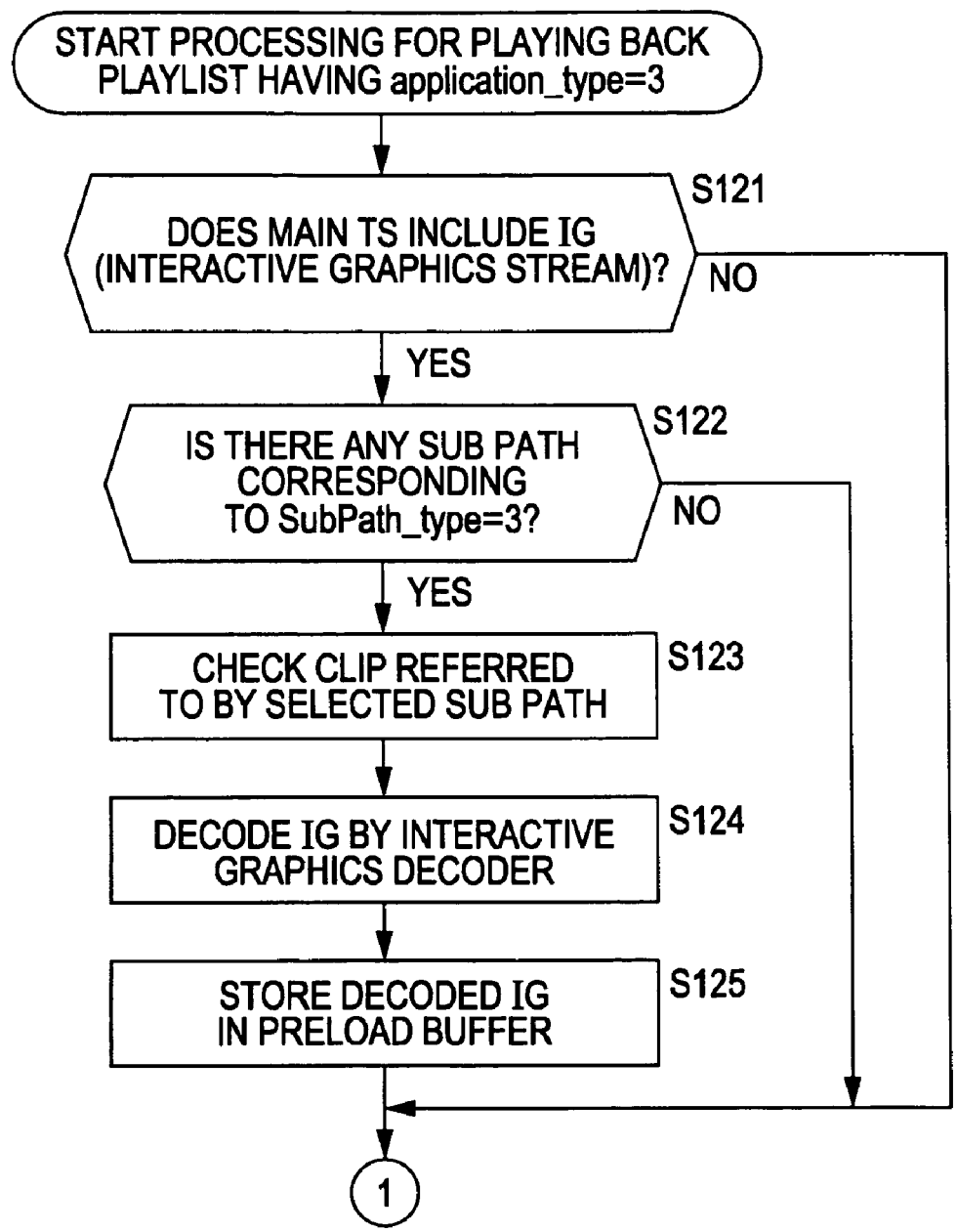
FIG. 63 is a flowchart illustrating playback processing for PlayList having application_type=3 in the playback apparatus shown in FIG. 53.

In step S121 in FIG. 63, the controller 21 determines whether the main TS includes an IG (interactive graphics stream).

Figure 64:
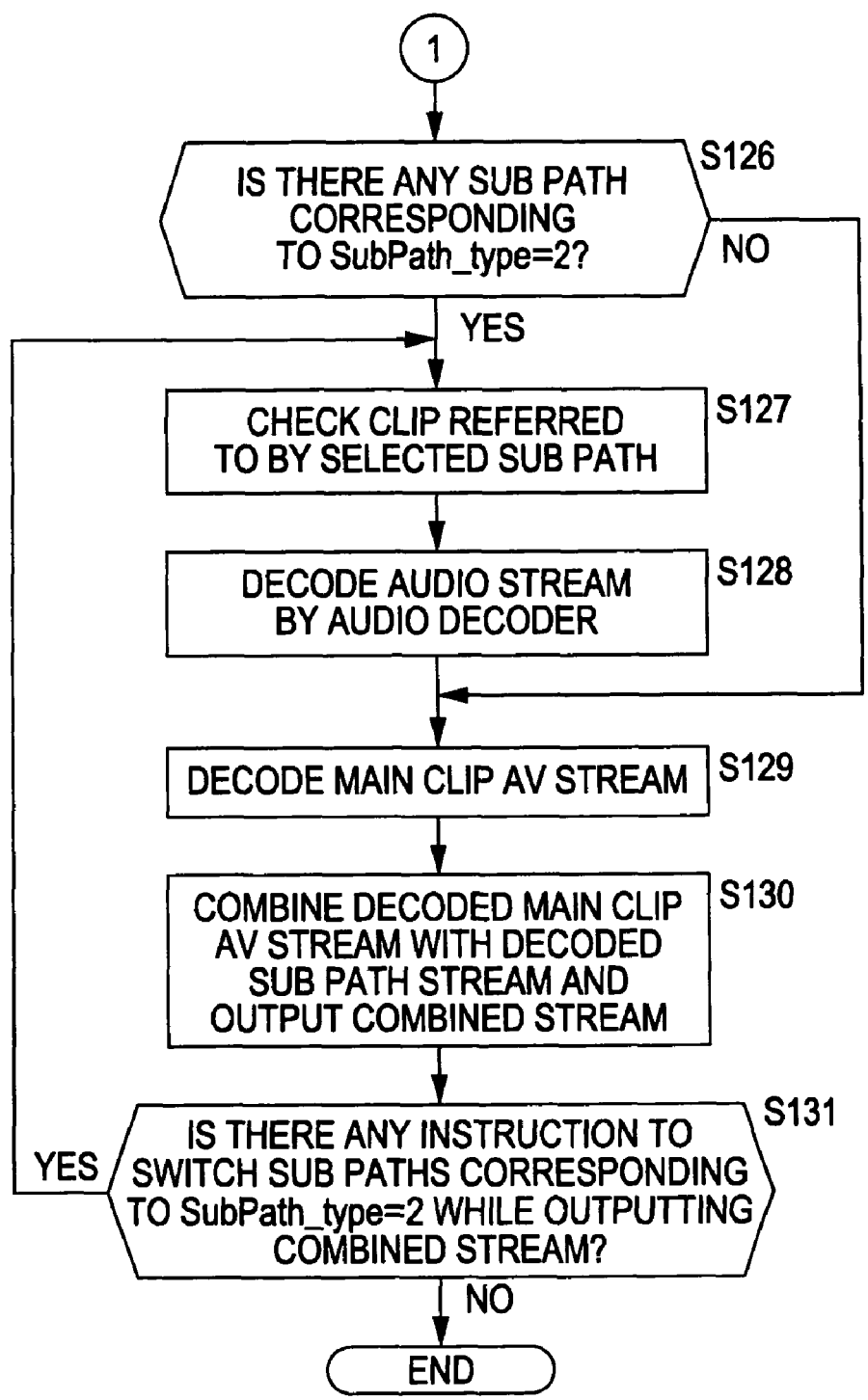
FIG. 64 is a flowchart illustrating the playback processing for PlayList having application_type=3 in the playback apparatus shown in FIG. 53.

If it is determined in step S121 the main TS does not include an IG, the process proceeds to step S126 in FIG. 64. Step S126 and the subsequent steps are described below.

If it is determined in step S121 that the main TS includes an IG, the process proceeds to step S122.

It is determined in step S122 whether there is any Sub Path of SubPath_type=3.

If it is determined in step S122 that there is no Sub Path of SubPath_type=3, the process proceeds to step S126. Step S126 and the subsequent steps are described below.

If it is determined in step S122 that there is a Sub Path of SubPath_type=3, the process proceeds to step S123. In step S123, the controller 21 checks the clip referred to by the selected Sub Path (Sub Path of SubPath_type=3).

The controller 21 then instructs the storage drive 22 to read the stream specified by the Sub Path, i.e., the IG, from the clip. The storage drive 22 reads the IG in response to this instruction. Alternatively, the controller 21 reads the IG from the local storage 24. Then, the controller 21 instructs the interactive graphics decoder 74 to decode the IG. The process then proceeds to step S124.

Then, in step S124, the interactive graphics decoder 74 decodes the IG. Then, in step S125, the interactive graphics decoder 74 stores the decoded IG in the preload buffer 414.

After step S125, or if the outcome of step S121 or S122 is NO, the process proceeds to step S126.

It is determined in step S126 whether there is any Sub Path of SubPath_type=2.

If it is determined in step S126 that there is no Sub Path of SubPath_type=2, the process proceeds to step S129. Step S129 and the subsequent steps are described below.

If it is determined in step S126 that there is a Sub Path of SubPath_type=2, the process proceeds to step S127. In step S127, the controller 21 checks the clip referred to by the selected Sub Path (Sub Path of SubPath_type=2).

Then, the controller 21 instructs the storage drive 22 to read the stream specified by the Sub Path, i.e., an audio stream, from the clip. The storage drive 22 reads the audio stream in response to this instruction. Alternatively, the controller 21 reads the audio stream from the local storage 24. The controller 21 then instructs the second audio decoder 75-2 to decode the read audio stream. The process then proceeds to step S128.

Then, in step S128, the second audio decoder 75-2 decodes the read audio stream.

After step S128 or if the outcome of step S126 is NO, the process proceeds to step S129.

In step S129, the AV decoder 403 decodes the main clip AV stream. The main clip AV stream includes a video stream or an audio stream referred to by the Main Path of the PlayList to be played back, and is contained in the main TS. The first video decoder 72 or the first audio decoder 75-1 executes step S129.

In step S130, the AV decoder 403 combines the decoded main clip AV stream with the decoded Sub Path stream, and outputs the combined stream. The decoded Sub Path stream is the IG decoded in step S124 and stored in the preload buffer 414 in step S125 or the audio stream decoded in step S128 in FIG. 64.

In step S131, the controller 21 determines whether an instruction to switch Sub Paths of SubPath_type=2 has been given (by the user) while outputting the stream combined in step S130.

If it is determined in step S131 that an instruction to switch Sub Paths of SubPath_type=2 has been given, the process returns to step S127, and step S127 and the subsequent steps are repeated. That is, the audio stream to be combined with the main clip AV stream is switched.

If it is determined in step S131 that an instruction to switch Sub Paths of SubPath_type=2 has not been given, the playback processing for a Playlist of application_type=3 is completed.

An example of playback processing for a PlayList including a clip of application_type=1 or 2 is described below with reference to the flowcharts in FIGS. 65 through 68.

The controller 21 shown in FIG. 53 checks application_type of the clip referred to by the Main Path of a PlayList to be played back, and if it is found to be application_type=1 or 2, the controller 21 starts playback processing for the PlayList of application_type=1 or 2.

Figure 65:
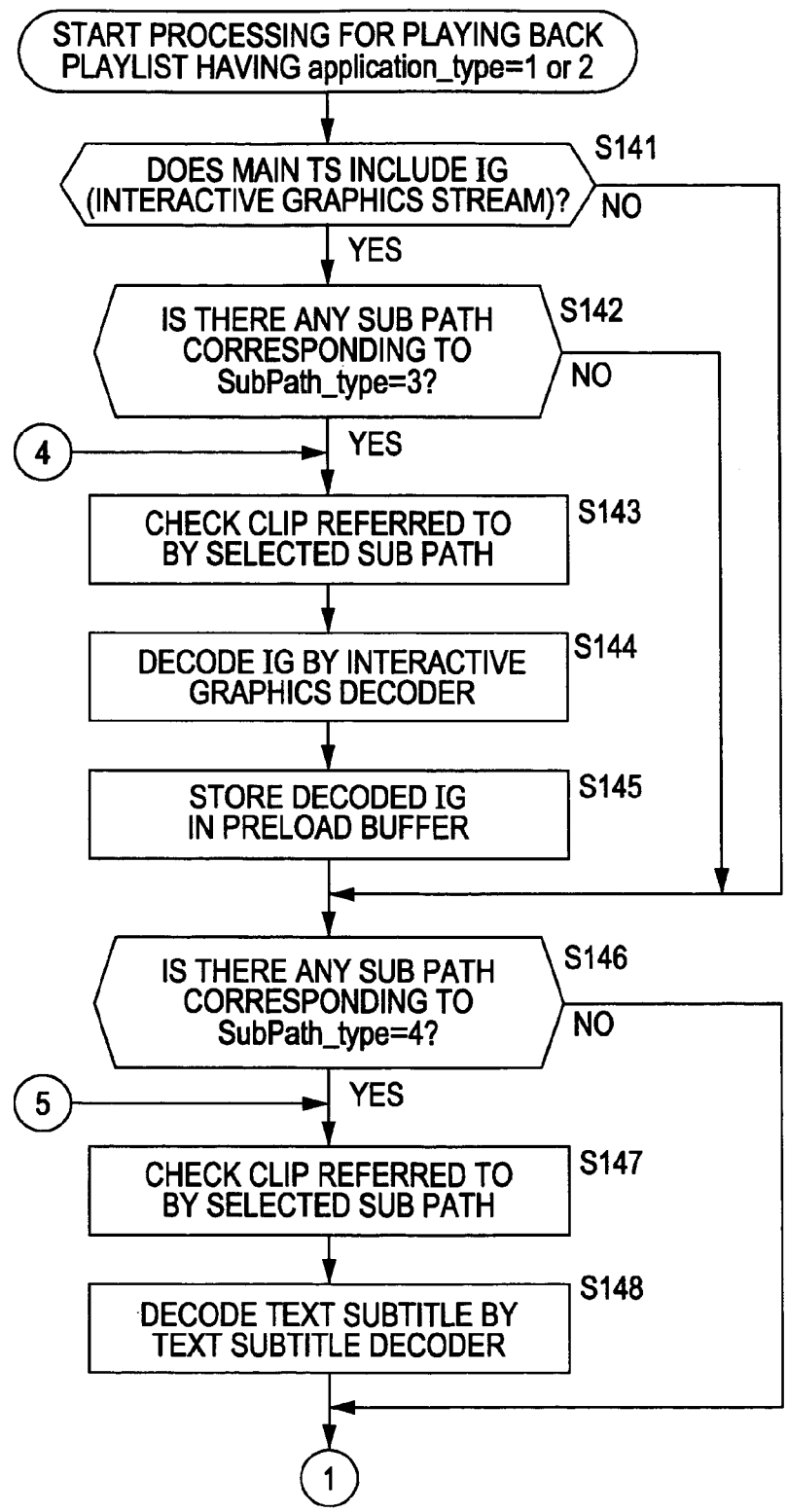
FIG. 65 is a flowchart illustrating playback processing for a PlayList having application_type=1 or 2 in the playback apparatus shown in FIG. 53.

In step S141 in FIG. 65, the controller 21 determines whether the main TS includes an IG.

If it is determined in step S141 that the main TS does not include an IG, the process proceeds to step S146. Step S146 and the subsequent steps are described below.

If it is determined in step S141 that the main TS includes an IG, the process proceeds to step S142.

The controller 21 determines in step S142 whether there is any Sub Path of SubPath_type=3.

If it is determined in step S142 that there is no Sub Path of SubPath_type=3, the process proceeds to step S146. Step S146 and the subsequent steps are described below.

If it is determined in step S142 that there is a Sub Path of SubPath_type=3, the process proceeds to step S143. In step S143, the controller 21 checks the clip referred to by the selected Sub Path (Sub Path of SubPath_type=3).

The controller 21 then instructs the storage drive 22 to read the stream specified by the Sub Path, i.e., the IG, from the clip. The storage drive 22 reads the IG in response to this instruction. Alternatively, the controller 21 reads the IG from the local storage 24. The controller 21 then instructs the interactive graphics decoder 74 to decode the read IG. The process then proceeds to step S144.

Then, in step S144, the interactive graphics decoder 74 decodes the read IG. Then, in step S145, the interactive decoder 74 stores the decoded IG in the preload buffer 414.

After step S145, or if the outcome of step S141 or S142 is NO, the process proceeds to step S146.

The controller 21 determines whether there is any Sub Path of SubPath_type=4.

If it is determined in step S146 that there is no Sub Path of SubPath_type=4, the process proceeds to step S149. Step S149 and the subsequent steps are described below.

If it is determined in step S146 that there is a Sub Path of SubPath_type=4, the process proceeds to step S147. In step S147, the controller 21 checks the clip referred to by the selected Sub Path (Sub Path of SubPath_type=4).

The controller 21 then instructs the storage drive 22 to read the stream specified by the Sub Path, i.e., the text subtitle stream. The storage drive 22 reads the text subtitle stream in response to this instruction. Alternatively, the controller 21 reads the text subtitle stream from the local storage 24. The controller 21 then instructs the text-ST composition 76 to decode the read text subtitle stream. The process then proceeds to step S148.

In step S148, the text-ST composition 76 decodes the read text subtitle.

Figure 66:
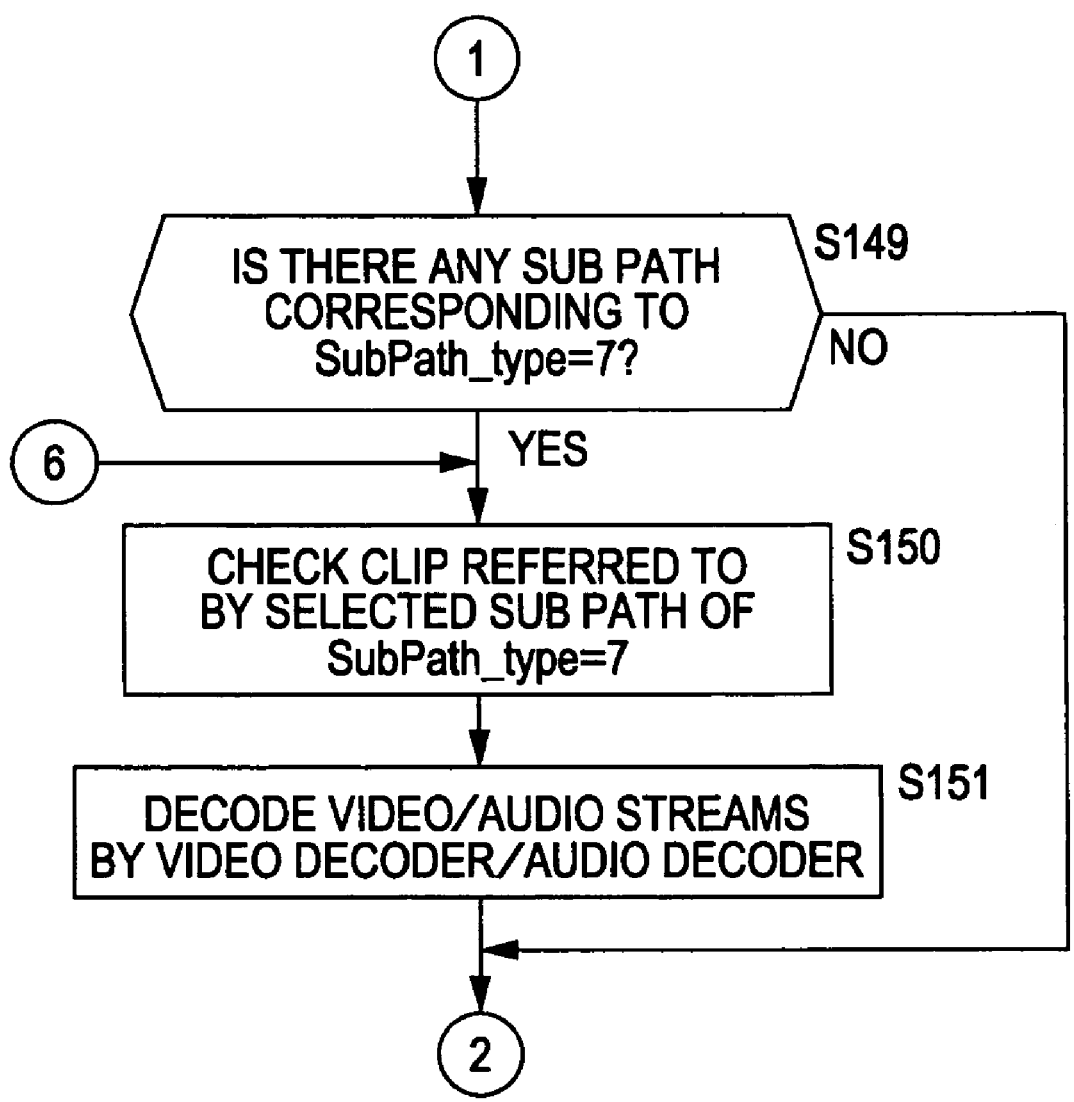
FIG. 66 is a flowchart illustrating the playback processing for a PlayList having application_type=1 or 2 in the playback apparatus shown in FIG. 53.

After step S148, or if the outcome of step S146 is NO, the process proceeds to step S149 in FIG. 66.

The controller 21 then determines whether there is any Sub Path of SubPath_type=7.

If it is determined in step S149 that there is no Sub Path of SubPath_type=7, the process proceeds to step S152. Step S152 and the subsequent steps are described below.

If it is determined in step S149 that there is a Sub Path of SubPath_type=7, the process proceeds to step S150. In step S150, the controller 21 checks the clip referred to by the selected Sub Path (Sub Path of SubPath_type=7).

The controller 21 then instructs the storage drive 22 to read the stream specified by the Sub Path, i.e., the video/audio stream, from the clip. The storage drive 22 reads the video/audio stream in response to this instruction. Alternatively, the controller 21 reads the video/audio stream from the local storage 24. Then, the controller 21 instructs the second video decoder 412 or the second audio decoder 75-2 to decode the read video/audio stream. The process then proceeds to step S151.

In step S151, the second video decoder 412 or the second audio decoder 75-2 decodes the read video/audio stream.

Figure 67:
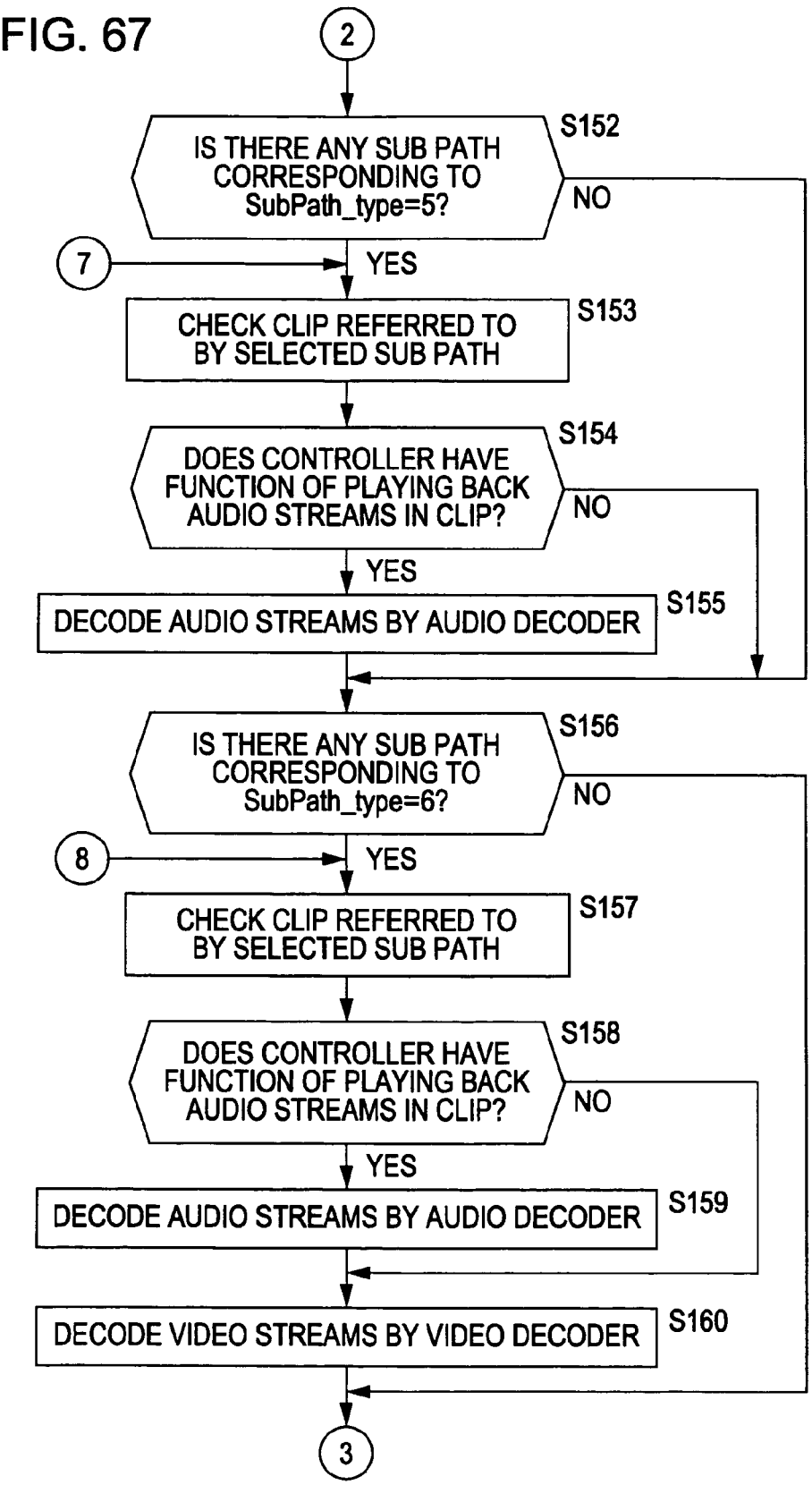
FIG. 67 is a flowchart illustrating the playback processing for a PlayList having application_type=1 or 2 in the playback apparatus shown in FIG. 53.

After step S151, or if the outcome of step S149 is NO, the process proceeds to step S152 in FIG. 67.

The controller 21 determines whether there is any Sub Path of SubPath_type=5.

If it is determined in step S152 that there is no Sub Path of SubPath_type=5, the process proceeds to step S156. Step S156 and the subsequent steps are described below.

If it is determined in step S152 that there is a Sub Path of SubPath_type=5, the process proceeds to step S153. In step S153, the controller 21 checks the clip referred to by the selected Sub Path (Sub Path of SubPath_type=5).

Then, the controller 21 determines by referring to stream_attributes( ) in FIG. 18 in step S154 whether it has the function of playing back the audio stream contained in the clip.

If it is determined in step S154 that the function of playing back the audio stream is not provided, the process proceeds to step S156. Step S156 and the subsequent steps are described below.

If it is determined in step S154 that the function of playing back the audio stream is provided, the controller 21 instructs the storage drive 22 to read the stream specified by the Sub Path, i.e., the audio stream, from the clip. The storage drive 22 reads the audio stream in response to this instruction. Alternatively, the controller 21 reads the audio stream from the local storage 24. The controller 21 then instructs the second audio decoder 75-2 to decode the read audio stream. The process then proceeds to step S155.

Then, in step S155, the second audio decoder 75-2 decodes the read audio stream.

After step S155, or if the outcome of step S152 or S154 is NO, the process proceeds to step S156.

The controller 21 determines in step S156 whether there is any Sub Path of SubPath_type=6.

If it is determined in step S156 that there is no Sub Path of SubPath_type=6, the process proceeds to step S161. Step S161 and the subsequent steps are described below.

If it is determined in step S156 that there is a Sub Path of SubPath_type=6, the process proceeds to step S157. In step S157, the controller 21 checks the clip referred to by the selected Sub Path (SubPath_type=6).

In step S158, the controller 21 determines by referring to stream_attributes in FIG. 18 whether it has the function of playing back the audio stream contained in the clip.

If it is determined in step S158 that the function of playing back the audio stream is not provided, the controller 21 instructs the storage drive 22 to read the corresponding video stream specified by the Sub Path from the clip. The storage drive 22 reads the video stream from the clip in response to this instruction. Alternatively, the controller 21 reads the video stream from the local storage 24. In this case, the controller 21 prohibits the decoding of audio streams, and instructs the second video decoder 412 to decode the video stream. Then, the process proceeds to step S160. Step S160 and the subsequent steps are described below.

If it is determined in step S158 that the function of playing back the audio stream contained in the clip is provided, the controller 21 instructs the storage drive 22 to read the stream specified by the Sub Path, i.e., the video stream and the audio stream, from the clip. The storage drive 22 reads the video stream and the audio stream in response to this instruction. Then, the controller 21 instructs the second audio decoder 75-2 to decode the read audio stream, and the second video decoder 412 to decode the read video stream. The process then proceeds to step S159.

Then, in step S159, the second audio decoder 75-2 decodes the read audio stream.

After step S159, or if the outcome of step S158 is NO, the process proceeds to step S160.

In step S160, the second video decoder 412 decodes the read video stream.

Figure 68:
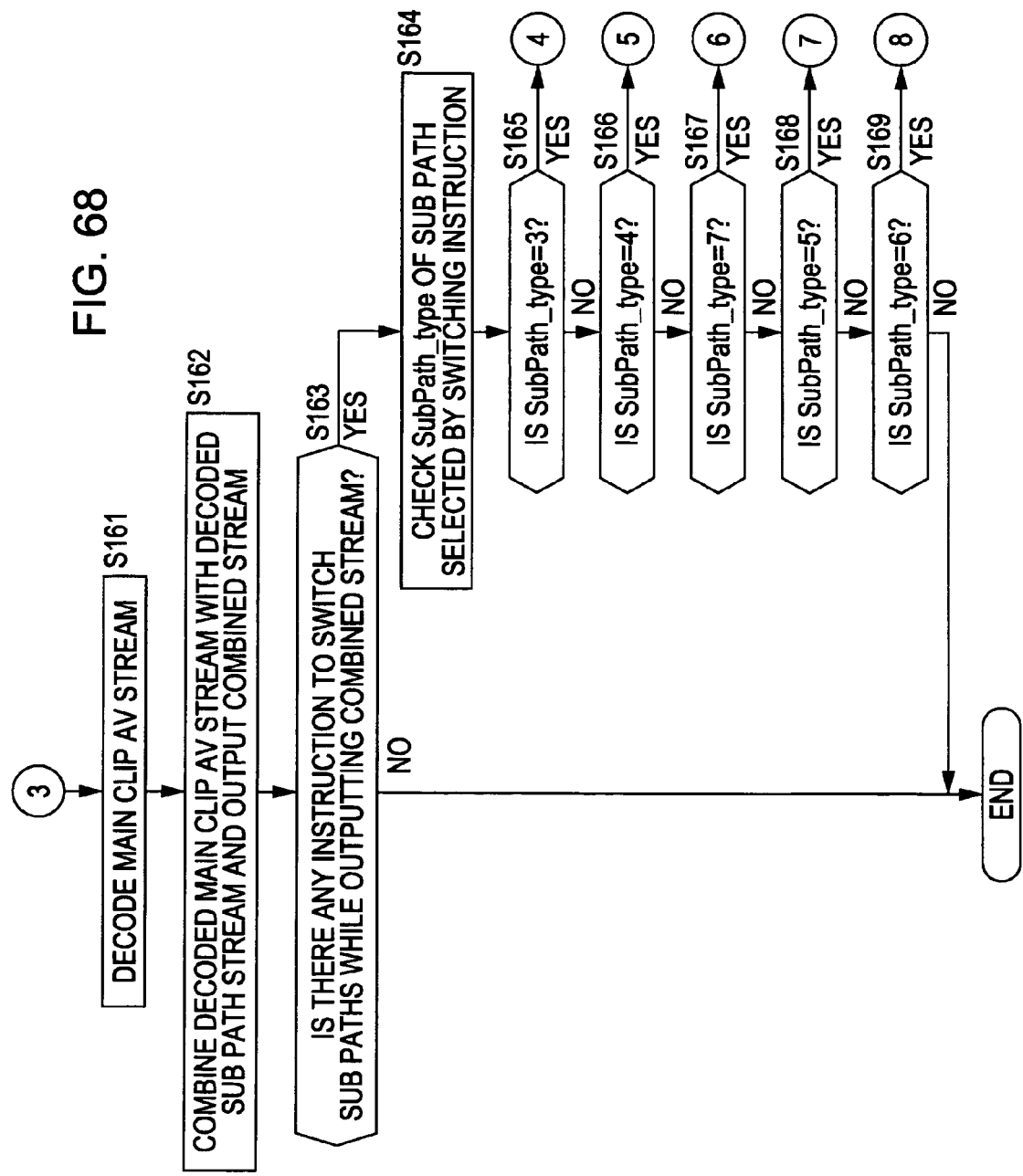
FIG. 68 is a flowchart illustrating the playback processing for a PlayList having application_type=1 or 2 in the playback apparatus shown in FIG. 53.

After step S160, or if the outcome of step S156 is NO, the process proceeds to step S161 in FIG. 68.

In step S161, the AV decoder 403 decodes the main clip AV stream. The main clip AV stream includes a video stream or an audio stream referred to by the Main Path of the PlayList to be played back, and is contained in the main TS. The main clip AV stream is a primary video stream or a primary audio stream in the picture-in-picture technique. That is, the first video decoder 72 or the first audio decoder 75-1 of the AV decoder 403 executes step S161.

In step S162, the AV decoder 403 combines the decoded main clip AV stream with the decoded Sub Path stream, and outputs the combined stream. The decoded Sub Path stream includes at least 0 Sub Path stream among the IG decoded in step S144 in FIG. 65 and stored in the preload buffer 414 in step S145, the text subtitle decoded in step S148 in FIG. 65, the audio stream decoded in step S151 in FIG. 66, the audio stream decoded in step S155 in FIG. 67, the audio stream decoded in step S159 in FIG. 66, and the video stream decoded in step S160 in FIG. 66.

In step S163, the controller 21 determines whether an instruction to switch Sub Paths has been given (by the user) operation while outputting the stream combined in step S162.

If it is determined in step S163 that there is no instruction to switch Sub Paths, the playback processing for a PlayList of application_type=1 or 2 is completed.

If it is determined in step S163 that an instruction to switch Sub Paths has been given, the process proceeds to step S164.

In step S164, the controller 21 checks SubPath_type of the Sub Path selected by the switching instruction. More specifically, if specific secondary_audio_stream or secondary_video_stream is selected from at least one secondary_audio_stream (audio_stream_id2) or secondary_video_stream (video_stream_id2) defined in STN_table, the controller 21 checks the stream entry associated with the specified secondary_audio_stream or secondary_video_stream based on STN_table( ). The controller 21 then checks SubPath_id from ref_to_SubPath_id recorded in the stream entry, and specifies SubPath of PlayList( ) in FIG. 9 from SubPath_id, and obtains SubPath_type from SubPath( ) in FIG. 10.

In step S165, the controller 21 determines whether the result of step S164 is SubPath_type=3.

If it is determined in step S165 that SubPath_type=3, the process returns to step S143 in FIG. 65. That is, the IG to be combined with the main clip AV stream is switched.

If it is determined in step S165 that the result of step S164 is not SubPath_type=3, the process proceeds to step S166.

The controller 21 determines in step S166 whether the result of step S164 is SubPath_type=4.

If it is determined in step S166 that SubPath_type=4, the process returns to step S147, and step S147 and the subsequent steps are repeated. That is, the text subtitle to be combined with the main clip AV stream is switched.

If it is determined in step S166 that the result of step S164 is not SubPath_type=4, the process proceeds to step S167.

The controller 21 determines in step S167 whether the result of step S164 is SubPath_type=7.

If it is determined in step S167 that SubPath_type=7, the process returns to step S150, and step S150 and the subsequent steps are repeated. That is, the video/audio stream to be combined with the main clip AV stream is switched.

If it is determined in step S167 that the result of step S164 is not SubPath_type=7, the process proceeds to step S168.

The controller 21 determines in step S168 whether the result of step S164 is SubPath_type=5.

If it is determined in step S168 that SubPath_type=5, the process returns to step S153 in FIG. 53, and step S153 and the subsequent steps are repeated. That is, the audio stream to be combined with the main clip AV stream is switched.

If it is determined in step S168 that the result of step S164 is not SubPath_type=5, the process proceeds to step S169.

The controller 21 determines in step S169 whether the result of step S164 is SubPath_type=6.

If it is determined in step S169 that SubPath_type=6, the process returns to step S157 in FIG. 67, and step S157 and the subsequent steps are repeated. That is, the audio stream or the video stream to be combined with the main clip AV stream is switched.

If it is determined in step S169 that the result of step S164 is not SubPath_type=6, the playback processing for a PlayList of application_type=1 or 2 is completed.

As has been discussed above, to implement an application using the picture-in-picture technique, the definition of combinations of streams to be played back together with a primary video stream, i.e., combinations of secondary video streams, primary audio streams, secondary audio streams, and subtitle streams, is necessary.

By defining a plurality of combinations, not only a primary video stream or a primary audio stream played back in the full screen 301, but also a secondary video stream, a secondary audio stream, or a subtitle stream played back in the sub-screen 302 can be easily switched.

Another example of STN_table( ), i.e., eighth STN_table( )), which is similar to the seventh STN_table( ) shown in FIGS. 44 and 45, for defining combinations of streams that can be played back together with a primary video stream is discussed below with reference to FIGS. 69 and 70.

More specifically, FIGS. 69 and 70 illustrate the syntax of the eighth STN_table( ) defining combinations of secondary video streams, primary audio streams, secondary audio streams, and subtitle streams, and more specifically, a combination of a secondary audio stream and a primary audio stream, a combination of a secondary video stream and a secondary audio stream, and a combination of a secondary video stream and a picture-in-picture application presentation graphics or text subtitle. The playback processing executed by referring to the eighth STN_table( ) can also be performed by the playback apparatus 401 shown in FIG. 52. In FIGS. 69 and 70, portions similar to those in FIGS. 44 and 45 are not explained for avoiding repetitions.

The 8-bit number_of_audio_stream2_entries field indicates the number of secondary audio streams registered in STN_table( ).

The number of secondary audio streams can be determined by audio_stream2_number=audio_stream2_id+1.

The 8-bit number_of_video_stream2_entries field indicates the number of secondary video streams registered in STN_table( ).

The number of secondary video streams can be determined by video_stream2_number=video_stream2_id+1.

In the stream_entry( ) block of each video_stream2_id, the type field should be set to be 2.

The 8-bit number_of_PiP_PG_textST_stream_entries indicates the number of PiP application PG or text subtitle streams registered in STN_table( ).

The number of PiP application PG (presentation graphics) or text subtitle streams is determined by PiP_PG_textST_stream_number=PiP_PG_textST_stream_id+1.

The comb_info_Secondary_audio_Primary_audio( ) block indicates the combination of a secondary audio stream and a primary audio stream.

In the comb_info_Secondary_audio_Primary_audio( ) block, the 8-bit number_of_audio_stream_ref_entries field indicates the number of primary audio streams that can be combined with a secondary audio stream. The 8-bit audio_stream_id_ref indicates the ID of the primary audio stream that can be combined with a secondary audio stream.

The comb_info_Secondary_video_Secondary_audio( ) block indicates the combination of a secondary video stream and a secondary audio stream.

In the comb_info_Secondary_video_Secondary_audio( ) block, the 8-bit number_of_audio_stream2_ref_entries indicates the number of secondary audio streams that can be combined with a secondary video stream. The 8-bit audio_stream_id2_ref field indicates the ID of the secondary audio stream that can be combined with a secondary video stream.

The comb_info_Secondary_video_PiP_PG_textST( ) block indicates the combination of a secondary video stream and a picture-in-picture application PG or text subtitle stream.

In the comb_info_Secondary_video_PiP_PG_textST( ) block, the 8-bit number_of_PiP_PG_textST_ref_entries field indicates the number of PiP application PG or text subtitle streams that can be combined with a secondary video stream. The 8-bit PiP_PG_textST_stream_id_ref field indicates the ID of the PiP application PG or text subtitle stream that can be combined with a secondary video stream.

As in the STN_table( ) shown in FIGS. 35, 41, 42, 44, and 45, instead of the IDs, the corresponding numbers may be used. For example, instead of audio_stream_id, the audio stream number (audio_stream_number) may be used, or instead of audio_stream_id2, the audio stream number 2 (audio_stream_number2) may be used. The same applies to video streams and subtitle streams.

According to FIGS. 69 and 70, combinations of secondary audio streams and primary audio streams, combinations of secondary video streams and secondary audio streams, and combinations of secondary video streams and PiP application PG or text subtitle streams can be defined.

Accordingly, inconsistent combinations, such as combinations of picture-in-picture application PG/text subtitle streams (PiP PG TextST streams) combinations that can be simultaneously played back with primary video streams video streams), in addition to combinations of secondary video streams (#2 video streams), primary audio streams (#1 audio streams), secondary audio streams (#2 audio streams), and subtitle streams (PG TextST streams) that can be simultaneously played back with primary video streams (#1 video streams), are not defined.

In the playback apparatus 401, a plurality of registers are disposed in part of the rewritable memory area of the memory 23, and playback processing is executed based on the values set in those registers.

The values set in some registers related to the functions unique to the playback apparatus 401, for example, the value indicating whether the playback apparatus 401 can play back audio streams #2, is not changed. In contrast, values set in predetermined registers are changed in response to an operation input from a user or a navigation command generated by a navigation program.

A navigation command may be recorded, separately from stream data, on a recording medium or a built-in hard disk, and is then preloaded and supplied to the controller 21 by the playback apparatus 401. Alternatively, a navigation command may be recorded on a recording medium or a built-in hard disk by being embedded in stream data, and is loaded and supplied to the controller 21 by the playback apparatus 401 when the stream data is played back.

In the registers, values for various settings required for playback processing by the playback apparatus 401 are stored. Preferably, the following registers are included: a register defining subtitle streams (PG TextST streams) played back by the playback apparatus 401, a register defining picture-in-picture application PG or text subtitle streams (PiP PG TextST streams) played back by the playback apparatus 401, a register indicating the IDs of subtitle streams (PG TextST streams) played back by the playback apparatus 401, a register indicating the language code numbers (or IDs) of subtitle streams played back by the playback apparatus 401, a register indicating the ID of an initially set language, and a register indicating the code numbers (or IDs) of countries corresponding to subtitle streams played back by the playback apparatus 401.

When a picture-in-picture application is started, by considering the viewability, the playback apparatus 401 may display only one of a subtitle stream (PG TextST stream) or a picture-in-picture application PG or text subtitle stream (PiP PG TextST stream). Alternatively, the playback apparatus 401 may display a subtitle stream (PG TextST stream) or a picture-in-picture application PG or text subtitle stream (PiP PG TextST stream) together.

Figure 71:
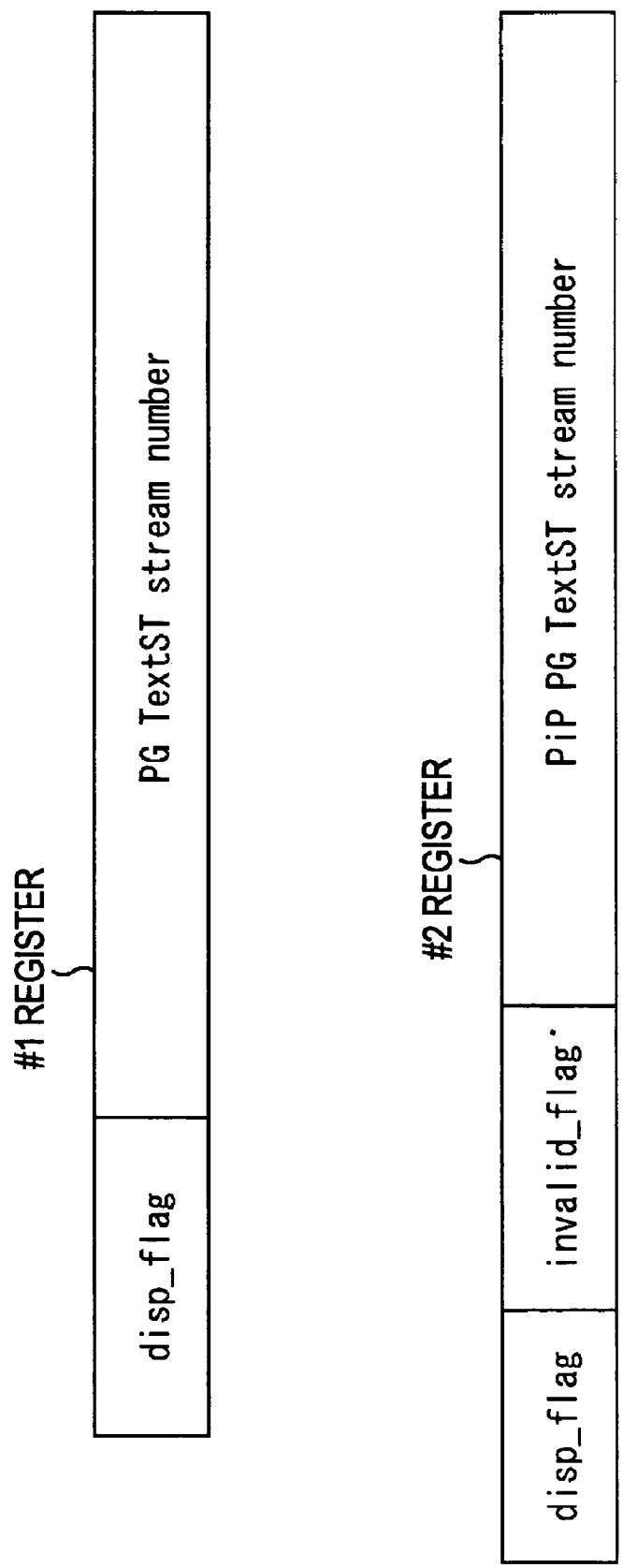
FIG. 71 illustrates registers.

Examples of the registers are now described with reference to FIG. 71. One register is used for determining, when a picture-in-picture application is started, whether the playback apparatus 401 plays back (displays) primary subtitle streams (PG TextST streams) (which are not for the picture-in-picture application). By referring to this register, it can also be determined, if the PG TextST streams are played back, which stream is played back. The other register is used for determining whether a picture-in-picture application PG or text subtitle stream (PiP PG TextST stream) is played back. By referring to this register, it can also be determined, if it is played back, which stream is played back.

More specifically, #1 register is a register indicating the ID number of a primary PG TextST stream. That is, the #1 register indicates the PG TextST stream to be played back from among primary PG TextST streams registered in STN_table( ) of the current PlayItem.

In the #1 register, if disp_flag (display_flag) indicates 0, the primary PG TextST stream is not displayed, and if disp_flag indicates 1, the primary PG TextST stream is displayed. In the #1 register, the PG TextST stream number is the ID number of the primary PG TextST stream registered in STN_table( ) of the current PlayItem( ).

Then, #2 register is a register indicating the ID number of a picture-in-picture application PG TextST stream.

In the #2 register, if disp_flag indicates 0, the picture-in-picture application PG TextST stream is not displayed, and if disp_flag indicates 1, the picture-in-picture application PG TextST stream is displayed. The picture-in-picture application PG TextST stream number indicates the ID number of the picture-in-picture application PG TextST stream registered in STN_table( ) of the current PlayItem( ). When invalid_flag indicates 0, the ID number of the PiP application PG TextST stream is valid, and when invalid_flag indicates 1, the ID number of the picture-in-picture application PG TextST stream is invalid.

If 0xFF is registered in the PG TextST stream number, the PG TextST stream is not selected or does not exist. If 0xFF is registered in the PiP application PG TextST stream number, the picture-in-picture application PG TextST stream is not selected or does not exist.

Even if a value other than 0xFF is registered in the PG TextST stream number or the PiP application PG TextST stream number, the validity of displaying the corresponding stream can be determined by a combination of invalid_flag and disp_flag. That is, when disp_flag of the #1 or #2 register indicates 0, i.e., when displaying of the corresponding stream is invalid, it is not always that 0xFF is set in the PG TextST stream number or the PiP application PG TextST stream number. More specifically, when disp_flag of the #1 or #2 register indicates 0, i.e., when displaying of the corresponding stream is invalid, the value (other than 0xFF) registered in the PG TextST stream number or the PiP application PG TextST stream number is ignored, and the corresponding stream is not displayed.

By referring to the values set in those registers, playback processing for the corresponding streams can be played back in the playback apparatus 401.

For example, it is now assumed that the playback apparatus 401 can display only one of a subtitle stream (PG TextST stream) or a picture-in-picture application PG TextST stream (PiP PG TextST stream) when a picture-in-picture application is started. In this case, the primary PG TextST stream associated with the PG TextST stream number set in the #1 register is played back when PiP display is not performed, and more specifically, when disp_flag of the #1 register is 1 and invalid_flag of the #2 register is 1 or when displaying of Secondary Video is invalid. When the value of the #1 register is changed, the status of the playback operation of the primary PG TextST stream is immediately changed.

If the PG TextST stream number of the #1 register does not coincide with the PG TextST stream number registered in STN_table( ) of PlayItem( ), the primary PG TextST stream to be played back is selected by a PG TextST stream automatic selection routine.

According to the automatic selection routine, the register indicating languages that can be displayed by the playback apparatus 401 and languages that cannot be displayed by the playback apparatus 401 is first checked to preferentially select streams corresponding to languages that can be displayed by the playback apparatus 401, and then, streams corresponding to language codes set in the playback apparatus 401 are preferentially selected, and then, numbers registered in STN_table( ) are preferentially selected in ascending order.

The picture-in-picture application PG TextST stream associated with the PiP application PG TextST stream number set in the #2 register is played back when displaying of the secondary video is valid, and when disp_flag of the #2 register indicates 1 and invalid_flag indicates 0, and when the ID number of the PiP application PG TextST stream registered in the #2 register is included in the PiP application PG TextST stream registered in STN_table( ) of the current PlayItem( ).

If the number registered in the #2 register does not coincide with the PiP application PG TextST stream registered in STN_table( ) of PlayItem( ) even though displaying of the secondary video is valid and even though disp_flag of the #2 register indicates 1 and invalid_flag indicates 0, the picture-in-picture application PG TextST stream to be played back is selected by a PiP application PG TextST stream automatic selection routine.

According to the automatic selection routine, the register indicating languages that can be displayed by the playback apparatus 401 and languages that cannot be displayed by the playback apparatus 401 is first checked to preferentially select streams corresponding to languages that can be displayed by the playback apparatus 401, and then, streams corresponding to language codes set in the playback apparatus 401 are preferentially selected, and then, numbers registered in STN_table( ) are preferentially selected in ascending order.

An example in which a primary PG textST stream is played back when the picture-in-picture display operation is executed is described below with reference to FIG. 72.

In the state in which the picture-in-picture display operation is not executed (indicated by "No PiP" in FIG. 72), if disp_flag of the #1 register is 1, the PG TextST stream number set in the #1 register is checked regardless of the setting status of the #2 register, and then, the PG TextST stream having the PG TextST stream number=0x05 registered in STN_table( ) is played back (displayed).

Figure 72:
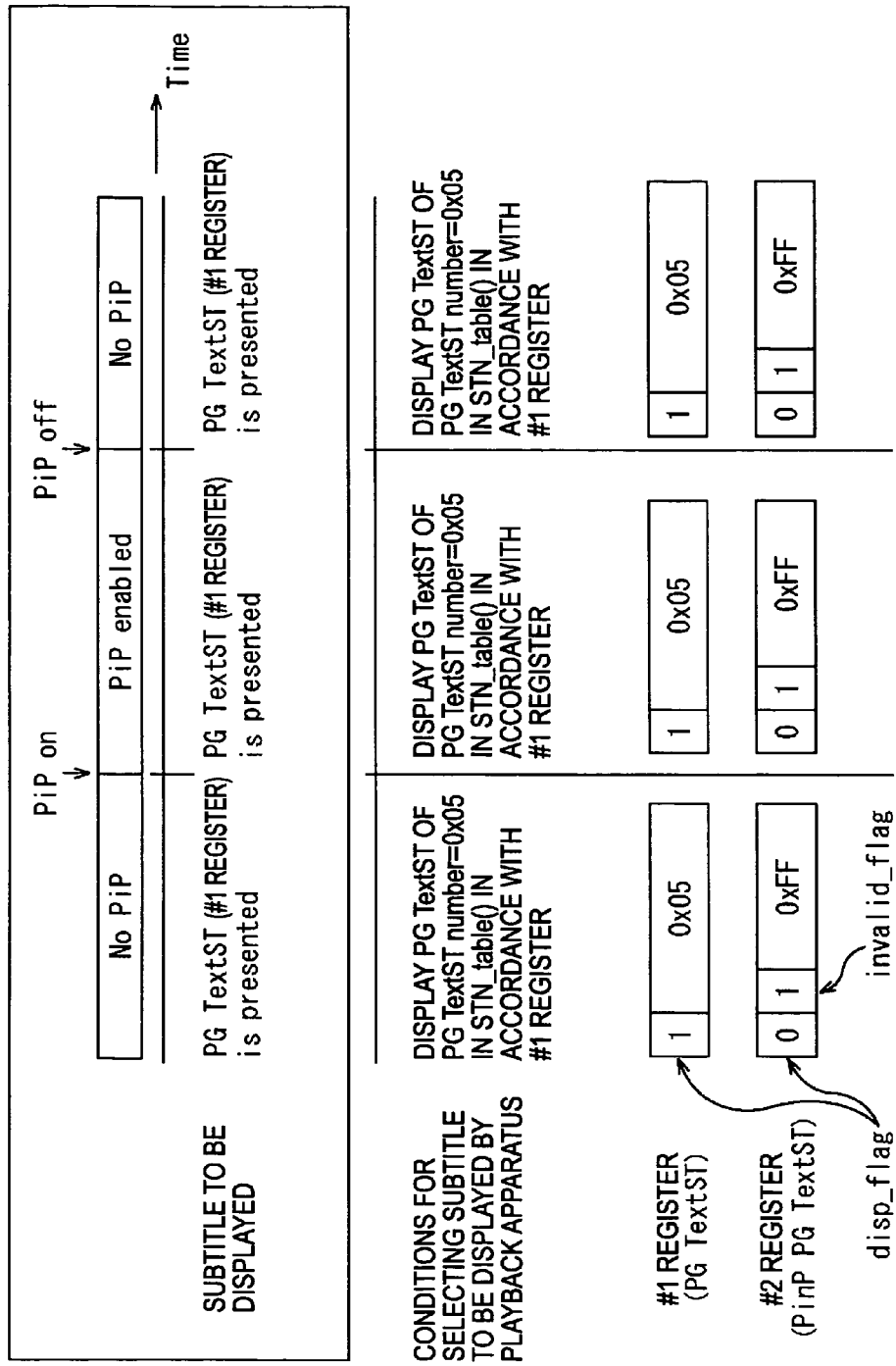
FIG. 72 illustrates an example in which a primary PG TextST stream is played back when a PiP display operation is executed.

Then, in response to a navigation command by a navigation program or the input of a predetermined operation from a user, the picture-in-picture display operation is started (indicated by "PiP on" in FIG. 72). In this case, even if the user selects displaying of a picture-in-picture application PG TextST stream is selected (even if disp_flag=1), the PiP application PG TextST stream is not displayed if invalid_flag of the #2 register is 1 by (for example, a navigation command generated by the navigation program). That is, even though the picture-in-picture display operation is executed (indicated by "PiP enabled" in FIG. 72), the PG TextST stream number set in the #1 register is checked so that the PG TextST stream having the PG TextST stream number=0x05 is played back (displayed).

The navigation command may be recorded on, separately from stream data, for example, a recording medium, and is preloaded and supplied to the controller 21 by the playback apparatus 401. Alternatively, the navigation command may preferably be recorded on a recording medium by being embedded in stream data, and is loaded and supplied to the controller 21 when the stream data is played back, which makes control of the command execution timing easy.

A navigation command that can set invalid_flag is generated, for example, in the following manner. A content creator may embed a navigation command in a stream (for example, in an interactive graphics stream (IG stream), so that invalid_flag can be automatically changed. Alternatively, button information and control information for changing invalid_flag are contained in an IG stream, and buttons that can be operated by the user can be displayed while the IG stream is being played back. Then, when the user presses (selects) a certain button, invalid_flag can be changed.

When the picture-in-picture display operation is finished (indicated by "PiP off" in FIG. 72) so that the state in which the picture-in-picture display operation is not performed (indicated by "No PiP" in FIG. 72) has resumed, if disp_flag of the #1 register is 1, the PG TextST stream number set in the #1 register is checked regardless of the setting status of the #2 register, and the PG TextST stream having the PG TextST stream number=0x05 is played back (displayed).

An example in which a picture-in-picture application PG TextST stream is played back when the picture-in-picture display operation is executed is now discussed below with reference to FIG. 73.

For example, in the state in which the picture-in-picture display operation is not executed (indicated by "No PiP" in FIG. 73), when disp_flag of the #1 register is 1, the PG TextST stream number set in the #1 register is checked regardless of the status setting of the #2 register, and the PG TestST stream having the PG TextST stream number=0x05 registered in STN_table( ) is played back (displayed).

Figure 73:
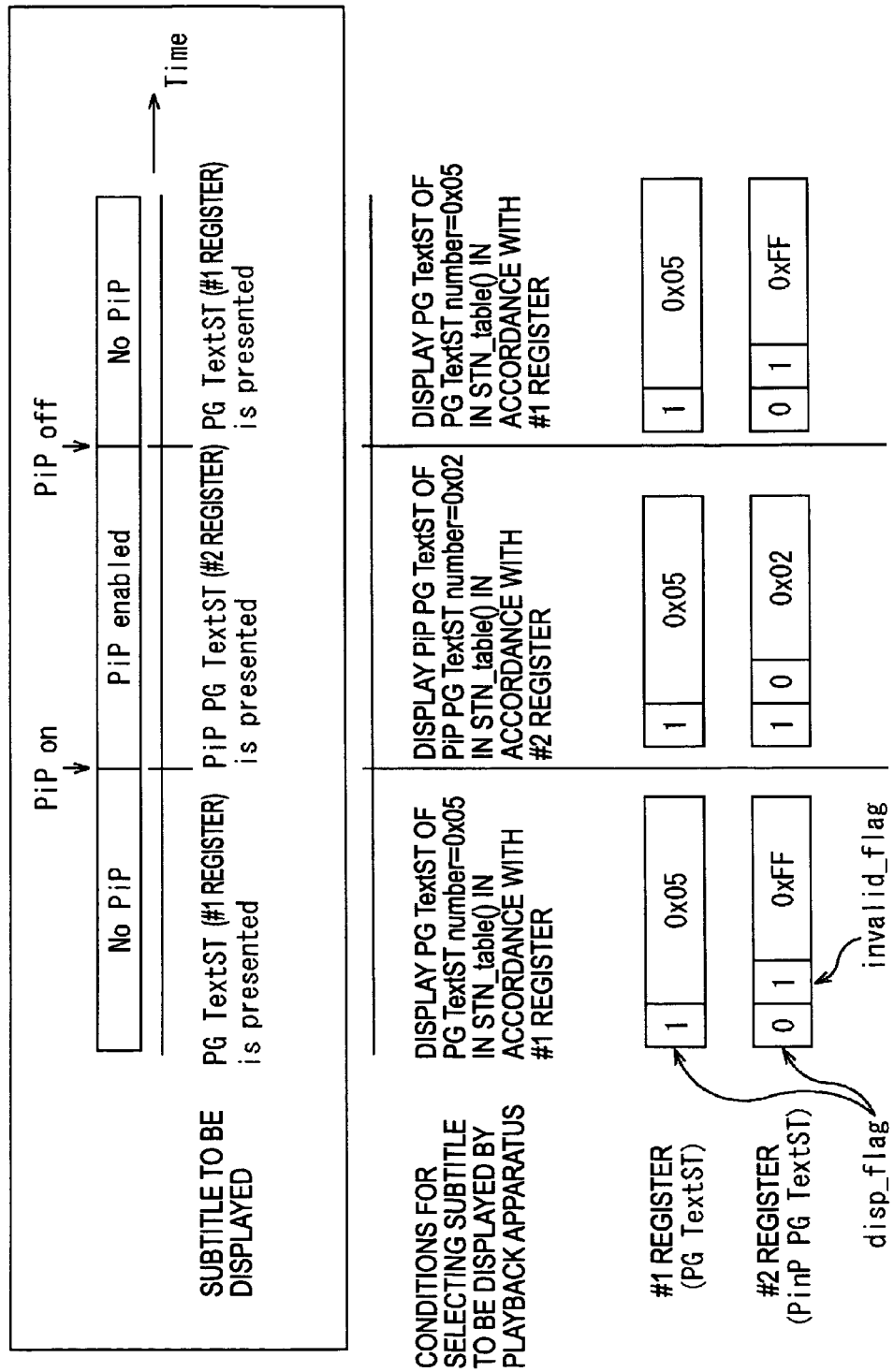
FIG. 73 illustrates an example in which a picture-in-picture application PG TextST stream is played back when a picture-in-picture display operation is executed.

Then, in response to a navigation command by a navigation program (for example, a navigation command embedded in a stream) or the input of a predetermined operation from the user, the picture-in-picture display operation is started (indicated by "PiP on" in FIG. 73). In this case, if invalid_flag of the #2 register is 0 and disp_flag is 1, the PiP application PG TextST stream number set in the #2 register is checked, and the picture-in-picture application PG TextST stream having the PiP application PG TextST stream number=0x02 is displayed. If the user does not select displaying of a picture-in-picture application PG TextST stream (when disp_flag is 0), the picture-in-picture application PG TextST stream is not displayed.

When the picture-in-picture display operation is finished (indicated by "PiP off" in FIG. 73) so that the state in which the picture-in-picture display operation is not performed (indicated by "No PiP" in FIG. 73) has resumed, if disp_flag of the #1 register is 1, the PG TextST stream number set in the #1 register is checked regardless of the setting status of the #2 register, and the PG TextST stream having the PG TextST number=0x05 registered in STN_table( ) is played back (displayed).

If 0xFF is registered in the PiP application PG TextST stream number in FIG. 72 or 73, a TextST stream is not selected or does not exist. Even if a value other than 0xFF is registered in the PG TextST stream number or the PiP application PG TextST stream number, the validity of displaying the corresponding stream can be determined by a combination of invalid_flag and disp_flag. That is, when invalid_flag is 1, i.e., when displaying of the corresponding stream is invalid, the value (other than 0xFF) registered in the PG TextST stream number or the PiP application PG TextST stream number is ignored, and the corresponding stream is not displayed.

In the example shown in FIG. 72 or 73, two registers, i.e., the #1 register for primary video image (subtitle) information and the #2 register for secondary video (PiP) image (subtitle) information, are provided. However, only a single register may be provided.

Additionally, disp_flag may be only one flag. In this case, the disp_flag indicates whether a PG TextST stream, which is a primary video image (subtitle) stream, or a PiP PG_TextST stream, which is a secondary video (PiP) image (subtitle) stream, is displayed, that is, the flag indicates whether image information is displayed. In this case, invalid_flag indicates whether the image corresponding to the primary video information or the PiP image information is displayed.

A description is given below of playback processing for a PiP (picture-in-picture) application PG TextST stream with reference to the flowchart in FIG. 74.

In step S301, the controller 21 checks STN_table( ) of the current PlayItem( ) for the corresponding PG TextST streams according to the PG TextST stream number set in the #1 register.

In step S302, the controller 21 specifies the desired PG TextST stream, reads it from the clip recorded on the recording medium 11 or the local storage 24, and plays it back in accordance with disp_flag.

For example, if disp_flag of the #1 register is 1, the controller 21 checks the PG TextST stream number set in the #1 register to read the PG TextST stream having the PG TextST stream number registered in STN_table( ) and supplies it to the AV decoder 403. The read PG TextST stream is supplied to the presentation graphics plane generator 93 via the corresponding buffer, PID filter, and switch so that a presentation graphics plane, which is a rendering image, is generated and supplied to the video data processor 96. The presentation graphics plane is combined with, for example, a primary video stream, in the video processor 96, and is output together with the corresponding sound data.

In step S303, the controller 21 starts the picture-in-picture display operation (PiP ON).

If PiP display is synchronized with the Main Path, the start (PiP ON) and the end (PiP OFF) of the PiP display operation are conducted at predetermined times represented by SubPlayItem_IN_time and SubPlayItem_OUT_time, respectively, of the SubPlayItem shown in FIG. 12 which indicates the video stream to be played back by the PiP display operation. In contrast, if PiP display is not synchronized with the Main Path, the start (PiP ON) and the end (PiP OFF) of the PiP display operation are set in response to the input from the user or a navigation command.

In step S304, the controller 21 changes invalid_flag set in the #2 register, if necessary, in response to a navigation command embedded in the stream or preloaded after being read from a location different from the stream.

The controller 21 then determines in step S305 whether invalid_flag is 0 (i.e., whether the PiP PG TextST display operation is valid).

If invalid_flag is found to be 0 in step S305, the process proceeds to step S306 to determine whether disp_flag is 1 (i.e., whether the PiP PG TextST display operation is performed) in the #2 register. More specifically, if the picture-in-picture display is not synchronized with the Main Path, the controller 21 determines in steps S305 and S306 whether an instruction to perform a picture-in-picture display operation has been given by the user and whether disp_flag set in the #2 register is 1.

The order of steps S305 and S306 may be reversed.

Figure 75:
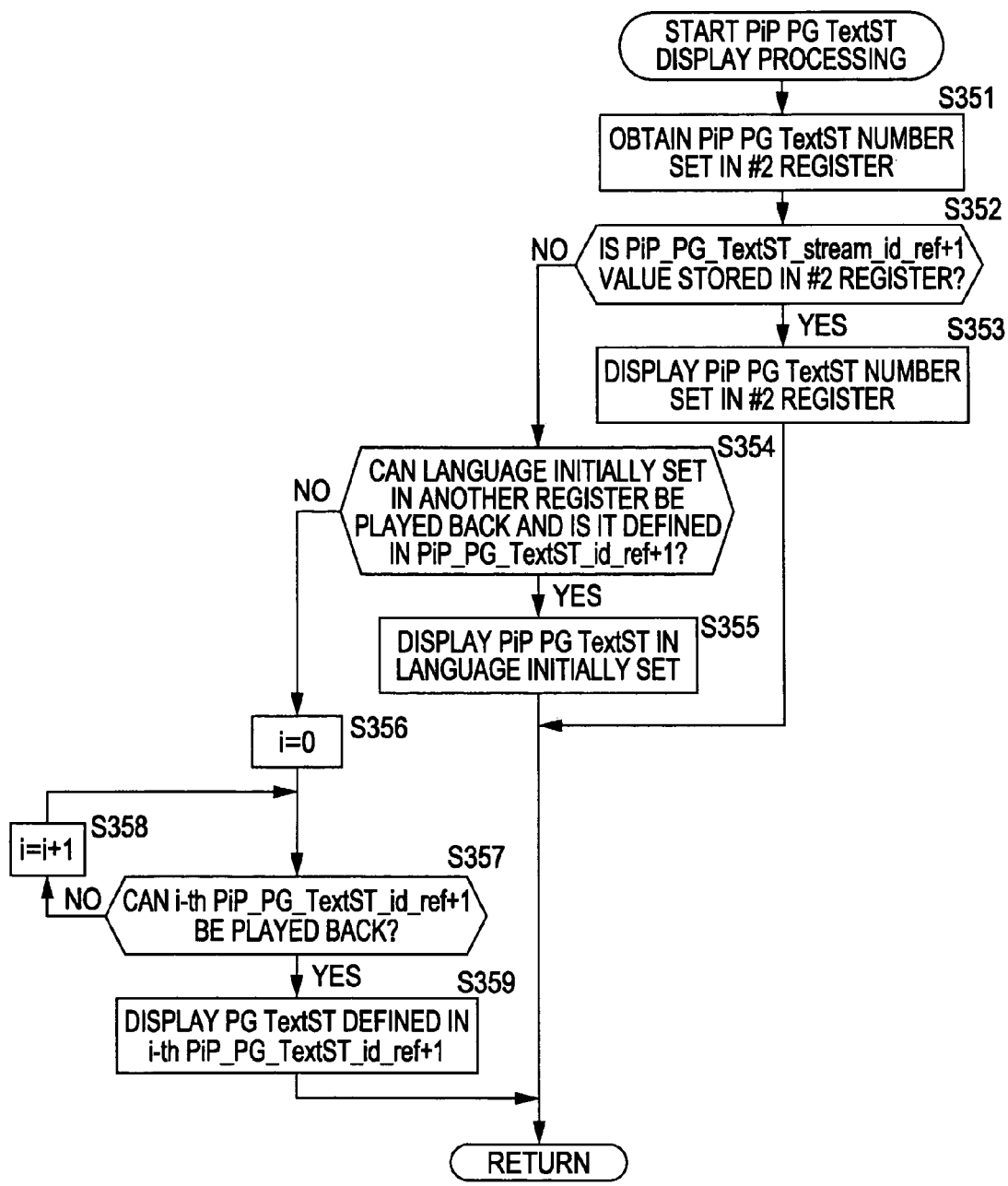
FIG. 75 is a flowchart illustrating PiP PG TextST stream display processing.

If it is determined in step S306 that disp_flag in the #2 register is 1, the process proceeds to step S307 in which PiP PG Text ST processing, which is discussed below with reference to the flowchart in FIG. 75, is performed. The process then proceeds to step S311.

If disp_flag is 1 in the #1 register, the primary PG textST stream may be displayed together with the picture-in-picture application PG TextST stream.

If it is determined in step S305 that invalid_flag is not 0 (i.e., invalid_flag is 1), or if it is determined in step S306 that disp_flag is not 1 (i.e., disp_flag is 0), the process proceeds to step S308 to determine whether disp_flag is 1 (PG TextST display) in the #1 register.

If it is determined in step S308 that disp_flag is 1 in the #1 register, the process proceeds to step S309. In step S309, the controller 21 checks STN_table( ) of the current PlayItem( ) for the corresponding PG TextST stream in accordance with the PG TextST stream number set in the #1 register to specify the PG TextST stream to be played back, and displays the specified stream. The process then proceeds to step S311. If disp_flag is only one flag indicating whether a PG TextST stream, which is a primary video image (subtitle) stream, or a PiP PG textST stream, which is a PiP image (subtitle) stream, is displayed, i.e., a flag indicating whether image information is displayed, the same disp_flag is checked in step S306 or S308.

For example, if disp_flag is 1 in the #1 register, the controller 21 checks the value of the PG TextST stream number set in the #1 register to read the PG TextST stream having the PG TextST stream number registered in STN_table( ), and supplies the read PG TextST stream to the AV decoder 403. The read PG TextST stream is then supplied to the presentation graphics plane generator 93 via the corresponding buffer, PID filter, and switch, and a presentation graphics plane, which is a rendering image, is generated and is supplied to the video processor 96. The presentation graphics plane is then mixed with, for example, a primary video stream, and is output together with the corresponding sound data.

If it is determined in step S308 that disp_flag is not 1 (i.e., disp_flag is 0), the process proceeds to step S310. In step S310, the controller 21 determines that no PG TextST stream is displayed (for example, corresponding subtitles are not displayed on the full screen 301 or the sub-screen 302). The process then proceeds to step S311.

After step S307, S309, or S310, the process proceeds to step S311 to determine whether the picture-in-picture (PiP) display operation is finished.

As stated above, if picture-in-picture display is synchronized with the Main Path, the picture-in-picture display operation are started (PiP ON) and ended (PiP OFF) at predetermined times regardless of whether there is an input from the user. In contrast, if picture-in-picture display is not synchronized with the Main Path, the start (PiP ON) and the end (PiP OFF) of the PiP display operation are set in response to the input from the user.

If it is determined in step S311 that the picture-in-picture (PiP) display operation is not finished, the process returns to step S304, and step S304 and the subsequent steps are repeated. If it is determined in step S311 that the picture-in-picture (PiP) display operation is finished, the processing is completed.

According to the above-described processing, it is determined based on the value set in the #1 register or the #2 register, when the picture-in-picture display operation is performed, whether the primary (which is not for a PiP application) subtitle streams (PG TextST streams) or picture-in-picture application PG text subtitle streams (PiP PG TextST streams) for a picture-in-picture application is displayed. Basically, a determination as to which stream is to be played back is also determined by the setting of the #1 register or the #2 register. However, if the setting of the #1 or #2 register does not coincide with the content of STN_table( ), the above-described automatic selection routine is performed for determining the stream to be played back.

Figure 74:
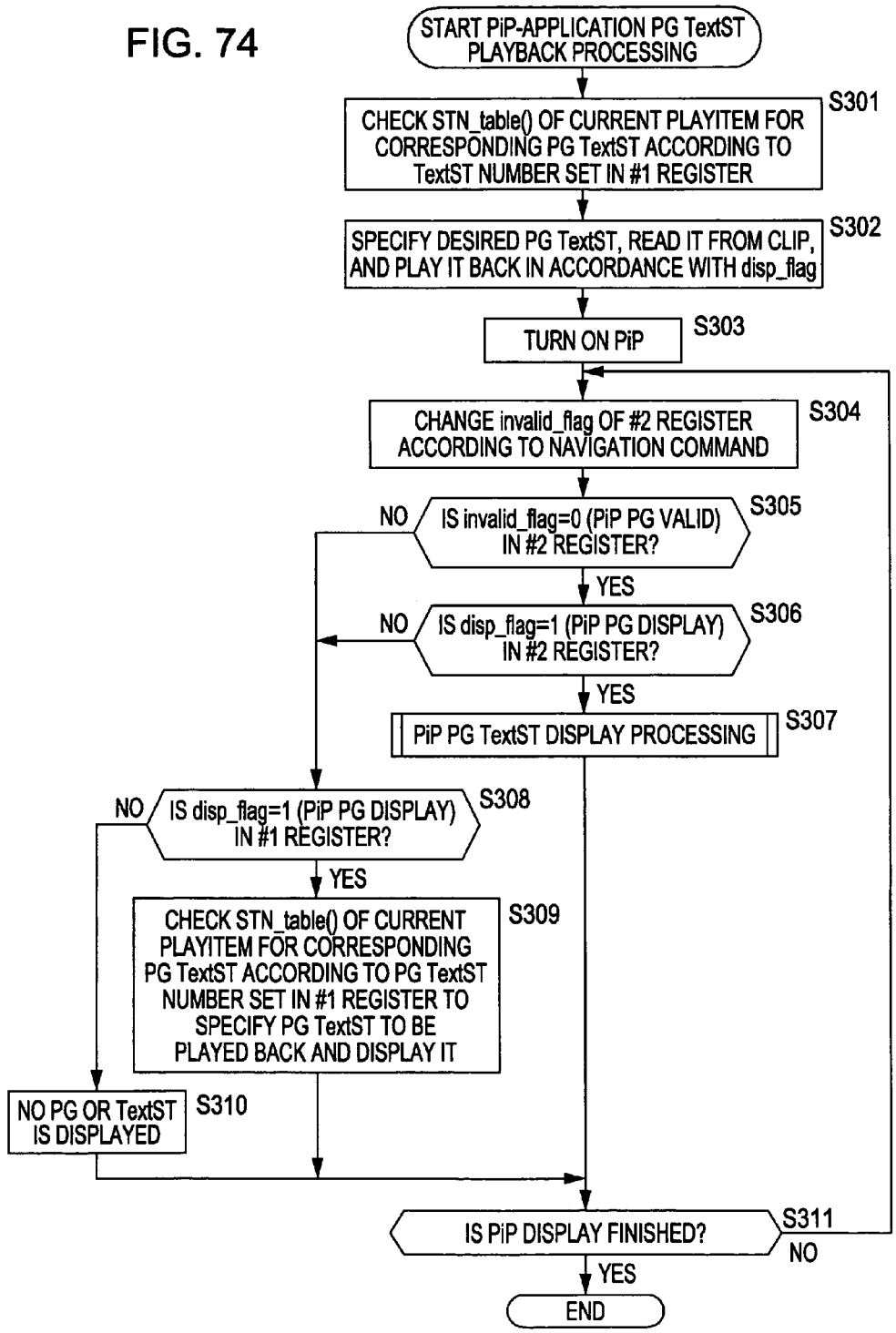
FIG. 74 is a flowchart illustrating PiP (picture-in-picture) application PG TextST playback processing.

The PiP PG TextST stream display processing executed in step S307 in FIG. 74 is discussed below with reference to the flowchart in FIG. 75.

In step S351, the controller 21 obtains the PiP PG TextST stream number registered in the #2 register. The PiP PG TextST stream number may be set by referring to the stream number table, or in response to the input from the user, or by the above-described navigation command. Alternatively, the value set in the previous picture-in-picture display operation may be used as the PiP PG TextST stream number.

In step S352, the controller 21 determines whether the value obtained by adding one to PiP_PG_textST_stream_id_ref of the eighth STN_table( ) discussed with reference to FIGS. 69 and 70 is stored in the #2 register.

If it is determined in step S352 that the above-described value (PiP_PG_textST_stream_id_ref+1) is stored in the #2 register, the process proceeds to step S353. In step S353, the controller 21 displays the PiP PG TextST stream corresponding to the PiP PG TextST stream number set (stored) in the #2 register. The process returns to step S307 in FIG. 74 and proceeds to step S311.

More specifically, the controller 21 reads the PiP PG TextST stream associated with the PiP PG TextST stream number set in the #2 register from the recording medium 11 via the storage drive 22 or from the local storage 24. The read PG TextST stream is then supplied to the presentation graphics plane generator 93 via the corresponding buffer, PID filter, and switch, and a presentation graphics plane, which is a rendering image, is generated and is supplied to the video processor 96. The presentation graphics plane is then combined with, for example, a primary video stream or a secondary video stream, and is output together with the corresponding sound data.

If it is determined in step S352 that the above-described value (PiP_PG_textST_stream_id_ref+1) is not stored in the #2 register, the process proceeds to step S354. In step S354, the controller 21 refers to PG_language_code and textST_language_code of stream_attribute( ) (FIG. 18) of STN_table and refers to the register indicating initial settings of languages (the register different from the #1 register or the #2 register) to determine whether the playback apparatus 401 can play back the languages set in the register and whether the language is defined by the value (PiP_PG_textST_id_ref+1).

If it is determined in step S354 that the language initially set in the register can be played back and is defined by PiP_PG_textST_id_ref+1 of STN_table( ), the process proceeds to step S355. In step S355, the controller 21 displays the PiP PG TextST stream associated with the initially set language. The process then returns to step S307 in FIG. 74 and proceeds to step S311.

More specifically, the controller 21 reads the PiP PG TextST stream associated with the value set in the register from the recording medium 11 via the storage drive 22 or from the local storage 24. The read PG TextST stream is then supplied to the presentation graphics plane generator via the corresponding buffer, PID filter, and switch, and a presentation graphics plane, which is a rendering image, is generated and is supplied to the video processor 96. The presentation graphics plane is then combined with, for example, a primary video stream, and is output together with the corresponding sound data.

If it is determined in step S354 that the language set in the register cannot be played back or the language is not defined by PiP_PG_textST_id_ref+1 in the eighth STN_table, the process proceeds to step S356. In step S356, the controller 21 sets i to be 0 (i=0). The value i represents the i-th stream (to be determined whether the playback apparatus 401 can play back) of PiP_PG_textST_id_ref defined in STN_table.

Then, in step S357, the controller 21 checks the languages that can be decoded by the playback apparatus 401 by referring to the register indicating such languages, and then determines whether the PiP PG textST stream associated with the value obtained by adding one to the i-th PiP_PG_textST_id_ref can be played back.

If it is determined in step S357 that the stream cannot be played back, the process proceeds to step S358 in which the controller 21 sets i to be i+1 (i=i+1). The process then returns to step S357, and step S357 and the subsequent steps are repeated. That is, it is determined in step S357 whether PiP PG textST streams can be played back in ascending order of the streams registered in STN_table( ).

If it is determined in step S357 that the stream can be played back, the process proceeds to step S359. In step S359, the controller 21 displays the PiP PG textST stream defined by the i-th PiP_PG_textST_id_ref+1, and returns to step S307 in FIG. 74 and proceeds to step S311.

More specifically, the controller 21 reads the PiP PG textST stream defined by the PiP PG TextST stream corresponding to the value obtained by adding one to the i-th PiP_PG_textST_id_ref (which is determined to be played back in step S357) from the recording medium 11 via the storage drive 22 or from the local storage 24. The read PG TextST stream is then supplied to the presentation graphics plane generator 93 via the corresponding buffer, PID filter, and switch so that a presentation graphics plane, which is a rendering image, is generated and supplied to the video data processor 96. The presentation graphics plane is combined with, for example, a primary video stream, in the video processor 96, and is output together with the corresponding sound data.

According to the above-described processing, if the PiP PG textST stream number set in the #2 register coincides with the PiP PG textST stream number registered in STN_table of PlayItem( ), the PiP PG textST stream associated with the PiP PG textST stream number is played back. If the PiP PG TextST stream number in the #2 register does not coincide with the PiP PG textST number registered in STN_table( ) of the PlayItem, the picture-in-picture PG textST stream to be played back is selected by the PiP PG TextST stream automatic selection routine.

Another example of STN_table( ), i.e., ninth STN_table( ), defining combinations of streams that can be played back together with a primary video stream is discussed below with reference to FIGS. 76 through 78.

In the ninth example of the syntax of STN_table( ) (ninth STN_table( )) shown in FIGS. 76 through 78, combinations of secondary video streams, primary audio streams, secondary audio streams, subtitle streams, and, in particular, picture-in-picture application primary audio streams, that can be played back together with a primary video stream are defined. More specifically, combinations of secondary audio streams and primary audio streams, combinations of secondary video streams and secondary audio streams, combinations of secondary video streams and picture-in-picture application PG or text subtitle streams, and combinations of secondary video streams and picture-in-picture application primary audio streams are defined.

The playback processing executed by referring to the ninth STN_table( ) can also be performed by the playback apparatus 401 discussed with reference to FIG. 52. In FIGS. 76 through 78, portions similar to those in FIGS. 69 and 70 are not explained for avoiding repetitions.

A new field, the 8-bit number_of_PiP_primary_audio_stream_entries field indicates the number of picture-in-picture application primary audio streams registered in STN_table( ). The number of picture-in-picture application primary audio streams is determined by PiP_primary_audio_stream_number=PiP_primary_audio_stream_id+1.

The comb_info_Secondary_video_PiP_primary_audio( ) block indicates the combination of a secondary video stream and a picture-in-picture application primary audio stream.

In the comb_info_Secondary_video_PiP_primary_audio( ) block, the 8-bit number_of_PiP_primary_audio_ref_entries_SV field indicates the number of picture-inpicture application primary audio streams that can be combined with a secondary video stream. The 8-bit PiP_primary_audio_id_ref_SV field indicates the IDs of picture-in-picture application primary audio streams that can be combined with a secondary video stream.

As in the above-described examples of STN_table, instead of the IDs, the corresponding numbers may be used. For example, instead of audio_stream_id, the audio stream number (audio_stream_number) may be used, and instead of audio_stream_id2, the audio stream number 2 (audio_stream_number2) may be used. The same applies to video streams and subtitle streams.

According to the ninth STN_table( ) shown in FIGS. 76 through 78, combinations of secondary audio streams and primary audio streams, combinations of secondary video streams and secondary audio streams, combinations of secondary video streams and PiP application PG or text subtitle streams, and combinations of secondary video streams and PiP application primary audio streams can be defined.

Accordingly, in addition to inconsistent combinations of secondary video streams (#2 video streams), primary audio streams (#1 audio streams), secondary audio streams (#2 audio streams), subtitle streams (PG TextST streams), and picture-in-picture PG/text subtitle streams (PiP PG TextSt streams) that can be simultaneously played back with primary video streams (#1 video streams), inconsistent combinations of secondary video streams and picture-in-picture application primary audio streams that can be simultaneously played back with primary video streams (#1 video streams) are not defined.

As stated above, in the playback apparatus 141, a plurality of registers are disposed in part of the rewritable memory area of the memory 23, and the playback processing is executed based on the values set in those registers. In part of the rewritable memory area of the memory 23, in addition to the registers discussed with reference to FIG. 70, a register for setting audio streams to be played back when a picture-in-picture application is started is disposed. When the ninth STN_table( ) shown in FIGS. 76 through 78 is used, those registers are checked.

The register unique to the ninth STN_table( ) (register for setting audio streams to be played back when a picture-in-picture application is started) is discussed below with reference to FIG. 79.

The #3 register indicates the ID number of a primary audio stream, and more specifically, the primary audio stream to be played back selected from among primary audio streams registered in STN_table of the current PlayItem( ).

When the picture-in-picture display operation is not executed, the audio stream having the ID number set in the #3 register is played back. However, if the audio stream having the ID number set in the #3 register is not registered in STN_table( ) of the current PlayItem( ), the primary audio stream to be played back is selected by a primary audio stream automatic selection routine.

A determination as to whether the audio stream having the ID number set in the #3 register is played back when the picture-in-picture display operation is executed is made based on the content set in the #5 register. A specific example in which audio streams are played back when a picture-in-picture application is displayed is discussed below.

The #4 register indicates the ID number of a secondary audio stream, and more specifically, the secondary audio stream to be played back selected from among secondary audio streams registered in STN_table( ) of the current PlayItem( ).

When the picture-in-picture display operation is not executed, the audio stream having the ID number set in the #4 register is played back in response to the input from the user or based on various settings. However, if the audio stream having the ID number set in the #4 register is not registered in STN_table( ) of the current PlayItem( ), the secondary audio stream to be played back is selected by a secondary audio stream automatic selection routine. There may be some cases where the audio stream having the ID number set in the #4 register is played back when a picture-in-picture application is displayed. A specific example in which the audio stream having the ID number set in the #4 register is played back when the picture-in-picture display operation is executed is described below.

The #5 register indicates the ID number of a picture-in-picture application primary audio stream, and more specifically, the picture-in-picture application primary audio stream to be played back selected from among picture-in-picture display primary audio streams registered in STN_table( ) of the current PlayItem( ). If invalid_flag is 0 in the #5 register, the ID number of the picture-in-picture application primary audio stream is valid. If invalid_flag is 1, the ID number of the picture-in-picture application primary audio stream is invalid.

If the audio stream having the ID number set in the #5 register is not a picture-in-picture application primary audio stream that can be combined with a secondary video stream in STN_table( ) of the current PlayItem( ), the audio stream to be played back is selected by a picture-in-picture application primary audio stream automatic selection routine.

According to the automatic selection routine, the register indicating audio streams that can be played back and audio streams that cannot be played back by the playback apparatus 141 is first checked. Then, audio streams that can be played back are preferentially selected, and audio streams corresponding to the language codes set in the playback apparatus 141 are preferentially selected, and then, the audio streams are preferentially selected in ascending order of the streams registered in STN_table( ).

If 0xFF is set in the secondary audio stream number, the secondary audio stream is not selected or it does not exist. If 0xFF is set in the PiP application primary audio stream number, the picture-in-picture application primary audio stream is not selected or it does not exist.

Even if a value other than 0xFF is registered in the PiP application primary audio stream number, the validity of playing back the corresponding audio stream can be determined by invalid_flag. That is, when invalid_flag is 1, i.e., when the playback operation is invalid, it is not always that 0xFF is set in the PiP application primary audio stream number. For example, when invalid_flag is 1, the value registered in the PiP application primary audio stream is ignored and the corresponding audio stream is not played back even if a value other than 0xFF is registered in the PiP application primary audio stream.

By referring to the values set in those registers, the playback apparatus 141 can execute the playback processing for streams.

A description is given below, with reference to FIG. 80, of an example in which a primary audio stream and a secondary audio stream are played back when the picture-in-picture display operation is executed. In this case, the secondary audio stream is played back in response to the input from the user or based on various settings.

When the picture-in-picture display operation is not executed (indicated by "No PiP" in FIG. 80), the primary audio stream number set in the #3 register is checked so that the primary audio stream having the audio stream number=0x05 registered in STN_table( ) is played back.

In this case, if the value other than 0xFF is registered in the secondary audio stream number of the #4 register, the audio stream having the ID number set in the #4 register is played back in response to the input from the user or based on various settings.

Figure 80:
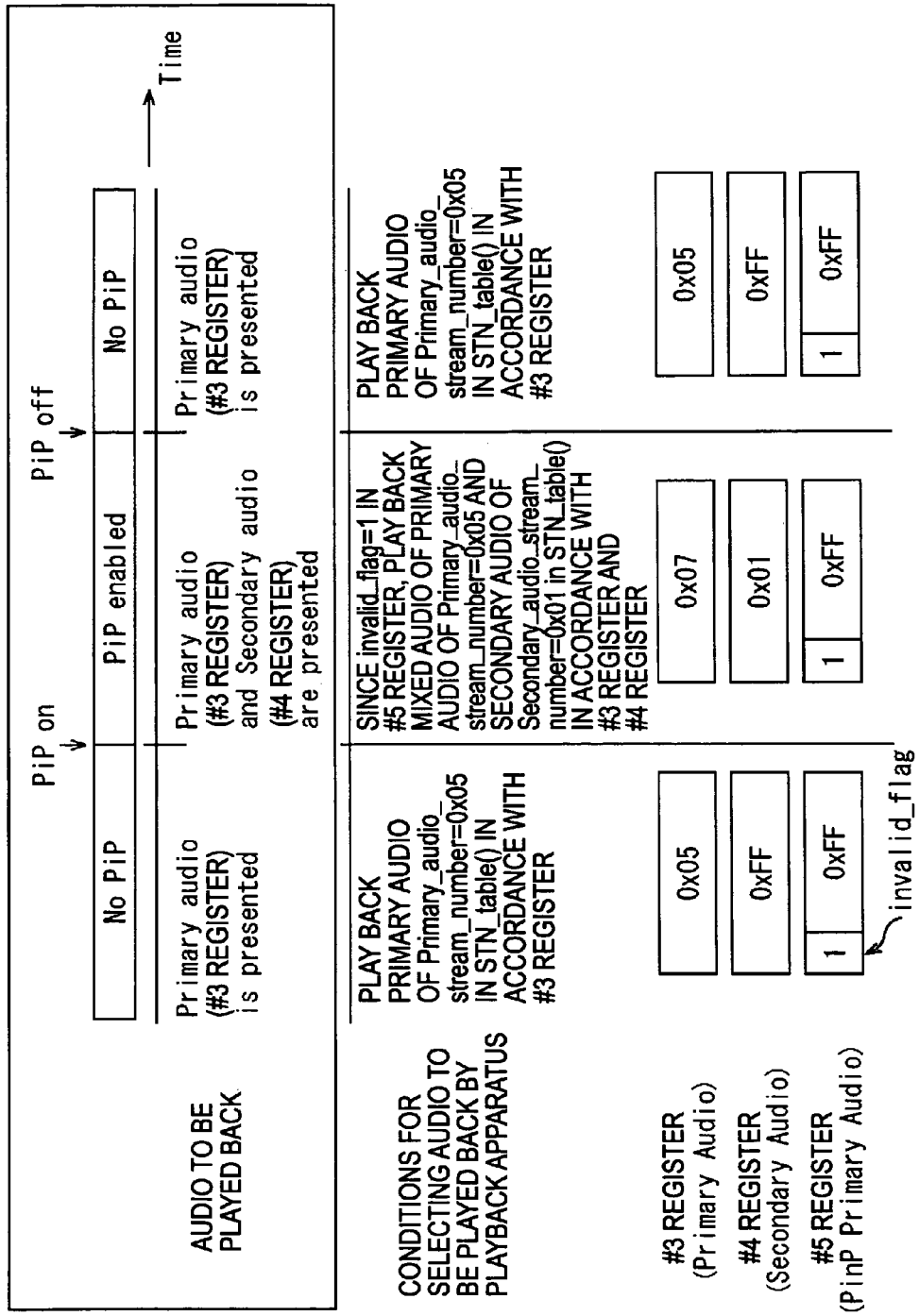
FIG. 80 illustrates an example in which a primary audio stream and a secondary audio stream are mixed and played back when a picture-in-picture display operation is executed.

Then, in response to a navigation command by a navigation program or the input of a predetermined operation from the user, the PiP display operation is started (indicated by "PiP on" in FIG. 80). Even if the picture-in-picture display operation is started, the picture-in-picture application primary audio stream is not played back if invalid_flag of the #5 register is 1 in accordance with, for example, a navigation command generated by the navigation program. More specifically, when the picture-in-picture display operation is executed (indicated by "PiP enabled" in FIG. 80), the primary audio stream number set in the #3 register and the secondary audio stream number set in the #4 register are checked so that the audio stream having the audio stream number=0x07 registered in STN_table is played back, and also, the audio stream having the audio stream2 number=0x01 is mixed with the audio stream having the audio stream number=0x07, and the mixed stream is played back in response to the input from the user or based on various settings.

When the picture-in-picture display operation is finished (indicated by "PiP off" in FIG. 80) so that the state in which the picture-in-picture display operation is not executed has resumed (indicated by "No PiP" in FIG. 80), the primary audio stream number set in the #3 register is checked so that the audio stream having the audio stream number=0x05 is played back.

If a value other than 0xFF is registered in the secondary audio stream number of the #4 register, the audio stream having the ID number set in the #4 register is played back in response to the input from the user or based on various settings.

A description is given below, with reference to FIG. 81, of an example in which a picture-in-picture application primary audio stream is played back when the picture-in-picture display operation is executed.

When the picture-in-picture display operation is not executed (indicated by "No PiP" in FIG. 81), the primary audio stream number set in the #3 register is checked so that the primary audio stream having the audio stream number=0x05 registered in STN_table( ) is played back.

In this case, if a value other than 0xFF is registered in the secondary audio stream number of the #4 register, the audio stream having the ID number set in the #4 register is played back in response to the input from the user or based on various settings.

Figure 81:
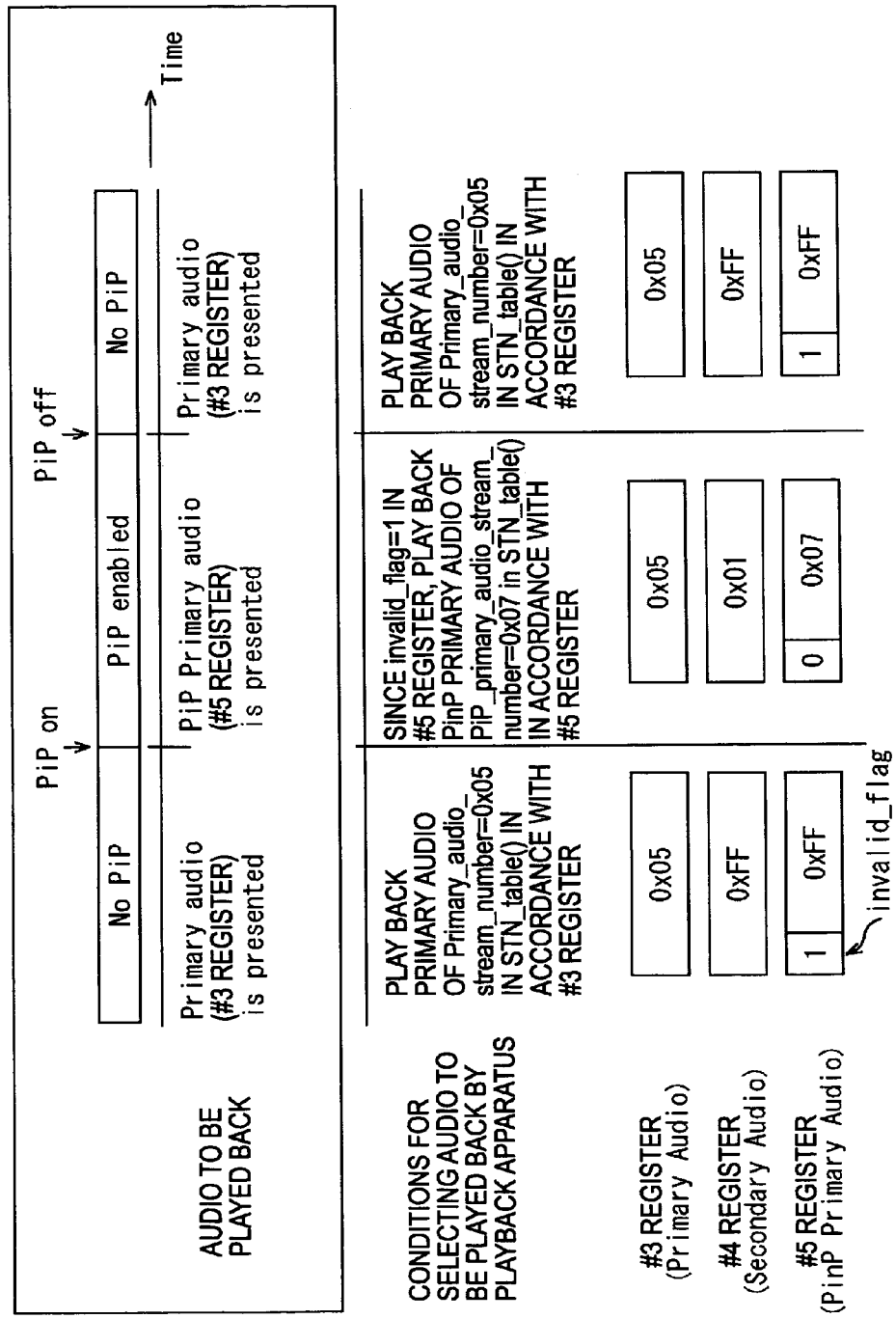
FIG. 81 illustrates an example in which a picture-in-picture application primary audio stream is played back when a picture-in-picture display operation is executed.

Then, in response to a navigation command (for example, a command embedded in a stream) by a navigation program or the input of a predetermined operation from the user, the picture-in-picture display operation is started (indicated by "PiP on" in FIG. 81). If invalid_flag of the #5 register is 0, the PiP application primary audio stream number in the #5 register is checked so that the PiP application primary audio stream having the PiP application primary audio stream number=0x07 registered in STN_table( ) is played back.

When the PiP display operation is finished (indicated by "PiP off" in FIG. 81) so that the state in which the PiP display operation is not executed has resumed (indicated by "No PiP" in FIG. 81), the primary audio stream number set in the #3 register is checked so that the audio stream having the audio stream number=0x05 is played back.

If a value other than 0xFF is registered in the secondary audio stream number of the #4 register, the audio stream having the ID number set in the #4 register is played back in response to the input from the user or based on various settings.

If 0xFF is registered in the PiP application primary audio stream number in FIG. 80 or 81, the picture-in-picture application primary audio stream is not selected or it does not exist. Even if a value other than 0xFF is registered in the PiP application primary audio stream number, the validity of playing back the corresponding stream can be determined by the setting of invalid_flag. More specifically, when invalid_flag=1, i.e., when the playback operation is invalid, the PiP application primary audio stream number is ignored and the corresponding stream is not played back even if a value other than 0xFF is registered in the PiP application primary audio stream number.

Audio stream playback processing 1 for a PiP (picture-in-picture) application audio stream is described below with reference to the flowchart in FIG. 82.

In step S401, the controller 21 checks STN_table( ) of the current PlayItem( ) for the corresponding primary audio streams in accordance with the primary audio stream number set in the #3 register.

In step S402, the controller 21 specifies the desired primary audio stream, reads it from the clip recorded on the recording medium 11 or the local storage 24, and plays it back.

For example, the controller 21 reads the primary audio stream having the primary audio stream number registered in STN_table( ) by referring to the primary audio stream number set in the #3 register, and supplies the read primary audio stream to the AV decoder 403. The read primary audio stream is supplied to the first audio decoder 75-1 via the corresponding buffer, PID filter, and switch, and is decoded and played back together with the corresponding video data.

In step S403, the controller 21 starts the picture-in-picture display operation (PiP is turned ON).

If picture-in-picture display is synchronized with the Main Path, the picture-in-picture display operation is started (PiP ON) and ended (PiP OFF) at predetermined times regardless of the input from the user. In contrast, if picture-in-picture display is not synchronized with the Main Path, the start (PiP ON) and the end (PiP OFF) of the PiP display operation are set by the input from the user.

In step S404, the controller 21 changes, if necessary, invalid_flag set in the #5 register in accordance with a navigation command embedded in the stream or preloaded after being read from a location different from the stream.

In step S405, the controller 21 determines whether invalid_flag of the #5 register is 0 (if the PiP primary audio stream is valid).

If invalid_flag is found to be 0 in step S405, the process proceeds to step S406. In step S406, the controller 21 checks the STN_table( ) of the current PlayItem for the corresponding picture-in-picture display primary audio streams in accordance with the picture-in-picture primary audio stream number set in the #5 register, as discussed with reference to FIG. 80.

In step S407, the controller 21 specifies the picture-in-picture display primary audio stream to be played back, reads the specified stream from the clip, supplies it to the AV decoder 403, and instructs the AV decoder 403 to decode it and play it back, as described above. The process then proceeds to step S409.

For example, the controller 21 reads the PiP display primary audio stream of the PiP primary audio stream number registered in STN_table by referring to the PiP primary audio stream number set in the #5 register, and supplies the read stream to the AV decoder 403. The read picture-in-picture display primary audio stream is supplied to the first audio decoder 75-1 via the corresponding buffer, PID filter, and switch and is decoded, and then, the primary audio stream is played back together with the corresponding video data. If the audio stream having the ID number set in the #5 register is not registered in STN_table( ) of the current PlayItem( ), the audio stream to be played back is selected by the picture-in-picture display primary audio stream automatic selection routine.

If it is determined in step S405 that invalid_flag is not 0 (i.e., invalid_flag=1), the process proceeds to step S408. In step S408, the controller 21 checks STN_table( ) of the current PlayItem( ) for the corresponding primary and secondary audio streams in accordance with the primary audio stream number set in the #3 register and the secondary audio stream number set in the #4 register. The controller 21 then reads the specified primary and secondary audio streams from the clip, supplies them to the AV decoder 403 and decodes them, and then plays them back by combining them with corresponding streams.

For example, the controller 21 reads the primary and secondary audio streams registered in STN_table( ) by referring to the primary audio stream number set in the #3 register and the secondary audio stream number set in the #4 register, and supplies them to the AV decoder 403. The read primary and secondary audio streams are then supplied to the first audio decoder 75-1 and the second audio decoder 75-2, respectively, via the corresponding buffers, PID filters, and switches, and are decoded, and then, they are output together with the corresponding video data. If the audio stream having the ID number set in the #3 or #4 register is not registered in STN_table( ) of the current PlayItem( ), the audio streams to be played back are selected by the corresponding audio stream automatic selection routines.

After step S407 or S408, the controller 21 determines in step S409 whether the picture-in-picture (PiP) display operation is finished.

If picture-in-picture display is synchronized with the Main Path, the picture-in-picture display operation is started (PiP ON) and ended (PiP OFF) at predetermined times regardless of the input from the user. In contrast, if picture-in-picture display is not synchronized with the Main Path, the start (PiP ON) and the end (PiP OFF) of the PiP display operation are set by the input from the user.

If it is determined in step S409 that the picture-in-picture (PiP) display operation is not finished, the process returns to step S404, and step S404 and the subsequent steps are repeated. If it is determined in step S409 that the PiP display operation is finished, the processing is completed.

According to the above-described processing, when the picture-in-picture display operation is performed, audio streams to be played back are determined based on the values set in the #3 register through #5 register. If the settings of the registers do not coincide with the content of STN_table( ), streams to be played back are determined according to the above-described automatic selection routines.

Another example of STN_table( ), i.e., tenth STN_table( ), defining combinations of streams that can be played back simultaneously with a primary video stream is discussed below with reference to FIGS. 83 through 85.

The tenth example of the syntax of STN_table( ), i.e., tenth STN_table( ), shown in FIGS. 83 through 85 defines combinations of secondary video streams, primary audio streams, secondary audio streams, subtitle streams, and also, as in the ninth example, picture-in-picture application primary audio streams that can be played back together with a primary video stream, and more specifically, combinations of secondary audio streams and primary audio streams, combinations of secondary video streams and secondary audio streams, combinations of secondary video streams and PiP application PG or text subtitle streams, combinations of secondary video streams and PiP application primary audio streams, and combinations of secondary audio streams and PiP application primary audio streams.

The playback processing executed by referring to the tenth STN_table( ) can also be performed by the playback apparatus 401 shown in FIG. 52. In FIGS. 83 through 85, portions similar to those in FIGS. 76 through 79 are not explained for avoiding repetitions.

The block unique to the tenth STN_table( ), i.e., comb_info_Secondary_audio_PiP_primary_audio( ), indicates combinations of secondary audio streams and picture-in-picture display primary audio streams.

In the comb_info_Secondary_audio_PiP_primary_audio( ) block, the 8-bit number_of_PiP_primary_audio_ref_entries_SA field indicates the number of picture-in-picture display primary audio streams that can be combined with a secondary audio stream. The 8-bit PiP_primary_audio_id2_ref_SA field indicates the IDs of the picture-in-picture display primary audio streams that can be combined with a secondary audio stream.

As in the above-described examples of STN_table( ), instead of the IDs, the corresponding numbers may be used. For example, instead of audio_stream_id, the audio stream number (audio_stream_number) may be used, and instead of audio_stream_id2, the audio stream number 2 (audio_stream_number2) may be used. The same applies to the video streams and subtitle streams.

According to the tenth STN_table( ) shown in FIGS. 83 through 85, combinations of secondary audio streams and primary audio streams, combinations of secondary video streams and secondary audio streams, combinations of secondary video streams and picture-in-picture application PG or text subtitle streams, combinations of secondary video streams and picture-in-picture application primary audio streams, and combinations of secondary audio streams and PiP application primary audio streams can be defined.

Accordingly, inconsistent combinations of secondary audio streams and picture-in-picture display primary audio streams that can be simultaneously played back with primary video streams (#1 video streams), in addition to inconsistent combinations of secondary video streams (#2 video streams), primary audio streams (#1 audio streams), secondary audio streams (#2 audio streams), subtitle streams (PG TextST streams), and picture-in-picture PG/text subtitle streams (PiP PG TextST streams) that can be simultaneously played back with primary video streams (#1 video streams), are not defined.

In the playback apparatus 141, a plurality of registers are disposed in part of the rewritable memory area of the memory 23, and playback processing is executed based on the values set in those registers. In part of the rewritable memory area of the memory 23, in addition to the registers discussed with reference to FIG. 71, the register for setting audio streams to be played back when a PiP application is started, as discussed with reference to FIG. 79, is disposed. When the tenth STN_table( ) shown in FIGS. 83 through 85 is used, those registers are checked.

By referring to the values set in those registers, the playback apparatus 141 can perform playback processing for streams.

Processing for playing back primary and secondary audio streams when the picture-in-picture display operation is executed is similar to that discussed with reference to FIG. 79.

A description is given below, with reference to FIG. 86, of an example in which a secondary audio stream and a picture-in-picture application primary audio stream are played back when the picture-in-picture display operation is executed.

When the picture-in-picture display operation is not executed (indicated by "No PiP" in FIG. 86), the primary audio stream number set in the #3 register is checked so that the primary audio stream having the audio stream number=0x05 registered in STN_table( ) is played back.

Figure 86:
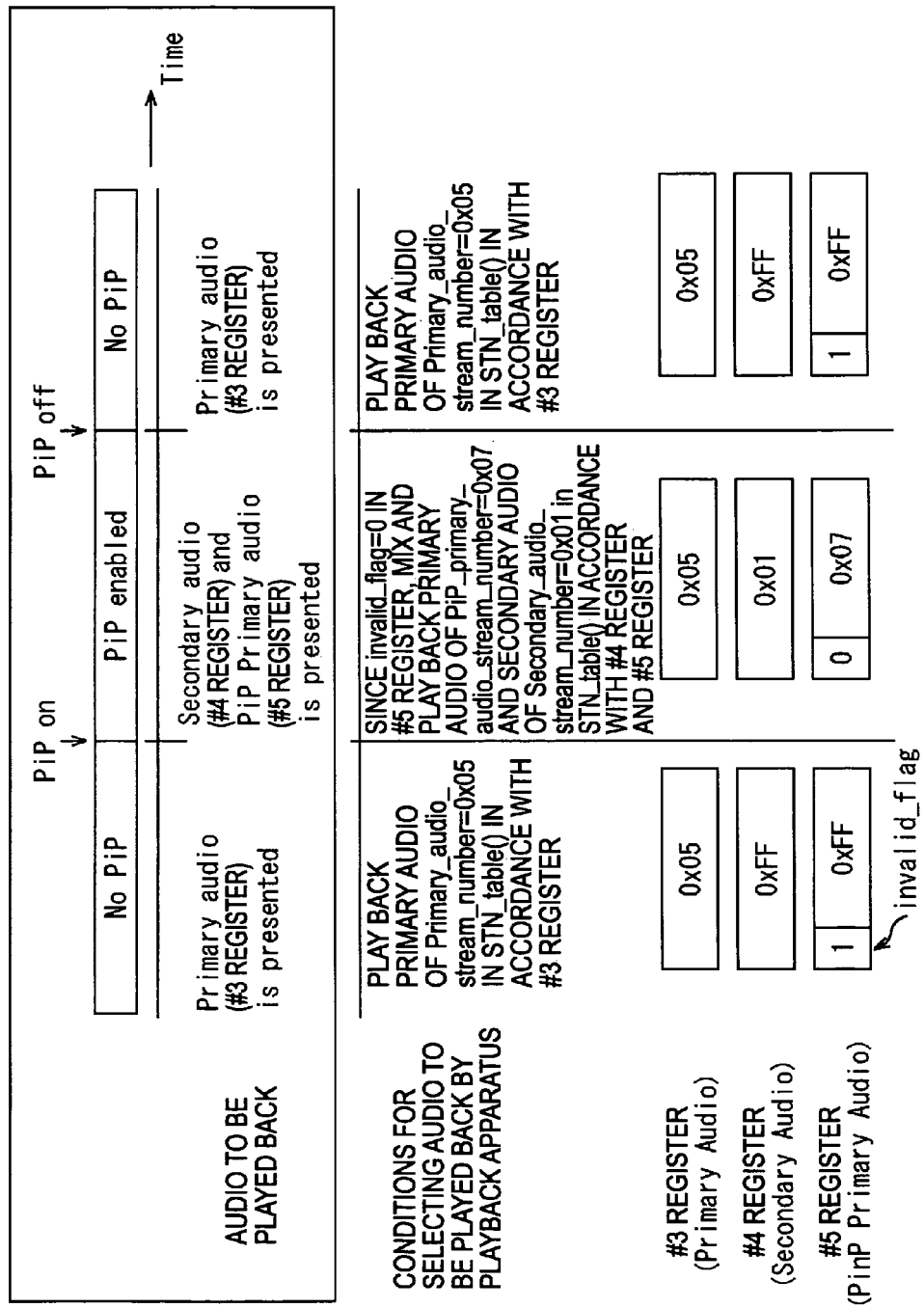
FIG. 86 illustrates an example in which a picture-in-picture application primary audio stream and a secondary audio stream are mixed and played back when a picture-in-picture display operation is executed.

Then, in response to a navigation command (for example, command embedded in the stream) generated by a navigation program or the input of a predetermined operation from the user, the picture-in-picture display operation is started (indicated by "PiP on" in FIG. 86). If invalid_flag in the #5 register is 0, the secondary audio stream number set in the #4 register and the PiP primary audio stream number set in the #5 register are checked so that the audio stream having the audio stream2 number=0x01 registered in STN_table is played back, and also, the audio stream having the PiP primary audio stream number=0x07 is mixed with the audio stream having the audio stream2 number=0x01, and the mixed stream is played back.

When the picture-in-picture display operation is finished (indicated by "PiP off" in FIG. 86) so that the state in which the picture-in-picture display operation is not executed has resumed (indicated by "No PiP" in FIG. 86), the primary audio stream number set in the #3 register is checked so that the audio stream having the audio stream number=0x05 is played back.

If 0xFF is registered in the PiP application primary audio stream number in FIG. 86, the picture-in-picture application primary audio stream is not selected or it does not exist. Even if a value other than 0xFF is registered in the PiP application primary audio stream number, the validity of playing back the corresponding stream can be determined by the setting of invalid_flag. More specifically, when invalid_flag=1, i.e., when the playback operation is invalid, the PiP application primary audio stream number is ignored and the corresponding stream is not played back even if a value other than 0xFF is registered in the PiP application primary audio stream number.

Figure 87:
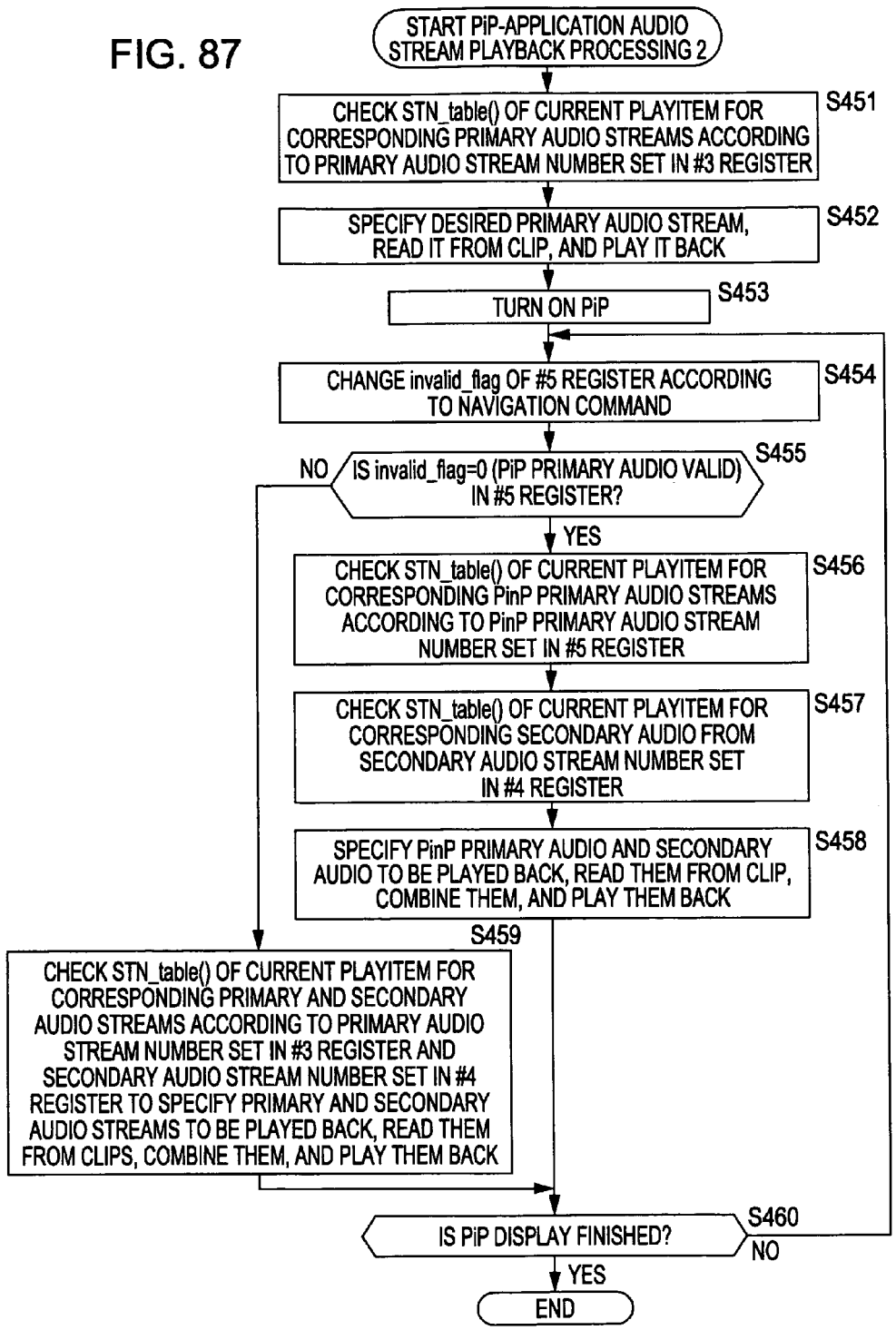
FIG. 87 is a flowchart illustrating PiP application audio stream playback processing 2.

Audio stream playback processing 2 for a PiP (picture-in-picture) application audio stream is described below with reference to the flowchart in FIG. 87.

Figure 82:
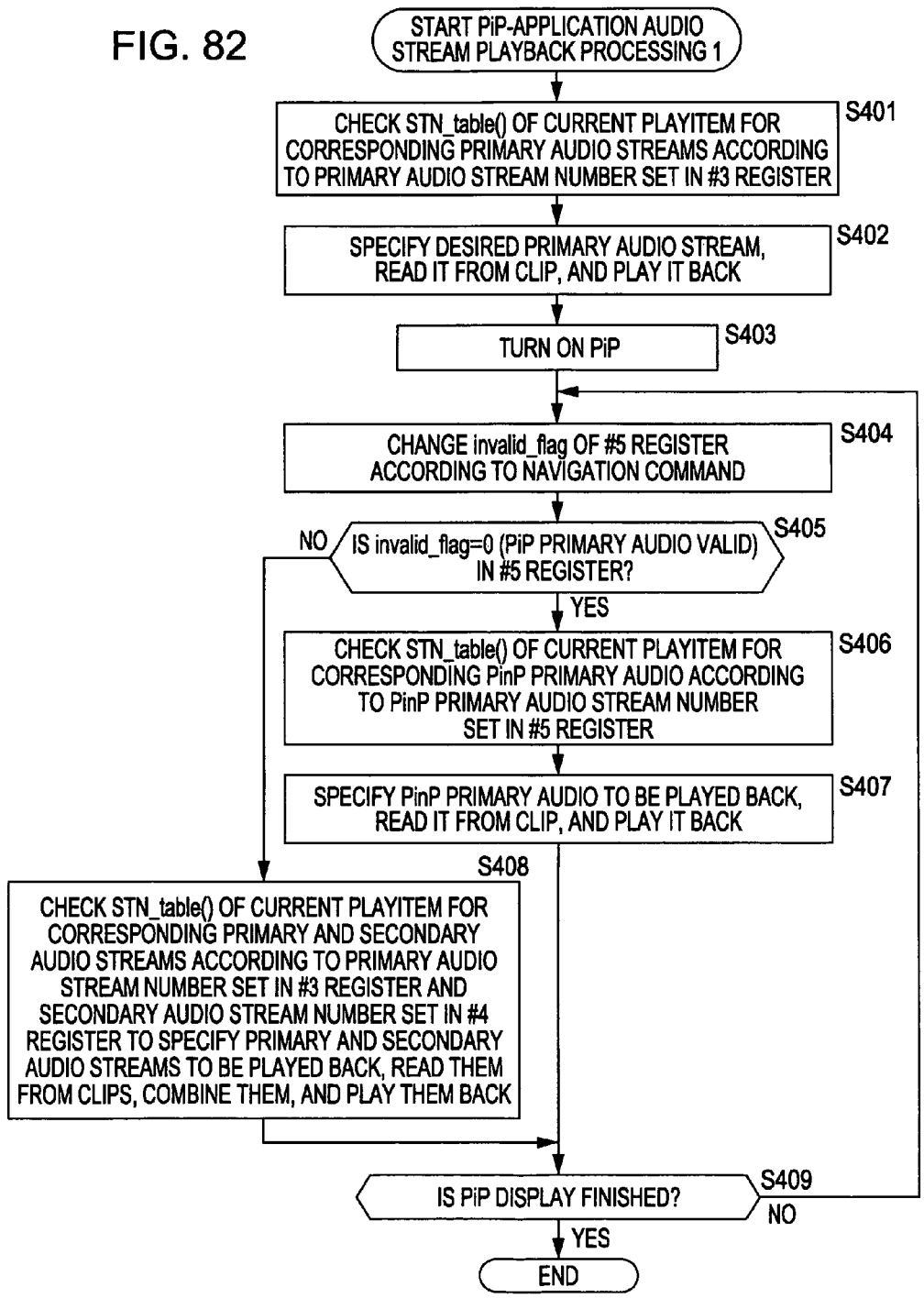
FIG. 82 is a flowchart illustrating PiP application audio stream playback processing 1.

Steps S451 through S455 are basically similar to steps S401 through S405, respectively, in FIG. 82.

In step S451, the controller 21 checks STN_table( ) of the current PlayItem( ) for the corresponding primary audio streams according to the primary audio stream number set in the #3 register. The controller 21 specifies the desired primary audio stream, reads it from the clip recorded on the recording medium 11 or the local storage 24, and plays it back. The controller 21 starts the picture-in-picture display operation. If picture-in-picture display is synchronized with the Main Path, the picture-in-picture display operation is started (PiP ON) and ended (PiP OFF) at predetermined times regardless of the input from the user. In contrast, if picture-in-picture display is not synchronized with the Main Path, the start (PiP ON) and the end (PiP OFF) of the PiP display operation are set by the input from the user.

The controller 21 changes, if necessary, invalid_flag set in the #5 register in accordance with a navigation command embedded in the stream or preloaded after being read from a location different from the stream. The controller 21 then determines whether invalid_flag of the #5 register is 0 (if the PiP primary audio stream is valid).

If invalid_flag is found to be 0 in step S455, the process proceeds to step S456. In step S456, the controller 21 checks STN_table( ) of the current PlayItem for the corresponding picture-in-picture display primary audio streams according to the PiP primary audio stream number set in the #5 register.

In step S457, the controller 21 checks STN_table( ) of the current PlayItem( ) for the corresponding secondary audio stream according to the secondary audio stream number set in the #4 register.

In step S458, the controller 21 specifies the picture-in-picture display primary audio stream and the secondary audio stream to be played back, reads the specified streams from the clip, supplies them to the AV decoder 403, and instructs the AV decoder 403 to decode them, combine (mix) them, and play them back, as described above. The process then proceeds to step S460, which is discussed below.

For example, the controller 21 reads the picture-in-picture display primary audio stream of the PiP primary audio stream number and the secondary audio stream of the secondary audio stream number registered in STN_table by referring to the PiP primary audio stream number set in the #5 register and the secondary audio stream number set in the #4 register, and supplies the read streams to the AV decoder 403. The read picture-in-picture display primary audio stream and the secondary audio stream are supplied to the first audio decoder 75-1 and the second audio decoder 75-2, respectively, via the corresponding buffers, PID filters, and switches, and are decoded, and then, they are played back together with the corresponding video data. If the audio stream having the ID number set in the #5 register or the #4 register is not registered in STN_table( ) of the current PlayItem( ), the audio stream to be played back is selected by the corresponding automatic selection routine.

If it is determined in step S455 that invalid_flag is not 0 (i.e., invalid_flag=1), the process proceeds to step S459. In step S459, the controller 21 checks STN_table( ) of the current PlayItem( ) for the corresponding primary and secondary audio streams in accordance with the primary audio stream number set in the #3 register and the secondary audio stream number set in the #4 register. The controller 21 then reads the specified primary and secondary audio streams from the clip, supplies them to the AV decoder 403, and instructs the AV decoder 403 to decode them, combine them, and play them back.

For example, the controller 21 reads the primary and secondary audio streams registered in STN_table( ) by referring to the primary audio stream number set in the #3 register and the secondary audio stream number set in the #4 register, and supplies them to the AV decoder 403. The read primary and secondary audio streams are then supplied to the first audio decoder 75-1 and the second audio decoder 75-2, respectively, via the corresponding buffers, PID filters, and switches, and are decoded, and then, they are output together with the corresponding video data. If the audio stream having the ID number set in the #3 or #4 register is not registered in STN_table( ) of the current PlayItem( ), the audio stream to be played back is selected by the corresponding audio stream automatic selection routine.

After step S457 or S459, the controller 21 determines in step S460 whether the picture-in-picture (PiP) display operation is finished.

As discussed above, if picture-in-picture display is synchronized with the Main Path, the picture-in-picture display operation is started (PiP ON) and ended (PiP OFF) at predetermined times regardless of the input from the user. In contrast, if picture-in-picture display is not synchronized with the Main Path, the start (PiP ON) and the end (PiP OFF) of the PiP display operation are set by the input from the user.

If it is determined in step S460 that the picture-in-picture (PiP) display operation is not finished, the process returns to step S454, and step S454 and the subsequent steps are repeated. If it is determined in step S460 that the picture-in-picture (PiP) display operation is finished, the processing is completed.

According to the above-described processing, when the picture-in-picture display operation is performed, audio streams to be played back are determined based on the values set in the #3 register through #5 register. If the settings of the registers do not coincide with the content of STN_table( ), streams to be played back are determined according to the above-described automatic selection routines.

A manufacturing method for the recording medium 11 on which data that can be played back by the playback apparatus 1, 141, or 401 is recorded is discussed below in the context of a disc-shaped recording medium with reference to FIGS. 88 and 89.

Figure 88:
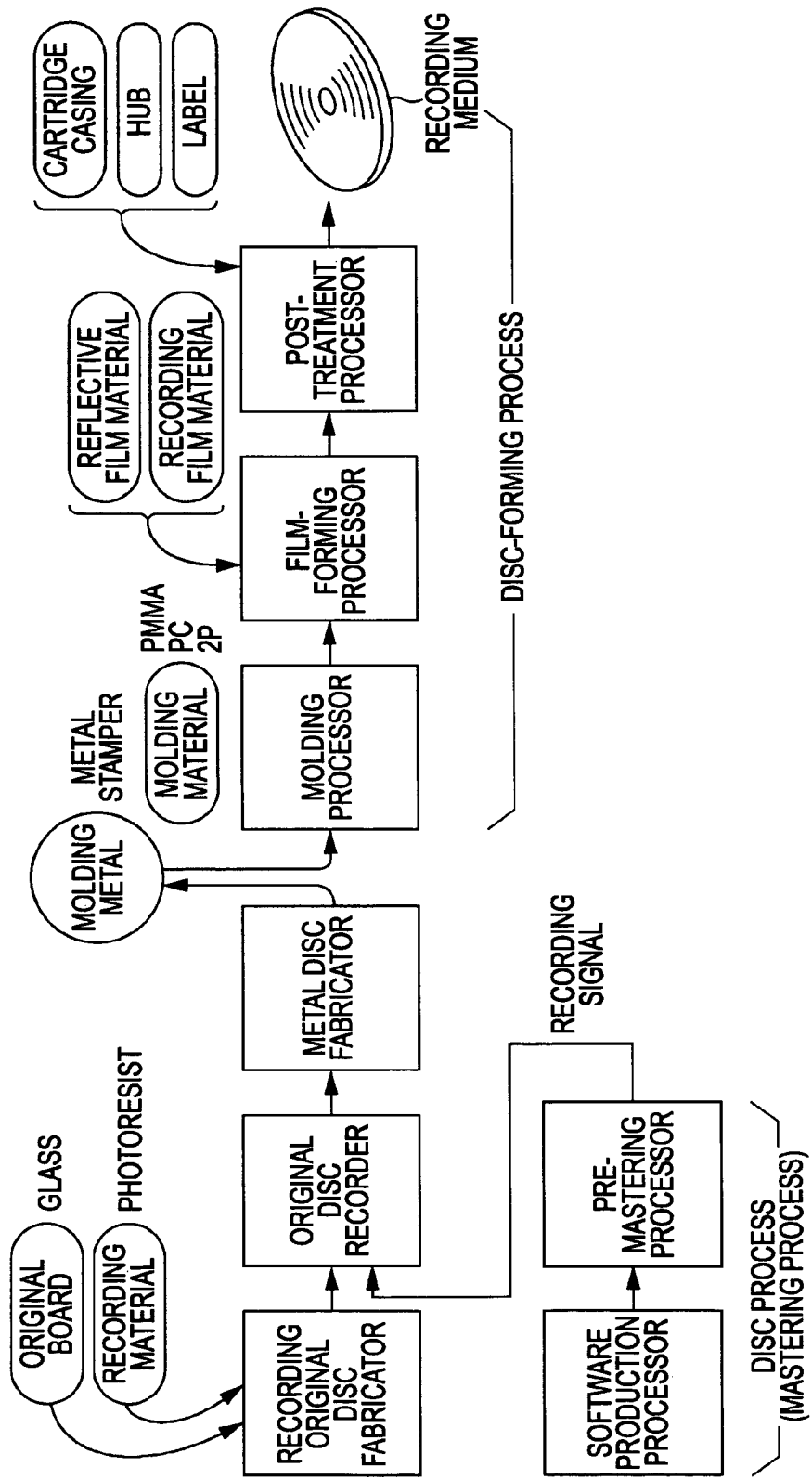
FIG. 88 illustrates a manufacturing method for a recording medium on which data to be played back by an playback apparatus.

As shown in FIG. 88, an original board, such as glass, is prepared, and then, a recording material, such as a photoresist, is applied onto the glass, thereby forming a recording original disc.

Figure 89:
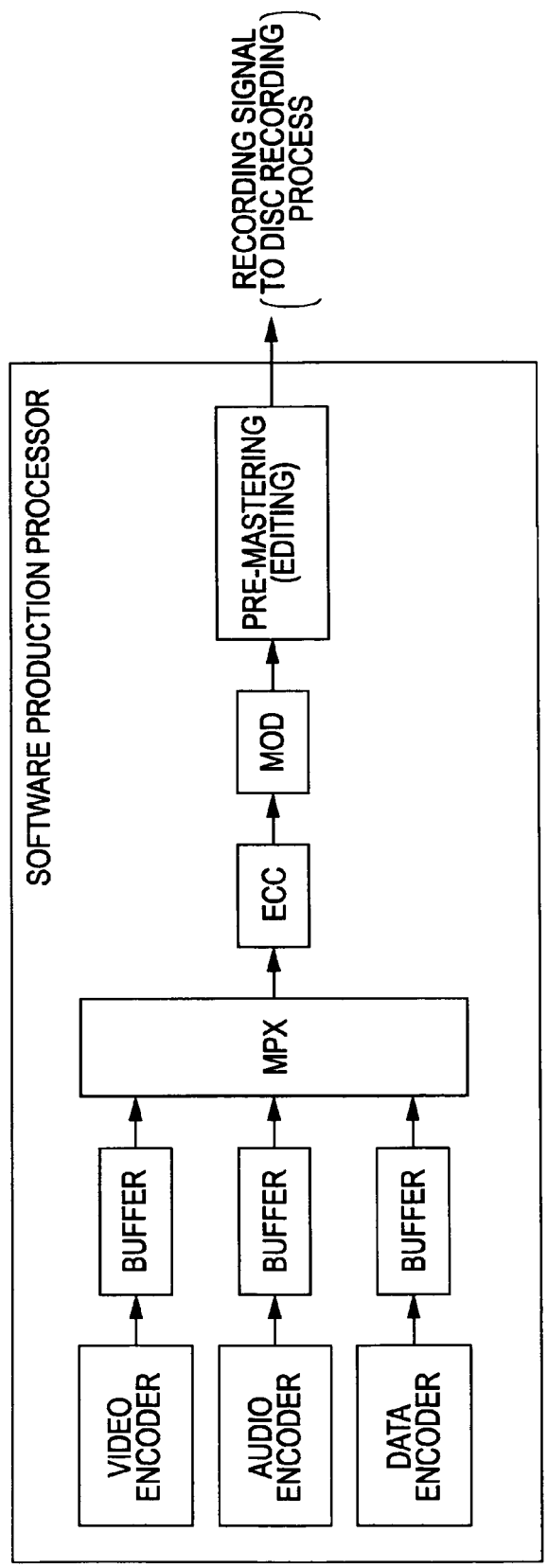
FIG. 89 illustrates the manufacturing method for a recording medium on which data to be played back by an playback apparatus.

In a software production processor, as shown in FIG. 89, video data which is encoded by an encoder (video encoder) and which is to be played back by the playback apparatus 1, 141, or 401 is temporarily stored in a buffer. Audio data encoded by an audio encoder is temporarily stored in a buffer, and also, data other than streams (e.g., Indexes, PlayLists, PlayItems, etc.) encoded by a data encoder is temporarily stored in a buffer. The video data, audio data, and data other than streams stored in the buffers are multiplexed with a synchronizing signal in a multiplexer (MPX), and are provided with error correction codes in an error-correcting code (ECC) circuit. Then, the multiplexed data is modulated in a modulation circuit (MOD), and is then recorded on, for example, magnetic tape, according to a predetermined format. As a result, software to be recorded on the recording medium 11 and to be played back by the playback apparatus 1, 141, or 401 is produced.

The software is edited (subjected to pre-mastering) if necessary so that a signal format to be recorded on an optical disc is generated. A laser beam is then modulated in accordance with this recording signal, and the modulated laser beam is applied to the photoresist on the original disc so that the photoresist is exposed to the laser beam in accordance with the recording signal.

Thereafter, the original disc is developed, and pits appear on the original disc. The original disc is then subjected to treatment, such as, electroforming, so that a metal original disc having pits transferred from on the original disc is fabricated. A metal stamper is then fabricated from the metal original disc. This metal stamper is used as a metal mold.

A material, such as PMMA or PC (polycarbonate) is injected into this metal stamper and is fixed. Alternatively, after applying a 2P (ultraviolet curable resin) onto the metal stamper, the resin is irradiated with an ultraviolet and is cured. This makes it possible to transfer pits on the metal stamper to the resin, thereby forming a replica.

A reflective film is then formed on the replica by deposition or sputtering. Alternatively, a reflective file is formed on the replica by spin-coating.

Then, necessary processing, such as adjusting the inner and outer diameters of the resulting disc and laminating two discs, is performed. Then, a label and a hub are attached to the disc and the disc is then inserted into a cartridge. As a result, the recording medium 11 on which data to be played back by the playback apparatus 1, 141, or 401 is recorded is completed.

The above-described series of processing operations may be executed by hardware or software. In this case, the processing operations can be performed by a personal computer 500 shown in FIG. 90.

Figure 90:
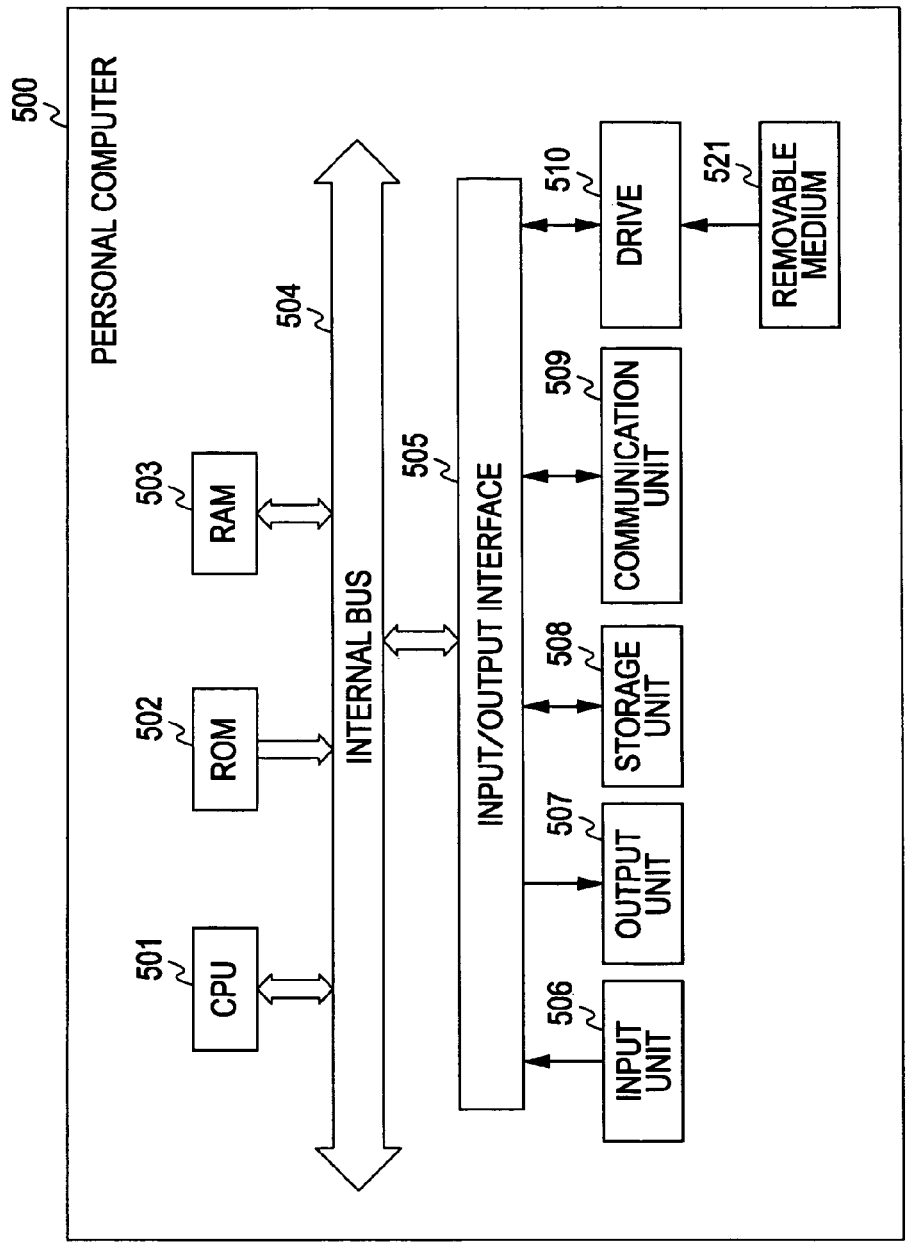
FIG. 90 illustrates the configuration of a personal computer.

In FIG. 90, a CPU (Central Processing Unit) 501 executes various processing operations according to a program stored in a ROM (Read Only Memory) 502 or a program loaded into a RAM (Random Access Memory) 503 from a storage unit 508. In the RAM 503, data necessary for the CPU 501 to execute various processing operations is also stored.

The CPU 501, the ROM 502, and the RAM 503 are connected to each other via an internal bus 504. An input/output interface 505 is also connected to the internal bus 504.

The input/output interface 505 is connected to an input unit 506, such as a keyboard and a mouse, an output unit 507, such as a display, for example, a CRT or an LCD, the storage unit 508, such as a hard disk, and a communication unit 509, such as a modem or a terminal adapter. The communication unit 509 performs communication via various networks including telephone lines or CATV.

A drive 510 is connected to the input/output interface if necessary. A removable medium 521, such as a magnetic disk, an optical disc, a magneto-optical disk, or a semiconductor memory, is installed in the drive 510. A computer program read from the removable medium 521 is installed into the storage unit 508.

If software is used for executing the series of processing operations, a corresponding software program is installed from a network or a recording medium.

This recording medium may be formed of a package medium, such as the removable medium 521, recording the program thereon, which is distributed to the user separately from the computer. Alternatively, the recording medium may be formed of the ROM 502 or a hard disk forming the storage unit 508 recording the program thereon, which is distributed to the user while being built in the computer.

In this specification, steps forming the computer program may be executed in chronological order described in this specification. Alternatively, they may be executed in parallel or individually.

Embodiments of the present invention are not restricted to the above-described embodiment, and various modifications may be made without departing from the spirit of the invention.

The invention claimed is:

1. A playback apparatus for playing back streams, comprising:
obtaining means for obtaining playback management information including a main playback path indicating a first position of at least one first stream on a time axis, at least one sub playback path indicating a second position of at least one second stream on the time axis, and selection option information that enables selection of at least one stream of at least one of a plurality of categories of stream type, which is to be played back, from among said at least one first stream referred to by the main playback path and that enables selection of at least one stream of at least one of the plurality of categories of stream type, which is to be played back, from among said at least one second stream referred to by one of said at least one sub playback path;
receiving means for receiving a selection of streams to be played back based on the selection option information included in the playback management information obtained by the obtaining means and which indicates predetermined possible combinations;

reading means for reading, when the selection of streams to be played back is received by the receiving means, by referring to the main playback path, first streams of said at least one-category of the plurality of categories of stream type selected from among said at least one first stream referred to by the main playback path and received by the receiving means, and for reading, by referring to the corresponding sub playback path, second streams of said at least one category of the plurality of categories of stream type selected from among said at least one second stream referred to by said at least one sub playback path and received by the receiving means; and combining means for combining at least two streams of the first and second streams read by the reading means, each stream of the at least two streams being of a predetermined category of the plurality of categories of stream type, when said category of stream type of said at least two streams are included in said at least one category of stream type of the first streams referred to by the main playback path and read by the reading means and in said at least one category of stream type of the second streams referred to by the corresponding sub playback path and read by the reading means, wherein the selection option information includes information indicating a combination of a first stream of the predetermined category of the plurality of categories of stream type and which is referred to by the main playback path and the second stream of the predetermined category of the plurality of categories of stream type and which is referred to by the corresponding sub playback path, the receiving means receives the selection of streams to be played back based on the selection option information, the reading means reads, when the selection of the first stream and the second stream to be played back is received by the receiving means, the first stream of the predetermined category of the plurality of categories of stream type and which is referred to by the main playback path and the second stream of the predetermined category of the plurality of categories of stream type and which is referred to by the corresponding sub playback path, the combining means combines the first stream and the second stream of the predetermined category of the plurality of categories of stream type and which are read by the reading means, the playback management information obtained by the obtaining means further includes information concerning a combination of two streams each of a predetermined category referred to by the corresponding sub playback path, the reading means reads, when the selection of the combination of the at least two streams of the predetermined category to be played back is received by the receiving means, the at least two streams of the predetermined category referred to by the corresponding sub playback path, and the combining means combines the at least two streams of the predetermined category and which are read by the reading means.

2. The playback apparatus according to claim 1, further comprising:

decoding means for decoding said first streams of at least one category of the plurality of categories of stream type and which are referred to by the main playback path and read by the reading means and said second streams of at least one category of the plurality of categories of stream type and which are referred to by the corresponding sub playback path and read by the reading means.

3. The playback apparatus according to claim 1, wherein the first and second streams of the predetermined category to be combined by the combining means are audio streams or video streams.

4. The playback apparatus according to claim 1, wherein the first stream of the predetermined category referred to by the main playback path is a first video stream, and the selection option information further includes information defining a combination of a first audio stream associated with the first video stream and a second audio stream different from the first audio stream.

5. The playback apparatus according to claim 1, wherein the selection option information further includes information indicating whether streams to be combined are entered, the receiving means receives, based on the information indicating whether streams to be combined are entered, a selection of a combination of streams of an identical category and which are referred to by at least one of the main playback path and the corresponding sub playback path or receives a selection of a single stream, and the reading means reads the entered streams received by the receiving means based on the selection option information.

6. The playback apparatus according to claim 1, wherein the first stream of the predetermined category referred to by the main playback path is a first video stream of the at least one first stream, and the selection option information further includes information defining a combination of a second video stream different from the first video stream and a second audio stream associated with the second video stream.

7. The playback apparatus according to claim 1, wherein the first stream of the predetermined category referred to by the main playback path is a first video stream of the at least one first stream, and the selection information further includes information defining a combination of a second video stream, which is independent of the first video stream, and text information associated with the second video stream.

8. A playback method for a playback apparatus for playing back streams, comprising:

an obtaining step of obtaining playback management information including a main playback path indicating a first position of at least one first stream on a time axis, at least one sub playback path indicating a second position of at least one second stream on the time axis, and selection option information that enables selection of at least one stream of at least one of a plurality of categories of stream type, which is to be played back, from among said at least one first stream referred to by the main playback path and that enables selection of at least one stream of at least one of the plurality of categories of stream type, which is to be played back, from among said at least one second stream referred to by one of said at least one sub playback path;

a receiving step of receiving a selection of streams to be played back based on the selection option information included in the playback management information obtained by processing in the obtaining step and which indicates predetermined possible combinations;

a reading step of reading, when the selection of streams to be played back is received by processing in the receiving step, by referring to the main playback path, first streams of said at least one category of the plurality of categories of stream type selected from among said at least one first stream referred to by the main playback path, and reading, by referring to the corresponding sub playback path, second streams of said at least one category of the plurality of categories of stream type selected from among said at least one second stream referred to by said at least one sub playback path; and a combining step of combining at least two streams of the first and second streams read by the reading step, each stream of the at least two streams being of a predetermined category of the plurality of categories of stream type, when said category of stream type of said at least two streams are included in said at least one category of stream type of the first streams referred to by the main playback path and read by processing in the reading step and in said at least one category of stream type of the second streams referred to by the corresponding sub playback path and read by processing in the reading step, wherein the selection option information includes information indicating a combination of a first stream of the predetermined category of the plurality of categories of stream type and which is referred to by the main playback path and the second stream of the predetermined category of the plurality of categories of stream type and which is referred to by the corresponding sub playback path, in the processing in the receiving step, the selection of streams to be played back is received based on the selection option information, in the processing in the reading step, when the selection of the first stream and the second stream to be played back is received by the processing in the receiving step, the first stream of the predetermined category of the plurality of categories of stream type and which is referred to by the main playback path and the second stream of the predetermined category of the plurality of categories of stream type and which is referred to by the corresponding sub playback path are read, and in the processing in the combining step, the first stream and the second stream of the predetermined category of the plurality of categories of stream type and which are read by the processing in the reading step are combined, the playback management information obtained by the obtaining step further includes information concerning a combination of two streams each of a predetermined category referred to by the corresponding sub playback path, the reading step further includes reading, when the selection of the combination of the at least two streams of the predetermined category to be played back is received by the receiving step, the at least two streams of the predetermined category referred to by the corresponding sub playback path, and the combining step further includes combining the at least two streams of the predetermined category and which are read by the reading step.

9. A non-transitory computer-readable medium storing computer readable instructions thereon for playing back streams, the instructions when executed by a playback apparatus causing the playback apparatus to perform a method comprising:

obtaining playback management information including a main playback path indicating a first position of at least one first stream on a time axis, at least one sub playback path indicating a second position of at least one second stream on the time axis, and selection option information that enables selection of at least one stream of at least one of a plurality of categories of stream type, which is to be played back, from among said at least one first stream referred to by the main playback path and that enables selection of at least one stream of at least one of the plurality of categories of stream type, which is to be played back, from among said at least one second stream referred to by one of said at least one sub playback path;

receiving a selection of streams to be played back based on the selection option information included in the playback management information obtained by processing in the obtaining step and which indicates predetermined possible combinations;

reading, when the selection of streams to be played back is received by processing in the receiving step, by referring to the main playback path, first streams of said at least one category of the plurality of categories of stream type selected from among said at least one first stream referred to by the main playback path, and reading, by referring to the corresponding sub playback path, second streams of said at least one category of the plurality of categories of stream type selected from among said at least one second stream referred to by said at least one sub playback path; and combining at least two streams of the first and second streams read by the reading step, each stream of the at least two streams being of a predetermined category of the plurality of categories of stream type, when said category of stream type of said at least two streams are included in said at least one category of stream type of the first streams referred to by the main playback path and read by processing in the reading step and in said at least one category of stream type of the second streams referred to by the corresponding sub playback path and read by processing in the reading step, wherein the selection option information includes information indicating a combination of a first stream of the predetermined category of the plurality of categories of stream type and which is referred to by the main playback path and the second stream of the predetermined category of the plurality of categories of stream type and which is referred to by the corresponding sub playback path, the selection of streams to be played back is received based on the selection option information, when the selection of the first stream and the second stream to be played back is received by the processing in the receiving step, the first stream of the predetermined category of the plurality of categories of stream type and which is referred to by the main playback path and the second stream of the predetermined category of the plurality of categories of stream type and which is referred to by the corresponding sub playback path are read, and the first stream and the second stream of the predetermined category of the plurality of categories of stream type and which are read by the processing in the reading step are combined, the playback management information obtained by the obtaining step further includes information concerning a combination of two streams each of a predetermined category referred to by the corresponding sub playback path, the reading step further includes reading, when the selection of the combination of the at least two streams of the predetermined category to be played back is received by the receiving step, the at least two streams of the predetermined category referred to by the corresponding sub playback path, and the combining step further includes combining the at least two streams of the predetermined category and which are read by the reading step.

10. A playback apparatus for playing back streams, comprising:

an obtaining unit that obtains playback management information including a main playback path indicating a first position of at least one first stream on a time axis, at least one sub playback path indicating a second position of at least one second stream on the time axis, and selection option information that enables selection of at least one stream of at least one of a plurality of categories of stream type, which is to be played back, from among said at least one first stream referred to by the main playback path and that enables selection of at least one stream of at least one of the plurality of categories of stream type, which is to be played back, from among said at least one second stream referred to by one of said at least one sub playback path;

a receiving unit that receives a selection of streams to be played back based on the selection option information included in the playback management information obtained by the obtaining unit and which indicates predetermined possible combinations;

a reading unit that reads, when the selection of streams to be played back is received by the receiving unit, by referring to the main playback path, first streams of said at least one category of the plurality of categories of stream type selected from among said at least one first stream referred to by the main playback path and received by the receiving unit, and for reading, by referring to the corresponding sub playback path, second streams of said at least one category of the plurality of categories of stream type selected from among said at least one second stream referred to by said at least one sub playback path and received by receiving unit; and a combining unit that combines at least two streams of the first and second streams read by the reading unit, each stream of the at least two streams being of a predetermined category of the plurality of categories of stream type, when said category of stream type of said at least two streams are included in said at least one category of stream type of the first streams referred to by the main playback path and read by the reading unit and in said at least one category of stream type of the second streams referred to by the corresponding sub playback path and read by the reading unit, wherein the selection option information includes information indicating a combination of a first stream of the predetermined category of the plurality of categories of stream type and which is referred to by the main playback path and the second stream of the predetermined category of the plurality of categories of stream type and which is referred to by the corresponding sub playback path, the receiving unit receives the selection of streams to be played back based on the selection option information, the reading unit reads, when the selection of the first stream and the second stream to be played back is received by the receiving unit, the first stream of the predetermined category of the plurality of categories of stream type and which is referred to by the main playback path and the second stream of the predetermined category of the plurality of categories of stream type and which is referred to by the corresponding sub playback path, and the combining unit combines the first stream and the second stream of the predetermined category of the plurality of categories of stream type and which are read by the reading unit, the playback management information obtained by the obtaining unit further includes information concerning a combination of two streams each of a predetermined category referred to by the corresponding sub playback path, the reading unit reads, when the selection of the combination of the at least two streams of the predetermined category to be played back is received by the receiving means, the at least two streams of the predetermined category referred to by the corresponding sub playback path, and the combining unit combines the at least two streams of the predetermined category and which are read by the reading unit.

11. A playback apparatus for playing back streams, comprising:

obtaining means for obtaining playback management information including a main playback path indicating a first position of at least one first stream on a time axis, at least one sub playback path indicating a second position of at least one second stream on the time axis, and selection option information that enables selection of at least one stream of at least one of a plurality of categories of stream type, which is to be played back, from among said at least one first stream referred to by the main playback path and that enables selection of at least one stream of at least one of the plurality of categories of stream type, which is to be played back, from among said at least one second stream referred to by one of said at least one sub playback path;

receiving means for receiving a selection of streams to be played back based on the selection option information included in the playback management information obtained by the obtaining means and which indicates predetermined possible combinations;

reading means for reading, when the selection of streams to be played back is received by the receiving means, by referring to the main playback path, first streams of said at least one-category of the plurality of categories of stream type selected from among said at least one first stream referred to by the main playback path and received by the receiving means, and for reading, by referring to the corresponding sub playback path, second streams of said at least one category of the plurality of categories of stream type selected from among said at least one second stream referred to by said at least one sub playback path and received by the receiving means; and combining means for combining at least two streams of the first and second streams read by the reading means, each stream of the at least two streams being of a predetermined category of the plurality of categories of stream type, when said category of stream type of said at least two streams are included in said at least one category of stream type of the first streams referred to by the main playback path and read by the reading means and in said at least one category of stream type of the second streams referred to by the corresponding sub playback path and read by the reading means, wherein the selection option information includes information indicating a combination of a first stream of the predetermined category of the plurality of categories of stream type and which is referred to by the main playback path and the second stream of the predetermined category of the plurality of categories of stream type and which is referred to by the corresponding sub playback path, wherein the receiving means receives the selection of streams to be played back based on the selection option information, wherein the reading means reads, when the selection of the first stream and the second stream to be played back is received by the receiving means, the first stream of the predetermined category of the plurality of categories of stream type and which is referred to by the main playback path and the second stream of the predetermined category of the plurality of categories of stream type and which is referred to by the corresponding sub playback path, wherein the combining means combines the first stream and the second stream of the predetermined category of the plurality of categories of stream type and which are read by the reading means, and wherein the receiving means receives the selection of a stream to be played back from among:

a first stream of the at least one first stream referred to by the main playback path;

a second stream of the at least one second stream referred to by the corresponding sub playback path;

a combination of the first stream of the at least one first stream referred to by the main playback path and the second stream of the at least one second stream referred to by the corresponding sub playback path, the second stream of the at least one second stream being included in a file different from a file including the first stream;

a combination of second streams of the at least one second stream referred to by the corresponding sub playback paths; and a combination of the first stream of the at least one first stream referred to by the main playback path and the second stream of the at least one second stream referred to by the corresponding sub playback path, the second stream of the at least one second stream being included in an identical file including the first stream.

12. A playback apparatus for playing back streams, comprising:

obtaining means for obtaining playback management information including a main playback path indicating a first position of at least one first stream on a time axis, at least one sub playback path indicating a second position of at least one second stream on the time axis, and selection option information that enables selection of at least one stream of at least one of a plurality of categories of stream type, which is to be played back, from among said at least one first stream referred to by the main playback path and that enables selection of at least one stream of at least one of the plurality of categories of stream type, which is to be played back, from among said at least one second stream referred to by one of said at least one sub playback path;

receiving means for receiving a selection of streams to be played back based on the selection option information included in the playback management information obtained by the obtaining means and which indicates predetermined possible combinations;

reading means for reading, when the selection of streams to be played back is received by the receiving means, by referring to the main playback path, first streams of said at least one-category of the plurality of categories of stream type selected from among said at least one first stream referred to by the main playback path and received by the receiving means, and for reading, by referring to the corresponding sub playback path, second streams of said at least one category of the plurality of categories of stream type selected from among said at least one second stream referred to by said at least one sub playback path and received by the receiving means; and combining means for combining at least two streams of the first and second streams read by the reading means, each stream of the at least two streams being of a predetermined category of the plurality of categories of stream type, when said category of stream type of said at least two streams are included in said at least one category of stream type of the first streams referred to by the main playback path and read by the reading means and in said at least one category of stream type of the second streams referred to by the corresponding sub playback path and read by the reading means, wherein the selection option information includes information indicating a combination of a first stream of the predetermined category of the plurality of categories of stream type and which is referred to by the main playback path and the second stream of the predetermined category of the plurality of categories of stream type and which is referred to by the corresponding sub playback path, wherein the receiving means receives the selection of streams to be played back based on the selection option information, wherein the reading means reads, when the selection of the first stream and the second stream to be played back is received by the receiving means, the first stream of the predetermined category of the plurality of categories of stream type and which is referred to by the main playback path and the second stream of the predetermined category of the plurality of categories of stream type and which is referred to by the corresponding sub playback path, wherein the combining means combines the first stream and the second stream of the predetermined category of the plurality of categories of stream type and which are read by the reading means, wherein the first stream of the predetermined category referred to by the main playback path is a first video stream of the at least one first stream, wherein the selection information further includes information defining a combination of a second video stream different from the first video stream and first image information associated with the second video stream, and wherein the playback apparatus further comprises:

first storing means for storing information indicating whether second image information associated with the first video stream is to be displayed or whether the first image information associated with the second video stream is to be displayed;

second storing means for storing information indicating which stream from among streams forming the second image information that are selectable by the selection option information is to be played back when the second image information is displayed;

third storing means for storing information indicating which stream from among streams forming the first image information that are selectable by the selection option information is to be played back when the first image information is displayed; and fourth storing means for storing information indicating whether the first image information or the second image information is to be displayed, wherein the reading means reads a stream associated with the first image information or the second image information to be displayed by further referring to the information stored in the first storing means, the second storing means, the third storing means, and the fourth storing means.

* * * * *